United States Patent [19]

Lavallee et al.

[11] Patent Number: 4,852,047
[45] Date of Patent: Jul. 25, 1989

[54] CONTINUOUS FLOW CHART, IMPROVED DATA FORMAT AND DEBUGGING SYSTEM FOR PROGRAMMING AND OPERATION OF MACHINES

[75] Inventors: Ronald Lavallee, Hudson; Thomas C. Peacock, Windham, both of N.H.

[73] Assignee: Universal Automation Inc., Hudson, N.H.

[21] Appl. No.: 38,876

[22] Filed: Apr. 14, 1987

[51] Int. Cl.$^4$ ............................................. G06F 9/00
[52] U.S. Cl. ............................ 364/191; 364/709.01; 340/712
[58] Field of Search .......................... 364/188–192, 364/146, 171, 147, 709, 710; 340/712

[56] References Cited

U.S. PATENT DOCUMENTS

| | | | |
|---|---|---|---|
| 4,546,435 | 10/1985 | Herbert et al. | 364/300 |
| 4,646,228 | 2/1987 | Ikeda | 364/192 |
| 4,679,135 | 7/1987 | Kobayashi et al. | 364/146 |

Primary Examiner—Jerry Smith
Assistant Examiner—Allen MacDonald
Attorney, Agent, or Firm—Robert K. Tendler

[57] ABSTRACT

An improved machine programming and control system includes the utilization of a continuous, multiple-block, flow chart or charts, all or a portion of which is displayed. Each entered flow chart is executed without conversion to other languages, such that machines are controlled in accordance with the flow charts that are displayed. Multiple flow charts may be entered each to separately control different machines or different parts of the same machine. The flow charts are displayed in a multiple-block presentation and a block numbering system permits rapid on-screen generation of flow charts, editing of the flow charts, and debugging of the flow charts through the utilization of an interrupt. A uniquely improved debugging system, active on an execution interrupt, permits rapid value changing for selected displayed flow chart blocks and permits a single-scan program rerun for verification. Upon run-time interruption, either the number of the flow chart block being executed at the time of interruption is automatically displayed or the block is highlighted so that a flow chart or charts may be edited and corrected on-the-fly. A new formatting system, inserts a block number format entry in the object program which is the output of the compiler, which entry is skipped by an Executive program during run-time execution, but which is retrievable upon a debugging cycle.

8 Claims, 9 Drawing Sheets

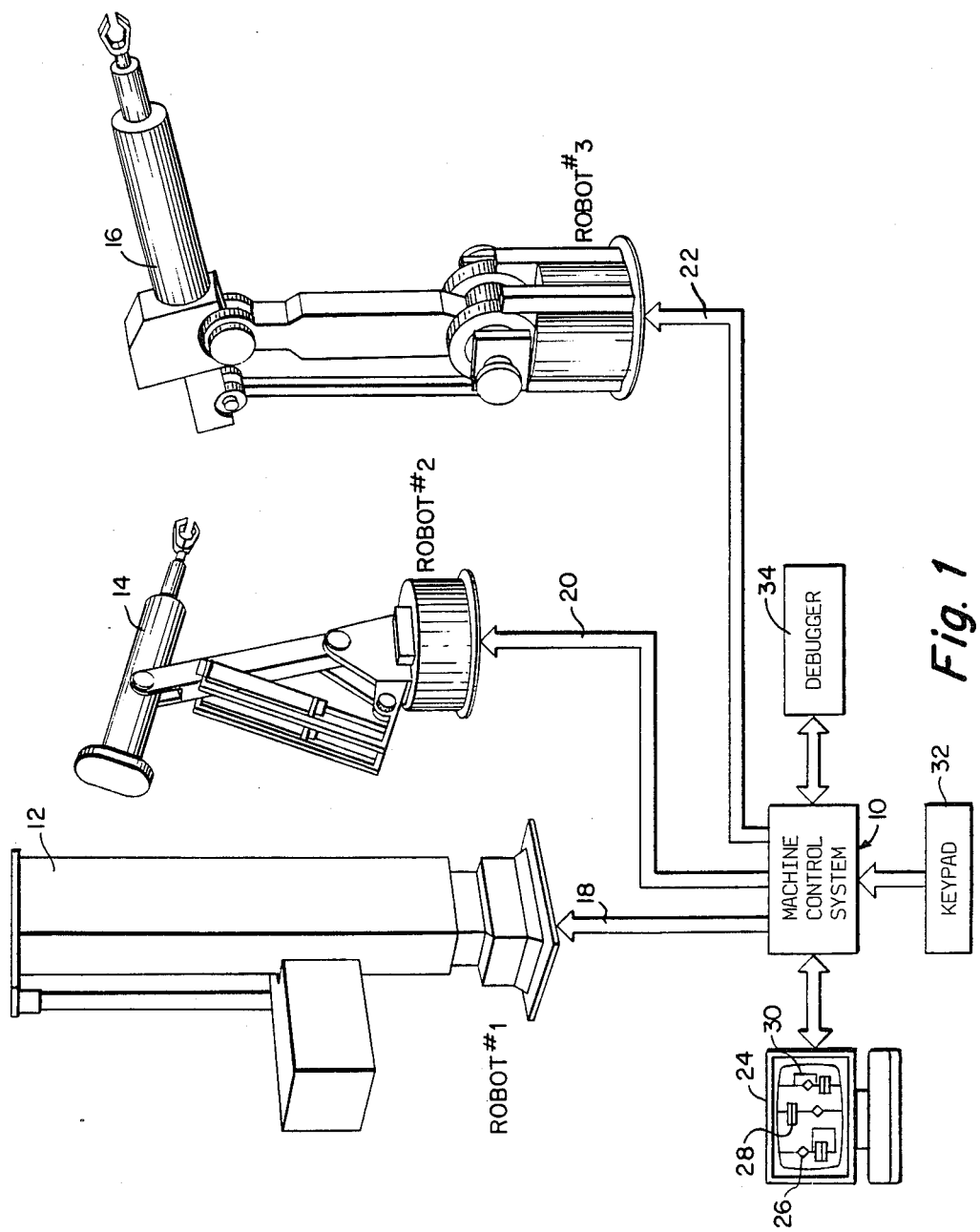

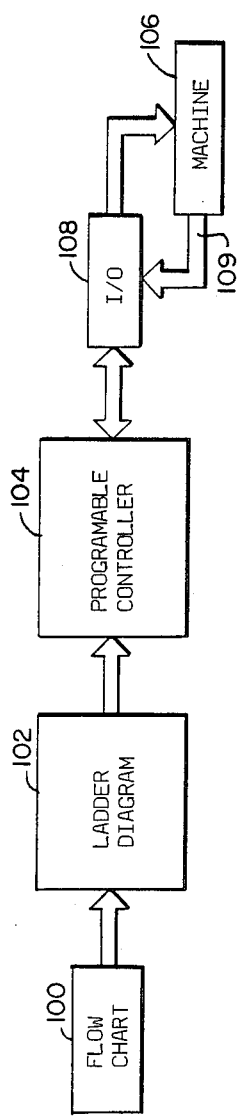
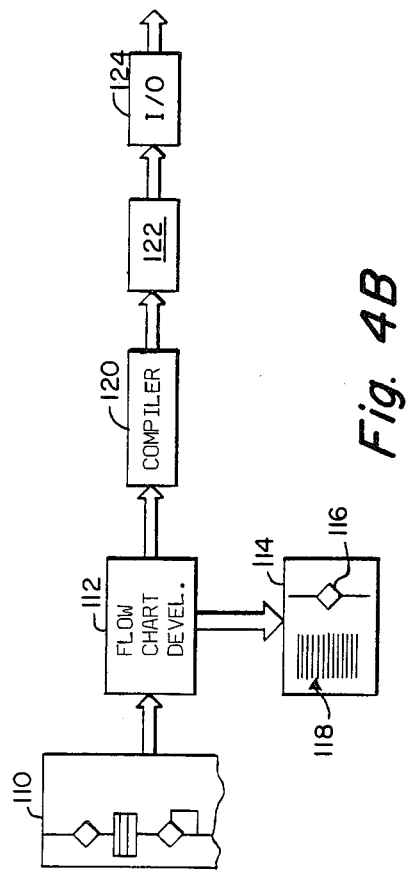
Fig. 4A (PRIOR ART)
Fig. 4B

CONTINUOUS FLOW CHART, IMPROVED DATA FORMAT AND DEBUGGING SYSTEM FOR PROGRAMMING AND OPERATION OF MACHINES

FIELD OF INVENTION

This invention relates to machine control, and more particularly to an improved formatting and debugging system, and to the utilization of a continuous multi-block flow chart display, for ease of flow chart generation and editing.

BACKGROUND OF THE INVENTION

Machine control, up to the present, was in general dependent on so-called ladder diagrams which were manually constructed either from the requirements for the machine or from a flow chart which was manually translated into a ladder diagram. The ladder diagram technique has been utilized, inter alia, to specify control systems involving relays and solenoids, motors, valves, hydraulic systems, lights, switches, and other electro-mechanical devices for drilling, welding, paint spraying, assembling parts, materials handling, fabrication, and in general control of machines for whatever purpose. However, ladder diagrams are extremely cumbersome in usage, and while there has been a large amount of experience with such ladder diagrams, they do not emulate the normal though process as well as do flow charts.

Flow charts, in general, include Decision blocks and other types of blocks, called Action blocks, which track closely the mental processes required to instruct a machine to go through various procedures. Regardless of the ability to describe machine function in flow chart form in the past, machines were treated as fixtures controllable by switches, solenoids, timers, etc., which were representable in ladder diagram form. The fixture might be a riveting machine or the fixture could be a drill and riveting machine. As manufacturing processes became more complex so did the language necessary for machine control, with the ladder diagram technique being almost impossible to implement, especially for closed loop systems.

In order to implement a ladder diagram, a specialized controller, such as manufactured by Gould or Allen Bradley, was built which was programmed in ladder language so that once a change was made in operation of the machine which the controller was to control, the controller had to be reprogrammed at the ladder language level in order to make the change. Such a change could merely involve the altering of a the stop point in the movement of an arm, head, or other mechanical device.

In summary, prior to the Subject Invention there existed so-called programmable controllers which operated in a harsh industrial environment and sensed inputs and outputs, and controlled machines with ladder language developed from traditional relay diagrams, which were difficult to construct, much less alter.

In the middle 1980's, Universal Automation of Hudson, N.H. developed a methodology and system for programming machines, especially robots, by defining the operation of a simple robot or machine through the use of a number of pictorially designated decision, logic, data entry, or run-time blocks as exemplified by CONTROL, WAIT, MOVE, EXIT, DECISION, and COMPARE flow chart blocks.

In these earlier machines a flow chart was manually generated using these flow chart blocks and each flow chart block could be called up at a computer console, at which time all of the particular tasks to be performed by that block were entered in tabular form, from whence the programmer went to the next sequential block. The reason for the use of flow charts as opposed to ladder diagrams was that flow charts could be drawn to represent almost any type of task involved, and more closely emulated the human thought process. Thus, any task could be represented in flow chart form and, with the ability to automatically execute a flow chart, the early Universal Automation system provided a powerful tool in which levels upon levels of programming could be eliminated.

Moreover, for the early Universal Automation systems, rather than scanning through the entire computer memory, tasks were performed on a block-by-block basis, in which the machines were controlled by virtue of the compiling of the final flow chart or flow charts into data converted through an Executive program into run-time instructions for each of the individual machines. In that sense, the computer-generated flow charts actually controlled the end use devices.

One of the features of the earlier work done by Universal Automation was the fact that, rather than time multiplexing tasks to be done without regard to the length of the task that had to be done, each individual flow chart block was executed, with the execution taking only that length of time necessary for the execution of a particular block. The execution of the blocks continued as long as the next block number was higher than the previous block number, with the task being suspended when the block number was equal to or lower than that of the block being executed. This minimized the amount of time necessary for the utilization of memory and computer power, such that personal computers were able to handle not only the generation of a flow chart but also the execution of a flow chart without the use of time multiplexing or conversion to another programming language.

As will be appreciated, the earlier work by Universal Automation completely bypassed the programmable controller by providing an image of the flow chart, created block-by-block, in the virtual memory of a computer. Thus the earlier Universal Automation systems completely bypassed the ladder diagrams in favor of executing a compiled flow chart or flow charts, which eliminated the need for the programmable controller and added an area of generality which was user-friendly to the point that a flow chart could be manually generated and then entered block-by-block into the computer. It will be appreciated that in these earlier systems the flow chart was drawn on a piece of paper and entered into the computer on a series of prompts. There was no display of a flow chart symbol on the screen. The computer served merely as an interface which asked questions about the drawn flow chart, which answers were entered into the computer so that the program could run.

Later Universal Automation introduced a system which displayed a single block of a flow chart so that entries could be made in a menu to the side of this single block. The block took one of six forms, e.g. one of those mentioned above, with each of the blocks being numbered. This permitted, in a limited way, the verification of inputting correct information.

The six types of blocks were as follows: The first type of block was a CONTROL block that allowed the user to turn on or off an output signal from the personal computer or CPU. It also allowed a turn on or off of an internal flag bit, a start, a stop, or a reset of a timer, or a clear, increment or decrement of an internal counter. Thus, the purpose of the CONTROL block was for instance, to start timers, increment counters, decrement counters, and then provide control that the turning on or off of an output signal would provide. The second block was a WAIT block which established a predetermined delay in the flow chart. WAIT blocks were obviously important to allow other things to occur, and the amount of delay was settable. The third block was a MOVE block which moved data through the system in parallel. In other words, the MOVE block permitted groups of input data or the value of counters or registers to be moved to output nodes, or to counters or registers. The next type of block was an EXIT block which allowed the user to leave the flow chart to go to any other type language required. The fifth type of block was the DECISION block which allowed the user to base a yes or no decision on an input sensor. It could also base a decision on internal bits being true, certain function keys on the computer keyboard being pressed, or certain time-out timers being completed. The sixth block was a COMPARE block which permitted the comparison of values in which a yes/no decision could be based on a result equal to or greater than or less than the particular values to be compared.

It will be noted that the blocks in the prior Universal Automation machines could be accessed individually by block numbers, but this required the user to have a separate handwritten flow chart in order to be able to ascertain what block to access prior to going to the computer screen to either alter, change, delete, or modify the function of a single block.

Once all the blocks had been completed in a handdone flow chart and entered into the computer, each block was displayed one at a time and verified by the operator. Assuming that the program met the specifications of the programmer, the information was compiled into data which, upon operation of an Executive program, drove I/O devices to execute the particular flow chart through the transmission of signals to the end-use machine.

The first flow chart programmers included a so-called editor, in which the flow charts were entered, with the editor displaying one block of the flow chart at a time, and with a menu of value selections to one side or the other of a block. These earlier machines also included a compiler, which compiled the flow chart or flow charts and created object data for use by the Executive program. The compiler also checked the flow chart for correctness of connection points, with the compiler producing a data file which was dependent on the types of blocks used, the connection points within the flow charts and various other criteria. Thus, in these machines, once compiled, data from the compiler was acted on by the Executive program to execute the flow chart by generating proper signals to I/O devices.

It will be noted that in the earlier Universal Automation machines, the compiler did not have to change from computer to computer or application to application. The Executive program was virtually all that was necessary to change and it could be changed in one or two ways. It was changed dependent upon the particular I/O system and also was changed for the given microprocessor utilized. Thus, until the particular microprocessor or input/output device was specified, there was no need to change the Executive portion of the program. The Edit programs and Compiler programs were completely independent and, from that basis alone, provided an editing advantage in that all editing and program generation was done in flow chart format.

Moreover, the earlier Universal Automation systems proved to run two to five times faster than the programmable controllers. This was because when a programmable computer solves its logic, it has to scan all of its memory locations to determine what to do. With the flow chart method of programming and execution, as will be discussed, one keeps track of where one is on each flow chart all the time. The Universal Automation system in effect only executes those statements of blocks on the flow chart that have to do with any particular given scan. Thus, the scan rate of the Universal Automation system was from two to five times faster than programmable controller scan rates.

One of the basic difficulties involved in the early Universal Automation systems was that no continuous flow chart, or part thereof, was produced on the computer screen. This became very inconvenient with respect to the formulation and generation of flow charts. A not small number of error routinely occurred in transferring a hand-drawn flow chart block-by-block to the single block representation of the flow chart on the screen. Also, one of the problems in representation of even a single flow chart block on the screen was the size of the screen and the inability to produce characters which were small enough to fit beside the representation of the block. Thus, menus were used on one side of the flow chart block to describe what was going on in the flow chart block. Moreover, this involved mental correspondence of a block to a chart of data. Another problem with the earlier machines was that the flow chart block was not drawn on the machine. Rather it was printed out on a printer which increased the difficulty in entering in the flow charts.

By way of further background, another and very real problem confronting the industry was the ability to reprogram the machines or robots "on the spot" when, for instance, a particular program did not provide expected machine movement or a machine broke down. It was ordinarily necessary, even with the early Universal Automation systems, to go back to the original program which was done by hand, correct it, re-enter it, and then recompile the program and run it to see if it would, in fact, run as expected. There was no ability to both interrupt the running of the program and to debug the program other than by guessing where in the program the error occurred. There was however a "freeze" capability in these early systems, as well as a rerun capability.

In summary, the earlier ladder diagram systems were almost intolerably complicated both in terms of the language involved and the debugging, as well as defining or redefining the role that the programmable controller was to play. While the early Universal Automation flow chart systems were easier to program than the ladder diagram systems, were faster than the programmable controllers, and alleviated the need for programmable controllers there was still a need for better programming and debugging techniques.

SUMMARY OF THE INVENTION

In order to solve these problems, the Subject Invention provides an improved machine programming and control system which includes the utilization of a continuous, multiple-block, flow chart or charts, all or a portion of which is displayed. Each displayed flow chart is executed without conversion to other languages, such that machines are controlled in accordance with the flow charts that are displayed. Multiple flow charts may be entered each to separately control different machines of different parts of the same machine. The flow charts are displayed in a multiple-block presentation, and a block numbering system is provided which permits rapid on-screen generation of flow charts, editing of the flow charts on screen, and debugging of the flow charts on screen should a run-time interrupt be initiated. A unique debugging system, active on an execution interrupt, permits rapid value changing for selected and displayed flow chart blocks and permits a single scan program rerun for verification of the displayed program change. Upon run-time interruption, either the number of the flow chart block being executed at the time of interruption is automatically displayed or the block is highlighted so that a flow chart or charts may be edited and corrected on-the-fly. In another embodiment, the flow of flow chart block up to the block executing at the time of interrupt is highlighted. Moreover, a new formatting system, different from the previous flow chart formatting systems, inserts a block number format entry before any Action block in the object program generated by the compiler prior to execution by the Executive program, which entry is skipped during run-time execution, but which is retrievable upon a debugging cycle.

More specifically, for a machine controlled by the execution of a flow chart, when a particular entry results in a machine operation which is incorrect, it is very important to be able to immediately locate the portion of the program which caused the incorrect machine function and to be able to change it immediately. In order to do this, the format for in the object program is changed in the Subject Invention to add a block number, which block number is invisible to the Executive program during execution. In other words, during executions, the block numbers are skipped and an Action block is the first element addressed. Thus, each of the format blocks contain the newly provided block number, with the remainder of the elements being for instance an action code element (the Action block), a mnemonic element, a fixed value element, a data-type element, and a destination-address element. With these elements, all of the simple robotic or machine operations can take place. The previous freeze capability halts the execution of the particular flow chart at the executing block and stays on that block until released. After a "freeze", as before, with an ENABLE, flow charts may be allowed to execute in a rerun mode, with the starting point being at the beginning of a subroutine flow chart.

Thus, during execution, the Executive program ignores the first three bytes corresponding to the block number and executes. Thus, the execution cycle simply jumps over the block number and goes directly to the first action code. As before, execution of a block is accomplished in ascending order with a descending order resulting in the suspension of execution of the flow chart so that another flow chart can be executed. Finally, flow chart numbers not only keep track of orderly flow of the programs but are utilized to make a decision as to whether to continue executing blocks within a given flow chart or to suspend a flow chart execution and to continue to any other flow chart.

Thus, upon interrupt of the system due to a machine malfunction or mispositioning etc., the number of the flow chart block in control at the point of interruption is automatically displayed, followed by display of the flow chart block. Alternatively, the flow chart blocks being executed at the time of interrupt are highlighted on the display. This permits the operator to easily change the program on-the-fly. A novel debugging system is provided due to the display of the portion of the flow chart executing at interruption. Thus one can read the status of any input; display the status of any output or flag; force the status of that output or flag on or off; read the value of counters, timers, and registers and allows change of these values in a visible display. Then a single scan execute of the displayed flow chart facilitates final program validation. Thus, the subject system provides for easy debugging of a program so that if, for instance, a position on an XY table is off by a given amount the given amount can be changed at the machine by changing a displayed value at a given flow chart block. Thereafter, the change is tried, and if successful, the program can be run further for checking.

Thus the new data format permits debugging of flow chart blocks through the display of a block number which is invisible during execution, but becomes visible during the interrupt process so that the flow chart entry can be easily edited or changed. Note the flow chart executing at the time of interrupt can be highlighted, and even the path previously taken through the flow chart to get to this block can be highlighted and this can be displayed in a different color or other indicator such as dotting the path.

A second feature is a debugging system in which, because of the display, changes can be instantaneously made to the flow chart and tried in a single scan execution.

A most important feature of the subject invention is the actual display of a continuous flow chart, or part thereof, rather than individual flow chart elements. Note, multiple, simultaneously-displayed flow charts can be accommodated by the Subject System. While the early Universal Automation systems required the manual conversion from an already hand-drawn flow chart to data entry, in the subject system the ability to produce or generate continuous portions of the flow chart on the computer screen not only provides ready editability to the initial flow chart, but also editability during subsequent changes in the flow chart once the flow chart has actually been executed and tried on the particular machine.

In order to provide for the display of a continuous flow chart as opposed to single flow chart blocks, a new set of instructions are necessary in the drawing of the blocks on the screen. While general purpose programs exist for the drawing of virtually any type of character on the screen, these programs are much too complex to be utilized with any degree of facility in a flow charting system. A simplified drawing system is therefore provided in which only certain allowed lines and symbols are permitted. These lines are horizontal lines, vertical lines, the formation of rectangles, and the formation of diamonds, in which the line length to each next block is fixed in an XY sense. Other symbols and lines are an enable symbol, and horizontal spaced lines with triangular ends, ie an unequal hexagon. The essence of this flow block drawing program is that the screen in one embodiment 640×350 dots, with the assembler merely actuating the appropriate dots for a given symbol or fixed length line.

Another feature of the drawing system is that the screen is divided up into cells, with only one block allowed per cell and only prescribed arrows within the cell along only certain paths. This alleviates the problem of specifying XY coordinates for symbols and lines. Here the flow chart is defined by cells and locations within a cell. This is accomplished by a specialized flow charting sheet.

In addition to the particular blocks and the way they are generated on the screen along with the particular lines to and from the blocks, a three by five dot matrix permits the labeling of the blocks on the screen, rather than in a menu beside the block. It will be appreciated that most computer terminals have a limited amount of space on the screen and the ability to provide intelligible symbology next to a continuous flow chart is almost as important as the ability to provide a continuous flow chart itself.

The ability to scroll through the continuous flow chart by displaying contiguous and continuous portions of the flow charts permits the operator to continually go backwards and forwards over his particular flow chart to look for errors or to add or delete that which he deems necessary. Not only are transcription errors completely eliminated by the subject system, because the flow chart has an immediately defined image in the memory of the CPU, its execution in the exact form indicated on the screen is assured.

In summary, the linking together of flow chart blocks on a display screen permits on-line generation of a flow chart, or series of flow charts for multiple machines. Note, the generation of a flow chart is self-executing through the aforementioned Executive program and compiler. Thus, in the subject invention, more than one flow chart block is displayed on the screen, with as many as fifteen or twenty blocks being displayed in one embodiment, thereby to give the programmer optimal ability to see the structure of his program. Additionally the three by five matrix alpha-numeric labeling is both readable and understandable even though small. During editing, this labeling system eliminates the necessity of having a menu or window set to one side to provide for the variables that are necessary in specifying the functions of each of the flow chart symbols or blocks. Finally, the utilization of a particularly efficient method of displaying alpha-numeric characters permits the presentation of continuous flow charts in a manner which is easily readable.

The use of the continuous flow chart in conjunction with the additional data format block which specifies the interrupted block only during execution interruption, provides easy access to the portion of the program which must be changed assuming the machine is not behaving according to plan or is behaving properly but inappropriately due to a programming error.

Thus, the subject system eliminates the need for programmable controllers. It eliminates the need for ladder diagrams and conversion to machine language. There is no need to reconfigure the compiler from computer to computer. Execution and, therefore, machine control is done directly from the flow chart. The entire flow chart is provided with the block numbers presented during a debug interruption cycle. The unique debugging system includes a display which identifies or displays the block being executed within each flow chart at the time of interruption. A single scan execution after debugging provides rapid verification for displayed program changes. There is no need, in the present system, to scan all memory locations since the only portion of the program that is executed is the executed flow chart block. The subject system is two to five times faster than even the fastest of the present programmable controllers, with each flow chart representing a task and with multitasking capability provided by the subject system in that the system switches flow flow chart to flow chart. At no time are the tasks time-multiplexed such that the time spent on each task is just that necessary to do the task. With each flow chart representing a task, putting together a system permits a user to link tasks together, with certain tasks being executed concurrently or sequentially. this multi-tasking capability is transparent to the user, with the time spent on each task dependent on what is happening within the task rather than being time multiplexed. The fact that the tasks are made nontransparent in their execution to the user provides aid in debugging a particular system. Note, all that is necessary to provide for machine control is to provide a flow chart, enter in the block numbers, and execute from that level without conversion to another language.

BRIEF DESCRIPTION OF THE DRAWINGS

These and other features of the Subject Invention will be better understood in conjunction with the Detailed Description taken in conjunction with the Drawings of which:

FIG. 1 is a diagrammatic representation of the Subject machine Control System operating from flow charts to control multiple machines;

FIG. 4A is a block diagram of a prior-art, programmable-controller system;

FIG. 4B is a block diagram of a flow chart-driven machine control involving single flow chart block display;

FIG. 9 is a diagrammatic representation of a three by five alphanumeric character placeable beside a flow chart block.

DETAILED DESCRIPTION

Figure 2A:
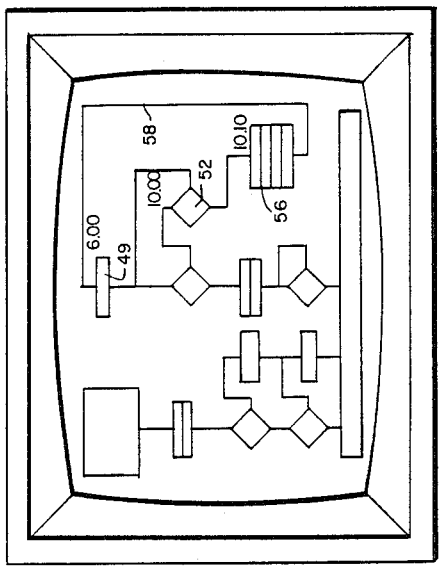
FIGS. 2A and 2B show an original flow chart and a change made after a run-time interrupt to permit on-the-fly changes and program reruns.

Referring now to FIG. 1, a machine control system generally designated by reference character 10 is shown coupled to three different robotic machines 12, 14, and 16 via buses 18, 20, and 22 respectively. The machine control system includes a CRT-type display or monitor 24, on which are presented three different flow charts 26, 28, and 30 with each of the depicted flow charts being a section of the larger flow chart to which it belongs.

As will be described, the displayed flow charts are also carried in the memory of the CPU used in the machine control system, which, in one embodiment utilizes a programmable personal computer or a like machine which has a keyboard or other entry device 32 and is provided with a debugging system at 34, as will be described.

It is one of the features of the subject machine control system that the flow charts which are displayed on monitor 24, are directly converted into machine language object code which results in the appropriate I/O signals being applied to buses 18, 20, and 22 respectively to control the respective machines through direct execution of the flow chart. The flow chart is executed in the sense that its image is compiled within the machine control system and the data therefrom is loaded into an Executive program which includes a logic solver, and I/O scanner. The output of the I/O scanner drives and I/O device or module, as will be described. The I/O module drives the respective machines or machine elements in accordance with the compiled and executed flow chart.

CONTINUOUS FLOW CHARTS & DEBUGGING

It is a primary feature of the subject system that the flow charts are presented on the display in a continuous and contiguous form so that they may be readily entered into the editor portion of the CPU and also easily edited, from whence they are directly executed after they are compiled. Thus, the display of the continuous and contiguous flow charts, or portions thereof, provides for ease of editing as well as entry, with the debugging unit 34 providing for ease of debugging an original program during a run-time execution of the program.

Again, as will be described later, in the debugging phase of the machine control system, debugger 34, upon interrupt of the execution of a flow chart, takes control over the machine control system and displays a highlighted flow chart element on display or monitor 24, which flow chart block is the one being executed at the time of the interrupt of the machine control. Alternatively, as will be seen, monitor 24 may display a listing of all of the flow chart block numbers, which block numbers correspond to the blocks being executed at the time of the interrupt. From that display, one can call up through the debugger the particular flow chart block, change its value via keypad 32, and through a single scan execute the altered program to ascertain if the machine is behaving in the manner prescribed.

Referring now to FIG. 2A a typical flow chart to be executed is illustrated to include flow chart blocks 40, 42, 44, 46, 48, 49, 50, 52, 53, and 54. These flow chart blocks define a portion of a continuous flow chart, in which during an interrupt, flow chart block 52 may be highlighted by the aforementioned debugger. It can be seen by FIG. 2B that an additional set of flow chart blocks 56 has been added in a loop illustrated by line 58 to correct whatever was the problem with the initial program. Thereafter, upon recompiling, the program illustrated in FIG. 2B is executed via the system of FIG. 1, with the simple editing having been accomplished through the addition of an additional set of blocks in the displayed flow chart.

Figure 2B:
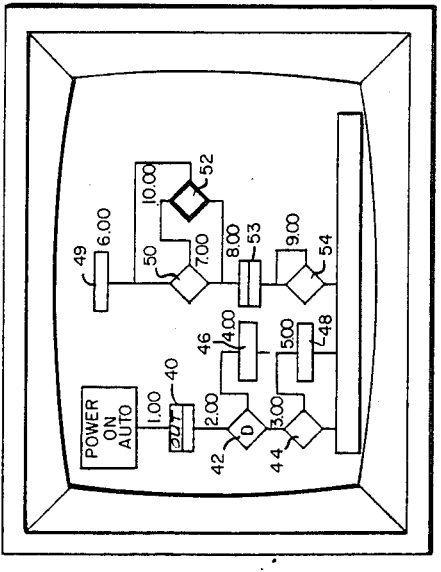

While additional flow chart blocks have been added to the initial flow chart as illustrated in FIG. 2B, it is sometimes only necessary to change the values of preexisting flow chart blocks. In this case, the debugger does not require recompiling of the altered program but rather, in a single-scan, will execute the displayed changes in the program, assuming the blocks had merely been altered in terms of value changes.

This is an extremely advantageous way of on-the-fly editing of programmable machines in that displayed values may be changed in the debugger, and the displayed values executed without going through a complete recompile. Should more extensive changes be made to the program, the debugger allows the operator to isolate and display the particular program blocks which were executing at the time of interrupt and then re-edit the program through an editor, which will be described hereinafter. After the more complicated changes have been made by the editor, they are compiled by the compiler and loaded into the Executive program so that the machine may be properly controlled.

Figure 8:
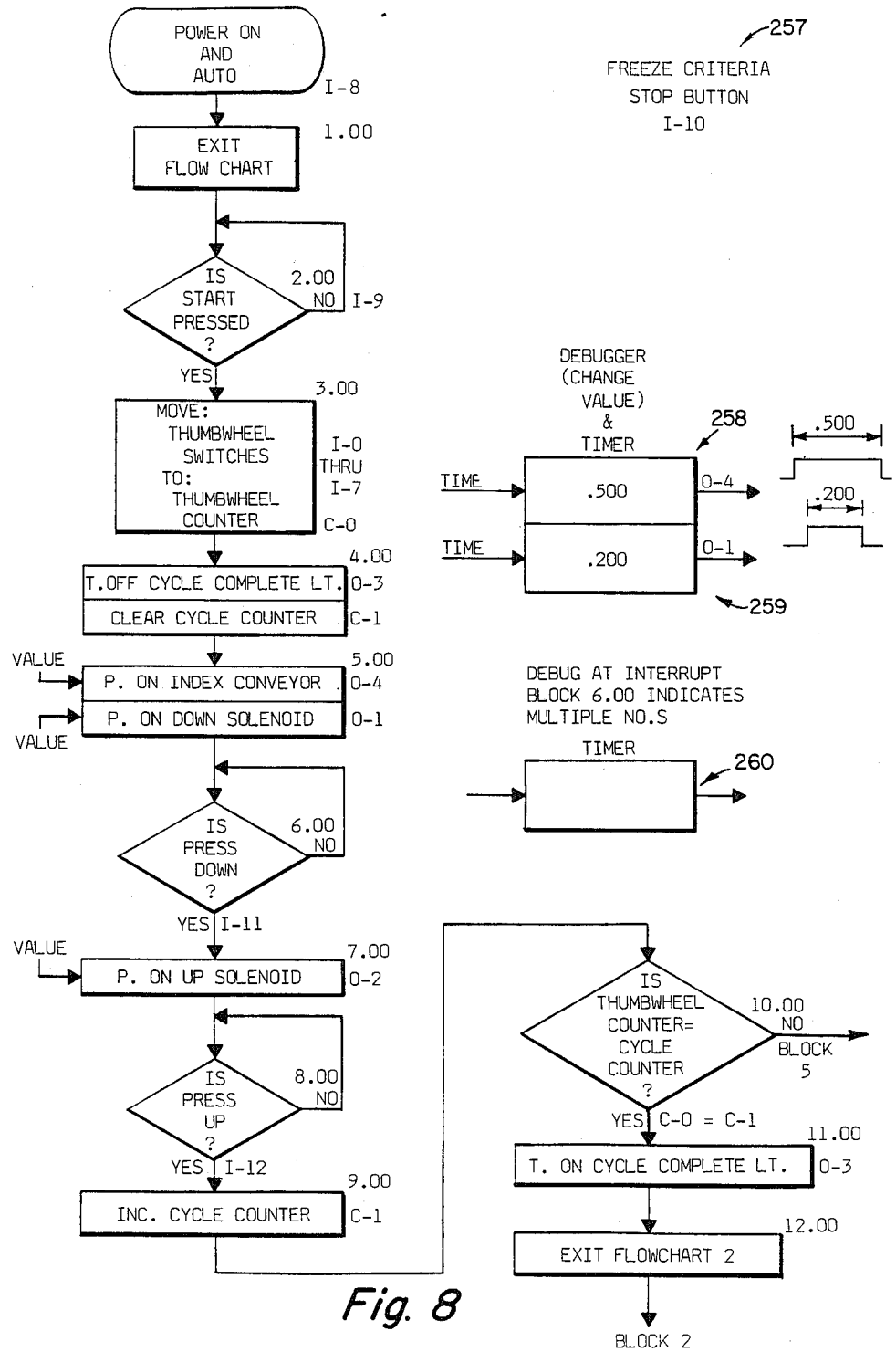
FIG. 8 is a simplified flow chart to control the punch press of FIG. 8.

What will be apparent from the FIG. 2A and 2B diagrams is that what is presented to the operator is a continuous flow chart or portion thereof, in which the flow blocks are contiguous and numbered; and in which the values are displayed immediately adjacent the flow chart blocks in the appropriate positions for the particular block as illustrated in FIG. 8. This is unlike previous systems in which if flow charts were used, only an individual block was displayed.

Having displayed the flow chart block numbers along with the flow chart blocks, it is possible to alter the program simply and easily by editing on the screen, in which screen entries are automatically mirrored into the editor or graphic memory within the computer utilized. Thus, as will be discussed in connection with FIG. 6, there is a correspondence between the displayed flow chart, the graphic memory, the editor memory and the object memory in the Executive program. This correspondence allows complete confidence that the flow chart, once edited on the screen, will be executed in precisely the manner presented by the screen.

Figure 3:
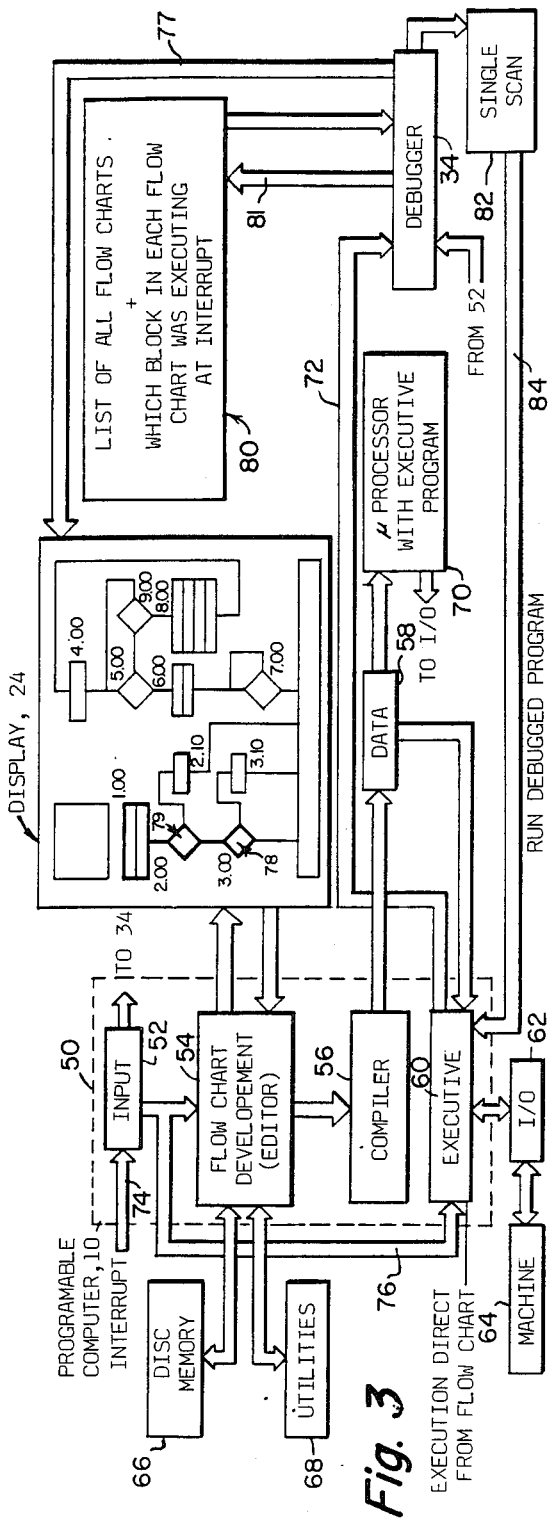
FIG. 3 is a block diagram of the Subject System illustrating display of continuous flow charts, flow chart block numbers and the subject debugger and interrupt system.

Referring now to FIG. 3, the machine control system 10 is seen to include a programmable computer or CPU designated by a dotted box 50 and an input device 52, such as the aforementioned keyboard. the CPU includes a flow chart development editor 54, a compiler 56 which produces object data 58 that is loaded into an executive unit 60 which includes an executive program that performs logic solving and I/O scanning functions. This unit provides signals through an I/O device 62 to a machine 64.

The flow chart development editor includes a disk memory 66, as illustrated, and a utilities package 68 which, in general, permits the development of flow chart symbology on display 24, as illustrated to the right of CPU 50. Note that the flow chart generating program resides in the editor. It will be appreciated that blocks and the flow charts are numbered by numbers such as 1.00; 2.00; . . . 8.00. These block numbers identify the blocks, with the lines describing the particular order in which they are desired to be run.

As also illustrated, the object data which is represented by block 58 may be coupled to a microprocessor 70 programmed with the aforementioned Executive program. Microprocessor 70, with its Executive program takes the place of unit 60 and may be utilized exteriorly of the CPU to run various machines. In other words, unit 60 of the CPU may be replaced with a preprogrammed microprocessor which, in essence, performs the same function.

It will be noted that debugger 34, is supplied with data on bus 72 from the unit 60, in which when an interrupt 74 is inputted via keypad 52, unit 60 is inhibited while, at the same time, providing data to debugger 34 to indicate which block or blocks are being executed at the time of interrupt. Inhibit signals come from the keyboard 52 over bus 76 as illustrated.

Debugger 34, in one embodiment, drives display 24 via bus 77 to highlight the particular block which was executing at the time of interrupt, this highlighting being shown by block 78. Also debugger 34 may highlight in a different fashion, the flow chart execution path to that block as illustrated at 79.

In an alternative embodiment, upon inhibiting of the executive program, a list of flow charts plus the block number in each flow chart which was executing at the interrupt is displayed on display 24. Here this display is illustrated by reference character 80 which is driven via data transmitted over bus 81.

The debugger functions in the following ways. It will be appreciated that the debugging system for the prior Universal Automation systems merely permitted reading of inputs, reading and changing the states of outputs, reading and changing the states of initial flags, reading and changing the values of times, counters, and registers, performing a single-scan execution or resuming or ending execution. The present debugging system performs all of the above with the added feature of display so as to alert the user quickly and to provide accurate change identification. Additionally, the subject debugger program, in one embodiment, highlights changes and flow chart paths to aid debugging. Moreover, the Subject System now permits full flow chart editing capabilities such as deleting blocks, moving blocks, changing flow paths or routes, and adding blocks. Thus the editor, compiler, and debugger function are now combined into one program for exceptional flexibility with all relevant data now displayed. Once the particular flow chart blocks have been altered to the satisfaction of the programmer, the debugger upon command can initiate a single scan, here illustrated at 82, of the newly debugged program via keypad 52 so that it may be executed by unit 60 via the I/O device 62, such that machine operation can be verified. The single-scan data is inputted to unit 60 over bus 84 as illustrated.

What will be appreciated is that the subject system permits the display of continuous flow chart blocks to aid in the flow chart development, as well as the debugging process. The block numbers are displayed for purpose of enabling the programmer to get back into the flow chart at the required spot and highlights are utilized to indicate, during an interrupt cycle, which blocks in the program were executing at the time of the interrupt.

It will also be appreciated that the CPU in the subject system can handle as many as 50 machines at one time in one embodiment, and thus as many as 50 different flow charts can be executed either simultaneously or sequentially depending on the flow of the manufacturing process which is controlled by the subject system.

Thus, it may be more appropriate rather than highlighting blocks on a screen since so many flow charts are involved, to provide the listing as illustrated by display 80, so that should the machine be carrying a large number of flow charts, only the flow charts that are necessary to be edited will be called up to the display.

As will be seen hereinafter, it is the provision of the Executive program with a new data format, in which flow chart blocks are designated by number in the program but are skipped over when execution begins, which provides the system with the type of debugging flexibility and data management which makes editing and debugging an exceptionally simple process for the end user.

To recapitulate with respect to the prior art and referring now to FIG. 4A it will be appreciated that in the prior art a manually-derived flow chart 100 was converted to a ladder diagram 102 which was then programmed into a programmable controller 104 in ladder language, which programmable controller controlled machine 106 via an I/O device 108 that produced the requisite signals for machine control. As illustrated, a closed loop 109 from the machine provided the programmable controller with inputs derived from the machine so that the programmable controller could operate in a closed loop manner. The closed loop machines with their programmable controllers are extremely complex, as described before, and perhaps unnecessarily so in view of the subject flow chart programming and control system.

The subject system has increased flexibility and ease of usage, as compared to the earlier Universal Automation system illustrated in FIG. 4B, in which a hand-drawn flow chart 110 was, upon prompts, entered in to a flow chart development system 112 with the aid of a single-block display 114, that involved a block 116 and a menu beside it here illustrated by reference character 118. The flow chart developer, as described above, drove a compiler 120 which, in turn, drove an executive unit 122 which outputted its logic solver, and I/O scanner through an I/O device 124 to a machine (not shown).

FORMAT

Figure 5:
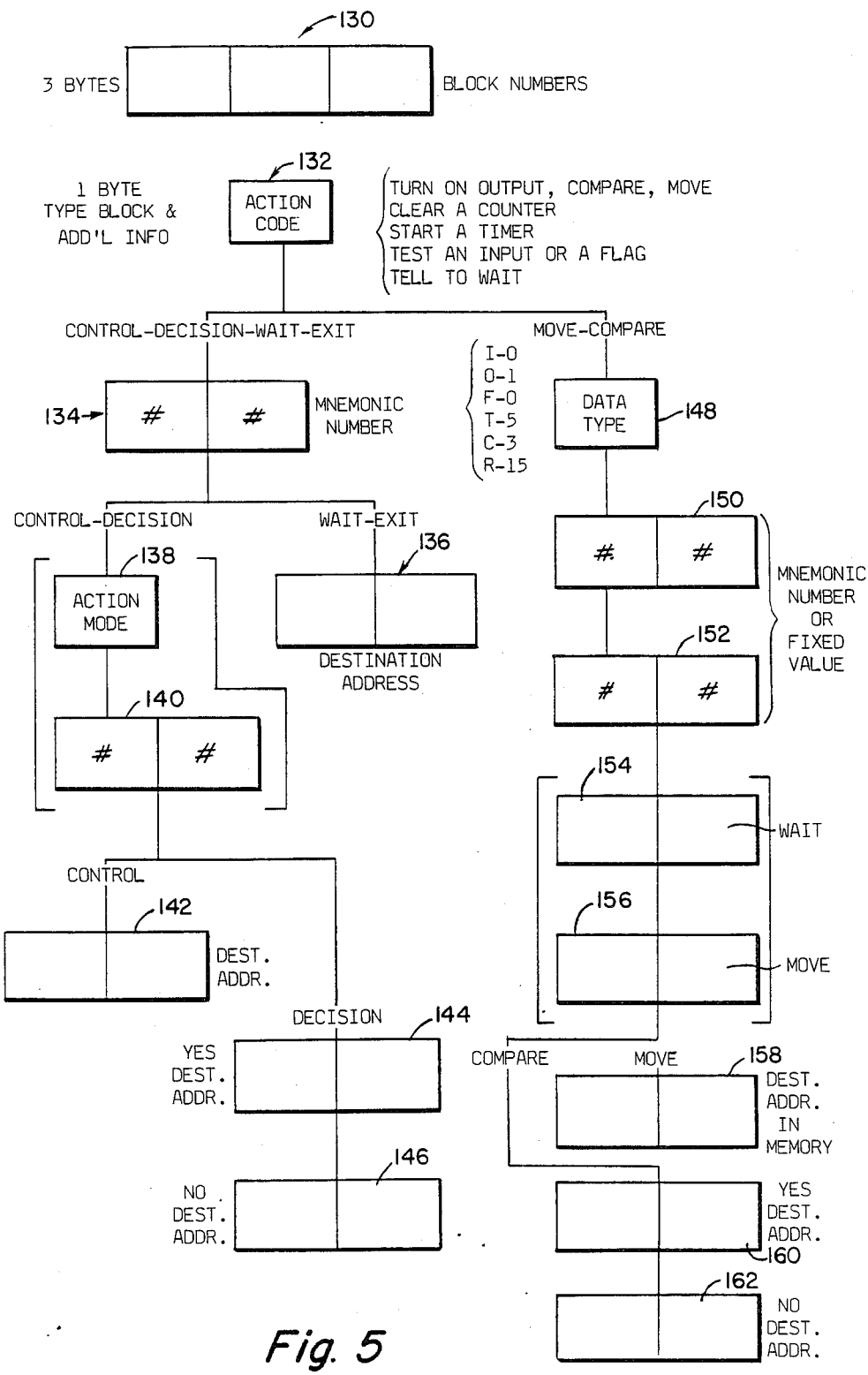
FIG. 5 is a diagrammatic illustration of the data format to be used by the Executive program of FIG. 2.

Referring now to FIG. 5, the data format of the object data produced by the compiler is illustrated in which 3 bytes are initially utilized for the block number as is illustrated at 130. It will be appreciated that this format is interpreted in the Executive program. The format contains a block number, an action code, a mnemonic number, a fixed value, a data type and a destination address. The action code, as illustrated at 132, is 1 byte in length which indicates, inter alia, the type of block which is to be executed and additional information. Withing the 1 byte it is possible to identify such actions as turning on and off an output or flag providing a compare, providing a move, clearing, incrementing or decrementing a counter, starting, stopping, or resetting a timer, testing an input, flag, or a timer or a function key on a key board, or telling the Executive Program to wait or exit. After the action code there is a branching to either a compare-decision-wait-exit mode, in which mnemonic numbers as illustrated at 134 define the numbers of such elements as an output, an input, a flag, a timer, a counter, or a register. Thereafter, a branch occurs to a wait-exit block in the form of a destination address 136. The other portion of the branch is to an optional control-decision block in which a further action code is illustrated at 138 which is followed by another mnemonic block 140. This outputs to a decision-control branch such that for a control branch there is a destination address 142, whereas if there is a decision branch a "yes" destination address 144 or "no" destination address at 146 is accessed.

The other branch from action block 132 is a move-compare branch in which the data type 148 is accessed. Thereafter a mnemonic number 150 or fixed value 152 can be accessed, with an optional mnemonic number block 154 or fixed value block 156 being provided. Thereafter there is a branch to a "move", wherein on the move side of the branch there is a destination address 158; whereas on the compare side of the branch there may be a "yes" destination address 160 or "no" destination address 162. Note that the above diagram is provided for illustrative purposes only to show the location of the block number element ahead of all others for a given task.

During execution of any particular program, the block number is skipped until such time as the aforementioned interrupt occurs at which time the block number is read out in terms of its 3 bytes of information.

With this new addition to the format block the above-identified debugging and control is made considerably easier which also permits the display of the relevant flow chart blocks which are actively being executed at the time of the interrupt.

Figure 6:
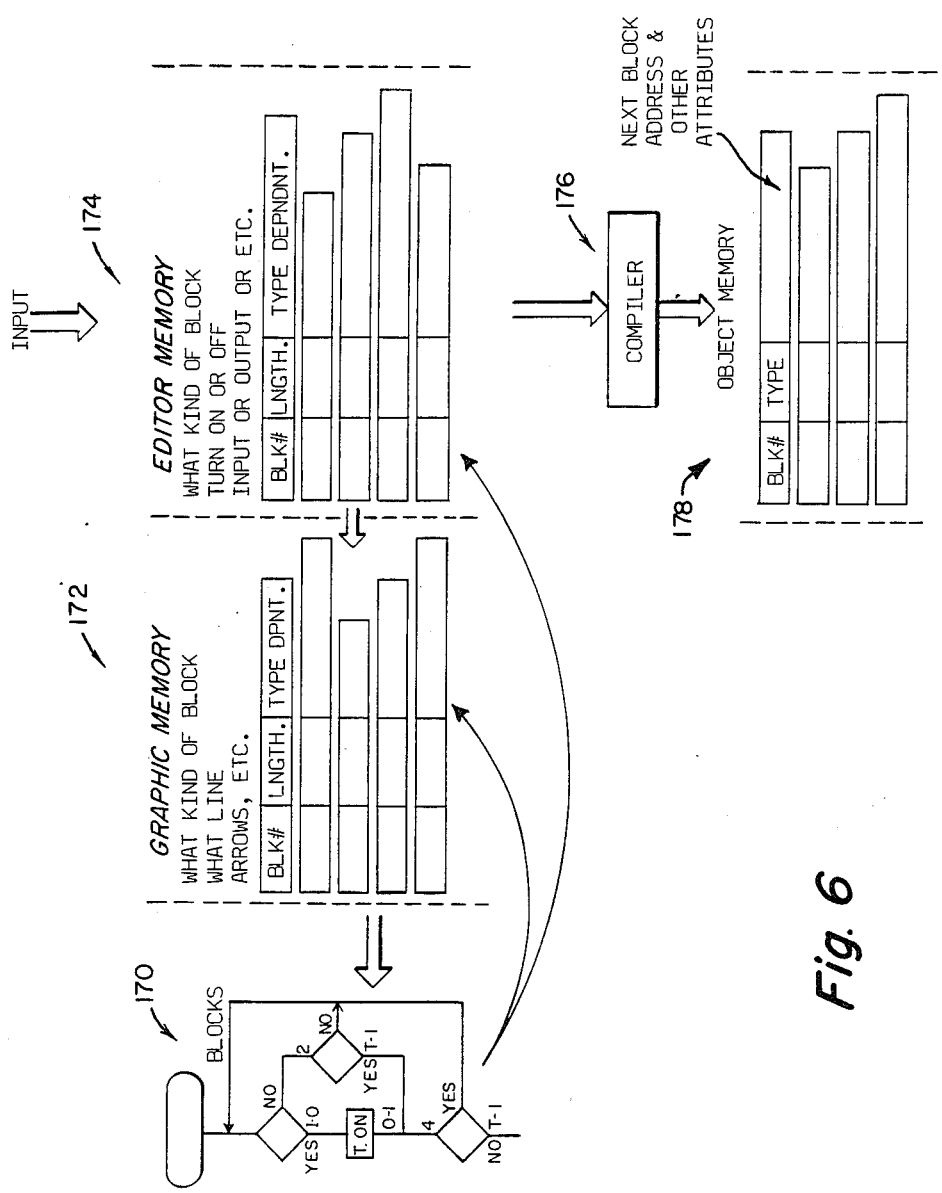
FIG. 6 is a diagrammatic illustration of the correspondence of a displayed flow chart to a graphic memory, and editor memory, and finally to an object memory, after compilation.

Referring to FIG. 6 it will be seen that a flow chart generally indicated at 170 is carried in the graphic memory format form as illustrated at 172 which identifies the graphic location and criteria such as the presence or absence of a line. The function of the block is carried in the editor memory form at 174. After compiling of the editor output at 176, the object data in the above format form is placed in object memory as illustrated by format 178.

It is the purpose of this diagram to indicate that what is established in the editor memory is reflected on screen at the same time as that which is executed. Thus the graphic memory defines the visual representation of the flow chart image in the editor memory. Therefore the graphics can change position while the flow chart stays the same in the editor memory. Thus, while the program or flow chart can be represented many ways on screen, the editor memory and hence the object code remain constant for a given flow chart input.

Figure 7:
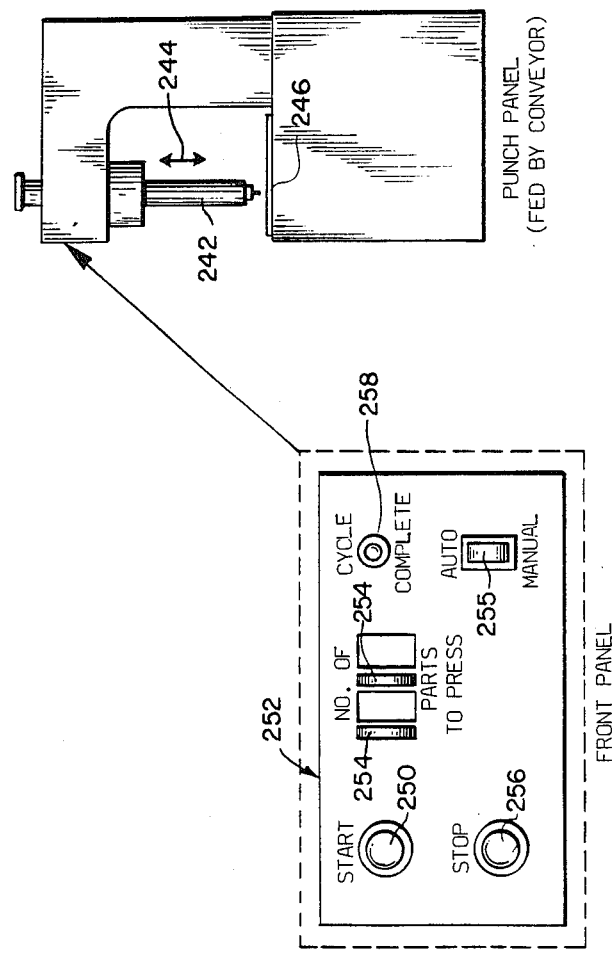
FIG. 7 is a diagram of a typical punch press to be run by the Subject System.

Referring now to FIG. 7, the simple control of a punch press and a conveyor is illustrated. Here the punch press has a head 242, which is solenoid-driven such that the press head is moved in a direction illustrated by double ended arrow 244, whereas a work piece 246 to be punched is driven by solenoid actuation to move the piece in a direction perpendicular to the movement of the punch press head.

Typically when the machine is in an automatic mode and controlled by the Subject System a start button 250 on a control panel generally indicated at 252 is pressed. This is subsequent to the operator first selecting the number of cycles to be utilized and the number of pieces to be punched, in this case indicated by thumb wheels 254 to indicate that 23 pieces are to be processed. To make sure that the machine is in the automatic mode the start button 250 is depressed with switch 255 in the automatic mode.

When in the automatic mode the machine is controlled by the flow chart of FIG. 8 such that the enable bubble at the top of the flow chart is the "power on and automatic control" vehicle. The freeze criteria is implemented by a stop button 256 on the panel in FIG. 7 as illustrated at 257 to be responsive to I-10. Thus after power on and the machine placed in the automatic mode, which is input 8, this results in the accessing of the first exit flow chart block, which is given block number 1.00. The exit flow chart block enables one to leave the flow chart and go to some other language to put on screen a message, for instance, on the face of a CRT, that says that the machine is now running. Running from the exit flow chart block is a decision block which ascertains that the start button has been pressed. This is block number 2.00 and has an input I-9. Pushing the start button results in an input at input 9 which results in a "yes". At this point one of the move blocks is accessed as illustrated at flow chart block 3.00. The inputs to this block are I-0 through I-7 which corresponds to the position of the thumb wheel switches. As a result the thumb wheel switch outputs are "moved" into counter C-0. The hardware inputs of 0 to 7 are therefore transferred to the thumb wheel counter, at which point the next block, block 4.00, turns off the cycle complete light 258 of FIG. 7. This is accomplished at output 0-3. The cycle complete light could have been on from a previous cycling of the machine so it is at this point that is it shut off during a new cycle. At this point, the counter for the unit is cleared as indicated by C-1 as this counter keeps track of the incrementing of the conveyor. The conveyor is moved through the utilization of block number 5.00 in which a value is inputted to pulse or index the conveyor via, for instance, a stepping motor or solenoid. A value is placed in the "index conveyor" portion of this block such that there is an output pulse at 0-4, the length of the pulse being determined by internal timer 258. The length of the output pulse determines the number of steps for the stepping motor and this may be changed so as to properly position the part under the punch press.

Likewise, the position of the head is controlled by a timer 259 which produces a different length pulse, again to produce an indexed or stepping motor type of drive for the head, such that the head is brought down by a distance commensurate with the length of the pulse produced by timer 259 at output 0-1.

It will therefore be appreciated that in the embodiment described, the positioning of the parts of the machine are provided by virtue of the translation of the timer pulse length into a length or throw governed by stepping motors, solenoids, or other devices.

After block 5.00 is a decision block 6.00 having an input I-11 which may be from a limit switch which answers the question, "is the press down?" If so, the next block accessed is block 7.00 which is a "pulse on up solenoid" which controls a solenoid by the pulse at output 0-2. The length of this pulse is controlled by a like timer 260 to pull up the head after the punch has been made. This is only accomplished after the head has performed the punching operation as indicated by the punch down input I-11. The head is moved up in accordance with the timer 260 output associated with block 7.00 and its up positions is indicated by an input I-12 at block 8.00 which indicates that the press is up. At that point the cycle counter is incremented at 9.00 such that counter C-1 is incremented. Thus the counter is incremented every time that a part is punched, with block 10.00 comparing the cycle counter output to thumb wheel counter and if they are not equal, then the process loops back to block 5.00 to index the conveyor which repeats the whole process again. The blocks are continually executed until a comparison to the cycle counter equals that of the thumb wheel counter at which point the cycle complete light is actuated by output 0-3 from block 11.00. At this point the flow chart is exited at block 12.00 to go back to block 2.00. The "exit flow chart" may place on the face of the CRT a display which indicates that the machine is no longer running since a loop is made back from 12.00 to 2.00, where the program waits until the start button is again pressed.

What will be appreciated is that this simplified flow chart shows the utilization of a number of flow chart blocks in which each has its indication immediately in or adjacent the block so that when it is presented on the CRT screen all of its functions are within the flow chart or adjacent to it, as opposed to being presented in a menu.

Should there be a mispositioning of the press or a limit switch fails, execution may be inhibited, with the interrupt immediately calling up and displaying the executing block number; or the executing block itself is highlighted on the display. At this point, should a timer change need to be made, the value can be immediately inputted into the corresponding timer so as to change the length of the timer pulse and thus the position of the corresponding element of the machine. With these changes made possible by the display of the executing block it is now possible, with the aforementioned debugger, to be able to change the program on-the-fly and to run through the program without recompiling, thereby to immediately ascertain if the timer pulses are of the requisite length to provide the requisite machine movement.

Alternatively, for instance, if the press is not down, then it can be ascertained that it may be a faulty limit switch. This can be ascertained because if the "press down" block 6.00 is highlighted, this alters the operator either to a programming error or to a machine error. As illustrated in the flow charts of FIG. 2, should there be a necessity of adding or subtracting flow chart elements in order to obtain proper machine control, it is the interruption which provides for the place in the cycle where the program must be changed. Thus, the program can be changed on-the-fly with the exception that the debugger activates the editor should new flow chart elements be necessary as opposed to the mere changing of flow chart values. Should new flow chart entries be necessary then it is necessary to go through a compile routine in order to test out the new program.

Referring to FIG. 9, it can be seen that the type of alphanumeric indication utilized adjacent the flow chart can be easily depicted by a three by five dot matrix system which permits exceptionally small numbers to be placed on the screen adjacent to the flow chart, which numbers are nontheless readable. This provides a unique capability when utilizing a flow chart to have all the information that is normally provided for a flow chart to actually appear on the screen at the flow chart block. Thus, the three by five character alphanumeric generating provides for exceptionally small, yet readable nonclementure to be put at a place where it is expected when doing a flow chart. It is therefore part of the subject invention that the flow charts be labeled by a dot matrix character generating system, which when utilized in combination with the subject process makes it uniquely easy to use, edit and otherwise modify the corresponding program or programs.

Figure 10:
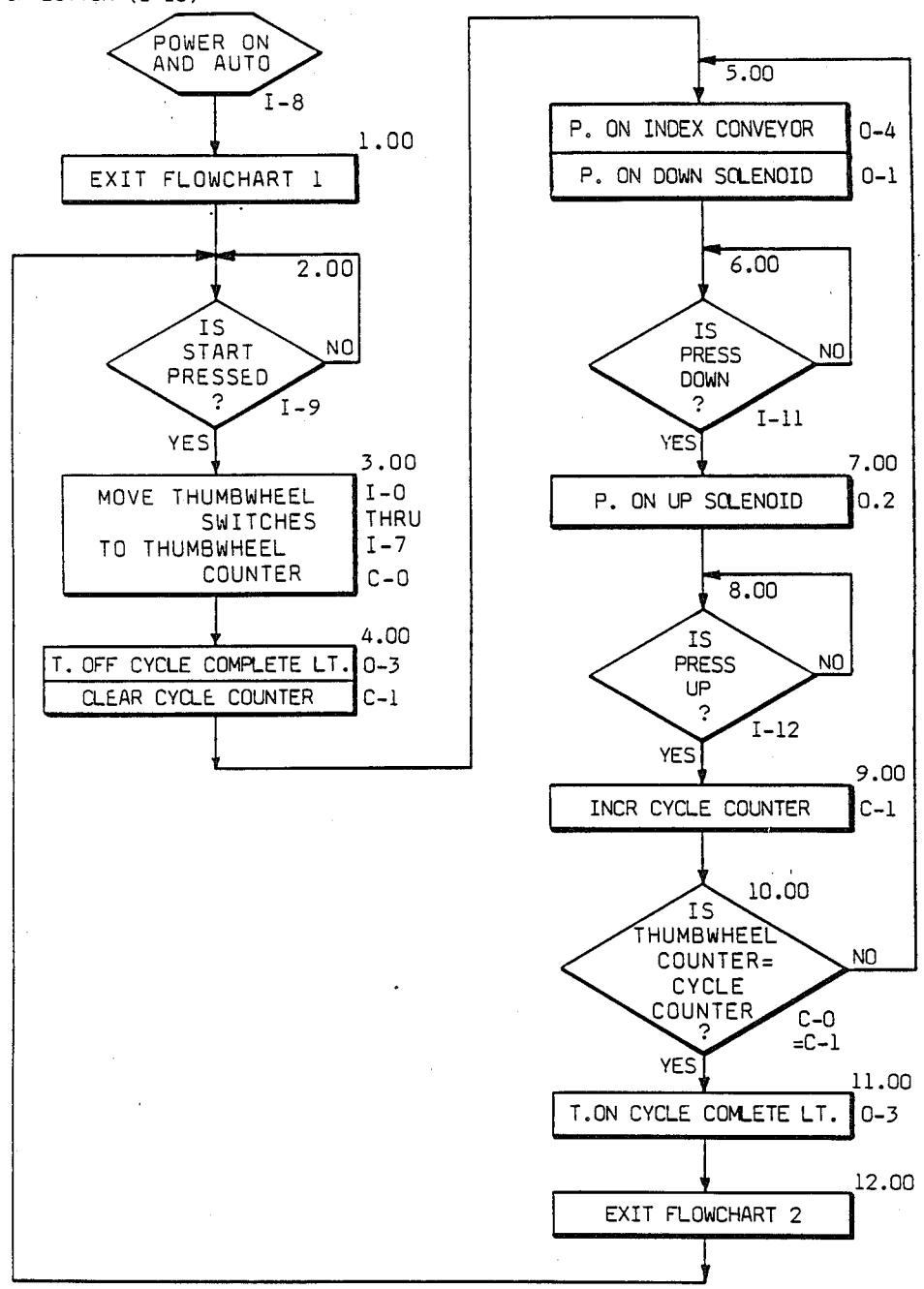
FIG. 10 shows a specialized flow charting sheet.

Referring to FIG. 10, a flow charting work sheet is presented, which is self-explanatory, to aid the user in using the subject flow chart drawing technique. Note that only one flow chart block is permitted per cell and only certain lines can be drawn using this chart. Since in one embodiment the screen is divided up into the same type cells, performing the flow chart on this sheet aids flow chart entry. Source code for the above system is now presented:

EDITOR

```
10 DEFINT A-Z
20 B$=MKI$(0) : CALL CHKMEM(B$) : IF CVI(B$)=0 THEN 220 ELSE PRINT "INSUFFICIENT
   MEMORY FOR EXECUTION" : GOTO 210
21 LOCATE 20,2 : PRINT F10$ : RETURN
22 LOCATE 20,2 : PRINT "F10 ------  EXIT TO EDITOR MENU" : RETURN
23 LOCATE 20,2 : PRINT "F10 ------  EXIT TO PREVIOUS MENU" : RETURN
24 LOCATE 17,2 : PRINT "F1 -------  ENTER ANOTHER NUMBER" : RETURN
25 LOCATE 1,75 : PRINT USING "(#.##)";SC! : RETURN
26 LOCATE 1,75 : PRINT USING "(#.##)";SR! : RETURN
30 CLS : PRINT TAB(30);"M A S T E R    M E N U" : LOCATE 1,75 : PRINT "(0.5C)" :
   LOCATE 4,16 : PRINT "PROJECT: "+PN$ : GOSUB 7320
40 LOCATE 8,25 : PRINT "F1  ------  MNEMONICS LABELS"
50 LOCATE 10,25 : PRINT "F2 ------  TIMER/PULSE TABLE"
60 LOCATE 12,25 : PRINT "F3 ------  FLOWCHART EDITOR"
70 LOCATE 14,25 : PRINT "F4 ------  PROJECT COMPILE"
80 LOCATE 16,25 : PRINT "F5 ------  PROJECT RUN/DEBUG"
90 LOCATE 18,25 : PRINT "F6 ------  SYSTEM UTILITIES"
100 LOCATE 22,25 : PRINT "F10 ------ EXIT TO SYSTEM"
110 F=1 : CALL FLOKEY(F)
120 IF F=1 THEN 190
130 IF F=2 THEN 190
140 IF F=3 THEN 270
150 IF F=4 THEN CHAIN "FLOPR3.EXE"
160 IF F=5 THEN CHAIN "FLOPR4.EXE"
170 IF F=6 THEN 190
180 IF F=10 THEN 200 ELSE BEEP : GOTO 110
190 DEF SEG=79 : POKE 5,F : DEF SEG : CHAIN "FLOPR1.EXE"
200 CLS
```

```
210 DEF SEG=79 : FOR I=0 TO 5 : POKE I,0 : NEXT I : DEF SEG : END
220 SCREEN 2 : CLS : HIO=512
230 DEF SEG=79 : A0=PEEK(0) : A1=PEEK(1) : B1=PEEK(2) : C1=PEEK(3) : D1=PEEK(4)
 : DEF SEG
240 IF A0<>17 THEN 200 ELSE IF CHR$(A1)+CHR$(B1)+CHR$(C1)<>"UAI" THEN 200
250 D$=CHR$(D1) : PFN$=D$+":PROJHDR.UAI"
260 DIM FLN$(50),FLN(50),SLN(50),C(7),C1(7),D(7),K$(7),K1$(7),IV(95),TMR!(1,511)
,MAXLBL(6),B0!(2000)
270 FOR I=1 TO 50 : FLN$(I)="" : FLN(I)=0 : SLN(I)=0 : NEXT I : ON ERROR GOTO 37
0
280 OPEN "I",#1,PFN$ : INPUT #1,PN$,PN,PD$,PT$,NF : IF NF=0 THEN 300
290 FOR I=1 TO NF : INPUT #1,FLN$(I),FLN(I) : NEXT I
300 CLOSE #1 : ON ERROR GOTO 0 : SF=0
310 B$=MKI$(0) : CALL PUTLBL(B$) : FOR I=1 TO 6 : MAXLBL(I)=0 : NEXT I : LIM=1 :
 LMF=0 : LFN$=D$+":PROJLBL.UAI" : ON ERROR GOTO 350
320 OPEN "I",#1,LFN$ : CLOSE #1 : OPEN "R",#1,LFN$,20 : FIELD #1,20 AS LB$
330 GET #1 : LT=CVI(LEFT$(LB$,2)) : IF LT>6 THEN 340 ELSE LN=CVI(MID$(LB$,3,2))
 : IF LN>MAXLBL(LT) THEN MAXLBL(LT)=LN
335 CALL PUTLBL(LB$) : GOTO 330
340 CLOSE #1 : ON ERROR GOTO 0
341 FOR I=0 TO 1 : FOR J=0 TO 511 : TMR!(I,J)=10000 : NEXT J : NEXT I : TIM=1 :
 TMF=0
342 TFN$=D$+":PROJTMR.UAI" : ON ERROR GOTO 347
343 OPEN "I",#1,TFN$ : CLOSE #1 : OPEN "R",#1,TFN$,7
344 FIELD #1,7 AS LB$
345 GET #1 : I=CVI(LEFT$(LB$,2)) : IF I<2 THEN J=CVI(MID$(LB$,3,2)) : TMR!(I,J)=
CVI(MID$(LB$,5,2))+ASC(MID$(LB$,7,1))/100 : GOTO 345
346 CLOSE #1 : ON ERROR GOTO 0 : GOTO 390
347 EC=ERR : RESUME 348
348 ON ERROR GOTO 0 : IF EC=53 THEN 346 ELSE GOSUB 7800
349 GOSUB 7310 : PRINT "(0.75)" : GOSUB 7880 : IF F=10 THEN 200 ELSE CLOSE #1 :
 CLS : GOTO 341
350 EC=ERR : RESUME 360
360 IF EC=53 THEN 340
362 ON ERROR GOTO 0 : GOSUB 7800 : GOSUB 7310 : PRINT "(0.70)" : GOSUB 7880 : IF
 F=10 THEN 200 ELSE CLOSE #1 : CLS : GOTO 310
370 EC=ERR : RESUME 380
380 ON ERROR GOTO 0 : GOSUB 7800 : GOSUB 7310 : PRINT "(0.60)" : GOSUB 7880 : IF
 F=10 THEN 200 ELSE CLOSE #1 : CLS : GOTO 270
390 GOSUB 7310 : LOCATE 3,16 : PRINT "PROJECT:  "+PN$ : SPF=0 : FS=1 : GOSUB 570
400 SC!=3! : GOSUB 25 : GOSUB 7280
410 IF NF<50 THEN LOCATE 7,2 : PRINT "F1 ------ FLOWCHART CREATE"
420 IF NF=0 THEN 470
430 LOCATE 9,2 : PRINT "F2 ------ FLOWCHART MODIFY"
440 LOCATE 11,2 : PRINT "F3 ------ FLOWCHART DELETE"
450 LOCATE 14,2 : PRINT "F4 ------ FLOWCHART PRINT"
460 IF NF>25 THEN LOCATE 17,2 : PRINT "F7 ------ PAGE DIRECTORY"
470 LOCATE 20,2 : PRINT "F10 ------ EXIT TO MASTER MENU"
480 F=1 : CALL FLOKEY(F)
490 IF F=1 THEN IF NF<50 THEN 600
500 IF NF=0 THEN 550
510 IF F=2 THEN 720
520 IF F=3 THEN 1080
530 IF F=4 THEN 1220
540 IF F=7 THEN IF NF>25 THEN GOSUB 7300 : GOSUB 560 : GOTO 480
550 IF F=10 THEN 30 ELSE BEEP : GOTO 480
560 IF FS=1 THEN FS=26 ELSE FS=1
570 LOCATE 7,50 : PRINT "FLOWCHART  DIRECTORY" : IF SPF>0 THEN GOSUB 598
580 FOR I=FS TO FS+24 : IF I>25 THEN II=I-25 ELSE II=I
590 J=INT((II+1)/2) : K=II-(J-1)*2 : LOCATE J+8,K*21+19 : PRINT USING "##  ";I;
 : PRINT FLN$(I);
593 IF SLN(I)>0 THEN LOCATE J+8,K*21+21 : PRINT CHR$(17)+CHR$(16)
595 NEXT I : RETURN
598 LOCATE 5,45 : PRINT CHR$(17)+CHR$(16)+"  DENOTES SELECTED FLOWCHART" : RETUR
N
600 FE$="CREATE" : SC!=3.01 : GOSUB 25 : GOSUB 7280 : LOCATE 7,2 : PRINT "Please
 enter flowchart name:" : LOCATE 9,2 : PRINT "(max 15 characters)" : LOCATE 11,1
0 : PRINT STRING$(15,CHR$(22))
620 EROW=17 : ECOL=2 : GOSUB 22 : LOCATE 11,10
630 MAXL=15 : ETYP=0 : GOSUB 7530 : IF F=10 THEN 400 ELSE IF X$=SPACE$(15) THEN
 BEEP : GOTO 630
640 J=0 : FOR I=1 TO NF : IF X$=FLN$(I) THEN J=I
650 NEXT I : IF J=0 THEN 680 ELSE SC!=3.02 : GOSUB 25 : LOCATE 14,2 : PRINT USIN
G "DUPLICATE FLOWCHART NAME - (##)";J
660 LOCATE 17,2 : PRINT "F1 ------- ENTER ANOTHER NAME" : GOSUB 22
```

```
670 BEEP : F=1 : CALL FLOKEY(F) : IF F=1 THEN 600 ELSE IF F=10 THEN 400 ELSE 670
680 NF=NF+1 : FLN$(NF)=X$ : BL!=0 : BH!=0 : B$=MKI$(0)+MKI$(0) : CALL PUTBLK(B$)
 : B=0 : B!=0 : CALL FLOEGA(B,B!) : SF=NF : CMF=0 : FMF=0 : MF=0 : GOSUB 7315 :
GOTO 1480
690 IF GSF=1 THEN FLN$(NF)="" : NF=NF-1 : GOTO 390 ELSE 1490
700 IF GSF=0 THEN 2110 ELSE GRFRTN=3 : GOTO 2080
710 MF=0 : GOTO 690
720 FE$="MODIFY" : GOSUB 1360 : IF F=10 THEN 400 ELSE IF SF<>FE THEN GOSUB 1420
 : IF F=1 THEN 400 ELSE IF F=10 THEN 200
730 SF=FE : CMF=1 : MF=1 : B=5 : CALL FLOEGA(B,B!)
740 GOSUB 7315 : GRFRTN=4
750 BL!=0 : BH!=0 : NB=2 : B$=MKI$(0)+CHR$(2)+SPACE$(32) : CALL GETBLK(B$) : B$=
MKI$(0)+CHR$(0)+SPACE$(32) : CALL GETBLK(B$) : IF MID$(B$,4,1)<>CHR$(0) THEN GOS
UB 7960 : BL!=B! : BH!=B! : NB=NB+1
760 B$=MKI$(0)+CHR$(0)+SPACE$(32) : CALL GETBLK(B$) : IF MID$(B$,4,1)<>CHR$(0) T
HEN GOSUB 7960 : BH!=B! : NB=NB+1 : GOTO 760
770 LOCATE 7,56 : PRINT USING "####  BLOCKS";NB : LOCATE 10,54 : PRINT "LOW BLOC
K NUMBER:" : LOCATE 12,58 : PRINT USING "####.##";BL! : LOCATE 15,53 : PRINT "HI
GH BLOCK NUMBER:" : LOCATE 17,58 : PRINT USING "####.##";BH!
771 GOSUB 7280 : IF FOK=0 THEN 780 ELSE SC!=(310+FOK)/100 :GOSUB 25:LOCATE 7,5
772 IF FOK=1 THEN PRINT "The maximum number of blocks" : LOCATE 9,5 : PRINT "has
 been reached !!!" ELSE PRINT "The memory available for the" : LOCATE 9,2 : PRI
NT "storing of blocks is exhausted."
773 GOTO 820
780 SC!=3.1 : GOSUB 25 : LOCATE 4,5 : PRINT "Please select object to modify"
790 LOCATE 7,2  : PRINT "F1  ------   FREEZE CRITERIA"
800 LOCATE 9,2  : PRINT "F2  ------   ENABLE CRITERIA"
810 LOCATE 12,2 : PRINT "F3  ------   NUMBERED BLOCK(S)"
820 IF FMF>0 THEN LOCATE 15,2 : PRINT "F4  ------   SAVE THE MODIFIED" : LOCATE
16,18 : PRINT "FLOWCHART ON DISK"
830 LOCATE 18,2 : PRINT "F9  ------   GO TO GRAPHICS EDITOR" : GOSUB 22
840 F=2 : CALL FLOKEY(F) : IF FOK>0 THEN 880
850 IF F=1 THEN 2080
860 IF F=2 THEN 2090
870 IF F=3 THEN 2110
880 IF F=4 THEN IF FMF=1 THEN GOSUB 970 : IF F=10 THEN 200 ELSE 390
885 IF F=9 THEN B=1 : GOTO 10000
890 IF F=10 THEN IF FMF=1 THEN 900 ELSE 390 ELSE BEEP : GOTO 840
900 SC!=3.14:GOSUB 25 : GOSUB 7280 : LOCATE 8,10 :PRINT "IGNORE  "+FE$ : LOCATE
11,10 :PRINT "ARE YOU SURE ?????"
910 LOCATE 15,2  : PRINT "F1  ------   SAVE THE MODIFIED" : LOCATE 16,18 : PRINT
"FLOWCHART ON DISK" : GOSUB 22
920 F=1 : CALL FLOKEY(F)
930 IF F=1 THEN GOSUB 970 : IF F=10 THEN 200 ELSE 390
940 IF F=10 THEN SF=0 : IF CMF=0 THEN 950 ELSE 390 ELSE BEEP : GOTO 920
950 FLN$(NF)="" : NF=NF-1 : GOTO 390
960 N$=RIGHT$(STR$(FLN(I)+1000),3) : SFN$=D$+":FLOW"+N$+".UAI" : RETURN
970 IF FLN(SF)>0 THEN 1000 ELSE FLN(SF)=PN : I=SF : GOSUB 960 : I=1
980 K=0 : FOR J=1 TO NF : IF FLN(J)=I THEN K=1
990 NEXT J : IF K=1 THEN I=I+1 : GOTO 980 ELSE PN=I
1000 GOSUB 7280 : LOCATE 10,15 : PRINT "S A V I N G" : LOCATE 12,12 : PRINT "F L
O W C H A R T"
1010 ON ERROR GOTO 1072 : OPEN "R",#1,SFN$,40 : FIELD #1,40 AS DB$
1012 B$=MKI$(0)+CHR$(1)+SPACE$(32) : CALL GETBLK(B$) : LSET DB$=B$ : PUT #1
1014 B$=MKI$(0)+CHR$(0)+SPACE$(32) : CALL GETBLK(B$) : IF MID$(B$,4,1)<>CHR$(0)
 THEN LSET DB$=B$ : PUT #1 : GOTO 1014
1016 B$=MKI$(10000) : LSET DB$=B$ : PUT #1 : LSET DB$="GRAPHICS" : PUT #1
1018 B$=MKI$(0)+CHR$(1)+SPACE$(32) : CALL GETGFB(B$) : LSET DB$=B$ : PUT #1
1020 B$=MKI$(0)+CHR$(0)+SPACE$(32) : CALL GETGFB(B$) : IF MID$(B$,4,1)=CHR$(0) T
HEN 1026
1021 GL=ASC(MID$(B$,4,1)) : B$=LEFT$(B$,GL+3) : GB=CVI(MID$(B$,11,2)) : GR=0 : I
F GL>9 THEN GR=CVI(MID$(B$,16,2))
1022 IF GB>0 THEN GL$=MKI$(GB)+SPACE$(95) : CALL GETGFS(GL$) : GS=ASC(MID$(GL$,3
,1)) : B$=B$+MID$(GL$,3,GS)
1023 IF GR>0 THEN GL$=MKI$(GR)+SPACE$(95) : CALL GETGFS(GL$) : GS=ASC(MID$(GL$,3
,1)) : B$=B$+MID$(GL$,3,GS)
1024 GL=LEN(B$)
1025 IF GL>40 THEN LSET DB$=LEFT$(B$,40) : PUT #1 : GL=GL-40 : B$=RIGHT$(B$,GL)
 : GOTO 1025 ELSE LSET DB$=B$ : PUT #1 : GOTO 1020
1026 B$=MKI$(10000) : LSET DB$=B$ : PUT #1
1028 CALL SETSQA : B$=""
1030 GL$=SPACE$(5) : CALL GETSQA(GL$) : IF MID$(GL$,1,2)=MKI$(-1) THEN 1034 ELSE
 MID$(GL$,1,2)=MKI$(CVI(MID$(GL$,1,2))-1)
1032 B$=B$+GL$ : IF LEN(B$)=40 THEN LSET DB$=B$ : PUT #1 : B$="" : GOTO 1030 ELS
E 1030
```

```
1034 B$=B$+MKI$(-1) : LSET DB$=B$ : PUT #1 : CALL SETSQL : B$=""
1036 GL$=SPACE$(5) : CALL GETSQL(GL$) : IF MID$(GL$,1,2)=MKI$(-1) THEN 1040
1038 B$=B$+GL$ : IF LEN(B$)=40 THEN LSET DB$=B$ : PUT #1 : B$="" : GOTO 1036 ELS
E 1036
1040 B$=B$+MKI$(-1) : LSET DB$=B$ : PUT #1 : CLOSE #1 : FMF=0
1045 ON ERROR GOTO 1074
1050 PD$=DATE$ : PT$=TIME$ : OPEN "O",#1,PFN$ : WRITE #1,PN$,PN,PD$,PT$,NF : FOR
   I=1 TO NF : WRITE #1,FLN$(I),FLN(I) : NEXT I : CLOSE #1
1051 IF LMF=0 THEN 1061 ELSE LOCATE 12,12 : PRINT "    L A B E L S    "
1052 ON ERROR GOTO 1076
1053 OPEN "R",#1,LFN$,20 : FIELD #1,20 AS LB$
1054 FOR I=1 TO 6 : FOR J=0 TO MAXLBL(I) : B$=MKI$(I)+MKI$(J)+SPACE$(16) : CALL
GETLBL(B$) : IF ASC(MID$(B$,5,1))>0 THEN LSET LB$=B$ : PUT #1
1055 NEXT J : NEXT I : B$=MKI$(7) : LSET LB$=B$ : PUT #1 : CLOSE #1 : LMF=0
1061 IF TMF=0 THEN 1067 ELSE LOCATE 12,12 : PRINT "TIMER/PULSE VALUES"
1062 ON ERROR GOTO 1078
1063 OPEN "R",#1,TFN$,7 : FIELD #1,7 AS LB$
1064 FOR I=0 TO 1 : FOR J=0 TO 511 : IF TMR!(I,J)<10000 THEN B$=MKI$(I)+MKI$(J)+
MKI$(INT(TMR!(I,J)))+CHR$(INT((TMR!(I,J)-INT(TMR!(I,J)))*100)) : LSET LB$=B$ : P
UT #1
1065 NEXT J : NEXT I : B$=MKI$(2) : LSET LB$=B$ : PUT #1 : CLOSE #1 : TMF=0
1067 ON ERROR GOTO 0 : F=0 : RETURN
1072 EC=ERR : RESUME 1073
1073 ON ERROR GOTO 0 : GOSUB 7800 : GOSUB 7310 : PRINT "(0.81)" : LOCATE 3,25 :
PRINT FLN$(FE)+" - "+SFN$ : GOSUB 7880 : IF F=10 THEN RETURN ELSE CLOSE #1 : CLS
 : GOTO 1010
1074 EC=ERR : RESUME 1075
1075 ON ERROR GOTO 0 : GOSUB 7800 : GOSUB 7310 : PRINT "(0.61)" : GOSUB 7880 : I
F F=10 THEN 200 ELSE CLOSE #1 : CLS : GOTO 1045
1076 EC=ERR : RESUME 1077
1077 ON ERROR GOTO 0 : GOSUB 7800 : GOSUB 7310 : PRINT "(0.71)" : GOSUB 7880 : I
F F=10 THEN 200 ELSE CLOSE #1 : CLS : GOTO 1052
1078 EC=ERR : RESUME 1079
1079 ON ERROR GOTO 0 : GOSUB 7800 : GOSUB 7310 : PRINT "(0.76)" : GOSUB 7880 : I
F F=10 THEN 200 ELSE CLOSE #1 : CLS : GOTO 1062
1080 FE$="DELETE" : GOSUB 1360 : IF F=10 THEN 400
1090 SC!=3.05 : GOSUB 25 : GOSUB 7280 : LOCATE 8,5 : PRINT "DELETE :    "+FLN$(FE
) : LOCATE 11,10 : PRINT "ARE YOU SURE ?????"
1100 LOCATE 15,5 : PRINT "F1 ------ DELETE FLOWCHART" : GOSUB 22
1120 F=1 : CALL FLOKEY(F) : IF F=1 THEN 1130 ELSE IF F=10 THEN 400 ELSE BEEP : G
OTO 1120
1130 I=FE : GOSUB 960 : IF FE=SF THEN SF=0 ELSE IF FE<SF THEN SF=SF-1
1140 IF FE<NF THEN FOR I=FE TO NF-1 : FLN$(I)=FLN$(I+1):FLN(I)=FLN(I+1):NEXT I
1150 FLN$(NF)="" : FLN(NF)=0 : NF=NF-1
1160 ON ERROR GOTO 1200 : OPEN "O",#1,PFN$ : PD$=DATE$ : PT$=TIME$ : WRITE #1,PN
$,PN,PD$,PT$,NF : IF NF>0 THEN FOR I=1 TO NF : WRITE #1,FLN$(I),FLN(I) : NEXT I
1170 CLOSE #1 : ON ERROR GOTO 1190 : KILL SFN$
1180 ON ERROR GOTO 0 : GOTO 390
1190 RESUME 1180
1200 EC=ERR : RESUME 1210
1210 ON ERROR GOTO 0 : GOSUB 7800 : GOSUB 7310 : PRINT "(0.61)" : GOSUB 7880 : I
F F=10 THEN 200 ELSE CLOSE #1 : CLS : GOTO 1160
1220 FE$="PRINT" : GOSUB 12200 : IF F=10 THEN 1299 ELSE IF SPF>1 THEN SPF=0 : GO
TO 1235 ELSE FOR I=1 TO NF : IF SLN(I)=1 THEN FE=I
1221 NEXT I : IF SF<>FE THEN GOSUB 1420 : IF F=1 THEN 1299 ELSE IF F=10 THEN 200
 ELSE SF=FE : B=5 : CALL FLOEGA(B,B!)
1222 CLS : PRINT TAB(28);"FLOWCHART:   "+FLN$(SF) : SC!=3.15 : GOSUB 25 : GOSUB 7
280
1223 LOCATE 7,8 : PRINT "FLOWCHART   PRINT"
1224 LOCATE 10,2 : PRINT "F1 ------ PRINT ALL ROWS"
1226 LOCATE 14,2 : PRINT "F2 ------ PARTIAL PRINT" : GOSUB 22
1228 F=2 : CALL FLOKEY(F)
1230 IF F=1 THEN PRL=0 : PRH=9999 : GOTO 1298
1232 IF F=2 THEN 1240
1234 IF F=10 THEN 1299 ELSE BEEP : GOTO 1228
1235 IF SPF=NF THEN 1299 ELSE SPF=SPF+1 : IF SLN(SPF)=0 THEN 1235 ELSE FE=SPF
1236 GOSUB 1420 : IF F=1 THEN 1299 ELSE IF F=10 THEN 200 ELSE SF=FE : B=5 : CALL
  FLOEGA(B,B!)
1237 CLS : PRINT TAB(28);"FLOWCHART:   "+FLN$(SF) : GOSUB 7280
1238 PRL=0 : PRH=9999 : GOSUB 1300 : IF F=10 THEN 1299 ELSE 1235
1240 PP$="lowest " : SC!=3.16 : GOSUB 1250 : IF F=10 THEN 1222 ELSE PRL=FE
1242 PP$="highest " : SC!=3.18 : GOSUB 1250
1245 IF F=10 THEN 1222 ELSE PRH=FE : IF PRH=>PRL THEN 1298 ELSE GOSUB 1290 : GOT
O 1245
```

```
1250 GOSUB 25 : GOSUB 7280 : LOCATE 7,4 : PRINT "Please enter the number of the"
 : LOCATE 9,2 : PRINT FP$+" row to be printed:" : LOCATE 11,15 : PRINT STRING$(4
,CHR$(22))
1260 EROW=17 : ECOL=2 : GOSUB 23 : LOCATE 11,15
1270 MAXL=4 : ETYP=1 : ALF=0 : GOSUB 7530 : IF F=10 THEN RETURN ELSE IF X$=SPACE
$(4) THEN BEEP : GOTO 1270
1280 F=0 : FE=VAL(X$) : IF FE=>0 THEN IF FE<10000 THEN RETURN
1290 SR!=SC!+.01 : GOSUB 26 : LOCATE 14,2 : PRINT "INVALID ROW NUMBER" : GOSUB 2
4 : GOSUB 23
1295 BEEP : F=2 : CALL FLOKEY(F) : IF F=1 THEN 1250 ELSE IF F=10 THEN RETURN ELS
E 1295
1298 GOSUB 1300
1299 FOR I=1 TO NF : SLN(I)=0 : NEXT I : GOTO 390
1300 B$=MKI$(0) : CALL GETLST(B$) : MGFY=INT(CVI(B$)/10)
1302 IF MGFY<PRL THEN RETURN ELSE IF MGFY<PRH THEN PRH=MGFY
1305 GOSUB 1350 : ON ERROR GOTO 1352
1324 WIDTH LPRINT 255 : LPRINT CHR$(15)+CHR$(27)+CHR$(48) : LPRINT "" : LPRINT T
AB(100);"FloPro  V1.1   TEXT-MODE PRINTOUT"
1325 LPRINT "" : LPRINT TAB(100);"DATE: ";DATE$;"    TIME: ";TIME$ : LPRINT "" :
 LPRINT ""
1326 LPRINT TAB(100);"PROJECT:   ";PN$ : LPRINT "" : LPRINT TAB(100);"FLOWCHART:
 ";FLN$(SF)
1328 FOR I=1 TO 6 : LPRINT "" : NEXT I : LPRINT TAB(25);"---------- A ---------
--         ---------- B ----------               ---------- C -------
----         ---------- D ----------               ---------- E ----
-------"
1330 LPRINT "" : LPRINT ""
1333 FOR GFRW=PRL TO PRH : B=9 : B!=GFRW : CALL FLOEGA(B,B!)
1334 FOR I=1 TO 22 : GFP$=MKI$(I)+SPACE$(203) : CALL GFPPG(GFP$)
1335 IF I=11 THEN LPRINT USING "      ROW: ####         ";GFRW; ELSE IF I=22 THEN LP
RINT "   _____"+SPACE$(6); ELSE LPRINT SPACE$(20);
1336 LPRINT GFP$
1337 A$=INKEY$ : IF LEN(A$)=0 THEN 1340 ELSE IF LEN(A$)=1 THEN 1337
1338 IF A$<>CHR$(0)+CHR$(59) THEN 1337
1339 GOSUB 7280 : LOCATE 10,9 : PRINT "PRINTER WILL PAUSE" : LOCATE 15,5 :PRINT
"(Note - it may take some time" : LOCATE 16,2 : PRINT "for the print buffer to e
mpty.)" : PPD=1
1340 NEXT I : IF PPD=0 THEN 1345
1341 SR!=3.29 : GOSUB 26 : GOSUB 7280 : LOCATE 10,5 : PRINT "F1 ------ RESUME
PRINTING" : GOSUB 22
1342 F=1 : CALL FLOKEY(F) : IF F=1 THEN GOSUB 1350 : GOTO 1345
1343 IF F=10 THEN 1347 ELSE BEEP : GOTO 1342
1345 NEXT GFRW : LPRINT CHR$(12)+CHR$(18) : F=0
1347 ON ERROR GOTO 0 : RETURN
1350 SC!=3.28 : GOSUB 26 : GOSUB 7280 : LOCATE 10,5 : PRINT "F1 ------ PAUSE P
RINTING" : LOCATE 11,12 : PRINT "AFTER CURRENT ROW" : PPD=0 : RETURN
1352 EC=ERR : RESUME 1353
1353 ON ERROR GOTO 0 :SR!=3.27:GOSUB 26:GOSUB 7280:LOCATE 10,2:PRINT USING "ERRO
R CODE ###  HAS OCCURRED";EC : LOCATE 13,5 : PRINT "PRINT REQUEST TERMINATED"
1354 LOCATE 20,2 : PRINT "Press any key to continue..."
1355 BEEP : BEEP : BEEP
1356 A$=INKEY$ : IF A$="" THEN 1356 ELSE F=10 : RETURN
1360 SC!=3.03 : GOSUB 25 : GOSUB 7280 : LOCATE 7,8 : PRINT "FLOWCHART  "+FE$ : L
OCATE 9,2 : PRINT "Please enter flowchart number:" : LOCATE 11,15 : PRINT STRING
$(2,CHR$(22))
1380 EROW=17 : ECOL=2 : GOSUB 22 : LOCATE 11,15
1390 MAXL=2 : ETYP=1 : GOSUB 7530 : IF F=10 THEN RETURN ELSE IF X$=SPACE$(2) THE
N BEEP : GOTO 1390
1395 FE=VAL(X$) : IF FE>0 THEN IF FE<=NF THEN RETURN
1400 SC!=3.04 : GOSUB 25 : LOCATE 14,2 : PRINT "INVALID FLOWCHART NUMBER" : GOSU
B 24: GOSUB 22
1410 BEEP : F=1 : CALL FLOKEY(F) : IF F=1 THEN 1360 ELSE IF F=10 THEN RETURN ELS
E 1410
1420 B$=MKI$(0)+CHR$(0) : CALL PUTBLK(B$) : CALL PUTGFB(B$) : I=FE : GOSUB 960
1430 ON ERROR GOTO 1460 : OPEN "I",#1,SFN$ : CLOSE #1 : OPEN "R",#1,SFN$,40 : FI
ELD #1,40 AS DB$
1431 GET #1 : IF CVI(LEFT$(DB$,2))<10000 THEN CALL PUTBLK(DB$) : FOK=CVI(DB$) :
IF FOK=0 THEN 1431 ELSE 1452
1432 GET #1 : IF LEFT$(DB$,8)<>"GRAPHICS" THEN EC=-1 : GOTO 1470
1433 GET #1 : IF CVI(LEFT$(DB$,2))=10000 THEN 1442
1434 GL=ASC(MID$(DB$,4,1)) : B$=LEFT$(DB$,GL+3) : GB=0 : GR=0 : IF GL>4 THEN GB=
CVI(MID$(B$,11,2)) : IF GL>9 THEN GR=CVI(MID$(B$,16,2))
1435 GL$=RIGHT$(DB$,37-GL) : IF GB<=0 THEN 1438 ELSE GL=ASC(LEFT$(GL$,1))
1436 IF GL>LEN(GL$) THEN GET #1 : GL$=GL$+DB$ : GOTO 1436
1437 GS$=MKI$(0)+LEFT$(GL$,GL) : CALL PUTGFS(GS$) : GB=CVI(MID$(GS$,1,2)) : MID$
```

```
(B$,11,2)=MKI$(GB) : GL$=RIGHT$(GL$,LEN(GL$)-GL) : IF GL$="" THEN IF GR>0 THEN
  ET #1 : GL$=OB$
1438 IF GR<=0 THEN 1441 ELSE GL=ASC(LEFT$(GL$,1))
1439 IF GL>LEN(GL$) THEN GET #1 : GL$=GL$+OB$ : GOTO 1439
1440 GS$=MKI$(0)+LEFT$(GL$,GL) : CALL PUTGFS(GS$) : GR=CVI(MID$(GS$,1,2)) : MID
(B$,16,2)=MKI$(GR)
1441 CALL PUTSQB(B$) : GOTO 1433
1442 GET #1 : I=1
1443 IF MID$(DB$,I,2)=MKI$(-1) THEN 1444 ELSE GL$=MID$(DB$,I,5) : CALL PUTSGA(G
$) : I=I+5 : IF I<40 THEN 1443 ELSE 1442
1444 GET #1 : I=1
1445 IF MID$(DB$,I,2)=MKI$(-1) THEN 1450 ELSE GL$=MID$(DB$,I,5) : CALL PUTSGL(G
$) : I=I+5 : IF I<40 THEN 1445 ELSE 1444
1450 CLOSE #1 : ON ERROR GOTO 0 : FMF=0 : F=0 : RETURN
1452 CLOSE #1 : ON ERROR GOTO 0 : SC!=(307+FOK)/100 : GOSUB 25 : GOSUB 7280 : L
CATE 7,5 : PRINT "Flowchart: "+FLN$(FE) : LOCATE 9,5
1454 IF FOK=1 THEN PRINT "Maximum number of blocks has" : LOCATE 11,5 : PRINT "
een exceeded  !!!" ELSE PRINT "Insufficient memory available" : LOCATE 11,5 :
RINT "for loading of flowchart  !!!"
1456 LOCATE 15,2 : PRINT "F1 ------ EXIT TO EDITOR MENU"
1458 F=1 : CALL FLOKEY(F) : IF F=1 THEN RETURN ELSE BEEP : GOTO 1458
1460 EC=ERR : RESUME 1470
1470 ON ERROR GOTO 0:GOSUB 7800:GOSUB 7310:PRINT "(0.80)":LOCATE 3,25:PRINT FLN
(FE)+" - "+SFN$:GOSUB 7880:IF F=10 THEN RETURN ELSE CLOSE #1:CLS:GOTO 1430
1475 F10$="F10 ------ EXIT CRITERIA ENTRY" : RETURN
1480 GOSUB 8350 : EF=1 : T=1 : GOSUB 1500 :IF GSF=1 THEN 690 ELSE B=2 : GRFRTN=
 : GOTO 10000
1490 GOSUB 8370 : EF=2 : T=2 : GOSUB 1500 :IF GSF=1 THEN 700 ELSE B=2 : GRFRTN=
 : GOTO 10000
1500 KK=0 : C(1)=0 : C1(1)=0 : D(1)=HIO : AGF=0 : K=1
1520 GOSUB 1475 : DFF=1
1530 GOSUB 1730 : IF DFF<>1 THEN GOSUB 1750 : GOTO 1610
1540 IF K>1 THEN ABF=1 ELSE ABF=0
1550 IF C(K)>0 AND C(K)<255 THEN AFF=1 ELSE AFF=0
1560 GOSUB 2102 : IF EF=0 THEN GOSUB 6270 ELSE GOSUB 5140
1570 GOSUB 1750 : IF F=12 THEN K=K-1 : DFF=3 : GOTO 1530
1580 IF F=11 THEN DFF=2 : GOTO 1610 ELSE IF F=10 THEN 1780
1590 IF C(K)=255 THEN FOR I=1 TO KK : LOCATE 13+I,38 : PRINT SPACE$(17) : LOCAT
 13+I,67 : PRINT SPACE$(13); : NEXT I : LOCATE 14,67 : PRINT "NO CRITERIA" : K
=1 : AGF=1 : GOTO 1760
1595 IF C(K)=4 THEN IF D(K)=0 OR D(K)>10 THEN D(K)=HIO
1600 I=K : GOSUB 8580 : GOSUB 1730 : GOSUB 1750 : DFF=2 : IF K>KK THEN KK=K
1610 IX=IX+II+7 : IF D(K)<HIO THEN II=(LEN(STR$(D(K)))-1)*8+1 ELSE II=9
1620 GOSUB 1740 : IF DFF<>2 THEN GOSUB 1750 : GOTO 1670
1630 ABF=1 : IF D(K)<HIO THEN AFF=1 ELSE AFF=0
1640 GOSUB 2102 : GOSUB 6030 : GOSUB 1750 : IF F=12 THEN DFF=1 : GOTO 1530
1650 IF F=11 THEN DFF=3 : GOTO 1670 ELSE IF F=10 THEN 1780
1660 I=K : GOSUB 8580 : II=(LEN(N$)-1)*8+1
1670 IX=IX+II+7 : IF C1(K)=0 THEN II=9 ELSE IF C1(K)<224 THEN II=25 ELSE II=17
1680 GOSUB 1740 : ABF=1 : IF C1(K)>0 THEN AFF=1 ELSE AFF=0
1690 GOSUB 2102 : GOSUB 6470 : GOSUB 1750 : IF F=12 THEN DFF=2 : GOTO 1530
1700 IF F=11 THEN K=K+1 : DFF=1 : GOTO 1530 ELSE IF F=10 THEN 1780
1710 IF F=3 THEN I=K:GOSUB 8580: FOR I=K+1 TO KK : LOCATE 13+I,38 : PRINT SPACE
(17); : LOCATE 13+I,67 : PRINT SPACE$(13); : NEXT I : KK=K : AGF=1 : GOTO 1760
1720 I=K : GOSUB 8580 : K=K+1 : DFF=1 : IF K<=KK THEN 1530 ELSE C(K)=0 : C1(K)=
 : D(K)=HIO : AGF=0 : KK=K : GOTO 1530
1730 IX=527 : IY=(K+12)*8 : IF C(K)<9 THEN II=9 ELSE IF C(K)<255 THEN II=41 ELS
 II=89
1740 GET (IX,IY)-(IX+II,IY+7),IV : PUT (IX,IY),IV,PRESET : RETURN
1750 PUT (IX,IY),IV,PSET : RETURN
1760 GOSUB 7280 : AFF=0 : ABF=0 : GOSUB 7500 : IF MF=1 THEN 1810
1770 IF EF=0 THEN GSF=0 : RETURN : ELSE 2040
1780 IF C(1)=255 THEN AGF=1 : GOTO 1810 ELSE I=1 : AGF=0
1790 IF C(I)=0 THEN 1810 ELSE IF D(I)=HIO THEN 1810 ELSE IF C1(I)=0 THEN 1810
1800 IF C1(I)=192 THEN AGF=1 : ELSE I=I+1 : GOTO 1790
1810 IF KK>0 THEN IF C(KK)=0 THEN KK=KK-1 : GOTO 1810
1820 IF K>KK THEN IF KK<1 THEN K=1 ELSE K=KK
1830 IF K>1 THEN ABF=1 ELSE ABF=0
1840 IF KK>K THEN AFF=1 ELSE AFF=0
1850 IF EF>0 THEN SC!=3.2 ELSE SC!=3.71
1852 IF AGF=0 THEN SC!=SC!+.01
1855 GOSUB 25 : GOSUB 7280 : GOSUB 7500 : LOCATE 8,3 : IF AGF=0 THEN PRINT "***
CRITERIA IS INVALID ***" ELSE : PRINT "F1 ------ CRITERIA IS CORRECT"
1860 LOCATE 10,3 : PRINT "F2 ------ MODIFY CRITERIA"
1870 IF KK=0 THEN 1900 ELSE IF KK=7 OR C(K)=0 OR C(K)=255 THEN 1890
```

```
1880 LOCATE 12,3 : PRINT "F3 ------  INSERT CRITERIA"
1890 LOCATE 14,3 : PRINT "F4 ------  DELETE CRITERIA"
1900 GOSUB 21
1910 IX=511 : IY=(12+K)*8 : II=9 : GOSUB 1740 : F=4 : CALL FLOKEY(F) : GOSUB 17
0
1920 IF F=12 THEN IF ABF=1 THEN K=K-1 : GOTO 1810
1930 IF F=11 THEN IF AFF=1 THEN K=K+1 : GOTO 1810
1940 IF F=1 THEN IF AGF=1 THEN IF EF>0 THEN 2040 ELSE GSF=0 : RETURN
1950 IF F=2 THEN 1520
1960 IF KK=0 THEN 1990 ELSE IF KK=7 OR C(K)=0 OR C(K)=255 THEN 1980
1970 IF F=3 THEN 2000
1980 IF F=4 THEN 2010
1990 IF F=10 THEN GSF=1 : RETURN ELSE BEEP : GOTO 1910
2000 KK=KK+1 : FOR I=KK TO K+1 STEP -1 : J=I-1 : C(I)=C(J) : C1(I)=C1(J) : D(I)
D(J) : GOSUB 8580 : NEXT I : I=K : GOSUB 2030 : AGF=0 : GOTO 1520
2010 IF K<KK THEN FOR I=K TO KK-1 : J=I+1 : C(I)=C(J) : C1(I)=C1(J) : D(I)=D(J)
: GOSUB 8580 : NEXT I
2020 I=KK : GOSUB 2030 : KK=KK-1 : GOTO 1780
2030 C(I)=0 : C1(I)=0 : D(I)=HIO : LOCATE 13+I,38 : PRINT SPACES(17); : LOCATE
3+I,67 : PRINT SPACES(13); : RETURN
2040 IF C(1)=255 THEN B$=CHR$(2)+CHR$(EF) : GOTO 2070 ELSE K=1
2050 IF C1(K)=192 THEN 2060 ELSE K=K+1 : GOTO 2050
2060 B$=CHR$(K*3+2)+CHR$(EF) : FOR I=1 TO K : B$=B$+CHR$(C(I)+C1(I))+MKI$(D(I))
: NEXT I
2070 B$=MKI$(0)+CHR$(EF)+B$ :CALL PUTBLK(B$) :FOK=CVI(B$) :GSF=0 :FMF=1 :RETURN
2080 B$=MKI$(0)+CHR$(1)+SPACES(32) : CALL GETBLK(B$) · GOTO 2100
2090 B$=MKI$(0)+CHR$(2)+SPACES(32) : CALL GETBLK(B$)
2100 GOSUB 7970 : EF=T : MF=1 : GOSUB 1475 : GOSUB 1760 : IF GSF=0 THEN B=3 : G
TO 10000 ELSE 10050
2102 IF EF>0 THEN RETURN ELSE LOCATE 9,40 : PRINT SPACES(13) : LOCATE 10,40 : P
INT SPACES(13) : IF C(K)=3 THEN 2103 ELSE IF C(K)=11 THEN 2103 ELSE RETURN
2103 IF D(K)=HIO THEN RETURN ELSE LOCATE 9,40 : PRINT "T-"+RIGHT$(STR$(D(K)),LE
(STR$(D(K)))-1)+" DONE AT"
2104 LOCATE 10,40 : X!=TMR!(0,D(K)) : IF X!=10000 THEN PRINT "UNDEFINED" ELSE P
INT USING "####.## sec.";X!
2105 RETURN
2110 IF FOK>0 THEN 740 ELSE F10$="F10 ------  EXIT FLOWCHART "+FES
2120 SC!=3.3 : GOSUB 25 : GOSUB 7280 : LOCATE 7,4 : PRINT "Please enter the num
er of the" : LOCATE 9,2 : PRINT "BLOCK to be entered or edited:" : LOCATE 11,15
: PRINT STRINGS(7,CHR$(22))
2125 AGX=1 : LOCATE 18,2 : PRINT "F9 ------  GO TO GRAPHICS EDITOR"
2130 EROW=16 : ECOL=2 : GOSUB 21 : LOCATE 11,15
2140 MAXL=7 : ETYP=2 : GOSUB 7530 :AGX=0 : IF F=10 THEN 740 ELSE IF F=9 THEN B=
: GOTO 9990 ELSE IF X$=SPACES(7) THEN BEEP : AGX=1 : GOTO 2140
2150 B!=VAL(X$) : BE!=INT(B!)+(CINT((B!-INT(B!))*100))/100 : IF BE!=B! THEN IF
!>0 THEN IF B!<10000 THEN 2180
2160 SC!=3.31 : GOSUB 25 : LOCATE 14,2 : PRINT "INVALID BLOCK NUMBER" : LOCATE
6,2 : PRINT "F1 ------  ENTER ANOTHER NUMBER" : GOSUB 21
2170 BEEP : F=1 : CALL FLOKEY(F) : IF F=1 THEN 2120 ELSE IF F=10 THEN 740 ELSE
170
2180 GOSUB 7950 : OY!=0 : OZ!=0 : EN=0 : GOSUB 7970
2190 B=0 : MF=1 : ON T GOTO 2200,2200,2720,3440,3720,4000,4180,4680,4680,4680
2200 ABF=0 : AFF=0 : GOSUB 7500 : GOSUB 7300 : T=0 : LOCATE 4,55 : PRINT USING
BLOCK   ####.##";B! : LOCATE 7,56 : PRINT "UNDEFINED" : MF=0 : GOSUB 5330
2210 IF F=1 THEN 2270
2220 IF F=2 THEN 2820
2230 IF F=3 THEN 3520
2240 IF F=4 THEN 3800
2250 IF F=5 THEN 4080
2260 IF F=6 THEN 4290 ELSE 2110
2265 F10$="F10 ------  EXIT CONTROLS ENTRY" : RETURN
2270 GOSUB 8390 : T=3 : LOCATE 4,54 : PRINT "CONTROL BLOCK" : GOSUB 2280 : IF
F=1 THEN 2200 ELSE B=B+2 : GOTO 9990
2280 FOR I=1 TO 7 :C(I)=0 :C1(I)=0 :D(I)=HIO :NEXT I :KK=0 :K=1:GOSUB 2265
2290 IX=383 : IY=(K*2+5)*8 : IF C1(K)=0 THEN II=9 ELSE II=41
2300 GOSUB 1740 : IF K>1 THEN ABF=1 ELSE ABF=0
2310 IF C1(K)>0 THEN AFF=1 ELSE AFF=0
2320 GOSUB 5430 : GOSUB 1750
2330 IF F=12 THEN K=K-1:GOTO 2390 ELSE IF F=11 THEN 2350 ELSE IF F=10 THEN 243
2340 I=K : GOSUB 8690 : IF K>KK THEN KK=K
2350 IF C(K)=3 OR C(K)=5 OR C1(K)=176 THEN 2390
2360 IX=584 : IY=(K*2+5)*8 : II=9 : GOSUB 1740 : ABF=1 : IF C(K)>0 THEN AFF=1 E
SE AFF=0
2370 GOSUB 5670 : GOSUB 1750
```

```
2380 IF F=12 THEN 2290 ELSE IF F=11 THEN 2390 ELSE IF F=10 THEN 2480 ELSE I=K
   GOSUB 8690
2390 IX=599 : IY=(K*2+5)*8 : IF D(K)<HIO THEN II=(LEN(STR$(D(K)))-1)*8+1 ELSE
   =9
2400 GOSUB 1740 : ABF=1 : IF D(K)<HIO THEN AFF=1 ELSE AFF=0
2410 GOSUB 6030 : GOSUB 1750
2420 IF F=12 THEN IF C(K)=3 OR C(K)=5 OR C1(K)=176 THEN 2290 ELSE 2360
2430 IF F=11 THEN 2452 ELSE IF F=10 THEN 2480
2440 J=0 : FOR I=1 TO KK : IF C(I)=C(K) THEN IF D(I)=D(K) THEN IF I<>K THEN J=
2450 NEXT I : IF J=1 THEN PUT (IX,IY),IV,PRESET : SR!=3.45 : GOSUB 26 : LOCATE
   4,2 : PRINT "DUPLICATE CONTROL" : D(K)=HIO : GOSUB 6190 : GOSUB 1750 : GOTO 24
   ELSE I=K : GOSUB 8690
2452 IF C(K)=7 THEN IF C1(K)=176 THEN TS=1 : GOSUB 2812 : IF F=10 THEN 2390
2453 IF C(K)=3 THEN IF C1(K)=144 THEN TS=0 : GOSUB 2812 : IF F=10 THEN 2390
2460 IF K<KK THEN K=K+1 : GOTO 2290 ELSE IF K>6 THEN 2500
2470 K=K+1 : C1(K)=0 : C(K)=0 : D(K)=HIO : KK=K : I=K*16+36 : LINE (475,I)-(47
   I+16),0 :LINE (575,I)-(575,I+16) : LINE -(375,I+16) : LINE -(375,I) : GOTO 229
2480 IF K>KK THEN 2500
2490 IF C1(KK)>0 THEN 2500 ELSE I=KK*16+36 : LINE (575,I)-(575,I+16),0 : LINE
   375,I+16),0 : LINE -(375,I),0 : LINE (475,I)-(475,I+16) : KK=KK-1 : IF K>KK TH
    K=KK
2500 IF KK=0 THEN AGF=0 : GOTO 2530
2510 AGF=1 : FOR I=1 TO KK : IF C(I)=0 OR D(I)=HIO THEN AGF=0
2520 NEXT I : IF AGF=1 THEN IF MF=0 THEN 2680
2530 IF K>1 THEN ABF=1 ELSE ABF=0
2540 IF KK>K THEN AFF=1 ELSE AFF=0
2550 GOSUB 5780
2560 IF F=12 THEN K=K-1 : GOTO 2530
2570 IF F=11 THEN K=K+1 : GOTO 2530
2580 IF F=10 THEN GSF=1 : RETURN
2590 IF F=1 THEN IF MF=0 THEN 2680 ELSE GSF=0 : RETURN
2600 IF F=2 THEN 2290
2610 IF F=3 THEN K=KK : GOTO 2470
2620 IF F=4 THEN 2650
2630 IF K<KK THEN FOR I=K TO KK-1 : J=I+1 : C1(I)=C1(J) : C(I)=C(J) : D(I)=D(J
   : GOSUB 8690 : NEXT I
2640 I=KK : GOSUB 2670 : IF KK>1 THEN 2490 ELSE KK=0 : AGF=0 : GOTO 2480
2650 KK=KK+1 : I=KK*16+36 : LINE (475,I)-(475,I+16),0 : LINE (575,I)-(575,I+16
   : LINE -(375,I+16) : LINE -(375,I) : FOR I=KK TO K+1 STEP -1 : J=I-1 : C1(I)=C
   J) : C(I)=C(J) : D(I)=D(J) : GOSUB 8690 : NEXT I
2660 I=K : GOSUB 2670 : AGF=0 : GOTO 2290
2670 C1(I)=0 : C(I)=0 : D(I)=HIO : LOCATE I*2+6,49 : PRINT SPACE$(23) : LOCATE
   *2+6,74 : PRINT SPACE$(5); : RETURN
2680 ABF=0 : AFF=0 : GOSUB 7500 : GOSUB 4990 : IF F=10 THEN 2530
2690 Y!=0! : N!=0 : K=1
2700 IF C1(K+1)=0 THEN 2710 ELSE K=K+1 : GOTO 2700
2710 B$=CHR$(K*3+7)+CHR$(3) : FOR I=1 TO K : B$=B$+CHR$(C1(I)+C(I))+MKI$(D(I))
   NEXT I : GOSUB 4790 : GOTO 4800
2720 IF KK=7 THEN 2740
2730 FOR I=KK+1 TO 7 : C(I)=0 : C1(I)=0 : D(I)=HIO : NEXT I
2740 SC!=3.4 : T$="CONTROLS" : GOSUB 7250
2750 F=1 : CALL FLOKEY(F)
2760 IF F=1 THEN GOSUB 2690 : B=3 : GOTO 9990
2770 IF F=2 THEN GOSUB 2265 : GOSUB 2480 : IF GSF=1 THEN GOSUB 7970 : GOTO 272
   ELSE 2720
2780 IF F=3 THEN GOSUB 4990 : GOTO 2720
2790 IF F=7 THEN B=1 : GOTO 2200
2800 IF F=8 THEN GOSUB 4940 : IF GSF=1 THEN 2740 ELSE B=4 : GOTO 9990
2810 IF F=10 THEN 2110 ELSE BEEP : GOTO 2750
2812 ABF=0 : AFF=0 : F=0 : IF TMR!(TS,D(K))<10000 THEN RETURN ELSE SC!=3.46 :
   TS=0 THEN MN$="TIMER" ELSE MN$="PULSE"
2813 GOSUB 25 : GOSUB 7280 : GOSUB 7500 : LOCATE 9,10 : PRINT MN$+" UNDEFINED
   : LOCATE 11,2 : PRINT "Please enter value in seconds:" : LOCATE 13,15 : PRINT
   RING$(7,22)
2814 EROW=17 : ECOL=2 : GOSUB 23 : LOCATE 13,15
2815 MAXL=7 : ETYP=2 : GOSUB 7530 : IF F=10 THEN RETURN ELSE IF X$=SPACE$(7) T
   N BEEP : GOTO 2815
2816 X!=VAL(X$) : XE!=INT(X!)+(CINT((X!-INT(X!))*100))/100 : IF XE!=X! THEN IF
   !<10000 THEN 2819
2817 SR!=SC!+.01 : GOSUB 26 : LOCATE 15,2 : PRINT "INVALID  NUMBER" : GOSUB 24
    GOSUB 23
2818 BEEP : F=3 : CALL FLOKEY(F) : IF F=1 THEN 2813 ELSE IF F=10 THEN RETURN E
   E 2818
2819 TMR!(TS,D(K))=X! : TMF=1 : RETURN
2820 GOSUB 8400 : T=4 : K=1 : LOCATE 4,55 : PRINT "MOVE  BLOCK" : GOSUB 2530 :
```

```
F GSF=1 THEN 2200 ELSE B=B+2 : GOTO 9990
2830 FOR I=1 TO 6 : C(I)=0 : C1(I)=0 : D(I)=HIO : NEXT I : AGF=0
2835 F10$="F10 ------ EXIT MOVE FIELDS ENTRY"
2840 IX=583 : IY=56 : IF C(K)<>8 THEN II=9 ELSE IX=439 : II=90
2850 GOSUB 1740 : ABF=0 : IF C(K)>0 THEN AFF=1 ELSE AFF=0
2860 I=C(K) : GOSUB 6610 : GOSUB 1750
2870 IF F=11 THEN 2900 ELSE IF F=10 THEN 3270
2880 IF I=8 THEN IF C(K)<>8 THEN IF D(K)>HIO THEN D(K)=HIO:D(2)=HIO:GOTO 2890
2885 IF I>0 THEN IF I<8 THEN IF C(K)=8 THEN IF D(K)<HIO THEN D(2)=0
2890 I=K : GOSUB 8880 : IF C(K)<>1 THEN LOCATE 9,74 : PRINT SPACE$(5) : LOCATE
0,56 : PRINT SPACE$(15) : LOCATE 10,74 : PRINT SPACE$(5)
2900 IF C(K)=8 THEN 3030
2910 IX=599 : IY=56 : IF D(K)<HIO THEN II=(LEN(STR$(D(K)))-1)*8+1 ELSE II=9
2920 GOSUB 1740 : ABF=1 : IF D(K)<HIO THEN AFF=1 ELSE AFF=0
2930 IF C(K)=1 THEN SC!=3.92:T$="high order (MSB)":GOSUB 6000 ELSE GOSUB 6030
2940 GOSUB 1750 : IF F=12 THEN 2840 ELSE IF F=11 THEN 2950 ELSE IF F=10 THEN 3
0 ELSE I=K : GOSUB 8880
2950 IF C(K)<>1 THEN 3120 ELSE LOCATE 9,74 : PRINT "THRU"; : K=3 : C(K)=1 : K$
)="I-" : LOCATE 10,74 : PRINT K$(K);
2960 IX=599 : IY=72 : IF D(K)<HIO THEN II=(LEN(STR$(D(K)))-1)*8+1 ELSE II=9
2970 GOSUB 1740 : ABF=1 : IF D(K)<HIO THEN AFF=1 ELSE AFF=0
2980 SC!=3.94 : T$="low order (LSB)" : GOSUB 6000
2990 GOSUB 1750 : IF F=12 THEN K=1 : GOTO 2910 ELSE IF F=11 THEN 3120 ELSE IF
10 THEN 3270
3000 IF ABS(D(1)-D(3))>15 THEN PUT (IX,IY),IV,PRESET : SR!=3.96 : GOSUB 26 : L
ATE 14,2 : PRINT "TOO MANY INPUTS" : D(K)=DKS : GOSUB 6190 : GOTO 2990
3010 IF C(4)=7 THEN IF ABS(D(1)-D(3))<>ABS(D(4)-D(6)) THEN PUT (IX,IY),IV,PRES
: SR!=3.98 : GOSUB 26 : LOCATE 14,2 : PRINT "I/O LENGTH MISMATCH" : D(K)=DKS
GOSUB 6190 : GOTO 2990
3020 I=K : GOSUB 8880 : GOTO 3120
3030 SC!=3.55:IX=583:IY=56:IF D(2)<HIO THEN II=(LEN(STR$(D(K)))-1)*8+1 ELSE I:
3040 GOSUB 1740 : ABF=1 : IF D(2)<HIO THEN AFF=1 ELSE AFF=0
3050 GOSUB 25 : GOSUB 7280 : GOSUB 7500 : LOCATE 9,2 : PRINT "Please enter va!
to be moved:" : LOCATE 11,15 : PRINT STRING$(5,CHR$(22))
3060 EROW=17 : ECOL=2 : GOSUB 21 : LOCATE 11,15
3070 MAXL=5 : ETYP=1 : GOSUB 7530 : IF F=>10 THEN 3110 ELSE IF X$=SPACE$(5) TH
BEEP : GOTO 3070
3080 X!=VAL(X$) : IF X!=>0 THEN IF C(4)<>6 THEN IF X!<=32767 THEN 3110 ELSE 3:
ELSE IF X!<=9999 THEN 3110
3090 SR!=SC!+.01 : GOSUB 26 : LOCATE 14,2 : PRINT "INVALID NUMBER" : GOSUB 2.
GOSUB 21
3100 BEEP : F=3 : CALL FLOKEY(F) : IF F=1 THEN 3050 ELSE IF F<10 THEN 3100
3110 GOSUB 1750 : IF F=12 THEN 2840 ELSE IF F=11 THEN 3120 ELSE IF F=10 THEN
0 ELSE D(2)=0 : D(K)=X! : I=K : GOSUB 8880
3120 K=4 : IX=583 : IY=80 : II=9 : GOSUB 1740 : ABF=1 : IF C(K)<>0 THEN AFF=1
SE AFF=0
3130 GOSUB 6750 : GOSUB 1750 : IF F=12 THEN IF C(1)=1 THEN K=3 : GOTO 2960 EL
K=1 : GOTO 2900
3140 IF F=11 THEN 3150 ELSE IF F=10 THEN 3270 ELSE I=K : GOSUB 8880 : IF C(K)
THEN LOCATE 12,74 : PRINT SPACE$(5) : LOCATE 13,56 : PRINT SPACE$(15) : LOCA
13,74 : PRINT SPACE$(5)
3150 IX=599 : IY=80 : IF D(K)<HIO THEN II=(LEN(STR$(D(K)))-1)*8+1 ELSE II=9
3160 GOSUB 1740 : ABF=1 : AFF=0 : IF D(K)<HIO THEN IF C(K)=7 THEN AFF=1
3170 IF C(K)=7 THEN SC!=3.92:T$="high order (MSB)":GOSUB 6000 ELSE GOSUB 6030
3180 GOSUB 1750:IF F=12 THEN 3120 ELSE IF F=11 THEN 3200 ELSE IF F=10 THEN 32
3190 I=K : GOSUB 8880 : IF C(K)<>7 THEN 3270
3200 LOCATE 12,74 : PRINT "THRU"; : K=6 : C(K)=7 : K$(K)="O-" : LOCATE 13,74
RINT K$(K);
3210 IX=599 : IY=96 : IF D(K)<HIO THEN II=(LEN(STR$(D(K)))-1)*8+1 ELSE II=9
3220 GOSUB 1740 : ABF=1 : AFF=0 : SC!=3.94 : T$="low order (LSB)" : GOSUB 600
3230 GOSUB 1750 : IF F=12 THEN K=3 : GOTO 3150 ELSE IF F=10 THEN 3270
3240 IF ABS(D(4)-D(6))>15 THEN PUT (IX,IY),IV,PRESET : SR!=3.96 : GOSUB 26 :
ATE 14,2 : PRINT "TOO MANY OUTPUTS" : D(K)=DKS : GOSUB 6190 : GOTO 3230
3250 IF C(1)=1 THEN IF ABS(D(1)-D(3))<>ABS(D(4)-D(6)) THEN PUT (IX,IY),IV,PRE
: SR!=3.98 : GOSUB 26 : LOCATE 14,2 : PRINT "I/O LENGTH MISMATCH" : D(K)=DKS
GOSUB 6190 : GOTO 3230
3260 I=K : GOSUB 8880
3270 ABF=0 : AFF=0 : GOSUB 7500 : AGF=0 : IF C(1)=0 THEN 3320 ELSE IF C(1)<>8
EN IF D(1)=HIO THEN 3320
3280 IF C(1)=8 THEN IF D(2)=HIO THEN 3320
3290 IF C(1)=1 THEN IF D(3)=HIO THEN 3320
3300 IF C(4)=0 THEN 3320 ELSE IF D(4)=HIO THEN 3320 ELSE IF C(4)=7 THEN IF C(
8 THEN 3320 ELSE IF D(6)=HIO THEN 3320
3310 AGF=1 : IF MF=0 THEN 3400
3320 IF AGF=1 THEN SC!=3.51 ELSE SC!=3.52
```

```
3325 GOSUB 25 : GOSUB 7280 : GOSUB 7500 : LOCATE 8,3
3330 IF AGF=0 THEN PRINT "*** MOVE FIELDS ARE INVALID ***" ELSE PRINT "F1 --
- FIELDS ARE CORRECT"
3340 LOCATE 10,3 : PRINT "F2 ------ MODIFY FIELD(S)" : GOSUB 21
3360 F=4 : CALL FLOKEY(F)
3370 IF F=1 THEN IF AGF=1 THEN IF MF=0 THEN 3400 ELSE GSF=0 : RETURN
3380 IF F=2 THEN K=1 : GOTO 2840
3390 IF F=10 THEN GSF=1 : RETURN ELSE BEEP : GOTO 3360
3400 GOSUB 4990 : IF F=10 THEN 3320
3410 Y!=D! : N!=0 : L=12 : B$=CHR$(C(1)*16+C(4))+MKI$(D(1)) : IF C(1)=1 THEN
+2 : B$=B$+MKI$(D(3))
3420 B$=B$+MKI$(D(4)) : IF C(4)=7 THEN L=L+2 : B$=B$+MKI$(D(6))
3430 B$=CHR$(L)+CHR$(4)+B$ : GOSUB 4790 : GOTO 4800
3440 SC!=3.5 : T$="FIELDS" : GOSUB 7250
3450 F=1 : CALL FLOKEY(F)
3460 IF F=1 THEN GOSUB 3410 : B=3 : GOTO 9990
3470 IF F=2 THEN GOSUB 2835 : IF GSF=1 THEN GOSUB 7970 : GOTO 3440 ELSE 3440
3480 IF F=3 THEN GOSUB 4990 : GOTO 3440
3490 IF F=7 THEN B=1 : GOTO 2200
3500 IF F=8 THEN GOSUB 4940 : IF GSF=1 THEN 3440 ELSE B=4 : GOTO 9990
3510 IF F=10 THEN 2110 ELSE BEEP : GOTO 3450
3520 GOSUB 8390 : T=5 : LOCATE 4,55 : PRINT "WAIT  BLOCK" : LOCATE 8,49 : PRI
"WAIT"; : X!=10000! : GOSUB 3530 : IF GSF=1 THEN 2200 ELSE B=B+2 : GOTO 9990
3530 LOCATE 8,55 : IF X!=>10000 THEN PRINT SPACE$(15) ELSE PRINT USING "####.
;X!
3535 F10$="F10 ------ EXIT WAIT TIME ENTRY"
3540 SC!=3.62:GOSUB 7280:LOCATE 7,5:PRINT "Please enter the number of":LOCATE
2:PRINT "seconds to wait:":IX=431:IY=56:IF X!=>10000 THEN II=9 ELSE II=57
3550 GOSUB 25:GOSUB 1740 : LOCATE 11,15 : PRINT STRING$(7,CHR$(22))
3560 EROW=17 : ECOL=2 : GOSUB 21 : LOCATE 11,15
3570 MAXL=7 : ETYP=2 : GOSUB 7530 : IF F=10 THEN 3610 ELSE IF X$=SPACE$(7) TH
BEEP : GOTO 3570
3580 X!=VAL(X$) : XE!=INT(X!)+(CINT((X!-INT(X!))*100))/100 : IF XE!=X! THEN I
!=>0 THEN IF X!<10000 THEN 3610
3590 SR!=3.63 : GOSUB 26 : LOCATE 14,2 : PRINT "INVALID NUMBER OF SECONDS" :
UB 24 : GOSUB 21
3600 BEEP : F=1 : CALL FLOKEY(F) : IF F=1 THEN LINE (4,90)-(273,146),0,BF : G
B 1750 : GOTO 3550 ELSE IF F<10 THEN 3600
3610 GOSUB 1750 : IF F=10 THEN GSF=1 : RETURN ELSE LOCATE 8,55 : PRINT USING
##.## SECONDS";X! : IF MF=0 THEN 3700
3620 SC!=3.61 : GOSUB 25 : GOSUB 7280
3630 LOCATE 8,3 : PRINT "F1 ------  WAIT TIME IS CORRECT"
3640 LOCATE 10,3 : PRINT "F2 ------ MODIFY WAIT TIME" : GOSUB 21
3660 F=2 : CALL FLOKEY(F)
3670 IF F=1 THEN IF MF=0 THEN 3700 ELSE GSF=0 : RETURN
3680 IF F=2 THEN 3540
3690 IF F=10 THEN GSF=1 : RETURN ELSE BEEP : GOTO 3660
3700 GOSUB 4990 : IF F=10 THEN 3620
3710 Y!=D! : N!=0 : B$=CHR$(10)+CHR$(5)+MKI$(INT(X!))+CHR$(INT((X!-INT(X!))*1
) : GOSUB 4790 : GOTO 4800
3720 SC!=3.6:T$="WAIT TIME" : GOSUB 7250
3730 F=1 : CALL FLOKEY(F)
3740 IF F=1 THEN GOSUB 3710 : B=3 : GOTO 9990
3750 IF F=2 THEN GOSUB 3535 : IF GSF=1 THEN GOSUB 7970 : GOTO 3720 ELSE 3720
3760 IF F=3 THEN GOSUB 4990 : GOTO 3720
3770 IF F=7 THEN B=1 : GOTO 2200
3780 IF F=8 THEN GOSUB 4940 : IF GSF=1 THEN 3720 ELSE B=4 : GOTO 9990
3790 IF F=10 THEN 2110 ELSE BEEP : GOTO 3730
3800 GOSUB 8390 : T=6 : LOCATE 4,55 : PRINT "EXIT  BLOCK" : LOCATE 8,49 : PRI
"EXIT FLOWCHARTS"; : FE=HIO : GOSUB 3810 : IF GSF=1 THEN 2200 ELSE B=B+2 : GO
9990
3810 LOCATE 8,68 : IF FE=HIO THEN PRINT SPACE$(4); ELSE PRINT USING "###";FE;
3815 F10$="F10 ------ EXIT NUMBER ENTRY"
3820 SC!=3.67:GOSUB 7280:LOCATE 7,5:PRINT "Please enter the number of":LOCATE 9,
2:PRINT "this flowchart exit:":IX=535:IY=56:IF FE=HIO THEN II=9 ELSE II=25
3830 GOSUB 25:GOSUB 1740 : LOCATE 11,15 : PRINT STRING$(3,CHR$(22))
3840 EROW=17 : ECOL=2 : GOSUB 21 : LOCATE 11,15
3850 MAXL=3 : ETYP=1 : GOSUB 7530 : IF F=10 THEN 3890 ELSE IF X$=SPACE$(3) THEN
BEEP : GOTO 3850
3860 FE=VAL(X$) : IF FE>0 THEN IF FE<HIO THEN 3890
3870 SR!=3.68 : GOSUB 26 : LOCATE 14,2 : PRINT "INVALID EXIT NUMBER" : GOSUB 24
: GOSUB 21
3880 BEEP : F=1 : CALL FLOKEY(F) : IF F=1 THEN LINE (4,90)-(273,146),0,BF : GOSU
B 1750 : GOTO 3830 ELSE IF F<10 THEN 3880
```

```
3890 GOSUB 1750 : IF F=10 THEN GSF=1 : RETURN ELSE LOCATE 8,68 : PRINT USING "##
#";FE : IF MF=0 THEN 3980
3900 SC!=3.66 : GOSUB 25 : GOSUB 7280
3910 LOCATE 8,3 : PRINT "F1 ------ NUMBER IS CORRECT"
3920 LOCATE 10,3 : PRINT "F2 ------ MODIFY EXIT NUMBER" : GOSUB 21
3940 F=2 : CALL FLOKEY(F)
3950 IF F=1 THEN IF MF=0 THEN 3980 ELSE GSF=0 : RETURN
3960 IF F=2 THEN 3820
3970 IF F=10 THEN GSF=1 : RETURN ELSE BEEP : GOTO 3940
3980 GOSUB 4990 : IF F=10 THEN 3900
3990 Y!=D! : N!=0 : B$=CHR$(9)+CHR$(6)+MKI$(FE) : GOSUB 4790 : GOTO 4800
4000 SC!=3.65:T$="EXIT NUMBER" : GOSUB 7250
4010 F=1 : CALL FLOKEY(F)
4020 IF F=1 THEN GOSUB 3990 : B=3 : GOTO 9990
4030 IF F=2 THEN 3815 : IF GSF=1 THEN GOSUB 7970 : GOTO 4000 ELSE 4000
4040 IF F=3 THEN GOSUB 4990 : GOTO 4000
4050 IF F=7 THEN B=1 : GOTO 2200
4060 IF F=8 THEN GOSUB 4940 : IF GSF=1 THEN 4000 ELSE B=4 : GOTO 9990
4070 IF F=10 THEN 2110 ELSE BEEP : GOTO 4010
4080 GOSUB 8420 : T=7 : Y!=0 : N!=0 : LOCATE 4,53 : PRINT "DECISION BLOCK";
4090 EF=0 : GOSUB 1500
4100 IF GSF=1 THEN 2200 ELSE ABF=0 : AFF=0 : GOSUB 7500
4110 GOSUB 4988 : IF F=10 THEN GOSUB 1780 : GOTO 4100 ELSE Y!=D! : GOSUB 8290
4120 GOSUB 4989 : IF F=10 THEN 4110
4130 IF D!=Y! THEN GOSUB 5060 : IF F=10 THEN 4110 ELSE 4130 ELSE N!=D!
4140 GOSUB 8290 : GOSUB 4150 : B=B+2 : GOTO 9990
4150 K=1
4160 IF C1(K)=192 THEN 4170 ELSE K=K+1 : GOTO 4160
4170 B$=CHR$(K*3+10)+CHR$(7) : FOR I=1 TO K : B$=B$+CHR$(C(I)+C1(I))+MKI$(D(I))
 : NEXT I : D!=Y! : GOSUB 4790 : D!=N! : GOSUB 4790 : GOTO 4800
4180 SC!=3.7 : T$="CRITERIA" : GOSUB 7250
4190 F=1 : CALL FLOKEY(F)
4200 IF F=1 THEN GOSUB 4150 : B=3 : GOTO 9990
4210 IF F=2 THEN EF=0 : K=1 : GOSUB 1520 : IF GSF=1 THEN GOSUB 7970 : GOTO 4180
 ELSE 4180
4220 IF F=3 THEN GOSUB 4988 : IF F=10 THEN 4180 ELSE 4270
4230 IF F=4 THEN GOSUB 4989 : IF F=10 THEN 4180 ELSE 4280
4235 IF F=5 THEN D!=Y! : Y!=N! : N!=D! : GOSUB 8290 : GOTO 4190
4240 IF F=7 THEN B=1 : GOTO 2200
4250 IF F=8 THEN GOSUB 4940 : IF GSF=1 THEN 4180 ELSE B=4 : GOTO 9990
4260 IF F=10 THEN 2110 ELSE BEEP : GOTO 4190
4270 IF D!=N! THEN GOSUB 5060 : IF F=10 THEN 4180 ELSE 4270 ELSE Y!=D! : GOSUB
8290 : GOTO 4180
4280 IF D!=Y! THEN GOSUB 5060 : IF F=10 THEN 4180 ELSE 4280 ELSE N!=D! : GOSUB
8290 : GOTO 4180
4290 GOSUB 8420 : T=8 : Y!=0 : N!=0 : LOCATE 4,53 : PRINT "COMPARE BLOCK"; : GOS
UB 4300 : IF GSF=1 THEN 2200 ELSE B=B+2 : GOTO 9990
4300 FOR I=1 TO 3 : C(I)=0 : C1(I)=HIO : D(I)=HIO : NEXT I : AGF=0 : K=1
4305 F10$="F10 ------ EXIT COMPARE ENTRY"
4310 IX=527 : IY=104 : II=9 : GOSUB 1740 : ABF=0 : IF C(K)>0 THEN AFF=1 ELSE AFF
=0
4320 GOSUB 6900 : GOSUB 1750 : IF F=11 THEN 4330 ELSE IF F=10 THEN 4530 ELSE I=K
 : GOSUB 8880
4330 IX=543 : IY=104 : IF D(K)<HIO THEN II=(LEN(STR$(D(K)))-1)*8+1 ELSE II=9
4340 GOSUB 1740 : ABF=1 : IF D(K)<HIO THEN AFF=1 ELSE AFF=0
4350 GOSUB 6030 : GOSUB 1750 : IF F=12 THEN 4310 ELSE IF F=11 THEN 4360 ELSE IF
F=10 THEN 4530 ELSE I=K : GOSUB 8880
4360 K=2 : IX=535 : IY=112 : II=9 : GOSUB 1740 : ABF=1 : IF C1(K)<>HIO THEN AFF=
1 ELSE AFF=0
4370 GOSUB 7010 : GOSUB 1750 : IF F=12 THEN K=1 : GOTO 4330 ELSE IF F=11 THEN 43
80 ELSE IF F=10 THEN 4530 ELSE I=K : GOSUB 8960
4380 K=3 : IX=527 : IY=120 : IF C(K)<>8 THEN II=9 ELSE IF D(2)=HIO THEN II=9 ELS
E II=(LEN(STR$(D(K)))-1)*8+1
4390 GOSUB 1740 : ABF=1 : IF C(K)>0 THEN AFF=1 ELSE AFF=0
4400 I=C(K):GOSUB 7130:GOSUB 1750:IF F=12 THEN 4360 ELSE IF F=11 THEN 4420 ELSE
IF F=10 THEN 4530 ELSE IF I=8 THEN IF C(K)<>8 THEN IF D(K)>HIO THEN D(K)=HIO : D
(2)=HIO : GOTO 4410
4405 IF I>0 THEN IF I<8 THEN IF C(K)=8 THEN IF D(K)<HIO THEN D(2)=0
4410 I=K : GOSUB 8880
4420 IF C(K)=8 THEN 4440 ELSE IX=543 : IY=120 : IF D(K)<HIO THEN II=(LEN(STR$(D(
K)))-1)*8+1 ELSE II=9
4430 GOSUB 1740 : ABF=1 : AFF=0 : GOSUB 6030 : GOSUB 1750 : IF F=12 THEN 4380 EL
SE IF F=10 THEN 4530 ELSE I=K : GOSUB 8880 : GOTO 4530
4440 SC!=3.86 : IX=527 : IY=120 : IF D(2)<HIO THEN II=(LEN(STR$(D(K)))-1)*8+1 EL
SE II=9
```

```
4450 GOSUB 1740 : ABF=1 : AFF=0
4460 GOSUB 25 : GOSUB 7280 : GOSUB 7500 : LOCATE 9,2 : PRINT "Please enter value
 to compare:" : LOCATE 11,15 : PRINT STRING$(5,CHR$(22))
4470 EROW=17 : ECOL=2 : GOSUB 21 : LOCATE 11,15
4480 MAXL=5 : ETYP=1 : GOSUB 7530 : IF F=>10 THEN 4520 ELSE IF X$=SPACE$(5) THEN
 BEEP : GOTO 4480
4490 X!=VAL(X$) : IF X!=>0 THEN IF C(1)<>6 THEN IF X!<=32767 THEN 4520 ELSE 4500
 ELSE IF X!<=9999 THEN 4520
4500 SR!=3.87 : GOSUB 26 : LOCATE 14,2 : PRINT "INVALID   NUMBER" : GOSUB 24 : GO
SUB 21
4510 BEEP : F=3 : CALL FLOKEY(F) : IF F=1 THEN 4460 ELSE IF F<10 THEN 4510
4520 GOSUB 1750 : IF F=12 THEN 4380 ELSE IF F=10 THEN 4530 ELSE D(2)=0 : D(K)=X!
 : I=K : GOSUB 8880
4530 ABF=0 : AFF=0 : GOSUB 7500 : AGF=0 : IF C(1)=0 THEN 4550 ELSE IF D(1)=HI0 T
HEN 4550 ELSE IF C(3)=0 THEN 4550 ELSE IF C(3)=8 THEN IF D(2)=HI0 THEN 4550 ELSE
 4540 ELSE IF D(3)=HI0 THEN 4550
4540 AGF=1 : IF MF=0 THEN 4630
4550 IF AGF=1 THEN SC!=3.81 ELSE SC!=3.82
4555 GOSUB 25 : GOSUB 7280 : GOSUB 7500 : LOCATE 8,3
4560 IF AGF=0 THEN PRINT "*** FIELDS ARE INVALID ***" ELSE PRINT "F1  ------  FI
ELDS ARE CORRECT"
4570 LOCATE 10,3 : PRINT "F2  ------  MODIFY FIELD(S)" : GOSUB 21
4590 F=4 : CALL FLOKEY(F)
4600 IF F=1 THEN IF AGF=1 THEN IF MF=0 THEN 4630 ELSE GSF=0 : RETURN
4610 IF F=2 THEN K=1 : GOTO 4310
4620 IF F=10 THEN GSF=1 : RETURN ELSE BEEP : GOTO 4590
4630 GOSUB 4988 : IF F=10 THEN 4550 ELSE Y!=D! : GOSUB 8290
4640 GOSUB 4989 : IF F=10 THEN 4630
4650 IF D!=Y! THEN GOSUB 5060  : IF F=10 THEN 4630 ELSE 4650 ELSE N!=D!
4660 GOSUB 8290
4670 B$=CHR$(15)+CHR$(8+C1(2))+CHR$(C(1)*16+C(3))+MKI$(D(1))+MKI$(D(3)) : D!=Y!
 : GOSUB 4790 : D!=N! : GOSUB 4790 : GOTO 4800
4680 SC!=3.8 : T$="FIELDS" : GOSUB 7250
4690 F=1 : CALL FLOKEY(F)
4700 IF F=1 THEN GOSUB 4670 : B=3 : GOTO 9990
4710 IF F=2 THEN GOSUB 4305 : IF GSF=1 THEN GOSUB 7970 : GOTO 4680 ELSE 4680
4720 IF F=3 THEN GOSUB 4988 : IF F=10 THEN 4680 ELSE 4770
4730 IF F=4 THEN GOSUB 4989 : IF F=10 THEN 4680 ELSE 4780
4735 IF F=5 THEN D!=Y! : Y!=N! : N!=D! : GOSUB 8290 : GOTO 4690
4740 IF F=7 THEN B=1 : GOTO 2200
4750 IF F=8 THEN GOSUB 4940 : IF GSF=1 THEN 4680 ELSE B=4 : GOTO 9990
4760 IF F=10 THEN 2110 ELSE BEEP : GOTO 4690
4770 IF D!=N! THEN GOSUB 5060 : IF F=10 THEN 4680 ELSE 4770 ELSE Y!=D! : GOSUB
8290 : GOTO 4680
4780 IF D!=Y! THEN GOSUB 5060 : IF F=10 THEN 4680 ELSE 4780 ELSE N!=D! : GOSUB
8290 : GOTO 4680
4790 B$=B$+MKI$(INT(D!))+CHR$(CINT((D!-INT(D!))*100)+10) : RETURN
4800 B$=MKI$(INT(B!))+CHR$(CINT((B!-INT(B!))*100)+10)+B$+MKI$(EN) : CALL PUTBLK(
B$) : FOK=CVI(B$)
4810 IF OY!=0 THEN 4820 ELSE IF OY!=B! THEN 4820 ELSE IF OY!=Y! THEN Y!=B! ELSE
D!=OY! : GOSUB 4900
4820 IF OZ!=0 THEN 4830 ELSE IF OZ!=B! THEN 4830 ELSE IF OZ!=N! THEN N!=B! ELSE
D!=OZ! : GOSUB 4900
4830 IF Y!=B! THEN 4840 ELSE D!=Y! : GOSUB 4870
4840 IF N!=0 THEN 4850 ELSE IF N!=B! THEN 4850 ELSE D!=N! : GOSUB 4870
4850 GSF=0 : FMF=1 : RETURN
4860 B$=MKI$(INT(D!))+CHR$(CINT((D!-INT(D!))*100)+10)+SPACE$(32) : CALL GETBLK(B
$) : RETURN
4870 GOSUB 4860 : L=ASC(MID$(B$,4,1)) : IF L>0 THEN 4890
4880 B$=LEFT$(B$,3)+CHR$(4)+CHR$(0)+MKI$(1) :CALL PUTBLK(B$):FOK=CVI(B$):RETURN
4890 EN=CVI(MID$(B$,L+2,2)) :EN=EN+1: MID$(B$,L+2,2)=MKI$(EN) : CALL PUTBLK(B$)
 : RETURN
4900 GOSUB 4860 : L=ASC(MID$(B$,4,1)) : T=ASC(MID$(B$,5,1)) :IF L=0 THEN RETURN
4910 EN=CVI(MID$(B$,L+2,2)) : EN=EN-1 : MID$(B$,L+2,2)=MKI$(EN)
4920 IF EN>0 OR T>0 THEN CALL PUTBLK(B$) : RETURN
4930 B$=LEFT$(B$,3)+CHR$(0) : CALL PUTBLK(B$) : RETURN
4940 SC!=3.33:GOSUB 25:GOSUB 7280 : LOCATE 8,10 : PRINT "ARE YOU SURE ?????"
4950 LOCATE 14,5 : PRINT "F1  ------  DELETE THE BLOCK" : GOSUB 23
4970 BEEP:F=1 : CALL FLOKEY(F):IF F=1 THEN 4980 ELSE IF F=10 THEN GSF=1:RETURN E
LSE 4970
4980 Y!=B! : N!=0 : IF EN=0 THEN B$=CHR$(0) : GOTO 4800 ELSE B$=CHR$(4)+CHR$(0)
 : GOTO 4800
4988 DS$="YES " : SC!=3.36 : GOTO 5000
4989 DS$="NO  " : SC!=3.38 : GOTO 5000
```

```
4990 DS$="" : SC!=3.34
5000 GOSUB 25:GOSUB 7280:LOCATE 7,5:PRINT "Please enter the number of":LOCATE 9,
 2:PRINT "the "+DS$+"DESTINATION block:":LOCATE 11,15:PRINT STRING$(7,CHR$(22))
5010 EROW=17 : ECOL=2 : GOSUB 23 : LOCATE 11,15
5030 MAXL=7 : ETYP=2 : GOSUB 7530 : IF F=10 THEN RETURN
5040 IF X$=SPACE$(7) THEN BEEP : GOTO 5030
5050 D!=VAL(X$) : DE!=INT(D!)+(CINT((D!-INT(D!))*100))/100 : IF DE!=D! THEN IF D
!>0 THEN IF D!<10000 THEN 5120
5060 SR!=SC!+.01 : GOSUB 26 : LOCATE 14,2 : PRINT "INVALID BLOCK NUMBER"
5070 GOSUB 24 : GOSUB 23
5090 BEEP : F=1 : CALL FLOKEY(F) : IF F=1 THEN 5000 ELSE IF F=10 THEN RETURN ELS
E 5090
5120 IF DS$="" THEN IF D!=B! THEN 5060 ELSE LOCATE 24,56 : PRINT USING "####.##
;D!;
5130 F=0 : RETURN
5140 IF K>1 THEN SC!=3.23 ELSE SC!=3.22
5150 GOSUB 25 : GOSUB 7280 : GOSUB 7500
5160 LOCATE 4,5 : PRINT "Please select criteria"
5170 LOCATE 7,5 : PRINT "F1  ------  I (INPUT)"
5180 LOCATE 9,5 : PRINT "F2  ------  F (FLAG)"
5190 LOCATE 11,5 : PRINT "F3  ------  NOT I"
5200 LOCATE 13,5 : PRINT "F4  ------  NOT F"
5220 IF K=1 THEN LOCATE 16,5 : PRINT "F5  ------  NO CRITERIA"
5230 GOSUB 21
5240 F=4 : CALL FLOKEY(F)
5250 IF F=12 THEN IF ABF=1 THEN RETURN
5260 IF F=11 THEN IF AFF=1 THEN RETURN
5270 IF F=1 THEN C(K)=1 : RETURN
5280 IF F=2 THEN C(K)=2 : RETURN
5290 IF F=3 THEN C(K)=9 : RETURN
5300 IF F=4 THEN C(K)=10 : RETURN
5310 IF F=5 THEN IF K=1 THEN C(K)=255 : RETURN
5320 IF F=10 THEN RETURN ELSE BEEP : GOTO 5240
5330 SC!=3.32 : GOSUB 25 : GOSUB 7280 : LOCATE 4,5 : PRINT "Please select block
type"
5340 LOCATE 7,5 : PRINT "F1  ------  CONTROL"
5350 LOCATE 9,5 : PRINT "F2  ------  MOVE"
5360 LOCATE 11,5 : PRINT "F3  ------  WAIT"
5370 LOCATE 13,5 : PRINT "F4  ------  EXIT FLOWCHARTS"
5380 LOCATE 15,5 : PRINT "F5  ------  DECISION"
5390 LOCATE 17,5 : PRINT "F6  ------  COMPARE"
5400 LOCATE 20,2 : PRINT "F10 ------  ENTER NEW BLOCK NUMBER"
5410 F=2 : CALL FLOKEY(F)
5420 IF F<7 THEN RETURN ELSE IF F=10 THEN RETURN ELSE BEEP : GOTO 5410
5430 SC!=3.43 : GOSUB 25 : GOSUB 7280 : GOSUB 7500 : LOCATE 4,5 : PRINT "Please
select segment action"
5440 LOCATE 7,5 : PRINT "F1  ------  T.ON   (OUTPUT"
5450 LOCATE 8,5 : PRINT "F2  ------  T.OFF  or FLAG)"
5460 LOCATE 10,5 : PRINT "F3  ------  P.ON  (OUTPUT)"
5470 LOCATE 12,5 : PRINT "F4  ------  START"
5480 LOCATE 13,5 : PRINT "F5  ------  STOP   (TIMER)"
5490 LOCATE 14,5 : PRINT "F6  ------  RESET"
5500 LOCATE 16,5 : PRINT "F7  ------  INCR"
5510 LOCATE 17,5 : PRINT "F8  ------  DECR   (COUNTER)"
5520 LOCATE 18,5 : PRINT "F9  ------  CLEAR"
5530 IF MF=0 AND K>1 THEN LOCATE 20,2 : PRINT "F10 ------  END OF CONTROLS" ELSE
 GOSUB 21
5540 F=4 : CALL FLOKEY(F)
5550 IF F=12 THEN IF ABF=1 THEN RETURN ELSE BEEP : GOTO 5540
5560 IF F=11 THEN IF AFF=1 THEN RETURN ELSE BEEP : GOTO 5540
5570 IF F=1 THEN C1(K)=144 :IF C(K)=7 OR C(K)=2 THEN RETURN ELSE C(K)=0 :RETURN
5580 IF F=2 THEN C1(K)=160 :IF C(K)=7 OR C(K)=2 THEN RETURN ELSE C(K)=0 :RETURN
5590 IF F=3 THEN C1(K)=176 : C(K)=7 : RETURN
5600 IF F=4 THEN C1(K)=144 : C(K)=3 : RETURN
5610 IF F=5 THEN C1(K)=160 : C(K)=3 : RETURN
5620 IF F=6 THEN C1(K)=176 : C(K)=3 : RETURN
5630 IF F=7 THEN C1(K)=144 : C(K)=5 : RETURN
5640 IF F=8 THEN C1(K)=160 : C(K)=5 : RETURN
5650 IF F=9 THEN C1(K)=176 : C(K)=5 : RETURN
5660 RETURN
5670 SC!=3.44 : GOSUB 25 : GOSUB 7280 : GOSUB 7500
5680 LOCATE 4,5 : PRINT "Please select element type"
5690 LOCATE 7,5 : PRINT "F1  ------  O (OUTPUT)"
5700 LOCATE 9,5 : PRINT "F2  ------  F (FLAG)" : GOSUB 21
```

```
5720 F=4 : CALL FLOKEY(F)
5730 IF F=12 THEN IF ABF=1 THEN RETURN
5740 IF F=11 THEN IF AFF=1 THEN RETURN
5750 IF F=1 THEN C(K)=7 : RETURN
5760 IF F=2 THEN C(K)=2 : RETURN
5770 IF F=10 THEN RETURN ELSE BEEP : GOTO 5720
5780 IF AGF=1 THEN SC!=3.41 ELSE SC!=3.42
5790 GOSUB 25 : GOSUB 7280 : GOSUB 7500 : LOCATE 8,3
5800 IF AGF=0 THEN PRINT "*** CONTROLS ARE INVALID ***" ELSE PRINT "F1 ------
CONTROLS ARE CORRECT"
5820 LOCATE 10,3 : PRINT "F2 ------ MODIFY SEGMENT(S)"
5830 IF C1(K)=0 THEN 5870 ELSE IF KK>6 THEN 5870
5850 LOCATE 12,3 : PRINT "F3 ------ ADD NEW SEGMENT"
5860 LOCATE 14,3 : PRINT "F4 ------ INSERT SEGMENT"
5870 IF KK>0 THEN LOCATE 16,3 : PRINT "F5 ------ DELETE SEGMENT"
5890 GOSUB 21
5900 IX=45*8-1 : IY=(K*2+5)*8 : II=9 : GOSUB 1740 : F=4 : CALL FLOKEY(F)
5910 PUT (IX,IY),IV,PSET
5920 IF F=12 THEN IF ABF=1 THEN RETURN
5930 IF F=11 THEN IF AFF=1 THEN RETURN
5940 IF F=1 THEN IF AGF=1 THEN RETURN
5950 IF F=2 THEN RETURN
5960 IF F=3 THEN IF C1(K)>0 THEN IF KK<7 THEN RETURN
5970 IF F=4 THEN IF C1(K)>0 THEN IF KK<7 THEN RETURN
5980 IF F=5 THEN IF KK>0 THEN RETURN
5990 IF F=10 THEN RETURN ELSE BEEP : GOTO 5900
6000 DKS=D(K) : DL=0 : IF C(K)=1 THEN C$="INPUT" : LT=1 ELSE C$="OUTPUT" : LT=4
6020 GOSUB 7280 : GOSUB 7500 : LOCATE 7,2 : PRINT "Please enter "+T$ : LOCATE 9,
10 : PRINT C$+" number or label:" : GOTO 6120
6030 SC!=3.9 : T$="" : DL=0
6040 IF C(K)=1 OR C(K)=9 THEN C$="INPUT" : LT=1
6050 IF C(K)=2 OR C(K)=10 THEN C$="FLAG" : LT=2
6060 IF C(K)=3 OR C(K)=11 THEN C$="TIMER" : LT=3
6070 IF C(K)=4 THEN C$="F-KEY" : GOTO 6262
6080 IF C(K)=5 THEN C$="COUNTER" : LT=5
6090 IF C(K)=6 THEN C$="REGISTER" : LT=6
6100 IF C(K)=7 THEN C$="OUTPUT" : LT=4
6110 GOSUB 7280 : GOSUB 7500 : LOCATE 7,5 : PRINT "Please enter "+C$ : LOCATE 9,
15 : PRINT "number or label:"
6120 GOSUB 25 : LOCATE 11,10 : PRINT STRING$(15,22) : AGX=0 : IF DL=0 THEN LOCAT
E 18,2 : PRINT "F9 ------ DISPLAY LABELS"/ : AGX=1
6121 EROW=16 : ECOL=2 : GOSUB 21 : LOCATE 11,10
6122 MAXL=15 : ETYP=0 : GOSUB 7530 : IF F=>10 THEN 6240 ELSE IF F=9 THEN GOSUB 9
200 : IF F=10 THEN 6240 ELSE 6158 ELSE IF X$=SPACE$(15) THEN BEEP : GOTO 6122
6124 IF RIGHT$(X$,1)=" " THEN X$=LEFT$(X$,LEN(X$)-1) : GOTO 6124
6126 I=ASC(LEFT$(X$,1)) : IF I=>48 THEN IF I<=57 THEN 6170
6130 X1$=X$ : FOR I1=1 TO LEN(X1$) : I=ASC(MID$(X1$,I1,1)) : IF I>96 THEN IF I<1
23 THEN MID$(X1$,I1,1)=CHR$(I-32)
6131 NEXT I1 : LN=0 : LD=HIO
6132 L$=MKI$(LT)+MKI$(LN)+SPACE$(16) : CALL GETLBL(L$) : L$=MID$(L$,6,ASC(MID$(L
$,5,1)))
6133 IF L$="" THEN IF LD=HIO THEN LD=LN : GOTO 6138 ELSE 6138
6134 FOR I1=1 TO LEN(L$) : I=ASC(MID$(L$,I1,1)) : IF I>96 THEN IF I<123 THEN MID
$(L$,I1,1)=CHR$(I-32)
6135 NEXT I1 : IF X1$=L$ THEN FE=LN : GOTO 6235
6138 LN=LN+1 : IF LN<=MAXLBL(LT) THEN 6132
6139 GOSUB 7280 : LOCATE 7,2 : PRINT X$ : LOCATE 7,18 : PRINT "is a new label."
6140 IF LT=1 OR LT=4 THEN 6150 ELSE LOCATE 14,2 : PRINT "F1 ------ ALLOCATE DY
NAMICALLY" : GOSUB 23
6141 F=3 : CALL FLOKEY(F) : IF F=1 THEN 6165 ELSE IF F=10 THEN IF T$="" THEN 611
0 ELSE 6020
6142 IF F>10 THEN 6240 ELSE BEEP : GOTO 6141
6146 GOSUB 7280 : LOCATE 7,2 : PRINT X$ : LOCATE 7,18 : PRINT "is a new label."
6150 L$=X$ : LOCATE 9,2 : PRINT "Please enter "+C$+" number:" : GOSUB 25 : LOCAT
E 11,15 : PRINT STRING$(3,22) : EROW=16 : ECOL=2 : GOSUB 23 : LOCATE 11,15
6151 MAXL=3 : ETYP=1 : GOSUB 7530 : IF F>10 THEN 6240 ELSE IF F=10 THEN 6158 ELS
E IF X$=SPACE$(3) THEN BEEP : GOTO 6151
6152 FE=VAL(X$) : X$=L$ : IF FE=>0 THEN IF FE<HIO THEN 6160
6153 SR!=SC!+.01 : GOSUB 26 : LOCATE 14,2 : PRINT "INVALID "+C$+" NUMBER" : LOCA
TE 16,2 : PRINT "F1 ------ ENTER ANOTHER NUMBER" : GOSUB 21
6154 BEEP : F=3 : CALL FLOKEY(F)
6155 IF F=1 THEN 6146 ELSE IF F=10 THEN 6158 ELSE IF F>10 THEN 6240 ELSE 6154
6158 IF T$="" THEN 6110 ELSE 6020
6160 L$=MKI$(LT)+MKI$(FE)+SPACE$(16) : CALL GETLBL(L$) : L$=MID$(L$,6,ASC(MID$(L
$,5,1)))
```

```
6161 IF L$="" THEN LD=FE : GOTO 6165 ELSE GOSUB 7280 : LOCATE 7,2 : PRINT "Now l
abeled: "+L$
6162 LOCATE 14,2 : PRINT "F1 ------ CHANGE LABEL" : GOSUB 23
6163 BEEP : F=3 : CALL FLOKEY(F)
6164 IF F=1 THEN LD=FE ELSE IF F=10 THEN 6146 ELSE IF F>10 THEN 6240 ELSE 6163
6165 IF LD<HIO THEN 6168 ELSE LD=MAXLBL(LT)+1 : IF LD<HIO THEN 6168
6166 GOSUB 7280 : LOCATE 9,5 : PRINT "ALL "+C$+" LABELS ARE" : LOCATE 11,5 : PRI
NT "ALREADY ALLOCATED !!" : GOSUB 23
6167 BEEP : F=3 : CALL FLOKEY(F) : IF F=10 THEN 6158 ELSE IF F>10 THEN 6240 ELSE
 6167
6168 IF LD>MAXLBL(LT) THEN MAXLBL(LT)=LD
6169 L$=MKI$(LT)+MKI$(LD)+CHR$(LEN(X$))+X$ : CALL PUTLBL(L$) : LMF=1 : FE=LD : G
OTO 6235
6170 J=0 : FOR I1=1 TO LEN(X$) : I=ASC(MID$(X$,I1,1)) : IF I<48 THEN J=1 ELSE IF
 I>57 THEN J=1
6172 NEXT I1 : IF J=1 THEN 6180
6175 FE=VAL(X$) : IF FE=>0 THEN IF FE<HIO THEN 6235
6180 SR!=SC!+.01 : GOSUB 26 : LOCATE 14,2 : PRINT "INVALID "+C$+" NUMBER"
6190 LOCATE 16,2 : PRINT "F1 ------- ENTER ANOTHER NUMBER" : LOCATE 18,2 : PRIN
T SPACE$(30) : GOSUB 21
6210 BEEP : F=3 : CALL FLOKEY(F)
6220 IF F=1 THEN LINE (4,90)-(273,146),0,BF : GOTO 6120
6230 IF F=>10 THEN 6240 ELSE 6210
6235 D(K)=FE : N$=STR$(FE) : IF AFF=1 THEN 6240
6238 K$(K)=K$(K)+RIGHT$(N$,LEN(N$)-1)
6240 AGX=0 : IF DL=1 THEN PUT (368,24),BO!,PSET : DL=0
6250 RETURN
6262 GOSUB 7280 : GOSUB 7500 : LOCATE 9,2 : PRINT "Please enter "+C$+" number:"
 : GOSUB 25 : LOCATE 11,15 : PRINT STRING$(3,22) : EROW=17 : ECOL=2 : GOSUB 21 :
LOCATE 11,15
6263 MAXL=3 : ETYP=1 : GOSUB 7530 : IF F=>10 THEN RETURN ELSE IF X$=SPACE$(3) TH
EN BEEP : GOTO 6263
6264 FE=VAL(X$) : IF FE>0 THEN IF FE<=10 THEN 6235
6265 SR!=SC!+.01 : GOSUB 26 : LOCATE 14,2 : PRINT "INVALID "+C$+" NUMBER" : GOSU
B 24 : GOSUB 21
6266 BEEP : F=3 : CALL FLOKEY(F)
6267 IF F=1 THEN 6262 ELSE IF F=>10 THEN RETURN ELSE 6266
6270 SC!=3.73 : GOSUB 25 : GOSUB 7280 : GOSUB 7500 : LOCATE 4,5 : PRINT "Please
select criteria"
6280 LOCATE 7,5 : PRINT "F1 ------ I (INPUT)"
6290 LOCATE 8,5 : PRINT "F2 ------ F (FLAG)"
6300 LOCATE 9,5 : PRINT "F3 ------ T (TIMER)"
6310 LOCATE 10,5 : PRINT "F4 ------ K (F-KEY)"
6320 LOCATE 13,5 : PRINT "F5 ------ NOT I"
6330 LOCATE 14,5 : PRINT "F6 ------ NOT F"
6340 LOCATE 15,5 : PRINT "F7 ------ NOT T" : GOSUB 21
6360 F=4 : CALL FLOKEY(F)
6370 IF F=12 THEN IF ABF=1 THEN RETURN
6380 IF F=11 THEN IF AFF=1 THEN RETURN
6390 IF F=1 THEN C(K)=1 : RETURN
6400 IF F=2 THEN C(K)=2 : RETURN
6410 IF F=3 THEN C(K)=3 : RETURN
6420 IF F=4 THEN C(K)=4 : RETURN
6430 IF F=5 THEN C(K)=9 : RETURN
6440 IF F=6 THEN C(K)=10 : RETURN
6450 IF F=7 THEN C(K)=11 : RETURN
6460 IF F=10 THEN RETURN ELSE BEEP : GOTO 6360
6470 IF EF>0 THEN SC!=3.24 ELSE SC!=3.74
6475 IF K>6 THEN SC!=SC!+.01
6480 GOSUB 25 : GOSUB 7280 : GOSUB 7500 : LOCATE 4,5 : PRINT "Please select next
 action"
6490 IF K>6 THEN 6520
6500 LOCATE 9,5 : PRINT "F1 ------ LOGICAL 'AND'"
6510 LOCATE 11,5 : PRINT "F2 ------ LOGICAL 'OR'"
6520 LOCATE 15,5 : PRINT "F3 ------ END OF CRITERIA" : GOSUB 21
6540 F=4 : CALL FLOKEY(F)
6550 IF F=12 THEN IF ABF=1 THEN RETURN
6560 IF F=11 THEN IF AFF=1 THEN RETURN
6570 IF F=1 THEN IF K<7 THEN C1(K)=208 : RETURN
6580 IF F=2 THEN IF K<7 THEN C1(K)=224 : RETURN
6590 IF F=3 THEN C1(K)=192 : RETURN
6600 IF F=10 THEN RETURN ELSE BEEP : GOTO 6540
6610 SC!=3.53 : GOSUB 25 : GOSUB 7280 : GOSUB 7500 : LOCATE 4,5 : PRINT "Please
select source type"
```

```
6620 LOCATE 7,5 : PRINT "F1 ------   C (COUNTER)"
6630 LOCATE 9,5 : PRINT "F2 ------   R (REGISTER)"
6640 LOCATE 11,5 : PRINT "F3 ------   I (INPUTS)"
6660 IF C(4)<>7 THEN LOCATE 14,5 : PRINT "F4 ------   FIXED VALUE"
6670 GOSUB 21
6680 F=4 : CALL FLOKEY(F)
6690 IF F=11 THEN IF AFF=1 THEN RETURN
6700 IF F=1 THEN C(K)=5 : RETURN
6710 IF F=2 THEN C(K)=6 : RETURN
6720 IF F=3 THEN C(K)=1 : RETURN
6730 IF F=4 THEN IF C(3)<>7 THEN C(K)=8 : RETURN
6740 IF F=10 THEN RETURN ELSE BEEP : GOTO 6680
6750 SC!=3.54 : GOSUB 25 : GOSUB 7280 : GOSUB 7500 : LOCATE 4,5 : PRINT "Please
select receiving type"
6760 LOCATE 7,5 : PRINT "F1 ------   C (COUNTER)"
6770 IF C(1)=8 THEN IF D(1)>9999 THEN 6810
6780 LOCATE 9,5 : PRINT "F2 ------   R (REGISTER)"
6800 IF C(1)<>8 THEN LOCATE 11,5 : PRINT "F3 ------   O (OUTPUTS)"
6810 GOSUB 21
6820 F=4 : CALL FLOKEY(F)
6830 IF F=12 THEN IF ABF=1 THEN RETURN
6840 IF F=11 THEN IF AFF=1 THEN RETURN
6850 IF F=1 THEN C(K)=5 : RETURN
6860 IF C(1)=8 THEN IF D(1)>9999 THEN 6890
6870 IF F=2 THEN C(K)=6 : RETURN
6880 IF F=3 THEN IF C(1)<>8 THEN C(K)=7 : RETURN
6890 IF F=10 THEN RETURN ELSE BEEP : GOTO 6820
6900 SC!=3.83 : GOSUB 25 : GOSUB 7280 : GOSUB 7500 : LOCATE 4,5 : PRINT "Please
select compare type"
6910 LOCATE 9,5 : PRINT "F1 ------   C (COUNTER)"
6920 IF C(3)=8 THEN IF D(3)>9999 THEN 6940
6930 LOCATE 12,5 : PRINT "F2 ------   R (REGISTER)"
6940 GOSUB 21
6950 F=4 : CALL FLOKEY(F)
6960 IF F=11 THEN IF AFF=1 THEN RETURN
6970 IF F=1 THEN C(K)=5 : RETURN
6980 IF C(3)=8 THEN IF D(3)>9999 THEN 7000
6990 IF F=2 THEN C(K)=6 : RETURN
7000 IF F=10 THEN RETURN ELSE BEEP : GOTO 6950
7010 SC!=3.84 : GOSUB 25 : GOSUB 7280 : GOSUB 7500 : LOCATE 4,5 : PRINT "Please
select compare relation"
7020 LOCATE 8,5 : PRINT "F1 ------   = (EQUAL TO)"
7030 LOCATE 10,5 : PRINT "F2 ------   < (LESS THAN)"
7040 LOCATE 12,5 : PRINT "F3 ------   > (GREATER THAN)" : GOSUB 21
7060 F=4 : CALL FLOKEY(F)
7070 IF F=12 THEN IF ABF=1 THEN RETURN
7080 IF F=11 THEN IF AFF=1 THEN RETURN
7090 IF F=1 THEN C1(K)=0 : RETURN
7100 IF F=2 THEN C1(K)=1 : RETURN
7110 IF F=3 THEN C1(K)=2 : RETURN
7120 IF F=10 THEN RETURN ELSE BEEP : GOTO 7060
7130 SC!=3.85 : GOSUB 25 : GOSUB 7280 : GOSUB 7500 : LOCATE 4,5 : PRINT "Please
select compare to"
7150 LOCATE 9,5 : PRINT "F1 ------   ANOTHER "; : IF C(1)=5 THEN PRINT "COUNTER"
 ELSE PRINT "REGISTER"
7170 LOCATE 12,5 : PRINT "F2 ------   FIXED VALUE" : GOSUB 21
7190 F=4 : CALL FLOKEY(F)
7200 IF F=12 THEN IF ABF=1 THEN RETURN
7210 IF F=11 THEN IF AFF=1 THEN RETURN
7220 IF F=1 THEN C(K)=C(1) : RETURN
7230 IF F=2 THEN C(K)=8 : RETURN
7240 IF F=10 THEN RETURN ELSE BEEP : GOTO 7190
7250 ABF=0 : AFF=0 : GOSUB 7500 : GOSUB 25 : GOSUB 7280 : LOCATE 7,5 : PRINT "F1
 ------   BLOCK IS CORRECT" : LOCATE 9,5 : PRINT "F2 ------   MODIFY "+T$
7260 LOCATE 11,5:IF T<7 THEN PRINT "F3 ------   MODIFY DESTINATION" ELSE PRINT "
F3 ------   MODIFY YES DEST":LOCATE 12,5 : PRINT "F4 ------   MODIFY NO  DEST":L
OCATE 13,5 : PRINT "F5 ------   SWAP YES/NO DEST"
7270 LOCATE 16,5 : PRINT "F7 ------   MODIFY BLOCK TYPE" : LOCATE 18,5 : PRINT "
F8 ------   DELETE THE BLOCK" : LOCATE 20,2 : PRINT "F10 ------   EXIT WITH NO M
ODIFY" : RETURN
7280 LOCATE 4,5 : PRINT SPACE$(30); : LINE (1,35)-(275,164),,B
7290 LINE (4,38)-(273,162),0,BF : RETURN
7300 LINE (278,10)-(640,200),0,BF : RETURN
7310 CLS:PRINT TAB(24);"F L O W C H A R T    E D I T O R":LOCATE 1,75:RETURN
7315 CLS : PRINT TAB(28);"FLOWCHART:  "+FLN$(SF) : RETURN
```

```
7320 LINE (121,44)-(520,188),,B : RETURN
7490 PRINT CHR$(17); : I=POS(0)*8 : J=CSRLIN*8 : LINE (I-12,J-5)-(I+8,J-5) : LIN
E -(I+8,J-8) : LOCATE J/8,I/8+3 : PRINT "  ----  ENTRY IS CORRECT" : RETURN
7500 IF ABF=1 THEN LINE (12,179)-(32,179) : LOCATE 23,2 : PRINT CHR$(17); : LINE
 (8,176)-(8,182) : LOCATE 23,6 : PRINT "  ----  BACK TO PREVIOUS FIELD"; ELSE LO
CATE 23,2 : PRINT SPACE$(35);
7510 IF AFF=1 THEN LINE (8,195)-(28,195) : LOCATE 25,4 : PRINT CHR$(16); : LINE
 (32,192)-(32,198) : LOCATE 25,6 : PRINT "  ----  ADVANCE TO NEXT FIELD"; ELSE LO
CATE 25,2 : PRINT SPACE$(35);
7520 RETURN
7530 X$=SPACE$(MAXL) : PX=0 : LX=0
7540 RX=CSRLIN : CX=POS(0) : IS=0 : F=0
7550 IF IS=0 THEN MYC$="  -  " ELSE MYC$="  --  "
7560 LOCATE RX+1,CX+PX-2 : PRINT MYC$;
7570 LOCATE EROW,ECOL : IF LX>0 THEN GOSUB 7490 ELSE PRINT SPACE$(32);
7580 LOCATE RX,CX+PX
7590 A$=INKEY$ : IF LEN(A$)=0 THEN 7590
7600 IF LEN(A$)=1 THEN 7680
7610 IF A$=CHR$(0)+CHR$(15) THEN IF ABF=1 THEN F=12 : RETURN
7615 IF A$=CHR$(0)+CHR$(67) THEN IF AGX=1 THEN F=9 : RETURN
7620 IF A$=CHR$(0)+CHR$(68) THEN F=10 : RETURN
7630 IF A$=CHR$(0)+CHR$(75) THEN IF PX>0 THEN PX=PX-1:PRINT CHR$(29);:GOTO 7560
 ELSE 7790
7640 IF A$=CHR$(0)+CHR$(77) THEN IF PX<LX THEN PX=PX+1:PRINT CHR$(28);:GOTO 7560
 ELSE 7790
7650 IF A$=CHR$(0)+CHR$(82) THEN IF IS=0 THEN IS=1 : GOTO 7550 ELSE IS=0 : GOTO
 7550
7660 IF A$=CHR$(0)+CHR$(83) THEN IF PX<LX THEN X$=LEFT$(X$,PX)+RIGHT$(X$,MAXL-PX
-1)+CHR$(32) : LX=LX-1 : GOTO 7780 ELSE 7790
7670 GOTO 7790
7680 IF A$=CHR$(8) THEN IF PX>0 THEN PRINT CHR$(29)+CHR$(32)+CHR$(29);: MID$(X$,
PX,1)=" " : PX=PX-1 : GOTO 7560 ELSE 7790
7690 IF A$=CHR$(9) THEN IF AFF=1 THEN F=11 : RETURN
7700 IF A$=CHR$(13) THEN F=0 : RETURN
7710 IF A$=CHR$(34) THEN 7790
7720 IF A$<CHR$(32) THEN 7790 ELSE IF IS=1 THEN IF LX=MAXL THEN 7790
7730 IF IS=0 THEN IF PX=MAXL THEN 7790
7740 IF A$=CHR$(46) THEN IF ETYP=1 THEN 7790 ELSE 7760
7750 IF ETYP>0 THEN IF A$<CHR$(48) OR A$>CHR$(57) THEN 7790
7760 IF IS=0 THEN PRINT A$; : PX=PX+1 : MID$(X$,PX,1)=A$ : IF PX>LX THEN LX=PX :
 GOTO 7560 ELSE 7560
7770 X$=LEFT$(X$,PX)+A$+MID$(X$,PX+1,MAXL-PX-1) : PX=PX+1 : LX=LX+1
7780 LOCATE RX,CX : PRINT LEFT$(X$,LX)+STRING$(MAXL-LX,CHR$(22)); : GOTO 7550
7790 BEEP : GOTO 7590
7800 IF EC=52 THEN EC$=D$+"  is an invalid drive designation" : RETURN
7810 IF EC=53 THEN EC$="There is no project file on drive   "+D$ : RETURN
7820 IF EC=61 THEN EC$="There is no more disk space on drive  "+D$ : RETURN
7830 IF EC=67 THEN EC$="The directory is full   OR   "+D$+" is an unavailable dri
ve" : RETURN
7840 IF EC=70 THEN EC$="The disk is write-protected in drive   "+D$ :RETURN
7850 IF EC=71 THEN EC$="There is no disk ready on drive   "+D$ : RETURN
7860 IF EC=72 THEN EC$="There was a disk media error on drive   "+D$:RETURN
7865 IF EC=-1 THEN EC$="The flowchart was not saved in GRAPHICS mode":RETURN
7870 EC$="There was a number ("+STR$(EC)+") error on drive   "+D$ : RETURN
7880 LINE (121,68)-(520,165),,B
7890 LOCATE 5,15 : PRINT EC$
7900 LOCATE 13,25 : PRINT "F1  ------  RETRY DISK IN DRIVE   "+D$
7910 LOCATE 19,25 : PRINT "F10 ------  EXIT TO SYSTEM"
7920 F=1 : CALL FLOKEY(F)
7930 IF F=1 THEN RETURN
7940 IF F=10 THEN RETURN ELSE BEEP : GOTO 7920
7950 B$=MKI$(INT(B!))+CHR$(CINT((B!-INT(B!))*100)+10)+SPACE$(32) : CALL GETBLK(B
$) : RETURN
7960 B!=CVI(MID$(B$,1,2))+(ASC(MID$(B$,3,1))-10)/100 : RETURN
7970 GOSUB 7960
7980 L=ASC(MID$(B$,4,1)) : T=ASC(MID$(B$,5,1))
7990 IF T<1 OR T>2 THEN IF L>2 THEN EN=CVI(MID$(B$,L+2,2))
8000 ON T GOTO 8020,8020,8050,8090,8150,8180,8200,8220,8220,8220
8010 RETURN
8020 IF G=0 THEN IF T=1 THEN GOSUB 8350 ELSE GOSUB 8370
8030 IF L=2 THEN C(1)=255 : D(1)=HIO : C1(1)=0 : K=1 : KK=1 : AGF=1 : IF G=0 THE
N LOCATE 14,67 : PRINT "NO CRITERIA" : RETURN ELSE RETURN
8040 KK=(L-2)/3 : FOR I=1 TO KK : GOSUB 8680 : GOSUB 8580 : NEXT I : K=1 : AGF=1
 : RETURN
8050 IF G=0 THEN GOSUB 8390 : LOCATE 4,54 : PRINT "CONTROL BLOCK"
```

```
8060 KK=(L-7)/3 : IF (G>0) OR (KK=1) THEN 8080 ELSE FOR J=2 TO KK
8070 I=J*16+36 : LINE (475,I)-(475,I+16),0 : LINE (575,I)-(575,I+16) : LINE -(37
5,I+16) : LINE -(375,I) : NEXT J
8080 FOR I=1 TO KK : GOSUB 8680 : GOSUB 8690 : NEXT I : K=1 : AGF=1 : GOTO 8260
8090 IF G=0 THEN GOSUB 8400 : LOCATE 4,55 : PRINT "MOVE  BLOCK"
8100 K=1 : I=ASC(MID$(B$,6,1)) : C(4)=I MOD 16 : C(1)=(I-C(4))/16
8110 D(1)=CVI(MID$(B$,7,2)) : J=9 : IF C(1)<>1 THEN D(3)=HIO ELSE D(3)=CVI(MID$(
B$,J,2)) : J=J+2
8115 IF C(1)=8 THEN D(2)=0
8120 I=1 : GOSUB 8880 : IF C(1)=1 THEN I=3 : C(3)=1 : GOSUB 8880 : IF G=0 THEN L
OCATE 9,74 : PRINT "THRU"
8130 D(4)=CVI(MID$(B$,J,2)) : J=J+2 : IF C(4)<>7 THEN D(6)=HIO ELSE D(6)=CVI(MID
$(B$,J,2))
8140 I=4 : GOSUB 8880 : IF C(4)=7 THEN I=6 : C(6)=7 : GOSUB 8880 : IF G=0 THEN L
OCATE 12,74 : PRINT "THRU"
8145 GOTO 8260
8150 IF G=0 THEN GOSUB 8390 : LOCATE 4,55 : PRINT "WAIT  BLOCK" : LOCATE 8,49 :
PRINT "WAIT";
8160 X!=CVI(MID$(B$,6,2))+ASC(MID$(B$,8,1))/100
8170 IF G=0 THEN LOCATE 8,55 : PRINT USING "####.## SECONDS";X!;
8175 GOTO 8260
8180 IF G=0 THEN GOSUB 8390 : LOCATE 4,55 : PRINT "EXIT  BLOCK" : LOCATE 8,49 :
PRINT "EXIT FLOWCHARTS";
8190 FE=CVI(MID$(B$,6,2)) : IF G=0 THEN LOCATE 8,68 : PRINT USING "###";FE;
8195 GOTO 8260
8200 IF G=0 THEN GOSUB 8420 : LOCATE 4,53 : PRINT "DECISION BLOCK";
8210 KK=(L-10)/3 : FOR I=1 TO KK : GOSUB 8680 : GOSUB 8580 : NEXT I : K=1 : AGF=
1 : GOTO 8270
8220 IF G=0 THEN GOSUB 8420 : LOCATE 4,53 : PRINT "COMPARE BLOCK";
8230 K=1 : I=ASC(MID$(B$,6,1)) : C(3)=I MOD 16 : C(1)=(I-C(3))/16 : C1(2)=T-8
8240 D(1)=CVI(MID$(B$,7,2)) : D(2)=0 : D(3)=CVI(MID$(B$,9,2))
8250 I=1 : GOSUB 8880 : I=2 : GOSUB 8960 : I=3 : GOSUB 8880 : GOTO 8270
8260 D!=CVI(MID$(B$,L-1,2))+(ASC(MID$(B$,L+1,1))-10)/100 : OY!=D! : OZ!=0 : IF G
=0 THEN LOCATE 24,56 : PRINT USING "####.##";D!;
8265 RETURN
8270 Y!=CVI(MID$(B$,L-4,2))+(ASC(MID$(B$,L-2,1))-10)/100 : OY!=Y!
8280 N!=CVI(MID$(B$,L-1,2))+(ASC(MID$(B$,L+1,1))-10)/100 : OZ!=N!
8285 IF G>0 THEN RETURN
8290 GOSUB 8330 : LOCATE 11,67 : PRINT "NO " : LOCATE 16,57 : PRINT "YES" : LOCA
TE 12,73 : PRINT SPACE$(7) : LOCATE 24,56 : PRINT SPACE$(7)
8300 IF Y!>0 THEN IF Y!<>B! THEN LOCATE 24,56 : PRINT USING "####.##";Y!; : ELSE
 LOCATE 11,67 : PRINT "YES"; : LOCATE 16,57 : PRINT "NO "; : GOSUB 8340
8310 IF N!=0 THEN RETURN ELSE IF N!=B! THEN GOSUB 8340 : RETURN ELSE IF Y!=B! TH
EN LOCATE 24,56 : ELSE LOCATE 12,73
8320 PRINT USING "####.##";N!; : RETURN
8330 LINE (575,92)-(575,44),0 : LINE -(477,44),0 : LINE -(485,40),0 : LINE (477,
44)-(485,48),0 : LINE (575,92)-(567,88) : LINE (575,92)-(567,96) : RETURN
8340 LINE (575,92)-(567,88),0 : LINE (575,92)-(567,96),0 : LINE (575,92)-(575,44
) : LINE -(477,44) : LINE -(485,40) : LINE (477,44)-(485,48) : RETURN
8350 GOSUB 7300 : LINE (440,52)-(510,52) : LINE -(530,62) : LINE -(530,82): LINE
 -(510,92) : LINE -(440,92) : LINE -(420,82) : LINE -(420,62) : LINE -(440,52)
8360 LOCATE 4,53 : PRINT "FREEZE CRITERIA" : LOCATE 9,56 : PRINT " H A L T " : R
ETURN
8370 GOSUB 7300 : LINE (420,52)-(530,52) : CIRCLE (530,72),48,,4.7124,1.5708 : L
INE (530,92)-(420,92) : CIRCLE (420,72),48,,1.5708,4.7124 : LINE (475,92)-(475,1
80) : LINE -(467,172) : LINE (475,180)-(483,172)
8380 LOCATE 4,53 : PRINT "ENABLE CRITERIA" : LOCATE 9,56 : PRINT "POWER  ON" : R
ETURN
8390 GOSUB 7300 : LINE (475,34)-(475,52) : LINE (375,52)-(575,52) : LINE -(575,6
8) : LINE -(375,68) : LINE -(375,52) : LINE (475,68)-(475,180) : LINE -(467,172)
 : LINE (475,180)-(483,172) : GOSUB 8440 : RETURN
8400 GOSUB 7300 : LINE (475,34)-(475,52) : LINE (375,52)-(575,52) : LINE -(575,1
08) : LINE -(375,108) : LINE -(375,52) : LINE (475,108)-(475,180) : LINE -(467,1
72) : LINE (475,180)-(483,172) : GOSUB 8440
8410 LOCATE 8,49 : PRINT "MOVE"; : LOCATE 11,49 : PRINT "TO"; : RETURN
8420 GOSUB 7300 : LINE (475,34)-(475,64) : LINE -(425,92) : LINE -(475,120) : LI
NE -(525,92) : LINE -(475,64) : LINE (475,120)-(475,180) : LINE -(467,172) : LIN
E (475,180)-(483,172)
8430 LINE (525,92)-(575,92) : LINE-(567,88) : LINE (575,92)-(567,96) : LOCATE 8,
61 : PRINT USING "####.##";B!; : LOCATE 11,67 : PRINT "NO"; : LOCATE 16,57 : PRI
NT "YES"; : RETURN
8440 LOCATE 6,61 : PRINT USING "####.##";B!; : RETURN
8450 IF C(I)=0 THEN IF D(I)<HIO THEN K$(I)=" -"
8460 IF C(I)=1 THEN K$(I)="I-"
8470 IF C(I)=2 THEN K$(I)="F-"
```

```
8480 IF C(I)=3 THEN K$(I)="T-"
8490 IF C(I)=4 THEN K$(I)="K-"
8500 IF C(I)=5 THEN K$(I)="C-"
8510 IF C(I)=6 THEN K$(I)="R-"
8520 IF C(I)=7 THEN K$(I)="O-"
8530 IF C(I)=9 THEN K$(I)="NOT I-"
8540 IF C(I)=10 THEN K$(I)="NOT F-"
8550 IF C(I)=11 THEN K$(I)="NOT T-"
8560 IF D(I)<>HIO THEN N$=STR$(D(I)):K$(I)=K$(I)+RIGHT$(N$,LEN(N$)-1)
8570 RETURN
8580 K$(I)="" : K1$(I)=SPACE$(17) : GOSUB 8450
8590 IF D(I)=HIO THEN 8660
8600 LT=C(I) MOD 8 : IF LT=4 THEN L$="FUNCTION KEY"+STR$(D(I)) : GOSUB 9020 ELSE LN=D(I) : GOSUB 9010
8610 K1$(I)="("+L$+")"
8620 IF C1(I)<192 THEN 8660
8630 IF C1(I)<208 THEN K$(I)=K$(I)+" end" : GOTO 8660
8640 IF C1(I)<224 THEN K$(I)=K$(I)+" AND" : GOTO 8660
8650 K$(I)=K$(I)+" OR"
8660 IF LEN(K$(I))=13 THEN 8670 ELSE K$(I)=K$(I)+" " : GOTO 8660
8670 IF G=0 THEN LOCATE 13+I,38 : PRINT K1$(I); : LOCATE 13+I,67 : PRINT K$(I)
8675 RETURN
8680 C1(I)=ASC(MID$(B$,3+I*3,1)) : C(I)=C1(I) MOD 16 : C1(I)=C1(I)-C(I) : D(I)=C
VI(MID$(B$,4+I*3,2)) : RETURN
8690 K1$(I)="" : K$(I)="" : GOSUB 8450
8700 IF C(I)=3 THEN 8750 ELSE IF C(I)=5 THEN 8790
8710 IF C1(I)=144 THEN K1$(I)="T.ON    "
8720 IF C1(I)=160 THEN K1$(I)="T.OFF   "
8730 IF C1(I)=176 THEN K1$(I)="P.ON    "
8740 GOTO 8820
8750 IF C1(I)=144 THEN K1$(I)="START   "
8760 IF C1(I)=160 THEN K1$(I)="STOP    "
8770 IF C1(I)=176 THEN K1$(I)="RESET   "
8780 GOTO 8820
8790 IF C1(I)=144 THEN K1$(I)="INCR    "
8800 IF C1(I)=160 THEN K1$(I)="DECR    "
8810 IF C1(I)=176 THEN K1$(I)="CLEAR   "
8820 IF D(I)=HIO THEN 8850
8830 LT=C(I) : IF LT=7 THEN LT=4
8840 LN=D(I) : GOSUB 9010 : K1$(I)=K1$(I)+L$
8850 IF LEN(K1$(I))=23 THEN 8860 ELSE K1$(I)=K1$(I)+" " : GOTO 8850
8860 IF LEN(K$(I))=5 THEN 8870 ELSE K$(I)=K$(I)+" " : GOTO 8860
8870 IF G=0 THEN LOCATE I*2+6,49 :PRINT K1$(I); :LOCATE I*2+6,74 :PRINT K$(I);
8875 RETURN
8880 K$(I)="" : K1$(I)=SPACE$(15) : GOSUB 8450
8890 IF C(I)=8 THEN K1$(I)="FIXED VALUE    " : IF D(2)<HIO THEN N$=STR$(D(I)) :
K$(I)=RIGHT$(N$,LEN(N$)-1)
8900 IF D(I)=HIO THEN 8930
8910 LT=C(I) : IF LT=7 THEN LT=4 ELSE IF LT=8 THEN 8930
8920 LN=D(I) : GOSUB 9010 : K1$(I)=L$
8930 IF T>7 THEN K1$(I)="("+K1$(I)+")"
8940 IF LEN(K$(I))=5 THEN 8950 ELSE K$(I)=K$(I)+" " : GOTO 8940
8950 IF T>7 THEN 8670 ELSE IF G=0 THEN LOCATE 7+I,56 :PRINT K1$(I); :LOCATE 7+I,
74 : PRINT K$(I);
8955 RETURN
8960 K$(I)="" : K1$(I)=SPACE$(17)
8970 IF C1(I)=0 THEN K$(I)="=" : K1$(I)="(EQUAL TO       )"
8980 IF C1(I)=1 THEN K$(I)="<" : K1$(I)="(LESS THAN      )"
8990 IF C1(I)=2 THEN K$(I)=">" : K1$(I)="(GREATER THAN   )"
9000 IF G=0 THEN LOCATE 15,38 : PRINT K1$(I); : LOCATE 15,68 :.PRINT K$(I)
9005 RETURN
9010 L$=MKI$(LT)+MKI$(LN)+SPACE$(16) : CALL GETLBL(L$) : L$=MID$(L$,6,ASC(MID$(L
$,5,1)))
9020 IF LEN(L$)=15 THEN RETURN ELSE L$=L$+" " : GOTO 9020
9200 GET (368,24)-(583,183),BO! : LINE (368,24)-(583,183),1,BF : LINE (384,31)-(
567,175),0,BF : DL=1 : LB=0
9210 LOCATE 5,56 : PRINT C$+"S" : LOCATE 23,2 : PRINT SPACE$(35); : LOCATE 25,2
: PRINT SPACE$(35);
9212 FOR I=LB TO LB+15 : J=(I MOD 16) : LOCATE J+7,49 : LL$=RIGHT$("   "+STR$(I)
,4)+SPACE$(19)
9214 L$=MKI$(LT)+MKI$(I)+SPACE$(16) : CALL GETLBL(L$) : L$=MID$(L$,6,ASC(MID$(L$
,5,1)))
9216 MID$(LL$,8,LEN(L$))=L$ : PRINT LL$ : NEXT I : GOSUB 7280
9220 IF LB<496 THEN LOCATE 8,2 : PRINT "F1  ------  PAGE FOWARD"
9230 IF LB>0 THEN LOCATE 11,2 : PRINT "F2  ------  PAGE BACKWARD"
```

```
9240 LOCATE 14,2 : PRINT "F3 ------ ENTER "+C$ : LOCATE 15,17 : PRINT "LABEL C
R NUMBER" : GOSUB 21
9250 F=3 : CALL FLOKEY(F)
9260 IF F=1 THEN IF LB<496 THEN LB=LB+16 : GOTO 9212
9270 IF F=2 THEN IF LB>0 THEN LB=LB-16 : GOTO 9212
9290 IF F=3 OR F=10 THEN RETURN ELSE BEEP : GOTO 9250
9990 GRFRTN=0
10000 IF T>0 THEN IF T<3 THEN B!=T/1000
10010 CALL FLOEGA(B,B!) : GOSUB 7315 : IF B>0 THEN FMF=1
10020 IF B!<=0 THEN 10050 ELSE IF B!<.01 THEN EF=B!*1000 : IF CMF=1 THEN IF EF=1
 THEN 2080 ELSE 2090 ELSE B$=MKI$(0)+CHR$(EF)+SPACE$(32) : CALL GETBLK(B$) : GOS
UB 7970 : GOTO 10050
10030 IF CMF=1 THEN 2180 ELSE GOSUB 7950 : GOSUB 7970
10050 ON GRFRTN GOTO 690,700,710,740
10060 GOTO 2110
12200 SC!=3.03 : GOSUB 25 : AFF=0 : ABF=0 : GOSUB 7500 : GOSUB 7280 : LOCATE 7,8
 : PRINT "FLOWCHART  "+FE$
12220 LOCATE 9,5 : PRINT "F1 ------ PRINT "; : IF SPF=0 THEN PRINT "ALL" ELSE
 PRINT "SELECTED"
12230 LOCATE 10,20 : PRINT "FLOWCHARTS"
12240 LOCATE 13,5 : PRINT "F2 ------ SELECT FLOWCHARTS" : LOCATE 14,20 : PRINT
 "TO PRINT"
12250 GOSUB 22 : IF NF>25 THEN LOCATE 17,5 : PRINT "F3 ------ PAGE DIRECTORY"
12270 F=1 : CALL FLOKEY(F)
12290 IF F=1 THEN IF SPF>0 THEN RETURN ELSE SPF=NF : FOR I=1 TO NF : SLN(I)=1 :
NEXT I : RETURN
12300 IF F=2 THEN 12420
12310 IF F=3 THEN IF NF>25 THEN GOSUB 7300 : GOSUB 560 : GOTO 12270
12320 IF F=10 THEN RETURN ELSE BEEP : GOTO 12270
12400 GET (IX,IY)-(IX+152,IY+7),IV
12410 PUT (IX,IY),IV,PRESET : RETURN
12420 LOCATE 1,75 : PRINT "(3.04)" : SX=1
12430 GOSUB 7280 : GOSUB 598
12440 LOCATE 8,5 : PRINT "F1 ------ INCLUDE IN PRINT"
12450 LOCATE 11,5 : PRINT "F2 ------ EXCLUDE FROM PRINT"
12460 IF NF>25 THEN LOCATE 15,5 : PRINT "F3 ------ PAGE DIRECTORY"
12470 LOCATE 20,5 : PRINT "F10 ------ EXIT SELECTION"
12480 IZ=FS+SX-1 :IY=INT((SX+1)/2)*8+56 :IF (SX MOD 2)=0 THEN IX=479 ELSE IX=311
12490 IF SX=1 THEN ABF=0 ELSE ABF=1
12500 IF SX+FS>NF OR SX=25 THEN AFF=0 ELSE AFF=1
12510 GOSUB 7500
12520 GOSUB 12400 : F=4 : CALL FLOKEY(F)
12530 PUT (IX,IY),IV,PSET
12540 IF F=12 THEN IF ABF=1 THEN SX=SX-1 : GOTO 12480
12550 IF F=11 THEN IF AFF=1 THEN SX=SX+1 : GOTO 12480
12560 IF F=1 THEN IF SLN(IZ)=1 THEN 12620 ELSE SLN(IZ)=1 : SPF=SPF+1 : GOTO 1260
0
12570 IF F=2 THEN IF SLN(IZ)=0 THEN 12620 ELSE SLN(IZ)=0 : SPF=SPF-1 : GOTO 1260
0
12580 IF F=3 THEN IF NF>25 THEN GOSUB 7300 : GOSUB 560 : SX=1 : GOTO 12430
12590 IF F=10 THEN 12200 : ELSE BEEP : GOTO 12520
12600 IF IZ>25 THEN II=IZ-25 ELSE II=IZ
12610 J=INT((II+1)/2) : K=II-(J-1)*2 : LOCATE J+8,K*21+21 : IF SLN(IZ)>0 THEN PR
INT CHR$(17)+CHR$(16) ELSE PRINT " "
12620 SX=SX MOD 25 : SX=SX+1 : IF SX+FS-1>NF THEN 12200 ELSE 12480
```

COMPILER

```
10 B$=MKI$(0) : CALL CHKMEM(B$) : IF CVI(B$)>0 THEN PRINT "INSUFFICIENT MEMORY F
OR EXECUTION" : GOTO 6330
20 DEFINT A-Z : SCREEN 2 : CLS : HIO=512
30 DEF SEG=79 : A0=PEEK(0) : A1=PEEK(1) : B1=PEEK(2) : C1=PEEK(3) : D1=PEEK(4) :
 DEF SEG
40 IF A0<>17 THEN 6320 ELSE IF CHR$(A1)+CHR$(B1)+CHR$(C1)<>"UAI" THEN 6320
60 DIM FLN$(50),FLN(50),SLN(50),BL!(50),BH!(50),C(7),C1(7),D(7),IV(95),STRT(50),
FEND(50),BX!(2000),BA(2000),USEF(511),USET(511),USEO(511),TMR!(1,511),OBJ$(50)
65 DIM CFG(1,31),RFR(1,31) : NOAB$=CHR$(22)+CHR$(32)+CHR$(22)+CHR$(22)
75 D$=CHR$(D1) : PFN$=D$+":PROJHDR.UAI"
80 FOR I=1 TO 50 : FLN$(I)="" : FLN(I)=0 :SLN(I)=0: NEXT I : ON ERROR GOTO 140
90 OPEN "I",#1,PFN$
100 INPUT #1,PN$,PN,PD$,PT$,NF
110 IF NF=0 THEN 130
120 FOR I=1 TO NF : INPUT #1,FLN$(I),FLN(I) : NEXT I
130 CLOSE #1 : ON ERROR GOTO 0 : SF=0 : GOTO 180
140 EC=ERR : RESUME 150
```

```
150 ON ERROR GOTO 0 : GOSUB 5540
160 GOSUB 5000 : PRINT "(0.60)" : GOSUB 5620 : IF F=10 THEN 6320 ELSE CLOSE #1 :
 CLS : GOTO 80
163 LOCATE 20,2 : PRINT "F10 ------ EXIT TO MASTER MENU" : RETURN
166 LOCATE 20,2 : PRINT "F10 ------ EXIT TO PREVIOUS MENU" : RETURN
180 CLS : PRINT TAB(25);"P R O J E C T     C O M P I L E" : FS=1 : GOSUB 380
190 GOSUB 4960 : AFF=0 : ABF=0
200 LOCATE 1,75 : IF NF>0 THEN PRINT "(4.00)" : GOTO 240 ELSE PRINT "(4.04)"
220 LOCATE 7,5 : PRINT "The flowchart directory on" : LOCATE 9,5 : PRINT "this d
isk is empty !" : LOCATE 12,7 : PRINT "NO COMPILE CAN OCCUR" : GOTO 300
240 LOCATE 7,5 :  PRINT "F1 ------ COMPILE "; : IF SF=0 THEN PRINT "ALL" ELSE
 PRINT "SELECTED" : LOCATE 1,79 : PRINT "1"
260 LOCATE 8,20 : PRINT "FLOWCHARTS"
270 LOCATE 11,5 : PRINT "F2 ------ SELECT FLOWCHARTS" : LOCATE 12,20 : PRINT "
TO COMPILE"
290 IF NF>25 THEN LOCATE 15,5 : PRINT "F3 ------ PAGE DIRECTORY"
300 GOSUB 163
310 GOSUB 5020
320 IF NF=0 THEN 360
330 IF F=1 THEN 680
340 IF F=2 THEN 460
350 IF F=3 THEN IF NF>25 THEN GOSUB 4990 : GOSUB 370 : GOTO 310
360 IF F=10 THEN 6150 ELSE BEEP : GOTO 310
370 IF FS=1 THEN FS=26 ELSE FS=1
380 LOCATE 7,50 : PRINT "FLOWCHART  DIRECTORY" : IF SF>0 THEN GOSUB 430
390 FOR I=FS TO FS+24 : IF I>25 THEN II=I-25 ELSE II=I
400 J=INT((II+1)/2) : K=II-(J-1)*2 : LOCATE J+8,K*21+19 : PRINT USING "## ";I;
 : PRINT FLN$(I);
410 IF SLN(I)>0 THEN LOCATE J+8,K*21+21 : PRINT CHR$(17)+CHR$(16)
420 NEXT I : RETURN
430 LOCATE 4,45:PRINT CHR$(17)+CHR$(16)+"  DENOTES SELECTED FLOWCHART":RETURN
440 GET (IX,IY)-(IX+152,IY+7),IV
450 PUT (IX,IY),IV,PRESET : RETURN
460 LOCATE 1,75 : PRINT "(4.02)" : SX=1
470 GOSUB 4960 : GOSUB 430
480 LOCATE 8,2 : PRINT "F1 ------ INCLUDE IN COMPILE"
490 LOCATE 11,2 : PRINT "F2 ------ EXCLUDE FROM COMPILE"
510 IF NF>25 THEN LOCATE 15,5 : PRINT "F3 ------ PAGE DIRECTORY"
520 LOCATE 20,5 : PRINT "F10 ------ EXIT SELECTION"
530 IZ=FS+SX-1 :IY=INT((SX+1)/2)*8+56 :IF (SX MOD 2)=0 THEN IX=479 ELSE IX=311
540 IF SX=1 THEN ABF=0 ELSE ABF=1
550 IF SX+FS>NF OR SX=25 THEN AFF=0 ELSE AFF=1
560 GOSUB 5190
570 GOSUB 440 : GOSUB 5050
580 PUT (IX,IY),IV,PSET
590 IF F=12 THEN IF ABF=1 THEN SX=SX-1 : GOTO 530
600 IF F=11 THEN IF AFF=1 THEN SX=SX+1 : GOTO 530
610 IF F=1 THEN IF SLN(IZ)=1 THEN 670 ELSE SLN(IZ)=1 : SF=SF+1 : GOTO 650
620 IF F=2 THEN IF SLN(IZ)=0 THEN 670 ELSE SLN(IZ)=0 : SF=SF-1 : GOTO 650
630 IF F=3 THEN IF NF>25 THEN GOSUB 4990 : GOSUB 370 : SX=1 : GOTO 530
640 IF F=10 THEN 180 : ELSE BEEP : GOTO 570
650 IF IZ>25 THEN II=IZ-25 ELSE II=IZ
660 J=INT((II+1)/2) : K=II-(J-1)*2 : LOCATE J+8,K*21+21 : IF SLN(IZ)>0 THEN PRIN
T CHR$(17)+CHR$(16) ELSE PRINT " "
670 SX=SX MOD 25 : SX=SX+1 : IF SX+FS-1>NF THEN 180 ELSE 530
680 LOCATE 1,75 : PRINT "(4.05)"; : GOSUB 4960 : LOCATE 4,5 : PRINT "Please sele
ct OUTPUT ENABLE"
690 LOCATE 7,5 : PRINT "F1 ------ I (INPUT)"
700 LOCATE 9,5 : PRINT "F2 ------ F (FLAG)"
710 LOCATE 11,5 : PRINT "F3 ------ NOT I"
720 LOCATE 13,5 : PRINT "F4 ------ NOT F"
730 LOCATE 16,2 : PRINT "F5 ------ OUTPUTS ALWAYS ENABLED" : GOSUB 166
750 GOSUB 5020
760 IF F=1 THEN C(1)=1 : GOTO 820
770 IF F=2 THEN C(1)=2 : GOTO 820
780 IF F=3 THEN C(1)=9 : GOTO 820
790 IF F=4 THEN C(1)=10 : GOTO 820
800 IF F=5 THEN C(1)=0 : D(1)=0 : OEL$="" : GOTO 960
810 IF F=10 THEN 180 ELSE BEEP : GOTO 750
820 IF C(1)=1 OR C(1)=9 THEN C$="INPUT" ELSE C$="FLAG"
830 LOCATE 1,75 : PRINT "(4.06)" : GOSUB 4960 : LOCATE 9,2 : PRINT "Please enter
 "+C$+" number:"
840 LOCATE 11,15 : PRINT STRING$(3,CHR$(22))
850 EROW=17 : ECOL=2 : GOSUB 166 : LOCATE 11,15
870 MAXL=3 : ETYP=1 : GOSUB 5220
```

```
875 IF F=10 THEN 680 ELSE IF F=1 THEN GOSUB 5530 : GOTO 875
880 IF X$=SPACE$(3) THEN BEEP : GOTO 870
890 D(1)=VAL(X$) : IF D(1)=>0 THEN IF D(1)<HIO THEN 951
900 LOCATE 1,79 : PRINT "7"; : LOCATE 14,2 : PRINT "INVALID "+C$+" NUMBER"
910 LOCATE 17,2 : PRINT "F1 ------ ENTER ANOTHER NUMBER" : GOSUB 166
930 BEEP : GOSUB 5040 :IF F=1 THEN 830 ELSE IF F=10 THEN 680 ELSE 930
951 OEL$="":MN$=(C(1) MOD 8):LFN$=D$+":PR_LBL.UAI" : ON ERROR GOTO 957
952 OPEN "I",#1,LFN$ : CLOSE #1 : OPEN "R",#1,LFN$,20 : FIELD #1,2 AS MN$,2 AS N
M$,1 AS LN$,15 AS LB$
953 GET #1 : IF CVI(MN$)<MN THEN 953 ELSE IF CVI(MN$)>MN THEN 956
954 IF CVI(NM$)<D(1) THEN 953 ELSE IF CVI(NM$)>D(1) THEN 956
955 OEL$="  ("+LEFT$(LB$,ASC(LN$))+")"
956 CLOSE #1 : GOTO 958
957 RESUME 958
958 ON ERROR GOTO 0
960 LOCATE 1,75 : PRINT "(4.08)" : GOSUB 4960
970 K$="" : IF C(1)=0 THEN K$="NONE" : GOTO 1030
980 IF C(1)=1 THEN K$="I-" : GOTO 1020
990 IF C(1)=2 THEN K$="F-" : GOTO 1020
1000 IF C(1)=9 THEN K$="NOT I-" : GOTO 1020
1010 IF C(1)=10 THEN K$="NOT F-"
1020 K$=K$+RIGHT$(STR$(D(1)),LEN(STR$(D(1)))-1)
1030 LOCATE 8,5 : PRINT "OUTPUT ENABLE CRITERIA IS:"
1040 LOCATE 10,5 : PRINT K$+OEL$
1050 LOCATE 16,2 : PRINT "F1 ------ CRITERIA IS CORRECT"
1060 LOCATE 20,2 : PRINT "F10 ------ RE-ENTER CRITERIA"
1070 GOSUB 5020
1080 IF F=1 THEN 1100
1090 IF F=10 THEN 680 ELSE BEEP : GOTO 1070
1100 CLS :CMF=0 :FOR J=0 TO 1 :FOR I=0 TO 31 :CFG(J,I)=0:NEXT I :NEXT J
1105 CFN$=D$+":PROJCFG.UAI" : ON ERROR GOTO 1150
1110 OPEN "I",#1,CFN$ : CLOSE #1 : OPEN "R",#1,CFN$,128
1120 FIELD #1,128 AS CF$
1130 GET #1 : CLOSE #1 : ON ERROR GOTO 0
1140 FOR J=0 TO 1 : FOR I=0 TO 31 : K=J*64+I*2+1 : CFG(J,I)=CVI(MID$(CF$,K,2))+2
57 : NEXT I : NEXT J : GOTO 1200
1150 EC=ERR : RESUME 1160
1160 ON ERROR GOTO 0 : IF EC=53 THEN 1200
1170 GOSUB 5540 : GOSUB 5000 : PRINT "(0.90)" : GOSUB 5620 : IF F=10 THEN 6320 E
LSE CLOSE #1 : GOTO 1100
1200 IO$="INPUT" : IO=0 : IOS=0 : MN$="inputs" : SC$="(4.10)" : GOSUB 1900
1210 IOX=0 :GOSUB 1800 :IF F=10 THEN GOSUB 5000 :FS=1 :GOSUB 380 :GOTO 960
1215 IF F=1 THEN 1400 ELSE IF F=2 THEN IOS=IOS+16 ELSE IF F=3 THEN IOS=IOS-16
1220 GOSUB 1930 : GOTO 1210
1400 IO$="OUTPUT" : IO=1 : IOS=0 : MN$="outputs" : SC$="(4.11)" : GOSUB 1900
1410 IOX=0 : GOSUB 1800 : IF F=10 THEN 1200
1415 IF F=1 THEN 1500 ELSE IF F=2 THEN IOS=IOS+16 ELSE IF F=3 THEN IOS=IOS-16
1420 GOSUB 1930 : GOTO 1410
1500 GOSUB 5000 : IO=0 : I=0 : JO=0 : J=1
1510 IF CFG(IO,I)=0 THEN 1550 ELSE IF CFG(IO,I)=CFG(JO,J) THEN 1600
1520 J=J+1 : IF J>31 THEN J=0 : JO=JO+1 : IF JO>1 THEN 1550
1530 GOTO 1510
1550 I=I+1 : IF I>31 THEN I=0 : IO=IO+1 : IF IO>1 THEN 1650
1560 JO=IO : J=I+1 : IF J>31 THEN J=0 : JO=JO+1 : IF JO>1 THEN 1650
1570 GOTO 1510
1600 LOCATE 1,75 : PRINT "(4.13)" : ABF=0 : AFF=0 : GOSUB 5190 : GOSUB 4960 : LO
CATE 8,10 : PRINT "DUPLICATE ADDRESSES" : LOCATE 11,10 : IF IO=0 THEN PRINT "INP
UTS  "; ELSE PRINT "OUTPUTS ";
1610 K=I*16 : IX=K : GOSUB 1990 : PRINT IX$+"-"; : IX=K+15 :GOSUB 1990 :PRINT IX
$ : LOCATE 13,10 : IF JO=0 THEN PRINT "INPUTS  "; ELSE PRINT "OUTPUTS ";
1620 K=J*16 : IX=K : GOSUB 1990 : PRINT IX$+"-"; : IX=K+15 :GOSUB 1990 :PRINT IX
$ : LOCATE 16,2 : PRINT "F1 ------ RE-ENTER ADDRESSES" : GOSUB 163
1630 GOSUB 5020 :IF F=1 THEN 1200 ELSE IF F=10 THEN 6150 ELSE BEEP :GOTO 1630
1650 C$="" :FOR J=0 TO 1 :FOR I=0 TO 31 :C$=C$+MKI$(CFG(J,I)-257) :NEXT I :NEXT
J
1652 IF CMF=0 THEN 1700
1654 ON ERROR GOTO 1680
1656 OPEN "R",#1,CFN$,128 : FIELD #1,128 AS CF$
1658 LSET CF$=C$ : PUT #1 : CLOSE #1 : ON ERROR GOTO 0 : GOTO 1700
1680 EC=ERR : RESUME 1685
1685 ON ERROR GOTO 0 : GOSUB 5540 : GOSUB 5000 : PRINT "(0.91)" : GOSUB 5620 : I
F F=10 THEN 6320 ELSE CLOSE #1 : CLS : GOTO 1654
1700 GOSUB 5000 : GOTO 2000
1800 IF IOX=0 THEN ABF=0 ELSE ABF=1
1810 IF IOX=15 THEN AFF=0 ELSE AFF=1
1820 GOSUB 5190
```

```
1830 EROW=0 :J=INT(IOX/2) :K=IOX-J*2 :LOCATE J*2+7,K*20+52 :PX=0 :IF CFG(IO,IOS+
IOX)=0 THEN LX=0 : X$=SPACE$(4) ELSE LX=4 :I=IOS+IOX :GOSUB 1970 :X$=IX$
1840 MAXL=4 : ETYP=4 : GOSUB 5230 : LOCATE RX+1,CX+PX-2 : PRINT SPACE$(4)
1850 IF X$=SPACE$(4) OR LX<4 THEN X=0 ELSE GOSUB 1895
1852 IF X<>CFG(IO,IOS+IOX) THEN CFG(IO,IOS+IOX)=X : CMF=1
1855 I=IOS+IOX : GOSUB 1950
1865 IF F=12 THEN IF ABF=1 THEN IOX=IOX-1 : GOTO 1800
1868 IF F=11 THEN IF AFF=1 THEN IOX=IOX+1 : GOTO 1800
1870 IF F=0 THEN IOX=IOX+1 : IOX=IOX MOD 16 : GOTO 1800
1880 IF F=1 THEN RETURN
1881 IF F=2 THEN RETURN
1882 IF F=3 THEN RETURN
1883 IF F=4 THEN 1800
1885 IF F=10 THEN RETURN ELSE BEEP : GOTO 1830
1895 X=(ASC(MID$(X$,1,1))-48)*256+(ASC(MID$(X$,3,1))-48)*10+ASC(MID$(X$,4,1))-48
 : RETURN
1900 GOSUB 5000 :PRINT SC$ :GOSUB 4960 :LOCATE 3,30 :PRINT IO$+" CONFIGURATION"
 :LOCATE 5,41 :PRINT IO$+"S RACK SLOT" :LOCATE 5,61 :PRINT IO$+"S RACK SLOT"
1920 LOCATE 7,5 : PRINT "Please enter the I/O address" : LOCATE 8,2 : PRINT "ass
ociated with each range of" : LOCATE 9,2 : PRINT MN$+" used in this project in"
 : LOCATE 10,2 : PRINT "the Gould format:"
1925 LOCATE 12,10 : PRINT "RACK #    SLOT #"
1930 LOCATE 15,2 :PRINT "F1 ------ ALL "+IO$+"S CORRECT"
1935 LOCATE 17,2 : IF IOS=0 THEN PRINT "F2 ------ PAGE FOWARD" ELSE PRINT SPAC
E$(25)
1940 LOCATE 18,2 : IF IOS>0 THEN PRINT "F3 ------ PAGE BACKWARD" ELSE PRINT SP
ACE$(25)
1945 GOSUB 166 : FOR I=IOS TO IOS+15 : GOSUB 1950 : NEXT I : RETURN
1950 J=INT(I/2) : K=I-J*2 : J=J MOD 8 : LOCATE J*2+7,K*20+41 : K=I*16 : IX=K : G
OSUB 1990 : PRINT IX$+"-"; : IX=K+15 : GOSUB 1990 : PRINT IX$+"   "; : IF CFG(I
O,I)=0 THEN PRINT NOAB$; ELSE GOSUB 1970 : PRINT IX$;
1960 RETURN
1970 IR=INT(CFG(IO,I)/256) : IX=CFG(IO,I)-IR*256 : GOSUB 1990 : IX$=RIGHT$(STR$(
IR),1)+" "+RIGHT$(IX$,2) : RETURN
1990 IX$=RIGHT$(STR$(IX),LEN(STR$(IX))-1)
1995 IX$=RIGHT$("000"+IX$,3) : RETURN
2000 GOSUB 5910 : IF F=10 THEN 6150
2010 FOR I=0 TO 511 : USEF(I)=0 : USET(I)=0 : USEO(I)=0 : NEXT I : FOR I=0 TO 31
 : RFR(0,I)=0 : RFR(1,I)=0 : NEXT I : MAXI=0 : MAXO=0 : MAXF=0 : MAXT=0
2020 GOSUB 3260 : IF F=10 THEN 6320
2030 OEC=C(1)+192 : OEN=D(1) : OBJA=0 : KK=1 : GOSUB 2850
2040 CLS : SC$="(4.30)" : GOSUB 3000 : ELN=2 : IF SF=0 THEN FOR I=1 TO NF : SLN(
I)=1 : SF=SF+1 : NEXT I
2050 B$=MKI$(0)+CHR$(0) : CALL PUTBLK(B$)
2060 FOR FE=1 TO NF : IF (SLN(FE)=1) AND (FOK=0) THEN GOSUB 3100 : IF F=10 THEN
 6320 ELSE IF BH!(FE)=0 THEN EM$="4.31  W  Flowchart: "+FLN$(FE)+" has no executa
ble blocks" : GOSUB 3030 : SLN(FE)=0 : SF=SF-1
2070 NEXT FE : GOSUB 3000 : EM$="" : IF PRNT=0 THEN GOSUB 6040
2080 IF FOK=1 THEN EM$="4.38  E  Attempt to compile more than maximum blocks" :
GOSUB 3030 : GOTO 2210
2090 IF FOK=2 THEN EM$="4.37  E  Out of memory space for block storage" : GOSUB
 3030 : GOTO 2210
2100 IF SF=0 THEN EM$="4.32  E  No executable blocks in selected flowcharts" : G
OSUB 3030 : GOTO 2210
2110 FOR I=1 TO SF : NBL!=10000
2120 FOR J=I TO NF : IF SLN(J)>0 THEN IF BL!(J)<NBL! THEN NBL!=BL!(J) : K=J
2130 NEXT J : IF K=I THEN 2170
2140 A$=FLN$(I) : FLN$(I)=FLN$(K) : FLN$(K)=A$
2150 A=FLN(I) : FLN(I)=FLN(K) : FLN(K)=A : A=SLN(I) : SLN(I)=SLN(K) : SLN(K)=A
2160 A!=BL!(I) : BL!(I)=BL!(K) : BL!(K)=A! : A!=BH!(I) : BH!(I)=BH!(K):BH!(K)=A!
2170 NEXT I : K1=0 : K2=0 : FOR I=2 TO SF : J=I-1
2180 IF BL!(I)<=BH!(J) THEN K1=I : K2=J
2190 NEXT I : IF K1=0 THEN 2230
2200 EM$="4.33  E  Flowcharts: "+FLN$(K1)+" & "+FLN$(K2)+" overlap block numbers
" : GOSUB 3030
2210 EM$="" : GOSUB 3030 : EM$="COMPILE TERMINATED - PRESS ANY KEY TO CONTINUE .
.." : GOSUB 3030
2220 A$=INKEY$ : IF LEN(A$)=0 THEN 2220 ELSE 80
2230 EM$="" : GOSUB 3030 : CF=1 : M=0 : E=0 : BS=0 : W=0
2240 P$="1" : SC$="(4.40)" : GOSUB 2970
2250 OBJA=OBJA+2
2260 B$=MKI$(FLN(CF))+CHR$(2)+SPACE$(32) : CALL GETBLK(B$) : GOSUB 5690
2270 IF T<>2 THEN SEC=2 : GOTO 2820 ELSE LOCATE 1,60 : PRINT "ENABLE "
2280 IF C(1)=255 THEN OBJA=OBJA+3 ELSE GOSUB 2850
2290 B$=MKI$(FLN(CF))+CHR$(1)+SPACE$(32) : CALL GETBLK(B$) : GOSUB 5690
2300 IF T<>1 THEN SEC=1 : GOTO 2820 ELSE LOCATE 1,60 : PRINT "FREEZE "
```

```
2310 IF C(1)=255 THEN OBJA=OBJA+3 ELSE GOSUB 2850
2320 B$=MKI$(INT(BL!(CF)))+CHR$(CINT((BL!(CF)-INT(BL!(CF)))*100)+10)+SPACE$(32)
 : CALL GETBLK(B$) : GOSUB 5690
2330 IF L=0 THEN SEC=3 : GOTO 2820
2340 STRT(CF)=OBJA : GOTO 2380
2350 IF B!=BH!(CF) THEN FEND(CF)=OBJA : OBJA=OBJA+2 : CF=CF+1 : IF CF>SF THEN 33
50 ELSE 2240
2360 B$=MKI$(0)+CHR$(0)+SPACE$(32) : CALL GETBLK(B$) : GOSUB 5690
2370 IF L=0 THEN SEC=4 : GOTO 2820 ELSE IF T=1 OR T=2 THEN 2360
2380 LOCATE 1,60 : PRINT USING "####.##";B!
2390 IF B!=BL!(CF) OR EN>0 THEN 2410
2400 GOSUB 6110 : EM$="4.42  E  Block "+BP$+" has no entries" :E=E+1:GOSUB 3070
2410 BS=BS+1 : BX!(BS)=B! : BA(BS)=OBJA
2420 ON T GOTO 2430,2430,2450,2610,2740,2760,2780,2800,2800,2800
2430 GOSUB 6110 : EM$="4.41  E  Block "+BP$+" is undefined" :E=E+1:GOSUB 3070
2440 GOTO 2350
2450 REM control
2460 OBJA=OBJA+5+KK*3
2470 FOR K=1 TO KK
2480 I=INT((C1(K)-128)/16)
2490 IF C(K)=7 THEN 2530
2500 IF C(K)=2 THEN 2560
2510 IF C(K)=3 THEN 2580
2520 NEXT K : GOTO 2350
2530 IF D(K)>MAXO THEN MAXO=D(K)
2535 RFX=INT(D(K)/16) : RFR(1,RFX)=RFR(1,RFX) OR 1
2540 IF I=3 THEN J=2 ELSE J=1
2550 USEO(D(K))=USEO(D(K)) OR J : GOTO 2520
2560 IF D(K)>MAXF THEN MAXF=D(K)
2570 USEF(D(K))=USEF(D(K)) OR 1 : GOTO 2520
2580 IF D(K)>MAXT THEN MAXT=D(K)
2590 IF I=3 THEN J=4 ELSE IF I=2 THEN J=2 ELSE J=1
2600 USET(D(K))=USET(D(K)) OR J : GOTO 2520
2610 REM move
2620 OBJA=OBJA+11
2630 IF C(1)<>1 THEN 2670
2640 OBJA=OBJA+2
2645 IF D(1)>D(3) THEN I=D(3) : J=D(1) ELSE I=D(1) : J=D(3)
2650 IF J>MAXI THEN MAXI=J
2660 FOR K=I TO J
2665 RFX=INT(K/16) : RFR(0,RFX)=RFR(0,RFX) OR 1 : NEXT K
2670 IF C(4)<>7 THEN 2350
2680 OBJA=OBJA+2
2690 IF D(4)>D(6) THEN I=D(6) : J=D(4) ELSE I=D(4) : J=D(6)
2700 IF J>MAXO THEN MAXO=J
2710 FOR K=I TO J
2720 USEO(K)=USEO(K) OR 4
2725 RFX=INT(K/16) : RFR(1,RFX)=RFR(1,RFX) OR 1
2730 NEXT K : GOTO 2350
2740 REM wait
2750 W=W+1 : OBJA=OBJA+8 : GOTO 2350
2760 REM exit
2770 OBJA=OBJA+8 : GOTO 2350
2780 REM decision
2790 GOSUB 2850 : OBJA=OBJA+7 : GOTO 2350
2800 REM compare
2810 OBJA=OBJA+13 : GOTO 2350
2820 REM fatal error
2830 EM$="4.99  *  UNRECOVERABLE INTERNAL ERROR "+STR$(SEC)
2840 GOSUB 3030 : GOTO 2210
2850 OBJA=OBJA+KK*3
2860 FOR K=1 TO KK : C(K)=C(K) MOD 8
2870 IF C(K)=1 THEN 2910
2880 IF C(K)=2 THEN 2930
2890 IF C(K)=3 THEN 2950
2900 NEXT K : RETURN
2910 IF D(K)>MAXI THEN MAXI=D(K)
2915 RFX=INT(D(K)/16) : RFR(0,RFX)=RFR(0,RFX) OR 1
2920 GOTO 2900
2930 IF D(K)>MAXF THEN MAXF=D(K)
2940 USEF(D(K))=USEF(D(K)) OR 2 : GOTO 2900
2950 IF D(K)>MAXT THEN MAXT=D(K)
2960 USET(D(K))=USET(D(K)) OR 8 : GOTO 2900
2970 LOCATE 1,1 : PRINT "     PASS #"+P$+"     Flowchart: "+FLN$(CF)+"     B
lock:          "+SC$; : PRINT SPACE$(80); : RETURN
```

```
2980 EM$=" "+FLN$(FE) : IF PRNT=0 THEN GOSUB 6040
2990 LOCATE 1,1 : PRINT "        LOADING       Flowchart: "+FLN$(FE)+SPACE$(30)+SC$;
     : PRINT SPACE$(80); : RETURN
3000 LOCATE 1,1 : PRINT SPACE$(74)+SC$; : PRINT SPACE$(80); : RETURN
3010 I$=RIGHT$("000"+RIGHT$(STR$(I),LEN(STR$(I))-1),3) : RETURN
3020 IF PRNT=0 THEN GOSUB 6040 : RETURN ELSE 3040
3030 IF PRNT=0 THEN GOSUB 6040
3040 ELN=ELN+1 : IF ELN>24 THEN ELN=24
3050 LOCATE ELN,1 : PRINT EM$ : IF ELN=24 THEN GOTO 3000 ELSE RETURN
3060 IF PRNT=0 THEN GOSUB 6040 : RETURN ELSE 3080
3070 IF PRNT=0 THEN GOSUB 6040
3080 ELN=ELN+1 : IF ELN>24 THEN ELN=24
3090 LOCATE ELN,1 : PRINT EM$ : IF ELN=24 THEN GOTO 2970 ELSE RETURN
3100 BL!(FE)=10000 : BH!(FE)=0 : GOSUB 2980
3110 N$=RIGHT$(STR$(FLN(FE)+1000),3) : SFN$=D$+":FLOW"+N$+".UAI"
3120 ON ERROR GOTO 3240
3130 OPEN "I",#1,SFN$
3140 CLOSE #1
3150 OPEN "R",#1,SFN$,40
3160 FIELD #1,40 AS DB$
3170 GET #1 : B!=CVI(LEFT$(DB$,2)) : IF B!=>10000 THEN 3230
3180 B1!=ASC(MID$(DB$,3,1)) : IF B1!=>10 THEN 3200
3190 MID$(DB$,1,2)=MKI$(FLN(FE)) : GOTO 3220
3200 B!=B!+(B1!-10)/100 : IF B!<BL!(FE) THEN BL!(FE)=B!
3210 IF B!>BH!(FE) THEN BH!(FE)=B!
3220 CALL PUTBLK(DB$) : FOK=CVI(DB$) : IF FOK=0 THEN 3170
3230 CLOSE #1 : ON ERROR GOTO 0 : F=0 : RETURN
3240 EC=ERR : RESUME 3250
3250 ON ERROR GOTO 0:GOSUB 5540:GOSUB 5000:PRINT "(0.80)":LOCATE 3,25:PRINT FLN$
(FE)+" - "+SFN$:GOSUB 5620:IF F=10 THEN RETURN ELSE CLOSE #1:CLS:GOTO 3100
3260 FOR I=0 TO 1 : FOR J=0 TO 511 : TMR!(I,J)=10000 : NEXT J : NEXT I
3270 TFN$=D$+":PROJTMR.UAI" : ON ERROR GOTO 3320
3280 OPEN "I",#1,TFN$ : CLOSE #1 : OPEN "R",#1,TFN$,7
3290 FIELD #1,7 AS LB$
3300 GET #1 : I=CVI(LEFT$(LB$,2)) : IF I<2 THEN J=CVI(MID$(LB$,3,2)) : TMR!(I,J)
=CVI(MID$(LB$,5,2))+ASC(MID$(LB$,7,1))/100 : GOTO 3300
3310 CLOSE #1 : ON ERROR GOTO 0 : F=0 : RETURN
3320 EC=ERR : RESUME 3330
3330 ON ERROR GOTO 0 : IF EC=53 THEN F=0 : RETURN ELSE GOSUB 5540
3340 GOSUB 5000 : PRINT "(0.75)" : GOSUB 5620 : IF F=10 THEN RETURN ELSE CLOSE #
1 : CLS : GOTO 3260
3350 REM end of pass 1
3360 SC$="(4.50)" : GOSUB 3000
3370 FOR I=0 TO MAXO
3380 ON USEO(I) GOTO 3390,3400,3410,3390,3420,3430,3410
3390 NEXT I : GOTO 3440
3400 W=W+1 : GOTO 3390
3410 GOSUB 3010 : EM$="4.51  E  O-"+I$+" has both P.ON and T.ON/T.OFF" :E=E+1: G
OSUB 3030 : GOTO 3390
3420 GOSUB 3010 : EM$="4.61  W  O-"+I$+" has both MOVE and T.ON/T.OFF" :M=M+1: G
OSUB 3030 : GOTO 3390
3430 GOSUB 3010 : EM$="4.52  E  O-"+I$+" has both P.ON and MOVE" :E=E+1: GOSUB 3
030 : GOTO 3390
3440 FOR I=0 TO MAXF
3450 ON USEF(I) GOTO 3470,3480
3460 NEXT I : GOTO 3490
3470 GOSUB 3010 : EM$="4.62  W  F-"+I$+" is T.ON/T.OFF but never tested" :M=M+1:
 GOSUB 3030 : GOTO 3460
3480 GOSUB 3010 : EM$="4.63  W  F-"+I$+" is tested but never T.ON/T.OFF" :M=M+1:
 GOSUB 3030 : GOTO 3460
3490 FOR I=0 TO MAXT : IF USET(I)=0 THEN 3620 ELSE J=0
3500 IF TMR!(0,I)<10000 THEN 3520
3510 GOSUB 3010 : EM$="4.53  E  T-"+I$+" is undefined in the timer table" :E=E+1
 : GOSUB 3030 : J=1
3520 IF USET(I)<8 THEN 3570
3530 IF (USET(I) MOD 2)=1 THEN 3550
3540 GOSUB 3010 : EM$="4.54  E  T-"+I$+" is tested but never started" :E=E+1: GO
SUB 3030 : GOTO 3620
3550 IF J=1 THEN 3620 ELSE IF USET(I)>11 THEN 3610
3560 GOSUB 3010 : EM$="4.64  W  T-"+I$+" is never reset" :M=M+1: GOSUB 3030 : GO
TO 3610
3570 IF J=1 THEN 3620
3580 GOSUB 3010 : EM$="4.65  W  T-"+I$+" is never tested" :M=M+1: GOSUB 3030
3590 IF (USET(I) MOD 2)=1 THEN 3610
3600 GOSUB 3010 : EM$="4.66  W  T-"+I$+" is never started" :M=M+1: GOSUB 3030
```

```
3610 USET(I)=1 : W=W+1
3620 NEXT I : IF W<513 THEN 3640
3630 EM$="4.55  E   More then 512 timers are required" :E=E+1: GOSUB 3030
3640 FOR IO=0 TO 1 : FOR J=0 TO 31
3650 IF RFR(IO,J)=0 THEN 3700 ELSE IF CFG(IO,J)>0 THEN 3800
3670 GOSUB 3750 :EM$="4.56  E   "+J$+"     are referenced but not configured" :E=E+1
 : GOSUB 3030 : GOTO 3800
3700 IF CFG(IO,J)=0 THEN 3800
3720 GOSUB 3750 :EM$="4.67  W   "+J$+"     are configured but not referenced" :M=M+1
 : GOSUB 3030 : GOTO 3800
3750 IF IO=0 THEN J$="Inputs  " ELSE J$="Outputs  "
3760 I=J*16 :GOSUB 3010 :J$=J$+I$+"-" :I=J*16+15 :GOSUB 3010 :J$=J$+I$ :RETURN
3800 NEXT J : NEXT IO
4000 EM$="" : GOSUB 3030 : EM$=STR$(M)+" WARNING" : IF M<>1 THEN EM$=EM$+"S"
4010 EM$=EM$+" DETECTED" : GOSUB 3030
4020 EM$=STR$(E)+" FATAL ERROR" : IF E<>1 THEN EM$=EM$+"S"
4030 EM$=EM$+" DETECTED" : GOSUB 3030 : IF E>0 THEN 2210
4040 EM$="" : GOSUB 3030 : OBJA=OBJA+2 : FOR I=0 TO MAXO
4050 IF USEO(I)<>2 THEN 4110 ELSE J=0
4060 IF USET(J)<>0 THEN J=J+1 : GOTO 4060
4070 USET(J)=HIO+I : USEO(I)=J : IF TMR!(1,I)=>10000 THEN TMR!(0,J)=0 ELSE TMR!(
0,J)=TMR!(1,I)
4080 GOSUB 3010 : J$=RIGHT$(STR$(J),LEN(STR$(J))-1)
4090 EM$="4.71  M   Pulse.Output 0-"+I$+" uses T-"+J$+"     PULSE=" : IF TMR!(1,I)
=>10000 THEN EM$=EM$+"     1 scan" ELSE B!=TMR!(1,I) : GOSUB 6110 : EM$=EM$+BP$
+" sec"
4100 GOSUB 3020
4110 NEXT I
4120 O1$=PN$+DATE$+TIME$+MKI$(7)+MKI$(OBJA)+MKI$(SF)
4130 IF MAXO>MAXI THEN MAXI=MAXO
4140 I=INT(MAXI/8)+1 : MAXI=I*8
4150 O1$=O1$+MKI$(MAXI)
4160 IF W>MAXT THEN MAXT=W
4170 O1$=O1$+MKI$(MAXT)
4180 FOR I=1 TO SF : O1$=O1$+MKI$(STRT(I)) : NEXT I
4190 FOR I=1 TO SF : O1$=O1$+FLN$(I) : NEXT I : O1$=O1$+C$
4200 OBJI=0 : O2$=CHR$(OEC)+MKI$(OEN) : CF=1
4210 P$="2" : SC$="(4.70)" : GOSUB 2970
4220 O2$=O2$+MKI$(FEND(CF)) : GOSUB 5890
4230 B$=MKI$(FLN(CF))+CHR$(2)+SPACE$(32) : CALL GETBLK(B$) : GOSUB 5690
4240 LOCATE 1,60 : PRINT "ENABLE "
4250 IF C(1)=255 THEN O2$=O2$+CHR$(192)+MKI$(0) : GOSUB 5890 ELSE GOSUB 4950
4260 B$=MKI$(FLN(CF))+CHR$(1)+SPACE$(32) : CALL GETBLK(B$) : GOSUB 5690
4270 LOCATE 1,60 : PRINT "FREEZE "
4280 IF C(1)=255 THEN O2$=O2$+CHR$(192)+MKI$(0) : GOSUB 5890 ELSE GOSUB 4950
4290 B$=MKI$(INT(BL!(CF)))+CHR$(CINT((BL!(CF)-INT(BL!(CF)))*100)+10)+SPACE$(32)
 : CALL GETBLK(B$) : GOSUB 5690 : GOTO 4330
4300 IF B!=BH!(CF) THEN O2$=O2$+MKI$(-1) : GOSUB 5890 : CF=CF+1 : IF CF>SF THEN
 4670 ELSE 4210
4310 B$=MKI$(0)+CHR$(0)+SPACE$(32) : CALL GETBLK(B$) : GOSUB 5690
4320 IF T=1 OR T=2 THEN 4310
4330 LOCATE 1,60 : PRINT USING "####.##";B!
4340 O2$=O2$+MID$(B$,1,3) : GOSUB 5890
4350 ON T GOTO 4360,4360,4370,4420,4440,4500,4520,4540,4540,4540
4360 GOTO 4310
4370 REM control
4380 FOR K=1 TO KK : IF C1(K)=176 THEN IF C(K)=7 THEN D(K)=USEO(D(K))
4390 IF K=KK THEN C1(K)=C1(K)+8
4400 O2$=O2$+CHR$(C1(K)+C(K))+MKI$(D(K)) : GOSUB 5890
4410 NEXT K : GOTO 4580
4420 REM move
4430 O2$=O2$+CHR$(244)+MID$(B$,6,L-7) : GOSUB 5890 : GOTO 4580
4440 REM wait
4450 I=0
4460 IF USET(I)<>0 THEN I=I+1 : GOTO 4460
4470 USET(I)=HIO*2+CF : TMR!(0,I)=X!
4480 GOSUB 3010 : GOSUB 6110 : EM$="4.72  M   Wait block "+BP$+"   uses T-"+I$ : G
OSUB 3060
4490 O2$=O2$+CHR$(248)+MKI$(I) : GOSUB 5890 : GOTO 4580
4500 REM exit
4510 O2$=O2$+CHR$(252)+MKI$(FE) : GOSUB 5890 : GOTO 4580
4520 REM decision
4530 GOSUB 4950 : GOTO 4560
4540 REM compare
4550 O2$=O2$+CHR$(232+T)+MID$(B$,6,5) : GOSUB 5890
```

```
4560 D!=Y! : GOSUB 4590
4570 D!=N!
4580 GOSUB 4590 : GOTO 4300
4590 JO=0 : J1=BS
4600 I=(JO+J1)/2 : IF D!=BX!(I) THEN 4660
4610 IF D!>BX!(I) THEN JO=I ELSE J1=I
4620 IF (J1-JO)>4 THEN 4600 ELSE I=JO
4630 IF D!=BX!(I) THEN 4660
4640 I=I+1 : IF I<=J1 THEN 4630
4650 SEC=5 : GOTO 2820
4660 O2$=O2$+MKI$(BA(I)) : GOSUB 5890 : RETURN
4670 O2$=O2$+MKI$(-1)
4680 SC$="(4.80)" : GOSUB 3000 : EM$="" : IF PRNT=0 THEN GOSUB 6040
4690 EM$="PASS #2 COMPLETE      -      OBJECT LENGTH= "+STR$(OBJA)
4700 LOCATE 1,1 : PRINT EM$ : IF PRNT=0 THEN GOSUB 6040
4710 OFN$=D$+":PROJOBJ.UAI" : ON ERROR GOTO 4910
4720 OPEN "R",#1,OFN$,512
4730 FIELD #1,2 AS BL$,510 AS BD$
4740 IF LEN(O1$)<500 THEN I=0 ELSE LSET BL$=MKI$(500) : LSET BD$=LEFT$(O1$,500)
 : PUT #1 : IF LEN(O1$)<1000 THEN I=1 ELSE LSET BL$=MKI$(500) : LSET BD$=MID$(O1$
,501,500) : PUT #1 : I=2
4750 K=LEN(O1$)-500*I : LSET BL$=MKI$(K) : LSET BD$=RIGHT$(O1$,K) : PUT #1
4760 IF OBJI>0 THEN FOR I=1 TO OBJI : LSET BL$=MKI$(LEN(OBJ$(I))) : LSET BD$=OBJ
$(I) : PUT #1 : NEXT I
4770 LSET BL$=MKI$(LEN(O2$)) : LSET BD$=O2$ : PUT #1
4780 O2$="" : FOR I=0 TO MAXT : IF USET(I)=0 THEN 4850
4790 IF USET(I)<HIO THEN J=0 : K=0 : GOTO 4810
4800 IF USET(I)<HIO*2 THEN J=64 : K=USET(I)-HIO ELSE J=32 : K=USET(I)-HIO*2
4810 IF K>255 THEN K=K-255 : J=J+128
4820 O2$=O2$+MKI$(I)+CHR$(J)+CHR$(K)
4830 T1!=INT(TMR!(0,I)*1000) : T3!=INT(T1!/65536!) : T1!=T1!-T3!*65536! : T2!=IN
T(T1!/256) : T1!=T1!-T2!*256 : O2$=O2$+CHR$(T1!)+CHR$(T2!)+CHR$(T3!)
4840 IF LEN(O2$)=504 THEN LSET BL$=MKI$(504) : LSET BD$=O2$ : PUT #1 : O2$=""
4850 NEXT I : O2$=O2$+MKI$(-1)
4860 LSET BL$=MKI$(LEN(O2$)) : LSET BD$=O2$ : PUT #1
4870 CLOSE #1 : ON ERROR GOTO 0
4880 EX$=EM$ : MID$(EX$,1,7)="COMPILE" : PRNT=1 : EM$="" : GOSUB 3030 : EM$="PRE
SS ANY KEY TO CONTINUE ..." : GOSUB 3030 : LOCATE 1,1 : PRINT EX$ : LOCATE 1,75
 : PRINT "(4.90)"
4890 A$=INKEY$ : IF LEN(A$)>0 THEN 4890
4900 A$=INKEY$ : IF LEN(A$)=0 THEN 4900 ELSE 6150
4910 EC=ERR : RESUME 4920
4920 ON ERROR GOTO 0 : GOSUB 5540
4930 GOSUB 5000 : PRINT "(4.81)"
4940 GOSUB 5620 : IF F=10 THEN 6320 ELSE CLOSE #1 : CLS : GOTO 4680
4950 FOR K=1 TO KK : O2$=O2$+CHR$(C1(K)+C(K))+MKI$(D(K)) : GOSUB 5890 : NEXT K :
 RETURN
4960 LINE (1,35)-(275,164),,B
4970 LOCATE 4,1 : PRINT SPACE$(35)
4980 LINE (4,38)-(273,162),0,BF : RETURN
4990 LINE (278,10)-(640,200),0,BF : RETURN
5000 CLS:PRINT TAB(25);"P R O J E C T      C O M P I L E":LOCATE 1,75:RETURN
5010 LINE (121,44)-(520,188),,B : RETURN
5020 GOSUB 5040 : IF F>10 THEN BEEP : GOTO 5020 ELSE RETURN
5030 GOSUB 5050 : IF F>10 THEN BEEP : GOTO 5030 ELSE RETURN
5040 A$=INKEY$ : IF LEN(A$)>0 THEN 5040
5050 A$=INKEY$ : IF LEN(A$)=0 THEN 5050
5060 IF A$=CHR$(0)+CHR$(59) THEN F=1 : RETURN
5070 IF A$=CHR$(0)+CHR$(60) THEN F=2 : RETURN
5080 IF A$=CHR$(0)+CHR$(61) THEN F=3 : RETURN
5090 IF A$=CHR$(0)+CHR$(62) THEN F=4 : RETURN
5100 IF A$=CHR$(0)+CHR$(63) THEN F=5 : RETURN
5110 IF A$=CHR$(0)+CHR$(64) THEN F=6 : RETURN
5120 IF A$=CHR$(0)+CHR$(65) THEN F=7 : RETURN
5130 IF A$=CHR$(0)+CHR$(66) THEN F=8 : RETURN
5140 IF A$=CHR$(0)+CHR$(67) THEN F=9 : RETURN
5150 IF A$=CHR$(0)+CHR$(68) THEN F=10 : RETURN
5160 IF A$=CHR$(9) THEN F=11 : RETURN
5170 IF A$=CHR$(0)+CHR$(15) THEN F=12 : RETURN : ELSE BEEP : GOTO 5050
5180 PRINT CHR$(17); : I=POS(0)*8 : J=CSRLIN*8 : LINE (I-12,J-5)-(I+8,J-5) : LIN
E -(I+8,J-8) : LOCATE J/8,I/8+3 : PRINT "  ---- ENTRY IS CORRECT" : RETURN
5190 IF ABF=1 THEN LINE (12,179)-(32,179) : LOCATE 23,2 : PRINT CHR$(17); : LINE
 (8,176)-(8,182) : LOCATE 23,6 : PRINT "  ----  BACK TO PREVIOUS ENTRY"; ELSE LO
CATE 23,2 : PRINT SPACE$(35);
```

```
5200 IF AFF=1 THEN LINE (8,195)-(28,195) : LOCATE 25,4 : PRINT CHR$(16); : LINE
(32,192)-(32,198) : LOCATE 25,6 : PRINT "  ---- ADVANCE TO NEXT ENTRY"; ELSE LO
CATE 25,2 : PRINT SPACE$(35);
5210 RETURN
5220 X$=SPACE$(MAXL) : PX=0 : LX=0
5230 RX=CSRLIN : CX=POS(0) : IS=0 : F=0
5240 IF IS=0 THEN MYC$="  -  " ELSE MYC$=" -- "
5250 LOCATE RX+1,CX+PX-2 : PRINT MYC$;
5260 IF EROW>0 THEN LOCATE EROW,ECOL : IF LX>0 THEN GOSUB 5180 ELSE PRINT SPACE$
(32);
5270 LOCATE RX,CX+PX
5280 A$=INKEY$ : IF LEN(A$)=0 THEN 5280
5290 IF LEN(A$)=1 THEN 5380
5300 IF A$=CHR$(0)+CHR$(15) THEN IF ABF=1 THEN F=12 : RETURN
5310 IF A$=CHR$(0)+CHR$(59) THEN F=1 : RETURN
5312 IF A$=CHR$(0)+CHR$(60) THEN IF ETYP=4 THEN IF IOS=0 THEN F=2 : RETURN
5314 IF A$=CHR$(0)+CHR$(61) THEN IF ETYP=4 THEN IF IOS>0 THEN F=3 : RETURN
5320 IF A$=CHR$(0)+CHR$(68) THEN F=10 : RETURN
5330 IF A$=CHR$(0)+CHR$(75) THEN IF PX=0 THEN 5530 ELSE PX=PX-1 : IF ETYP<>4 THE
N 5250 ELSE IF PX=1 THEN PX=0 : GOTO 5250 ELSE 5250
5340 IF A$=CHR$(0)+CHR$(77) THEN IF PX>=LX THEN 5530 ELSE PX=PX+1 : IF ETYP<>4 T
HEN 5250 ELSE IF PX=1 THEN PX=2 : GOTO 5250 ELSE 5250
5350 IF ETYP<>4 THEN IF A$=CHR$(0)+CHR$(82) THEN IF IS=0 THEN IS=1 : GOTO 5240 E
LSE IS=0 : GOTO 5240
5360 IF ETYP<>4 THEN IF A$=CHR$(0)+CHR$(83) THEN IF PX<LX THEN X$=LEFT$(X$,PX)+R
IGHT$(X$,MAXL-PX-1)+CHR$(32) : LX=LX-1 : GOTO 5520 ELSE GOTO 5530
5365 IF ETYP=4 THEN IF A$=CHR$(0)+CHR$(83) THEN IF PX=0 THEN X$=SPACE$(4) : F=4
: RETURN
5370 GOTO 5530
5380 IF A$=CHR$(8) THEN IF PX>0 THEN PRINT CHR$(29)+CHR$(32)+CHR$(29);: MID$(X$,
PX,1)=" " : PX=PX-1: GOTO 5250 ELSE 5530
5390 IF A$=CHR$(9) THEN IF AFF=1 THEN F=11 : RETURN
5400 IF A$=CHR$(13) THEN F=0 : RETURN
5410 IF A$=CHR$(34) THEN 5530
5420 IF A$<CHR$(32) THEN 5530 ELSE IF IS=1 THEN IF LX=MAXL THEN 5530
5430 IF IS=0 THEN IF PX=MAXL THEN 5530
5440 IF ETYP=1 THEN IF A$<CHR$(48) OR A$>CHR$(57) THEN 5530 ELSE 5500
5450 IF PX=0 THEN IF A$<CHR$(49) OR A$>CHR$(56) THEN 5530 ELSE 5500
5460 IF PX=2 THEN IF A$<CHR$(48) OR A$>CHR$(49) THEN 5530 ELSE 5500
5462 IF MID$(X$,3,1)=CHR$(48) THEN IF A$<CHR$(49) OR A$>CHR$(57) THEN 5530 ELSE
5500
5464 IF A$<CHR$(48) OR A$>CHR$(49) THEN 5530 ELSE 5500
5500 IF IS=0 THEN PRINT A$; : PX=PX+1 : MID$(X$,PX,1)=A$ : IF PX>LX THEN LX=PX :
 GOTO 5525 ELSE 5525
5510 X$=LEFT$(X$,PX)+A$+MID$(X$,PX+1,MAXL-PX-1) : PX=PX+1 : LX=LX+1
5520 LOCATE RX,CX : PRINT LEFT$(X$,LX)+STRING$(MAXL-LX,CHR$(22)); : GOTO 5240
5525 IF ETYP=4 THEN IF PX=1 THEN PX=2
5526 GOTO 5250
5530 BEEP : GOTO 5280
5540 IF EC=52 THEN EC$=D$+"  is an invalid drive designation"  : RETURN
5550 IF EC=53 THEN EC$="There is no project file on drive  "+D$ : RETURN
5560 IF EC=61 THEN EC$="There is no more disk space on drive  "+D$ : RETURN
5570 IF EC=67 THEN EC$="The directory is full  OR  "+D$+"  is an unavailable dri
ve" : RETURN
5580 IF EC=70 THEN EC$="The disk is write-protected in drive  "+D$ :RETURN
5590 IF EC=71 THEN EC$="There is no disk ready on drive  "+D$ : RETURN
5600 IF EC=72 THEN EC$="There was a disk media error on drive  "+D$:RETURN
5610 EC$="There was a number ("+STR$(EC)+") error on drive  "+D$ : RETURN
5620 LINE (121,68)-(520,165),,B
5630 LOCATE 5,15 : PRINT EC$
5640 LOCATE 13,25 : PRINT "F1  ------  RETRY DISK IN DRIVE  "+D$
5650 LOCATE 19,25 : PRINT "F10 ------  EXIT TO SYSTEM"
5660 GOSUB 5020
5670 IF F=1 THEN RETURN
5680 IF F=10 THEN RETURN ELSE BEEP : GOTO 5660
5690 B!=CVI(MID$(B$,1,2))+(ASC(MID$(B$,3,1))-10)/100
5700 L=ASC(MID$(B$,4,1)) : T=ASC(MID$(B$,5,1))
5710 IF T<1 OR T>2 THEN IF L>2 THEN EN=CVI(MID$(B$,L+2,2))
5720 ON T GOTO 5740,5740,5760,5770,5800,5810,5820,5830,5830,5830
5730 RETURN
5740 IF L=2 THEN C(1)=255 : D(1)=HIO : C1(1)=0 : KK=1 : RETURN
5750 KK=(L-2)/3 : GOSUB 5880 : RETURN
5760 KK=(L-7)/3 : GOSUB 5880 : GOTO 5850
5770 I=ASC(MID$(B$,6,1)) : C(4)=I MOD 16 : C(1)=(I-C(4))/16
5780 D(1)=CVI(MID$(B$,7,2)) : J=9 : IF C(1)<>1 THEN D(3)=0 ELSE D(3)=CVI(MID$(B$
,J,2)) : J=J+2
```

```
5790 D(4)=CVI(MID$(B$,J,2)) : J=J+2 : IF C(4)<>7 THEN 5850 ELSE D(6)=CVI(MID$(B$
,J,2)) : GOTO 5850
5800 X!=CVI(MID$(B$,6,2))+ASC(MID$(B$,8,1))/100 : GOTO 5850
5810 FE=CVI(MID$(B$,6,2)) : GOTO 5850
5820 KK=(L-10)/3 : GOSUB 5880 : GOTO 5860
5830 I=ASC(MID$(B$,6,1)) : C(3)=I MOD 16 : C(1)=(I-C(3))/16
5840 D(1)=CVI(MID$(B$,7,2)) : D(2)=0 : D(3)=CVI(MID$(B$,9,2)) : GOTO 5860
5850 D!=CVI(MID$(B$,L-1,2))+(ASC(MID$(B$,L+1,1))-10)/100 : RETURN
5860 Y!=CVI(MID$(B$,L-4,2))+(ASC(MID$(B$,L-2,1))-10)/100
5870 N!=CVI(MID$(B$,L-1,2))+(ASC(MID$(B$,L+1,1))-10)/100 : RETURN
5880 FOR I=1 TO KK : C1(I)=ASC(MID$(B$,3+I*3,1)) : C(I)=C1(I) MOD 16 : C1(I)=C1(
I)-C(I) : D(I)=CVI(MID$(B$,4+I*3,2)) : NEXT I : RETURN
5890 IF LEN(O2$)<500 THEN RETURN
5900 OBJI=OBJI+1 : OBJ$(OBJI)=O2$ : O2$="" : RETURN
5910 GOSUB 4960 : LOCATE 1,75 : PRINT "(4.20)" : LOCATE 8,5 : PRINT "DO YOU WANT
 PRINTED OUTPUT ?" : LOCATE 12,10 : PRINT "F1 ------ YES" : LOCATE 15,10 : PRI
NT "F2 ------ NO" : GOSUB 163 : GOSUB 5020 : GOTO 6020
5915 GOSUB 4960 : ON ERROR GOTO 5920 : OPEN "I",#1,"9:9.9" : GOTO 5930
5920 RESUME 5930
5930 ON ERROR GOTO 5980
5950 LPRINT ""
5960 LPRINT TAB(15);"PROJECT:   ";PN$ :LPRINT TAB(15);"DATE: ";DATE$;"   TIME: "
;TIME$ :LPRINT "" :LPRINT "OUTPUT ENABLE:  ";K$+OEL$ : LPRINT ""
5962 LPRINT "I/O CONGFIGURATION:" : FOR IO=0 TO 1 : FOR J=0 TO 31 : IF CFG(IO,J)
=0 THEN 5966
5964 GOSUB 3750 : LPRINT "   "+J$+"  @   "; : I=J : GOSUB 1970 : LPRINT IX$
5966 NEXT J : NEXT IO : LPRINT ""
5968 LPRINT "" : LPRINT "FLOWCHARTS:"
5970 ON ERROR GOTO 0 : PRNT=0 : F=0 : RETURN
5980 EC=ERR : RESUME 5990
5990 ON ERROR GOTO 0 : LOCATE 1,75 : PRINT "(4.95)" : GOSUB 4960 : LOCATE 8,5 :
PRINT USING "ERROR CODE ###  HAS OCCURRED";EC : LOCATE 10,2 : PRINT "WHILE ATTEM
PTING TO PRINT"
6000 LOCATE 14,5 : PRINT "F1 ------ RETRY PRINTER" : LOCATE 16,5 : PRINT "F2
------ CONTINUE WITH" : LOCATE 17,18 : PRINT "NO PRINTOUT" : GOSUB 163
6010 BEEP : GOSUB 5020
6020 IF F=1 THEN 5915 ELSE IF F=2 THEN PRNT=1 : RETURN ELSE IF F=10 THEN RETURN
ELSE 6010
6040 ON ERROR GOTO 6050 : OPEN "I",#1,"9:9.9" : GOTO 6060
6050 RESUME 6060
6060 ON ERROR GOTO 6090
6070 LPRINT EM$
6080 ON ERROR GOTO 0 : RETURN
6090 EC=ERR : RESUME 6100
6100 ON ERROR GOTO 0 : EM$="4.96  P  ERROR CODE"+STR$(EC)+"  HAS OCCURRED WHEN A
TTEMPTING TO PRINT" : PRNT=1 : GOSUB 3030 : BEEP : BEEP : RETURN
6110 BP$=STR$(B!) : I1=INSTR(BP$,".") : IF I1=0 THEN BP$=BP$+".00" : GOTO 6140
6120 IF I1+2>LEN(BP$)THEN BP$=BP$+"0" : GOTO 6120
6130 IF I1+2<LEN(BP$)THEN BP$=LEFT$(BP$,I1+2)
6140 BP$=RIGHT$(SPACE$(4)+BP$,7) : RETURN
6150 CLS : PRINT TAB(30);"M A S T E R   M E N U" : LOCATE 1,75 : PRINT "(0.50)"
: LOCATE 4,16 : PRINT "PROJECT:   "+PN$ : GOSUB 5010
6160 LOCATE 8,25 : PRINT "F1 ------ MNEMONICS LABELS"
6170 LOCATE 10,25 : PRINT "F2 ------ TIMER/PULSE TABLE"
6180 LOCATE 12,25 : PRINT "F3 ------ FLOWCHART EDITOR"
6190 LOCATE 14,25 : PRINT "F4 ------ PROJECT COMPILE"
6200 LOCATE 16,25 : PRINT "F5 ------ PROJECT RUN/DEBUG"
6210 LOCATE 18,25 : PRINT "F6 ------ SYSTEM UTILITIES"
6220 LOCATE 22,25 : PRINT "F10 ------ EXIT TO SYSTEM"
6230 GOSUB 5020
6240 IF F=1 THEN 6310
6250 IF F=2 THEN 6310
6260 IF F=3 THEN CHAIN "FLOPR2.EXE"
6270 IF F=4 THEN 80
6280 IF F=5 THEN CHAIN "FLOPR4.EXE"
6290 IF F=6 THEN 6310
6300 IF F=10 THEN 6320 ELSE BEEP : GOTO 6230
6310 DEF SEG=79 : POKE 5,F : CHAIN "FLOPR1.EXE"
6320 CLS
6330 DEF SEG=79 : FOR I=0 TO 5 : POKE I,0 : NEXT I : END
```

RUN/DEBUG

```
10 DEFINT A-Z :DIM FLN$(50) :SCREEN 2 :CLS :EDM$=" ------ ENTER DEBUG MODE"
20 DEF SEG=79 : A0=PEEK(0) : A1=PEEK(1) : B1=PEEK(2) : C1=PEEK(3) : D1=PEEK(4) :
DEF SEG
30 IF A0<>17 THEN 710 ELSE IF CHR$(A1)+CHR$(B1)+CHR$(C1)<>"UAI" THEN 710
40 D$=CHR$(D1) : PFN$=D$+":PROJHDR.UAI" : OFN$=D$+":PROJOBJ.UAI"
50 FOR I=1 TO 50 : FLN$(I)="" : NEXT I : NF=0 : OL=0
60 ON ERROR GOTO 120 : OPEN "I",#1,PFN$ : INPUT #1,PN$ : CLOSE #1 : OPEN "I",#1,
OFN$ : CLOSE #1
70 OPEN "R",#1,OFN$,512 : FIELD #1,2 AS L$,510 AS A$
80 GET #1 : L=CVI(L$) : PN$=MID$(A$,1,40) : E$=MID$(A$,41,10) : T$=MID$(A$,51,8)
 : IOT=CVI(MID$(A$,59,2)) : NF=CVI(MID$(A$,63,2)) : NB=69+2*NF : L=L-NB+1 : I=1
90 IF L=>15 THEN FLN$(I)=MID$(A$,NB,15) : L=L-15 : NB=NB+15 : I=I+1 : IF I>NF T
HEN 110 ELSE 90
100 FLN$(I)=MID$(A$,NB,L) : R=15-L : GET #1 : L=CVI(L$) : FLN$(I)=FLN$(I)+MID$(A
$,1,R) : L=L-R : NB=R+1 : I=I+1 : IF I<=NF THEN 90
110 CLOSE #1 : ON ERROR GOTO 0 : GOTO 140
120 EC=ERR : RESUME 130
130 ON ERROR GOTO 0 : NF=0
140 GOSUB 410 : IF NF=0 THEN PRINT "(5.01)" ELSE PRINT "(5.00)" : LOCATE 3,1 : P
RINT "PROJECT: ";PN$;"   COMPILED: ";E$;" ";T$
150 FS=1 :GOSUB 250 :GOSUB 400 :LOCATE 7,5 :IF NF=0 THEN PRINT "Compiled project
 is necessary" :LOCATE 9,5 :PRINT "to execute RUN/DEBUG program !" :GOTO 180
155 IF IOT<>7 THEN PRINT "PROJECT NOT COMPILED FOR" :LOCATE 9,5 :PRINT " GOULD
800 SERIES I/O" :LOCATE 1,79 : PRINT "9" : GOTO 170
160 PRINT "F1 ------ BEGIN EXECUTION" : LOCATE 10,5 : PRINT "F2"+EDM$
170 IF NF > 25 THEN LOCATE 15,5 : PRINT "F3  ------ PAGE DIRECTORY"
180 GOSUB 420
190 GOSUB 430 : IF IOT<>7 THEN 220
200 IF F=1 THEN IF NF>0 THEN 300
210 IF F=2 THEN IF NF>0 THEN 300
220 IF F=3 THEN IF NF>25 THEN GOSUB 390 : GOSUB 240 : GOTO 190
230 IF F=10 THEN 530 ELSE BEEP : GOTO 190
240 IF FS=1 THEN FS=26 ELSE FS=1
250 LOCATE 7,50 : IF NF=0 THEN PRINT "NO COMPILED PROJECT" : LOCATE 9,50 : PRINT
 "FOUND ON DATA DISK" : RETURN ELSE PRINT "FLOWCHARTS   COMPILED"
260 FOR I=FS TO FS+24 : IF I>25 THEN II=I-25 ELSE II=I
270 IF I<=NF THEN J=INT((II+1)/2) : K=II-(J-1)*2 : LOCATE J+8,K*21+19 : PRINT US
ING "## ";I; : PRINT FLN$(I);
280 NEXT I : RETURN
290 CALL UADBUG(B) : GOTO 140
300 IF OL>0 THEN 307 ELSE B=ASC(D$)-64 : CALL SETDRV(B)
305 CALL FLOPRO(B) : IF B<>520 THEN 315 ELSE OL=1
307 IF F=2 THEN 290
310 CLS : CALL FLOPRO(B)
315 GOSUB 410 : PRINT "(5.03)" : LOCATE 3,1 : PRINT "EXIT FLOWCHARTS #";B
320 GOSUB 400 : IF B<512 THEN LOCATE 7,5 : PRINT "F1 ------ RESUME EXECUTION" :
 LOCATE 10,5 : PRINT "F2"+EDM$
330 GOSUB 420
340 GOSUB 430
350 IF B<512 THEN IF F=1 THEN 310 ELSE IF F=2 THEN 370
360 IF F=10 THEN 530 ELSE BEEP : GOTO 340
370 CALL UADBUG(B) : IF B=0 THEN 310
380 GOSUB 410 : PRINT "(5.05)" : LOCATE 3,1 : PRINT "EXECUTION TERMINATED" : GOT
O 320
390 LINE (278,33)-(640,200),0,BF : RETURN
400 LINE (1,35)-(275,164),,B : RETURN
410 SCREEN 0 : SCREEN 2 : CLS : PRINT TAB(25);"P R O J E C T      R U N / D E B U
G" : LOCATE 1,75 : RETURN
420 LOCATE 20,2 : PRINT "F10 ------ EXIT TO MASTER MENU  " : RETURN
430 A$=INKEY$ : IF LEN(A$)>0 THEN 450
440 F=0 : A$=INKEY$ : IF LEN(A$)=0 THEN 440
450 IF A$=CHR$(0)+CHR$(59) THEN F=1
460 IF A$=CHR$(0)+CHR$(60) THEN F=2
470 IF A$=CHR$(0)+CHR$(61) THEN F=3
480 IF A$=CHR$(0)+CHR$(62) THEN F=4
490 IF A$=CHR$(0)+CHR$(63) THEN F=5
500 IF A$=CHR$(0)+CHR$(64) THEN F=6
510 IF A$=CHR$(0)+CHR$(68) THEN F=10
520 IF F=0 THEN BEEP : GOTO 440 ELSE RETURN
530 CLS : PRINT TAB(30);"M A S T E R    M E N U" : LOCATE 1,75 : PRINT "(0.50)" :
 LOCATE 4,16 : PRINT "PROJECT:   "+PN$
540 LINE (121,44)-(520,188),,B
550 LOCATE 8,25 : PRINT "F1 ------ MNEMONICS LABELS"
```

```
560 LOCATE 10,25 : PRINT "F2 ------ TIMER/PULSE TABLE"
570 LOCATE 12,25 : PRINT "F3 ------ FLOWCHART EDITOR"
580 LOCATE 14,25 : PRINT "F4 ------ PROJECT COMPILE"
590 LOCATE 16,25 : PRINT "F5 ------ PROJECT RUN/DEBUG"
600 LOCATE 18,25 : PRINT "F6 ------ SYSTEM UTILITIES"
610 LOCATE 22,25 : PRINT "F10 ------ EXIT TO SYSTEM"
620 GOSUB 430
630 IF F=1 THEN 700
640 IF F=2 THEN 700
650 IF F=3 THEN CHAIN "FLOPR2.EXE"
660 IF F=4 THEN CHAIN "FLOPR3.EXE"
670 IF F=5 THEN CHAIN "FLOPR4.EXE"
680 IF F=6 THEN 700
690 IF F=10 THEN 710 ELSE BEEP : GOTO 620
700 DEF SEG=79 : POKE 5,F : CHAIN "FLOPR1.EXE"
710 CLS : DEF SEG=79 : FOR I=0 TO 5 : POKE I,0 : NEXT I : END
```

GRAPHICS EDITOR (subroutine called from Editor)

```
10 DEFINT A-Z
20 SUB FLOEGA(B,B!) STATIC
30 DIM C(7),C1(7),D(7),K$(7),K1$(7)
35 HIO=512 : G=1 : GMF=0 : P4=15 : GFMOD=0
40 IF B=0 THEN GOSUB 9500 : GOTO 30000
50 IF B=1 THEN GOSUB 9990 : GOTO 30000
60 IF B=2 THEN GOSUB 10000 : GOTO 30000
70 IF B=3 THEN GOSUB 15000 : GOSUB 15200 : GOTO 30000
80 IF B=4 THEN GOSUB 15000 : GOSUB 10392 : GOSUB 15100 : GOSUB 18100 : GOSUB 103
25 : GOTO 30000
90 IF B=5 THEN GOSUB 9510 : GOTO 30000
100 IF B=9 THEN GOSUB 6000
200 GOTO 30000
6000 P1$=SPACE$(13)+"|" : P2$=" "+STRING$(25,45)
6010 GFP$=MKI$(0)+MKI$(0) : CALL GFPPL(GFP$)
6020 GFRW=8! : FOR GFCX=0 TO 4 : GPRL=0 : GFP=GFRW*10+GFCX : GFS=GFP : GOSUB 960
0 : IF B!>0 THEN GOSUB 9800 : GOSUB 9820 : GOSUB 18800 : GOSUB 27970 : GFCY=(GFS
-GFP)/10+1 : GOSUB 7500
6030 IF GFS<10 THEN 6040 ELSE GFR=GFS-10
6032 GFQ=17 : GOSUB 19500 : IF GW>0 THEN P=1 : A$="|" : A=1 : GOSUB 6500 : A=2 :
 GOSUB 6500
6035 GFQ=18 : GOSUB 19500 : IF GW>0 THEN P=16 : A$="|" : A=1 : GOSUB 6500 : A=2
: GOSUB 6500
6037 GFQ=19 : GOSUB 19500 : IF GW>0 THEN P=39 : A$="|" : A=1 : GOSUB 6500 : A=2
: GOSUB 6500
6040 GFR=GFS : GFQ=11 : GOSUB 19500 : IF GW>0 THEN P=1 : A$="|" : FOR A=2 TO 11
: GOSUB 6500 : NEXT A
6042 GFQ=12 : GOSUB 19500 : IF GW>0 THEN P=16 : A$="|" : FOR A=2 TO 11 : GOSUB 6
500 : NEXT A
6044 GFQ=13 : GOSUB 19500 : IF GW>0 THEN P=39 : A$="|" : FOR A=2 TO 11 : GOSUB 6
500 : NEXT A : A=6 : IF GD=1 THEN A$="^" : GOSUB 6500 ELSE A$="v" : GOSUB 6500
6046 GFQ=14 : GOSUB 19500 : IF GW>0 THEN P=1 : A$="|" : FOR A=11 TO 21 : GOSUB 6
500 : NEXT A : A=16 : IF GD=1 THEN A$="^" : GOSUB 6500 ELSE A$="v" : GOSUB 6500
6048 GFQ=15 : GOSUB 19500 : IF GW>0 THEN P=16 : A$="|" : FOR A=11 TO 21 : GOSUB
6500 : NEXT A : A=16 : IF GD=1 THEN A$="^" : GOSUB 6500 ELSE A$="v" : GOSUB 6500
6050 GFQ=16 : GOSUB 19500 : IF GW>0 THEN P=39 : A$="|" : FOR A=11 TO 21 : GOSUB
6500 : NEXT A
6052 GFQ=17 : GOSUB 19500 : IF GW>0 THEN P=1 : A$="|" : FOR A=21 TO 22 : GOSUB 6
500 : NEXT A
6054 GFQ=18 : GOSUB 19500 : IF GW>0 THEN P=16 : A$="|" : FOR A=21 TO 22 : GOSUB
6500 : NEXT A
6056 GFQ=19 : GOSUB 19500 : IF GW>0 THEN P=39 : A$="|" : FOR A=21 TO 22 : GOSUB
6500 : NEXT A
6058 GFQ=20 : GOSUB 19500 : IF GW>0 THEN P=16 : A$="|" : FOR A=2 TO 3 : GOSUB 65
00 : NEXT A
6060 IF (GFS MOD 10)=0 THEN 6070 ELSE GFR=GFS-1
6062 GFQ=3 : GOSUB 19500 : IF GW>0 THEN P=0 : A$="--" : A=2 : GOSUB 6500
6065 GFQ=6 : GOSUB 19500 : IF GW>0 THEN P=0 : A$="--" : A=11 : GOSUB 6500
6067 GFQ=9 : GOSUB 19500 : IF GW>0 THEN P=0 : A$="--" : A=21 : GOSUB 6500
6070 GFR=GFS : GFQ=1 : GOSUB 19500 : IF GW>0 THEN P=1 : A$="----------------" :
A=2 : GOSUB 6500
6072 GFQ=2 : GOSUB 19500 : IF GW>0 THEN P=16 : A$="-------------)------------" : A
=2 : GOSUB 6500 : IF GD=1 THEN P=28 : A$="<" : GOSUB 6500
```

```
6074 GFQ=3 : GOSUB 19500 : IF GW>0 THEN P=39 : A$="--" : A=2 : GOSUB 6500
6076 GFQ=4 : GOSUB 19500 : IF GW>0 THEN P=1 : A$="------------------" : A=11 : GOS
UB 6500
6078 GFQ=5 : GOSUB 19500 : IF GW>0 THEN P=16 : A$="-------------)------------" : A
=11 : GOSUB 6500 : IF GD=1 THEN P=28 : A$="<" : GOSUB 6500
6080 GFQ=6 : GOSUB 19500 : IF GW>0 THEN P=39 : A$="--" : A=11 : GOSUB 6500
6082 GFQ=7 : GOSUB 19500 : IF GW>0 THEN P=1 : A$="--------)---------" : A=21 : GOS
UB 6500 : IF GD=1 THEN P=8 : A$="<" : GOSUB 6500
6084 GFQ=8 : GOSUB 19500 : IF GW>0 THEN P=16 : A$="--------------------------" : A
=21 : GOSUB 6500
6086 GFQ=9 : GOSUB 19500 : IF GW>0 THEN P=39 : A$="--" : A=21 : GOSUB 6500
6088 IF GPRL>0 THEN A=GPRL : P=39 : A$="-" : GOSUB 6500
6100 NEXT GFCX
6200 RETURN
6500 GFP$=MKI$(GFCX)+MKI$(A)+MKI$(P)+MKI$(LEN(A$))+A$ : CALL GFPPP(GFP$) : RETUR
N
7500 ON T GOTO 7560,7610,7750,7860,7930,7940,7950,7950,7950,7950
7510 RETURN
7560 IF GFCY=2 THEN K=5 : A=2 : GOTO 7580
7570 A=8 : A$="       FREEZE CRITERIA:" : GOSUB 8500 : A=12 : IF C(1)=255 THEN A$="
          NONE" : GOSUB 8500 : RETURN ELSE K=1 : IF KK>4 THEN KK=4
7580 FOR I=K TO KK : J=0 : GOSUB 17000 : P$=A$ : IF I1=0 THEN A$="" : GOSUB 1705
0 : A$="   "+P$+" ("+A$+")"
7590 GOSUB 8500 : A=A+1 : J=1 : GOSUB 17000 : A$="      "+A$ : GOSUB 8500 : A=A+2
 : NEXT I : RETURN
7610 IF GFCY>1 THEN 7670 ELSE IF GFT>15 THEN 7630
7612 A=7 : A$="      "+STRING$(19,45) : GOSUB 8500 : A=8 : P4=19 : IF KK=2 THEN GO
SUB 7720 ELSE A$=SPACE$(19)
7614 A$="    /"+A$+"\" : GOSUB 8500 : A=9 : P4=21 : IF KK=2 THEN I=1 : J=0 : GOSU
B 17000 ELSE IF C(1)<255 THEN GOSUB 7720 ELSE A$=SPACE$(21)
7616 A$="   /"+A$+"\" : GOSUB 8500 : A=10 : P4=23 : IF KK=2 THEN I=1 : J=1 : GOSU
B 17000 ELSE IF C(1)<255 THEN I=1 : J=0 : GOSUB 17000 ELSE GOSUB 7710
7618 A$="<"+A$+">" : GOSUB 8500 : A=11 : P4=21 : IF KK=2 THEN I=2 : J=0 : GOSUB
 17000 ELSE IF C(1)<255 THEN I=1 : J=1 : GOSUB 17000 ELSE A$=SPACE$(21)
7620 A$="   \"+A$+"/" : GOSUB 8500 : A=12 : P4=19 : IF KK=2 THEN I=2 : J=1 : GOSU
B 17000 ELSE A$=SPACE$(19)
7622 A$="    \"+A$+"/" : GOSUB 8500 : A=13 : A$="      "+STRING$(19,45) : GOSUB 850
0 : A=14 : A$=P1$ : GOSUB 8500 : A=15 : A$=P1$ : IF C(1)<255 THEN A$=P1$+"   "+K$
(1)
7624 GOSUB 8500 : A=16 : A$=P1$ : IF KK=2 THEN A$=P1$+"   "+K$(2)
7626 GOSUB 8500 : A=17 : A$=P1$ : GOSUB 8500 : GOTO 7700
7630 IF GFT>16 THEN 7650
7632 A=10 : A$="      "+STRING$(19,45) : GOSUB 8500 : A=11 : A$="    /"+SPACE$(19)+
"\" : GOSUB 8500 : A=12 : P4=19 : IF KK=5 THEN GOSUB 7720 ELSE A$=SPACE$(19)
7634 A$="   /"+A$+"\" : GOSUB 8500 : A=13 : P4=21 : IF KK=5 THEN I=1 : J=0 : GOS
UB 17000 ELSE IF KK=4 THEN GOSUB 7720 ELSE A$=SPACE$(21)
7636 A$="  /"+A$+"\" : GOSUB 8500 : A=14 : P4=21 : IF KK=5 THEN I=1 : J=1 : GOSU
B 17000 ELSE IF KK=4 THEN I=1 : J=0 : GOSUB 17000 ELSE GOSUB 7720
7637 A$=" /"+A$+"\" : GOSUB 8500 : A=15 : P4=23 : K=KK-1 : I=INT(K/2) : J=(K MO
D 2) : GOSUB 17000 : A$=" /"+A$+"\" : GOSUB 8500 : A=16 : P4=23 : I=INT(KK/2) :
J=(KK MOD 2) : GOSUB 17000
7638 A$="/"+A$+"\" : GOSUB 8500 : A=17 : P4=25 : K=KK+1 : I=INT(K/2) : J=(K MOD
 2) : GOSUB 17000 : A$="<"+A$+">" : GOSUB 8500 : A=18 : P4=23 : K=KK+2 : I=INT(K
/2) : J=(K MOD 2) : GOSUB 17000
7639 A$="\"+A$+"/" : GOSUB 8500 : A=19 : P4=23 : K=KK+3 : I=INT(K/2) : J=(K MOD
 2) : GOSUB 17000 : A$=" \"+A$+"/" : GOSUB 8500 : A=20 : P4=21 : K=KK+4 : I=INT(
K/2) : J=(K MOD 2) : GOSUB 17000
7640 A$="  \"+A$+"/" : GOSUB 8500 : A=21 : P4=21 : IF KK=5 THEN I=5 : J=0 : GOSU
B 17000 ELSE IF KK=4 THEN I=4 : J=1 : GOSUB 17000 ELSE A$=SPACE$(21)
7642 A$="   \"+A$+"/" : GOSUB 8500 : A=22 : P4=19 : IF KK=5 THEN I=5 : J=1 : GOSU
B 17000 ELSE A$=SPACE$(19)
7644 A$="    \"+A$+"/" : GOSUB 8500 : RETURN
7650 A=12 : A$="      "+STRING$(19,45) : GOSUB 8500 : A=13 : A$="    /"+SPACE$(19)+
"\" : GOSUB 8500 : A=14 : P4=19 : IF KK=7 THEN GOSUB 7720 ELSE A$=SPACE$(19)
7652 A$="   /"+A$+"\" : GOSUB 8500 : A=15 : P4=19 : IF KK=7 THEN I=1 : J=0 : GOS
UB 17000 ELSE GOSUB 7720
7654 A$="  /"+A$+"\" : GOSUB 8500 : A=16 : P4=21 : I=1 : J=(KK MOD 2) : GOSUB 1
7000 : A$=" /"+A$+"\" : GOSUB 8500 : A=17 : P4=21 : K=KK-3 : I=INT(K/2) : J=(K
MOD 2) : GOSUB 17000
7656 A$=" /"+A$+"\" : GOSUB 8500 : A=18 : P4=21 : I=2 : J=(KK MOD 2) : GOSUB 17
000 : A$="  /"+A$+"\" : GOSUB 8500 : A=19 : P4=23 : K=KK-1 : I=INT(K/2) : J=(K M
OD 2) : GOSUB 17000
7658 A$=" /"+A$+"\" : GOSUB 8500 : A=20 : P4=23 : I=3 : J=(KK MOD 2) : GOSUB 170
00 : A$=" /"+A$+"\" : GOSUB 8500 : A=21 : P4=25 : K=KK+1 : I=INT(K/2) : J=(K MOD
 2) : GOSUB 17000
7660 A$="<"+A$+">" : GOSUB 8500 : A=22 : P4=23 : I=4 : J=(KK MOD 2) : GOSUB 1700
```

```
0 : A$=" \"+A$+"/" : GOSUB 8500 : RETURN
7670 IF GFCY>2 THEN 7690 ELSE IF GFT>16 THEN 7680
7672 A=1 : A$="    \"+SPACE$(19)+"/" : GOSUB 8500 : A=2 : A$="    "+STRING$(19,45
) : GOSUB 8500 : A=3 : A$=P1$ : GOSUB 8500 : A=4 : A$=P1$ : GOSUB 8500 : A=5 : A
$=P1$ : GOSUB 8500
7674 FOR A=6 TO 17 : I=A-5 : IF I<=KK THEN A$=P1$+"   "+K$(I) ELSE A$=P1$
7676 GOSUB 8500 : NEXT A : GOTO 7700
7680 A=1 : P4=23 : K=KK+3 : I=INT(K/2) : J=(K MOD 2) : GOSUB 17000 : A$="  \"+A$+
"/" : GOSUB 8500 : A=2 : P4=21 : I=5 : J=(KK MOD 2) : GOSUB 17000 : A$="  \"+A$-
"/" : GOSUB 8500
7681 A=3 : P4=21 : K=KK+5 : I=INT(K/2) : J=(K MOD 2) : GOSUB 17000 : A$="  \"+A$
+"/" : GOSUB 8500 : A=4 : P4=21 : I=6 : J=(KK MOD 2) : GOSUB 17000 : A$="  \"+A$
+"/" : GOSUB 8500
7682 A=5 : P4=19 : K=KK+7 : I=INT(K/2) : J=(K MOD 2) : GOSUB 17000 : A$="   \"+A
$+"/" : GOSUB 8500 : A=6 : P4=19 : IF KK=7 THEN I=7 : J=1 : GOSUB 17000 ELSE A$=
SPACE$(19)
7683 A$="   \"+A$+"/" : GOSUB 8500 : A=7 : A$="   \"+SPACE$(19)+"/" : GOSUB 2500
 : A=8 : A$="   "+STRING$(19,45) : GOSUB 8500 : FOR A=9 TO 12 : A$=P1$ : GOSUB
8500 : NEXT A
7684 FOR A=13 TO 22 : I=A-12 : IF I<=KK THEN A$=P1$+"   "+K$(I) ELSE A$=P1$
7686 GOSUB 8500 : NEXT A : RETURN
7690 FOR A=1 TO 17 : A$=P1$ : GOSUB 8500 : NEXT A
7700 IF B3!=0 THEN RETURN ELSE D!=B3! : GOTO 7760
7710 K2=(P4-9)/2 : A$=SPACE$(K2)+"POWER  ON" : GOTO 7730
7720 K2=(P4-13)/2 : A$=SPACE$(K2)+"POWER ON  AND"
7730 IF LEN(A$)<P4 THEN A$=A$+" " : GOTO 7730 ELSE RETURN
7740 FOR A=4 TO K-2 : A$=P1$ : GOSUB 8500 : NEXT A : A=K-1 : GFN!=B! : GOSUB 171
00 : A$=P1$+"   "+A$ : GOSUB 8500 : A=K : A$=P2$ : GOSUB 8500 : RETURN
7750 IF GFCY=1 THEN 7754
7752 A=1 : IF KK=6 THEN I=4 : GOTO 7756 ELSE A$=P2$ : GOSUB 8500 : A=2 : IF KK=5
 THEN I=4 : GOTO 7756 ELSE I=5 : GOTO 7756
7754 K=11-KK : IF KK>4 THEN K=K+11
7755 GOSUB 7740 : I=1 : A=K+1
7756 A$="| "+K1$(I)+" | "+K$(I) : GOSUB 8500 : A=A+1 : IF A>22 THEN RETURN ELSE
A$=P2$ : GOSUB 8500 : A=A+1 : I=I+1 : IF A>22 THEN RETURN ELSE IF I<=KK THEN 775
6
7758 K=A : FOR A=K TO 17 : A$=P1$ : GOSUB 8500 : NEXT A
7760 IF GFBP<0 THEN A$=P1$ : A=18 : GOSUB 8500 : GOTO 7770
7765 GFN!=D! : GOSUB 17100 : A$=SPACE$(9)+A$ : A=18 : GOSUB 8500
7770 IF GFBP=0 THEN A=19 : GOSUB 17200 : A$=SPACE$(10)+A$ : GOSUB 8500 : RETURN
7780 FOR A=19 TO 21 : A$=P1$ : GOSUB 8500 : NEXT A : RETURN
7860 K=7 : GOSUB 7740 : A=8 : A$="| MOVE    "+K1$(1)+" | "+K$(1) : GOSUB 8500 :
A=9 : A$="|"+SPACE$(25)+"| " : IF C(1)=1 THEN A$=A$+"THRU"
7880 GOSUB 8500 : A=10 : IF C(1)=1 THEN A$="|"+SPACE$(9)+K1$(3)+" | "+K$(3) ELSE
 A$="|"+SPACE$(25)+"|"
7890 GOSUB 8500 : A=11 : A$="| TO     "+K1$(4)+" | "+K$(4) : GOSUB 8500 : A=12
: A$="|"+SPACE$(25)+"| " : IF C(4)=7 THEN A$=A$+"THRU"
7900 GOSUB 8500 : A=13 : IF C(4)=7 THEN A$="|"+SPACE$(9)+K1$(6)+" | "+K$(6) ELSE
 A$="|"+SPACE$(25)+"|"
7910 GOSUB 8500 : A=14 : A$=P2$ : GOSUB 8500 : A=15 : GOTO 7758
7930 K=10 : GOSUB 7740 : A=11 : IF X!=0 THEN A$="    0.00" ELSE GFN!=X! : GOSUB 1
7100
7935 A$="| WAIT    "+A$+" SECONDS |" : GOSUB 8500 : A=12 : A$=P2$ : GOSUB 8500 :
 A=13 : GOTO 7758
7940 K=10 : GOSUB 7740 : A=11 : A$="| EXIT FLOWCHARTS"+RIGHT$(SPACE$(7)+STR$(FE)
,8)+" |" : GOSUB 8500 : A=12 : A$=P2$ : GOSUB 8500 : A=13 : GOTO 7758
7950 P5$="|" : IF B!=Y! THEN P1=1 ELSE IF B!=N! THEN P1=2 ELSE P1=0 : P5$=" "
7970 IF P1=1 OR GFTA>0 THEN P3$="YES" : P4$="NO " ELSE P3$="NO " : P4$="YES"
7975 IF GFCY>1 THEN 8040 ELSE IF GFT>10 THEN 8000 ELSE IF T>7 THEN KK=2
7980 A=4 : A$=P1$ : IF P1>0 THEN A$=A$+"("+STRING$(19,45)
7982 GOSUB 8500 : A=5 : A$=P1$+SPACE$(19)+P5$ : GOSUB 8500 : A=6 : GFN!=B! : GOS
UB 17100 : A$=P1$+"   "+A$+SPACE$(10)+P5$ : GOSUB 8500
7984 A=7 : A$=SPACE$(11)+"/    \"+SPACE$(17)+P5$ : GOSUB 8500 : A=8 : A$=SPACE$(8
)+"/     \"+SPACE$(14)+P5$ : GOSUB 8500
7986 A=9 : A$=SPACE$(5)+"/       IS      \"+SPACE$(11)+P5$ : GOSUB 8500 : A=10 :
 P4=19 : IF KK=2 THEN I=1 : J=0 : GOSUB 17000 ELSE A$=SPACE$(19)
7988 A$="   /"+A$+"\   "+P3$+"     "+P5$ : GOSUB 8500 : A=11 : P4=21 : IF KK=1 THE
N I=1 : J=0 ELSE IF T=7 THEN I=1 : J=1 ELSE I=2 : J=0
7990 GOSUB 17000 : A$="  ("+A$+")---------" : IF GFRP>0 THEN A$=A$+"--" : GPRL=1
1
7991 GOSUB 8500 : A=12 : P4=19 : IF KK=1 THEN I=1 : J=1 ELSE IF T=7 THEN I=2 : J
=0 ELSE I=3 : J=0
7992 GOSUB 17000 : P$="   \"+A$+"/   " : A$="" : IF P1=0 THEN IF P3$="YES" THEN G
FN!=Y! : GOSUB 17100 ELSE GFN!=N! : GOSUB 17100
7994 A$=P$+A$ : GOSUB 8500 : A=13 : P4=15 : A$=SPACE$(15) : IF KK=2 THEN IF T=7
```

```
THEN I=2 : J=1 : GOSUB 17000 ELSE IF C(3)=8 THEN A$=STR$(D(3))+")" : MID$(A$,1,1
)="(" : GOSUB 17070
7995 P$=SPACE$(5)+"\"+A$+"/     " : A$="" : IF P1=0 THEN IF GFRP=0 THEN GOSUB 17
200
7996 A$=P$+A$ : GOSUB 8500 : A=14 : A$=SPACE$(8)+"\    ?    /" : GOSUB 8500 : A=
15 : A$=SPACE$(11)+"\    /    "+K$(1) : IF T>7 THEN A$=A$+"  "+K$(2)
7997 GOSUB 8500 : A=16 : A$=SPACE$(10)+P4$+"|" : IF KK=2 THEN A$=A$+SPACE$(6) :
IF T=7 THEN A$=A$+K$(2) ELSE A$=A$+K$(3)
7998 GOSUB 8500 : A=17 : A$=P1$ : GOSUB 8500 : IF P4$="YES" THEN D!=Y! ELSE D!=N
!
7999 GOTO 7760
8000 IF GFT>12 THEN 8030
8002 FOR A=4 TO 10 : A$=P1$ : GOSUB 8500 : NEXT A
8004 A=11 : A$=P1$ : IF P1>0 THEN A$=A$+"<"+STRING$(19,45)
8006 GOSUB 8500 : A=12 : A$=P1$+SPACE$(19)+P5$ : GOSUB 8500 : A=13 : GFN!=B! : G
OSUB 17100 : A$=P1$+" "+A$+SPACE$(10)+P5$ : GOSUB 8500
8008 A=14 : A$=SPACE$(11)+"/  \"+SPACE$(17)+P5$ : GOSUB 8500 : A=15 : A$=SPACE$
(8)+"/      \"+SPACE$(14)+P5$ : GOSUB 8500
8010 A=16 : A$=SPACE$(5)+"/       \"+SPACE$(11)+P5$ : GOSUB 8500 : A=17
: P4=17 : IF KK=5 THEN I=1 : J=0 : GOSUB 17000 ELSE A$=SPACE$(17)
8012 A$="    /"+A$+"\"+SPACE$(10)+P5$ : GOSUB 8500 : A=18 : P4=19 : IF KK=5 THEN
 I=1 : J=1 : GOSUB 17000 ELSE IF KK=4 THEN I=1 : J=0 : GOSUB 17000 ELSE A$=SPACE
$(19)
8014 A$="   /"+A$+"\"+SPACE$(9)+P5$ : GOSUB 8500 : A=19 : P4=21 : IF KK=5 THEN I
=2 : J=0 ELSE IF KK=4 THEN I=1 : J=1 ELSE I=1 : J=0
8016 GOSUB 17000 : A$="   /"+A$+"\"+SPACE$(8)+P5$ : GOSUB 8500 : A=20 : P4=23 : I
F KK=5 THEN I=2 : J=1 ELSE IF KK=4 THEN I=2 : J=0 ELSE I=1 : J=1
8018 GOSUB 17000 : A$="   /"+A$+"\ "+P3$+"  "+P5$ : GOSUB 8500 : A=21 : P4=25 : I
F KK=5 THEN I=3 : J=0 ELSE IF KK=4 THEN I=2 : J=1 ELSE I=2 : J=0
8020 GOSUB 17000 : A$="<"+A$+">--------" : IF GFRP>0 THEN A$=A$+"--" : GPRL=21
8021 GOSUB 8500 : A=22 : P4=23 : IF KK=5 THEN I=3 : J=1 ELSE IF KK=4 THEN I=3 :
J=0 ELSE I=2 : J=1
8022 GOSUB 17000 : P$="  \"+A$+"/   " : A$="" : IF P1=0 THEN IF P3$="YES" THEN GFN!
=Y! : GOSUB 17100 ELSE GFN!=N! : GOSUB 17100
8024 A$=P$+A$ : GOSUB 8500 : RETURN
8030 FOR A=4 TO 20 : A$=P1$ : GOSUB 8500 : NEXT A
8032 A=21 : A$=P1$ : IF P1>0 THEN A$=A$+"<"+STRING$(19,45)
8034 GOSUB 8500 : A=22 : A$=P1$+SPACE$(19)+P5$ : GOSUB 8500 : RETURN
8040 IF GFCY>2 THEN 8100 ELSE IF GFT>12 THEN 8070
8042 IF P1=0 THEN IF P3$="YES" THEN GFN!=Y! ELSE GFN!=N!
8044 A=1 : P4=21 : IF KK=5 THEN I=4 : J=0 ELSE IF KK=4 THEN I=3 : J=1 : ELSE I=3
 : J=0
8046 GOSUB 17000 : P$="  \"+A$+"/   " : A$="" : IF P1=0 THEN IF GFRP=0 THEN GOSU
B 17200
8048 A$=P$+A$ : GOSUB 8500 : A=2 : P4=19 : IF KK=5 THEN I=4 : J=1 ELSE IF KK=4 T
HEN I=4 : J=0 ELSE I=3 : J=1
8050 GOSUB 17000 : A$="    \"+A$+"/" : GOSUB 8500 : A=3 : P4=17 : IF KK=5 THEN I=
5 : J=0 : GOSUB 17000 ELSE IF KK=4 THEN I=4 : J=1 : GOSUB 17000 ELSE A$=SPACE$(1
7)
8052 A$="     \"+A$+"/" : GOSUB 8500 : A=4 : P4=15 : IF KK=5 THEN I=5 : J=1 : GOS
UB 17000 ELSE A$=SPACE$(15)
8054 A$=SPACE$(5)+"\"+A$+"/" : GOSUB 8500 : A=5 : A$=SPACE$(8)+"\    ?    /" : G
OSUB 8500 : A=6 : A$=SPACE$(11)+"\    /    "+K$(1) : GOSUB 8500
8056 A=7 : A$=SPACE$(10)+P4$+"|    "+K$(2) : GOSUB 8500 : FOR A=8 TO 17 : I=A-
5 : IF I<=KK THEN A$=P1$+SPACE$(6)+K$(I) ELSE A$=P1$
8058 GOSUB 8500 : NEXT A : IF P4$="YES" THEN D!=Y! ELSE D!=N!
8060 GOTO 7760
8070 A=1 : GFN!=B! : GOSUB 17100 : A$=P1$+" "+A$+SPACE$(10)+P5$ : GOSUB 8500
8072 A=2 : A$=SPACE$(11)+"/  \"+SPACE$(17)+P5$ : GOSUB 8500 : A=3 : A$=SPACE$(8
)+"/      \"+SPACE$(14)+P5$ : GOSUB 8500
8074 A=4 : A$=SPACE$(5)+"/       IS      \"+SPACE$(11)+P5$ : GOSUB 8500 : A=5 :
P4=17 : IF KK=7 THEN I=1 : J=0 : GOSUB 17000 ELSE A$=SPACE$(17)
8076 A$="    /"+A$+"\"+SPACE$(10)+P5$ : GOSUB 8500 : A=6 : P4=19 : I=1 : J=(KK M
OD 2) : GOSUB 17000 : A$="   /"+A$+"\"+SPACE$(9)+P5$ : GOSUB 8500
8078 A=7 : P4=21 : K=KK-3 : I=INT(K/2) : J=(K MOD 2) : GOSUB 17000 : A$="   /"+A$
+"\"+SPACE$(8)+P5$ : GOSUB 8500 : A=8 : P4=21 : I=2 : J=(KK MOD 2) : GOSUB 17000
 : A$="   /"+A$+"\"+SPACE$(8)+P5$ : GOSUB 8500
8080 A=9 : P4=23 : K=KK-1 : I=INT(K/2) : J=(K MOD 2) : GOSUB 17000 : A$="   /"+A$+
"\"+SPACE$(7)+P5$ : GOSUB 8500 : A=10 : P4=23 : I=3 : J=(KK MOD 2) : GOSUB 17000
 : A$="   /"+A$+"\ "+P3$+"  "+P5$ : GOSUB 8500
8082 A=11 : P4=25 : K=KK+1 : I=INT(K/2) : J=(KK MOD 2) : GOSUB 17000 : A$="<"+A$+
">--------" : IF GFRP>0 THEN A$=A$+"--" : GPRL=11
8084 GOSUB 8500 : A=12 : P4=23 : I=4 : J=(KK MOD 2) : GOSUB 17000 : P$="  \"+A$+"
/  " : A$="" : IF P1=0 THEN IF P3$="YES" THEN GFN!=Y! : GOSUB 17100 ELSE GFN!=N!
 : GOSUB 17100
```

```
8086 A$=P$+A$ : GOSUB 8500 : A=13 : P4=23 : K=KK+3 : I=INT(K/2) : J=(K MOD 2) :
 GOSUB 17000 : P$=" \"+A$+"/  " : A$="" : IF P1=0 THEN IF GFRP=0 THEN GOSUB 17200
8088 A$=P$+A$ : GOSUB 8500 : A=14 : P4=21 : I=5 : J=(KK MOD 2) : GOSUB 17000 : A
$=" \"+A$+"/" : GOSUB 8500 : A=15 : P4=21 : K=KK+5 : I=INT(K/2) : J=(K MOD 2) :
 GOSUB 17000 : A$=" \"+A$+"/" : GOSUB 8500
8090 A=16 : P4=19 : I=6 : J=(KK MOD 2) : GOSUB 17000 : A$="    \"+A$+"/" : GOSUB
 8500 : A=17 : P4=17 : K=KK+7 : I=INT(K/2) : J=(K MOD 2) : GOSUB 17000 : A$="
 \"+A$+"/" : GOSUB 8500
8092 A=18 : P4=15 : IF KK=7 THEN I=7 : J=1 : GOSUB 17000 ELSE A$=SPACE$(15)
8094 A$=SPACE$(5)+"\"+A$+"/" : GOSUB 8500 : A=19 : A$=SPACE$(8)+"\   ?    /" :
 GOSUB 8500 : A=20 : A$=SPACE$(11)+"\    /    "+K$(1) : GOSUB 8500
8096 A=21 : A$=SPACE$(10)+P4$+"|       "+K$(2) : GOSUB 8500 : A=22 : A$=P1$+SPACE
$(6)+K$(3) : GOSUB 8500 : RETURN
8100 FOR A=1 TO 17 : I=A+3 : IF I<=KK THEN A$=P1$+SPACE$(6)+K$(I) ELSE A$=P1$
8102 GOSUB 8500 : NEXT A : IF P4$="YES" THEN D!=Y! ELSE D!=N!
8104 GOTO 7760
8500 A$="   "+A$
8510 GFP$=MKI$(GFCX)+MKI$(A)+MKI$(LEN(A$))+A$ : CALL GFPPL(GFP$) : RETURN
9500 GFBY=0 : GFX=0 : GFY=0 : B3!=0 : GDS!=0 : GOSUB 12680
9505 A$=MKI$(0)+CHR$(0) : CALL PUTGFB(A$) : GFDB=0 : RETURN
9510 GFBY=0 : GFX=0 : GFY=0 : GDS!=0 : GOSUB 12680
9520 B3!=0 : B!=.002 : GOSUB 9800 : GOSUB 9790 : IF ASC(MID$(A$,4,1))>0 THEN GOS
UB 9820 : B3!=B!
9525 GFDB=1 : RETURN
9600 A$=MKI$(GFP)+SPACE$(3) : CALL GETGFA(A$) : GA$=RIGHT$(A$,3) : GOSUB 9650 :
B!=GFN! : RETURN
9650 IF GA$=MKI$(0)+CHR$(0) THEN GFN!=0 : RETURN
9651 IF GA$=MKI$(0)+CHR$(1) THEN GFN!=.001 : RETURN
9652 IF GA$=MKI$(0)+CHR$(2) THEN GFN!=.002 : RETURN
9655 GFN!=CVI(MID$(GA$,1,2))+(ASC(MID$(GA$,3,1))-10)/100
9657 IF GFN!>20000 THEN GFNT=GFN!-20000 : GFN!=-1
9658 RETURN
9660 IF GFN!<.01 THEN GA$=MKI$(0)+CHR$(GFN!*1000) : RETURN
9670 GA$=MKI$(INT(GFN!))+CHR$(CINT((GFN!-INT(GFN!))*100)+10) : RETURN
9700 GFN!=B! : GOSUB 9660 : A$=GA$
9710 A$=A$+CHR$(0)+MKI$(GFP)+CHR$(GFTA*100+GFT)
9720 IF (GFBD!>0) OR (B!=.002) THEN GFN!=GFBD!:GOSUB 9660:A$=A$+GA$+MKI$(GFBP)
9730 IF GFRD!>0 THEN GFN!=GFRD! : GOSUB 9660 : A$=A$+GA$+MKI$(GFRP)
9740 MID$(A$,4,1)=CHR$(LEN(A$)-3) : CALL PUTGFB(A$) : RETURN
9750 GFN!=B! : GOSUB 9660 : A$=GA$
9760 A$=MKI$(GFP)+A$ : CALL PUTGFA(A$) : RETURN
9780 GOSUB 9660 : A$=GA$ : GOTO 9810
9790 A$=MKI$(0)+CHR$(0) : GOTO 9810
9800 GFN!=B! : GOSUB 9660 : A$=GA$
9810 A$=A$+SPACE$(20) : CALL GETGFB(A$) : RETURN
9820 GA$=LEFT$(A$,3) : GOSUB 9650 : B!=GFN! : GL=ASC(MID$(A$,4,1)) : GFP=CVI(MID
$(A$,5,2)) : GFTA=ASC(MID$(A$,7,1)) : GFT=(GFTA MOD 100) : GFTA=INT(GFTA/100)
9830 IF GL>4 THEN GA$=MID$(A$,8,3) : GOSUB 9650 : GFBD!=GFN! : GFBP=CVI(MID$(A$,
11,2)) ELSE GFBD!=0 : GFBP=0
9840 IF GL>9 THEN GA$=MID$(A$,13,3) : GOSUB 9650 : GFRD!=GFN! : GFRP=CVI(MID$(A$
,16,2)) ELSE GFRD!=0 : GFRP=0
9850 RETURN
9860 A$=MKI$(0)+CHR$(LEN(GFNL$)+1)+GFNL$ : CALL PUTGFS(A$) : GFLN=CVI(MID$(A$,1,
2)) : B!=GBS! : GOSUB 9800 : GOSUB 9820 : IF XD=0 THEN GFBP=GFLN ELSE GFRP=GFLN
9865 IF B!=.002 THEN GFBD!=GDS!
9870 GOSUB 9700 : RETURN
9890 GFP=(GFBY+GFNY)*10+GFNX :GOSUB 9600 :IF B!=-1 THEN GFNT=GFNT+1 ELSE GFNT=1
9892 B!=20000+GFNT : GOSUB 9750 : RETURN
9895 GFP=(GFBY+GFNY)*10+GFNX :GOSUB 9600 :GFNT=GFNT-1 : IF GFNT=0 THEN 9899
9897 B!=20000+GFNT : GOSUB 9750 : RETURN
9899 B!=0 : GOSUB 9750 : RETURN
9960 CALL GFSET : G=1 : A=483 : A$="CURRENT POSITION" : GOSUB 9980 : IF GFDB=1 T
HEN GDB!=B! : GOSUB 18600 : B!=GDB!
9965 GFDB=0 : RETURN
9970 GM$=MKI$(2) : CALL GFCLR(GM$) : A=340 : A$="USE ARROWS TO POSITION CURSOR"
 : GOSUB 9980 : RETURN
9975 GFN!=GBS! : GOSUB 17100 : A=370 : A$="PRESS 'F1' TO PLACE BLOCK - "+A$ : GO
SUB 9980 : RETURN
9978 A=1300 : A$="PRESS 'F8' TO SELECT A SPECIFIC BLOCK/CELL" : GOSUB 9980 : RET
URN
9980 GM$=MKI$(A)+MKI$(LEN(A$))+A$ : CALL GFMSG(GM$) : RETURN
9990 GOSUB 9960 : CGLT=1 : GOSUB 18100 : GOTO 10325
10000 GOSUB 9960 : GOSUB 18800 : GOSUB 27970
10020 GOSUB 12000 : IF T<3 THEN B!=T/1000
10030 GBS!=B! : GOSUB 9970 : GOSUB 9975 : GOSUB 9978 : CGLT=0 : GOSUB 18000
```

```
10050 IF F<>1 THEN GOSUB 18010 : GOTO 10050 ELSE F=10
10060 GFP=(GFBY+GFY)*10+GFX : GFAP=GFP : GOSUB 15800 : IF GFOK=0 THEN 10050
10090 GFLP=GFP : GFYL=GFY+GFL-1 : GOSUB 14000 : B!=GBS! : GOSUB 12100 : GFS=MKI$
(GFX)+MKI$(GFY)+MKI$(0)+MKI$(GFL+4) : CALL GFWRT(GF$) : GFP=GFAP : GOSUB 9700
10100 GMF=1 : GOSUB 9750 : IF GFL>1 THEN GFP=GFP+10 : GOSUB 9750 : IF GFL>2 THEN
 GFP=GFP+10 : GOSUB 9750
10120 B3!=0 : B!=.002 : GOSUB 9800 : GOSUB 9790 : IF ASC(MID$(A$,4,1))>0 THEN GO
SUB 9820 : B3!=B!
10130 IF GFMOD=1 THEN 15400 ELSE IF GFMOD=2 THEN 15750 ELSE IF B3!=0 THEN 10323
 ELSE IF GBS!<>.002 THEN 10200
10150 IF GFP=GFLP+10 THEN GF$=MKI$(GFX)+MKI$(GFYL) : GOSUB 19100 : B!=.002 : GOS
UB 9800 : GOSUB 9820 : GFBD!=B3! : GFBP=-1 : GOSUB 9700
10160 GOTO 10323
10200 IF GBS!<>B3! THEN 10230
10203 B!=.002 : GOSUB 9800 : GOSUB 9820 : IF GFBP>0 THEN GFET=0 : GOSUB 16100 :
B!=.002 : GOSUB 9800 : GOSUB 9820
10206 GOSUB 12050 : GFPB=GFP+(GFL-1)*10 : GFXB=GFP MOD 10 : GFYB=INT(GFPB/10) :
IF GFPB=GFAP-10 THEN XFBD!=GBS! : XFBP=-1 ELSE XFBD!=0 : XFBP=0
10209 GF$=MKI$(GFXB)+MKI$(GFYB-GFBY) : IF XFBP<0 THEN GOSUB 19100 ELSE IF GFBP<0
 THEN GOSUB 19200
10212 IF (GFYB<GFBY) OR (GFYB>(GFBY+3)) THEN 10215
10213 IF XFBP=0 THEN GFA=5124 : GFN!=GBS! : GOSUB 17100 : A$=" "+A$ : GOSUB 1330
0 : GFA=5605 : GOSUB 17200 : GOSUB 13300
10215 GFBD!=XFBD! : GFBP=XFBP : GOSUB 9700
10230 IF GFAP<10 THEN 10245 ELSE GFP=(GFAP-10) : GOSUB 9600 : IF B!<.01 THEN 102
45 ELSE GOSUB 9800 : GOSUB 9820
10239 IF GFBD!=GBS! THEN GF$=MKI$(GFX)+MKI$(GFY-1) : GOSUB 19100 : GFBP=-1 : GOS
UB 9700
10245 B!=GBS! : GOSUB 9800 : GOSUB 9820 : IF GFBD!=0 THEN 10275 ELSE GFN!=GFBD!
 : GOSUB 17200
10248 IF GFDA=GFLP+10 THEN GF$=MKI$(GFX)+MKI$(GFYL) : GOSUB 19100 : GFBP=-1 : GO
SUB 9700
10275 FOR GFEX=0 TO 4 : FOR GFEY=0 TO 3 : GFP=(GFBY+GFEY)*10+GFEX : GFS=GFP : GO
SUB 9600 : IF B!<=0 THEN 10320 ELSE GOSUB 9800 : GOSUB 9820
10280 IF GFBP<>0 THEN 10290 ELSE IF GFBD!<>GBS! THEN 10290 ELSE GOSUB 12050 : GF
P=GFP+(GFL-1)*10 : IF GFP<>GFS THEN 10290
10285 GF$=MKI$(GFEX)+MKI$(GFEY) :GFA=5605 :GFN!=GBS! :GOSUB 17200 :GOSUB 13300
10290 IF GFRD!<>GBS! THEN 10320 ELSE GOSUB 12050 : GFP=GFP+(GFL-1)*10 : IF GFT=1
3 THEN GFP=GFP-10
10310 IF GFP<>GFS THEN 10320 ELSE GFA=3612 : IF GFT=11 THEN GFA=572
10315 GF$=MKI$(GFEX)+MKI$(GFEY) :GFN!=GBS! :GOSUB 17200 :A$=" "+A$ :GOSUB 13300
10320 NEXT GFEY : NEXT GFEX
10323 B!=GBS! : GOSUB 9800 : GOSUB 9820 : GOSUB 12050
10325 GBS!=B! : ASW=0 : ARD=0 : ABD=0 : AMV=0 : IF GFT=9 THEN 10330 ELSE IF GFT=
11 THEN 10330 ELSE IF GFT<>13 THEN 10340
10330 IF GFBP=0 THEN IF GFRP=0 THEN ASW=1
10335 IF GFRP=0 THEN GFN!=GFRD! : GOSUB 17200 : IF GFDA=>0 THEN ARD=1
10338 IF GFRP>0 THEN ARD=2
10340 IF GFBP=0 THEN GFN!=GFBD! : GOSUB 17200 : IF GFDA=>0 THEN ABD=1
10345 IF B!=.002 THEN IF B3!>0 THEN IF GFBP=0 THEN ABD=1
10348 IF GFBP>0 THEN ABD=2
10349 GOSUB 9970 : GOSUB 9978
10350 GX$="  DESTINATION  " : IF GFT=>9 THEN IF GFT<=14 THEN IF GFTA=0 THEN GX$=
"YES DESTINATION" ELSE GX$="NO  DESTINATION"
10355 IF ABD=1 THEN A=370 : A$="PRESS 'F1' TO CONNECT "+GX$ : GOSUB 9980
10357 IF ABD=2 THEN A=370 : A$="PRESS 'F1' TO DISCONNECT "+GX$ : GOSUB 9980
10358 IF GFTA=0 THEN MID$(GX$,1,3)="NO " ELSE MID$(GX$,1,3)="YES"
10360 IF ARD=1 THEN A=850 : A$="PRESS 'F2' TO CONNECT "+GX$ : GOSUB 9980
10363 IF ARD=2 THEN A=850 : A$="PRESS 'F2' TO DISCONNECT "+GX$ : GOSUB 9980
10365 IF ASW=1 THEN A=1330 :A$="PRESS 'F3' TO SWITCH YES/NO PATHS" :GOSUB 9980
10370 IF B!>0 THEN AMV=1 : GFN!=B! : GOSUB 17100 : AX$=A$ : A=1810 : A$="PRESS
F4' TO MOVE BLOCK - "+AX$ : GOSUB 9980 : IF B!>.002 THEN AMV=2 : A=820 : A$="PRE
SS 'F6' TO DISPLAY SOURCES FOR BLOCK - "+AX$ : GOSUB 9980
10375 A=1780:A$="PRESS 'F10' TO RETURN TO EDITOR":GOSUB 9980:CGLT=1:GOSUB 18000
10380 IF F=10 THEN 10390
10381 IF F=6 THEN IF AMV=2 THEN 10900
10382 IF F=4 THEN IF AMV>0 THEN GOSUB 14000 : GOTO 10391
10383 IF F=3 THEN IF ASW=1 THEN GOSUB 14000 : GOTO 10410

10384 IF F=2 THEN IF ARD=2 THEN GOSUB 14000 : GOTO 10460
10385 IF F=1 THEN IF ABD=2 THEN GOSUB 14000 : GOTO 10470
10386 IF F=2 THEN IF ARD=1 THEN GOSUB 14000 : GOTO 10480
10387 IF F=1 THEN IF ABD=1 THEN GOSUB 14000 : GOTO 10490
10388 IF F=0 THEN 10325
10389 GOSUB 18010 : GOTO 10380
```

```
10390 GOSUB 14000 : CALL GFRET : RETURN
10391 GOSUB 10392 : B!=GBS! : GOSUB 18800 : GOSUB 27970 : GOTO 10020
10392 GOSUB 11000 : B!=GBS! : GOSUB 9800 : GOSUB 9820 : GOSUB 11010 : GOSUB 1600
0 : GOSUB 12680 : GF$=MKI$(GFX)+MKI$(GFY)+MKI$(0)+MKI$(GFL+4) : CALL GFWRT(GF$)
10393 IF GBS!<.01 THEN 10407
10395 B!=.002 : GOSUB 9800 : GOSUB 9820 :SA$=A$: IF GBS!=B3! THEN 10398
10396 GOSUB 9790 : GOSUB 9820 : SA$=A$ : IF ASC(MID$(A$,4,1))=0 THEN 10407
10397 IF GFBD!<>GBS! THEN 10401
10398 IF GFBP=-1 THEN GOSUB 10408 ELSE IF GFBP>0 THEN GFET=0 : GOSUB 16100
10399 A$=SA$ : GOSUB 9820 : GOSUB 16050 : IF GFLY<0 THEN 10400 ELSE IF GFLY>3 TH
EN 10400 ELSE GF$=MKI$(GFEX)+MKI$(GFLY) : GFA=5124 : GFN!=GBS! : GOSUB 17100 : A
$=" "+A$ : GOSUB 13300 : GFA=5605 : A$=" UNDEF" : GOSUB 13300
10400 GFBP=0 : GOSUB 9700 : GOTO 10396
10401 IF GFRD!<>GBS! THEN 10396
10402 IF GFRP>0 THEN GFET=1 : GOSUB 16100 : A$=SA$ : GOSUB 9820
10403 IF GFT=9 THEN GFA=3612 ELSE IF GFT=11 THEN GFA=6972 ELSE GFA=10012
10404 GOSUB 16050 : IF GFT=13 THEN GFLY=GFLY-1
10405 IF GFLY<0 THEN 10406 ELSE IF GFLY>3 THEN 10406 ELSE GF$=MKI$(GFEX)+MKI$(GF
EY) : A$=" UNDEF" : GOSUB 13300
10406 GFRP=0 : GOSUB 9700 : GOTO 10396
10407 GF$=MKI$(GFX)+MKI$(GFY) : CALL GFUNO(GF$) : RETURN
10408 GOSUB 16050 : GF$=MKI$(GFEX)+MKI$(GFLY) : GOSUB 19200 : RETURN
10410 GFN!=GFBD! :GFBD!=GFRD! : GFRD!=GFN! : GFTA=((GFTA+1) MOD 2): GOSUB 12600
: GMF=1
10420 GFN!=GFBD! : GOSUB 17200 : IF GFDA=(GFP+GFL*10) THEN GF$=MKI$(GFX)+MKI$(GF
Y+GFL-1) : GOSUB 19100 : GFBP=-1
10440 GOSUB 9700 : GOTO 10325
10460 GOSUB 11010 : GMF=1 : IF GFT=9 THEN GFA=3612 ELSE IF GFT=11 THEN GFA=7052
ELSE GFA=10012
10465 GFN!=GFRD! : GOSUB 17200 : A$=" "+A$ : GOSUB 13200 : B!=GBS!: GOSUB 9800 :
 GOSUB 9820 : GFRP=0 : GOSUB 9700 : GOTO 10325
10470 GOSUB 11000 : GMF=1 : IF GFL=1 THEN GFA=5605 ELSE IF GFL=2 THEN GFA=12005
ELSE GFA=18405
10475 GFN!=GFBD! : GOSUB 17200 : GOSUB 13200 : B!=GBS! : GOSUB 9800 : GOSUB 9820
 : GFBP=0 : GOSUB 9700 : GOTO 10325
10480 CALL GFRED : GF$=MKI$(GFX)+MKI$(GFY)+MKI$(GFT)+MKI$(1) : CALL GFSLS(GF$) :
 D!=GFRD! : XD=1 : LPS=6 : GFNY=GFY : IF GFT=11 THEN LPS=9 ELSE IF GFT=13 THEN G
FNY=GFNY+1
10485 GOTO 10495
10490 CALL GFRED :GF$=MKI$(GFX)+MKI$(GFY)+MKI$(GFT)+MKI$(0) :CALL GFSLS(GF$): D!
=GFBD! :XD=0 :LPS=8 :GFNY=GFY+GFL-1 :IF B!=.002 THEN D!=B3!
10495 GDS!=D!
10500 GM$=MKI$(2) :CALL GFCLR(GM$) :GFN!=GDS! :GOSUB 17100 :A=340 : A$="USE ARRO
WS TO DIRECT FLOW LINE TO BLOCK - "+A$ :GOSUB 9980 :A=1780 :A$="PRESS 'F10' TO E
XIT LINE MODE" :GOSUB 9980 : GFNX=GFX : GFLN$="" : GFSB=GFBY : GFST=GFT
10510 GFDX=GFNX:GFDY=GFNY+GFBY:GOSUB 17220:GM$=A$+STR$(LPS):CALL GFPOS(GM$):GFP=
(GFBY+GFNY)*10+GFNX : GOSUB 9600 : GOTO 10530
10520 BEEP
10530 A$=INKEY$ : IF A$<>"" THEN 10530
10540 A$=INKEY$ : IF A$="" THEN 10540 ELSE IF LEN(A$)=2 THEN A=ASC(MID$(A$,2,1))
 ELSE 10520
10550 IF A=72 THEN 10600
10560 IF A=80 THEN 10650
10570 IF A=77 THEN 10700
10580 IF A=75 THEN 10750
10590 IF A=68 THEN 10850 ELSE GOTO 10520
10600 IF LEN(GFLN$)>0 THEN IF RIGHT$(GFLN$,1)="D" THEN GOSUB 10800 : GOTO 10510
10610 IF LPS<4 THEN IF (GFBY+GFNY)=0 THEN 10520
10615 IF LPS=8 THEN IF B!>0 THEN 10520
10620 GOSUB 19860 : GOSUB 19500 : IF GR>0 THEN 10520 ELSE IF GW>0 THEN IF GD=0 T
HEN 10520
10640 GOSUB 19800 : GL$=GL$+MKI$(258) : GDR=1 : GFLN$=GFLN$+"U" : GOTO 10792
10650 IF LEN(GFLN$)>0 THEN IF RIGHT$(GFLN$,1)="U" THEN GOSUB 10800 : GOTO 10510
10660 IF LPS>6 THEN IF (GFBY+GFNY)=3255 THEN 10520
10670 IF LPS=2 THEN IF B!=GDS! THEN 1095 ELSE IF B!>0 THEN 10520
10680 GOSUB 19870 : GOSUB 19500 : IF GR>0 THEN 10520 ELSE IF GW>0 THEN IF GD=1 T
HEN 10520
10690 GOSUB 19810 : GL$=GL$+MKI$(2) : GDR=0 : GFLN$=GFLN$+"D" : GOTO 10792
10695 GFLN$=GFLN$+"C" : GOSUB 19750 : GOSUB 9860 : GMF=1 : GDS!=0 : GFX=GFNX : G
FY=GFNY : GOSUB 18110 : GOTO 10325
10700 IF LEN(GFLN$)>0 THEN IF RIGHT$(GFLN$,1)="L" THEN GOSUB 10800 : GOTO 10510
10710 IF (LPS MOD 3)=0 THEN IF GFNX=4 THEN 10520
10712 IF LPS=1 THEN IF B!>0 THEN GOSUB 9800 : GOSUB 9820 : IF INT(GFP/10)<(GFBY+
GFNY) THEN 10520
10715 IF LPS=4 THEN IF B!>0 THEN 10520
```

```
10720 IF LPS=7 THEN IF B!>0 THEN GOSUB 9800 : GOSUB 9820 : GOSUB 12050 : IF (INT
(GFP/10)+GFL-1)>(GFBY+GFNY) THEN 10520
10730 GOSUB 19880 : GOSUB 19500 : IF GR>0 THEN 10520 ELSE IF GW>0 THEN IF GD=1 T
HEN 10520
10740 GOSUB 19820 : GL$=GL$+MKI$(1) : GDR=0 : GFLN$=GFLN$+"R" : GOTO 10792
10750 IF LEN(GFLN$)>0 THEN IF RIGHT$(GFLN$,1)="R" THEN GOSUB 10800 : GOTO 10510
10760 IF (LPS MOD 3)=1 THEN IF GFNX=0 THEN 10520
10762 IF LPS=3 THEN IF B!>0 THEN GOSUB 9800 : GOSUB 9820 : IF INT(GFP/10)<(GFBY+
GFNY) THEN 10520
10765 IF LPS=6 THEN IF B!>0 THEN 10520
10770 IF LPS=9 THEN IF B!>0 THEN GOSUB 9800 : GOSUB 9820 : GOSUB 12050 : IF (INT
(GFP/10)+GFL-1)>(GFBY+GFNY) THEN 10520
10780 GOSUB 19890 : GOSUB 19500 : IF GR>0 THEN 10520 ELSE IF GW>0 THEN IF GD=0 T
HEN 10520
10790 GOSUB 19830 : GL$=GL$+MKI$(257) : GDR=1 : GFLN$=GFLN$+"L"
10792 GOSUB 10795 : CALL GFRED : CALL GFSLL(GL$) : GOSUB 19500 : GR=1 : GD=GDR :
 GOSUB 19600
10793 IF LPS=5 THEN GFP=GFR : GOSUB 9890
10794 GOTO 10510
10795 IF GFNY<0 THEN CALL GFSDN : GFBY=GFBY-1 : GFEY=0 : GOSUB 18700 : GFNY=0 :
MID$(GL$,3,2)=MKI$(0)
10797 IF GFNY>3 THEN CALL GFSUP : GFBY=GFBY+1 : GFEY=3 : GOSUB 18700 : GFNY=3 :
MID$(GL$,3,2)=MKI$(2)
10798 RETURN
10800 IF LPS=5 THEN GOSUB 9895
10803 GFD$=RIGHT$(GFLN$,1) : GFLN$=LEFT$(GFLN$,LEN(GFLN$)-1)
10805 IF GFD$="D" THEN 10810 ELSE IF GFD$="U" THEN 10820 ELSE IF GFD$="L" THEN 1
0830 ELSE 10840
10810 GOSUB 19800 : GL$=GL$+MKI$(5) : GOTO 10890
10820 GOSUB 19810 : GL$=GL$+MKI$(5) : GOTO 10890
10830 GOSUB 19820 : GL$=GL$+MKI$(4) : GOTO 10890
10840 GOSUB 19830 : GL$=GL$+MKI$(4) : GOTO 10890
10850 F=10 : IF LEN(GFLN$)>0 THEN GOSUB 10800 : GOTO 10850
10852 CALL GFWHT : IF GFSB<>GFBY THEN GFBY=GFSB : GOSUB 18600
10853 B!=GBS! : GOSUB 9800 : GOSUB 9820 : GOSUB 12050
10855 GF$=MKI$(GFX)+MKI$(GFY)+MKI$(GFT)+MKI$(XD) : CALL GFELS(GF$)
10860 IF XD=0 THEN D!=GDS! : GDS!=0 : GOSUB 17160 : GOTO 10325
10870 IF GFT<10 THEN GFA=3132 ELSE IF GFT<12 THEN GFA=6492 ELSE GFA=9532
10880 GFN!=GDS! : GDS!=0 : GOSUB 17100 : GOSUB 13200 : GFA=GFA+480 : GOSUB 17200
 : A$=" "+A$ : GOSUB 13200 : GOTO 10325
10890 IF F<10 THEN GOSUB 10795
10892 GOSUB 19500 : GR=0
10894 IF GW>0 THEN MID$(GL$,7,2)=MKI$(CVI(MID$(GL$,7,2))-3+256*GD)
10896 GOSUB 19300 : GOSUB 19600 : RETURN
10900 GFDS=1 : GSC=0 : IF GFX=0 THEN GSX=1 ELSE GSX=GFX-1
10905 GS$=MKI$(GSX)+MKI$(GFY)+MKI$(0) : GOSUB 10990
10915 B!=.002 : GOSUB 9800 : GOSUB 9820 : IF GBS!=B3! THEN 10930
10920 GOSUB 9790 : GOSUB 9820 : IF ASC(MID$(A$,4,1))=0 THEN 10940
10925 IF GFBD!=GBS! THEN 10930 ELSE IF GFRD!=GBS! THEN 10930 ELSE 10920
10930 GSC=GSC+1 : IF GSC=9 THEN GS$=LEFT$(GS$,4)+MKI$(5368)+MKI$(8)+"MORE ..." :
 CALL GFRED : CALL GFSCT(GS$) : CALL GFWHT : A=820 : A$="PRESS 'F6' TO DISPLAY M
ORE SOURCES" : GOSUB 9980 : GOTO 10945
10935 GFN!=B! : GOSUB 17100 : GS$=LEFT$(GS$,4)+MKI$(805+GSC*480)+MKI$(15)+A$+"
" : GOSUB 17200 : GS$=GS$+A$ : CALL GFSCT(GS$) : GOTO 10920
10940 IF GSC=0 THEN GS$=LEFT$(GS$,4)+MKI$(1287)+MKI$(4)+"NONE" : CALL GFSCT(GS$)
10945 A=1300 : A$="PRESS 'F8' TO SELECT A SPECIFIC BLOCK/CELL" : GOSUB 9980 : A=
1780 : A$="PRESS 'F10' TO EXIT SOURCES DISPLAY" : GOSUB 9980
10950 A$=INKEY$ : IF LEN(A$)<>2 THEN 10950 ELSE A=ASC(MID$(A$,2,1))
10960 IF A=64 THEN IF GSC=9 THEN GS$=LEFT$(GS$,4)+MKI$(1) : GOSUB 10990 : GSC=1
: GOTO 10935
10965 IF A=66 THEN GOSUB 18500 : GOTO 10380
10970 IF A=68 THEN CALL GFSRR(GS$) : GFDS=0 : GOSUB 14000 : GOTO 10323
10980 BEEP : GOTO 10950
10990 CALL GFSRC(GS$) : CALL GFRED : GS$=LEFT$(GS$,4)+MKI$(645)+MKI$(8)+"SOURCES
:" : CALL GFSCT(GS$) : CALL GFWHT : GM$=MKI$(2) : CALL GFCLR(GM$) : RETURN
11000 IF GFBP=-1 THEN GF$=MKI$(GFX)+MKI$(GFYL) : GOSUB 19200 ELSE IF GFBP>0 THEN
 GFET=0 : GOSUB 16100
11005 RETURN
11010 IF GFRP>0 THEN GFET=1 : GOSUB 16100
11015 RETURN
12000 GFL=1 : IF T=1 THEN IF KK>4 THEN GFL=2
12010 IF T=2 THEN IF KK>5 THEN GFL=3 ELSE IF KK>2 THEN GFL=2
12020 IF T=3 THEN IF KK>4 THEN GFL=2
12030 IF T=7 THEN IF KK>5 THEN GFL=3 ELSE IF KK>2 THEN GFL=2
12040 RETURN
```

```
12050 IF GFT=5 THEN 12080 ELSE IF GFT=6 THEN 12080 ELSE IF GFT=7 THEN 12080 ELSE
 IF GFT=11 THEN 12080 ELSE IF GFT=12 THEN 12080 ELSE IF GFT=16 THEN 12080 ELSE I
F GFT=19 THEN 12080
12060 IF GFT=13 THEN 12090 ELSE IF GFT=14 THEN 12090 ELSE IF GFT=17 THEN 12090
12070 GFL=1 : RETURN
12080 GFL=2 : RETURN
12090 GFL=3 : RETURN
12100 GFTA=0 : GFBD!=0 : GFRD!=0 : GFRP=0
12105 ON T GOTO 12110,12150,12230,12260,12320,12330,12360,12360,12360,12360
12110 GOSUB 12680 :GFA=1122 :A$="FREEZE CRITERIA:" :GOSUB 12700 :GFT=17+GFL :IF
 C(1)=255 THEN GFA=2565 :A$="NONE" :GOSUB 12700 : RETURN
12120 FOR I=1 TO KK :J=0 :GOSUB 17000 :GFT$=A$ :IF I1=0 THEN A$="" :GOSUB 17050
 : GFT$=GFT$+" ("+A$+")"
12130 GFA=1603+I*960 : A$=GFT$ : GOSUB 12700
12140 J=1 : GOSUB 17000 : GFA=2083+I*960 : GOSUB 12700 : NEXT I : RETURN
12150 GFT=14+GFL : GOSUB 12690 : IF B3!>0 THEN D!=B3! : GOSUB 12720
12160 IF C(1)=255 THEN GFA=1924 : A$=" POWER ON" : GOSUB 12700 : RETURN
12170 IF KK=1 THEN GFB=963 ELSE IF KK=2 THEN GFB=483 ELSE IF KK=3 THEN GFB=1603
ELSE IF KK=4 THEN GFB=1123 ELSE IF KK=5 THEN GFB=643 ELSE IF KK=6 THEN GFB=1603
ELSE GFB=1123
12180 GFA=GFB+480 : A$=" POWER ON  AND" : GOSUB 12700
12190 FOR I=1 TO KK : J=0 : GOSUB 17000 : GFA=GFB+I*960 : GOSUB 12700
12200 J=1 : GOSUB 17000 : GFA=GFB+480+I*960 : GOSUB 12700 : NEXT I
12210 IF GFT=15 THEN GFB=3528 ELSE IF GFT=16 THEN GFB=6568 ELSE GFB=9928
12220 FOR I=1 TO KK : GFA=GFB+I*480 : A$=K$(I) : GOSUB 12700 :NEXT I : RETURN
12230 GFT=KK : GOSUB 12690 : IF KK=1 THEN GFA=1608 ELSE IF KK=2 THEN GFA=1208 EL
SE IF KK=3 THEN GFA=808 ELSE IF KK=4 THEN GFA=488 ELSE IF KK=5 THEN GFA=3208 ELS
E IF KK=6 THEN GFA=2808 ELSE GFA=2408
12240 GOSUB 12710 :GOSUB 12720 :IF KK=1 THEN GFB=1681 ELSE IF KK=2 THEN GFB=1281
 ELSE IF KK=3 THEN GFB=881 ELSE IF KK=4 THEN GFB=561 ELSE IF KK=5 THEN GFB=3281
ELSE IF KK=6 THEN GFB=2881 ELSE GFB=2481
12250 FOR I=1 TO KK : GFA=GFB+I*800 : A$=" "+LEFT$(K1$(I),6)+RIGHT$(K1$(I),16)+"
 "+K$(I) : GOSUB 12700 : NEXT I : GOTO 12350
12260 GFT=8 :GOSUB 12690 :GFA=488 :GOSUB 12710 :GOSUB 12720 :GFA=1361 :A$=" MOVE
 "+K1$(1)+" "+K$(1) : GOSUB 12700
12270 IF C(1)<>1 THEN 12290 ELSE GFA=1853 : A$="THRU" : GOSUB 12700
12280 GFA=2324 : A$=" "+K1$(3)+"  "+K$(3) : GOSUB 12700
12290 GFA=2801 : A$=" TO     "+K1$(4)+"  "+K$(4) : GOSUB 12700
12300 IF C(4)<>7 THEN 12350 ELSE GFA=3293 : A$="THRU" : GOSUB 12700
12310 GFA=3764 : A$=" "+K1$(6)+"  "+K$(6) : GOSUB 12700 : GOTO 12350
12320 GFT=1 :GOSUB 12690 :GFA=1608 :GOSUB 12710 :GOSUB 12720 :GFA=2481 :GFN!=X!
 :IF GFN!=0 THEN A$="    0.00" ELSE GOSUB 17100
12325 A$=" WAIT   "+A$+" SECONDS" : GOSUB 12700 : GOTO 12350
12330 GFT=1 :GOSUB 12690 :GFA=1608 :GOSUB 12710 :GOSUB 12720 :GFA=2481 :A$=" EXI
T FLOWCHARTS"+RIGHT$(SPACE$(5)+STR$(FE),6) :GOSUB 12700
12350 GFBD!=D! : RETURN
12360 GFT=7+GFL*2 : IF B!=Y! OR B!=N! THEN GFT=GFT+1
12380 GOSUB 12690 : IF GFT<11 THEN GFA=969 : GFB=2253 : GFC=4564 ELSE IF GFT<13
THEN GFA=2649 : GFB=5613 : GFC=9604 ELSE GFA=4249 : GFB=8653 : GFC=14084
12390 GOSUB 12710 : IF Y!=B! THEN D!=N! : GFT$=" NO" : GFTA=1 ELSE D!=Y! : GFT$=
"YES"
12400 GFBD!=D! : GOSUB 12720 : GFA=GFC : A$=GFT$ : GOSUB 12700 : GFA=GFB : IF Y!
=B! THEN A$="YES" ELSE A$="NO "
12410 GOSUB 12700 : IF (GFT MOD 2)=0 THEN 12420 ELSE GFRD!=N! : GFN!=N! : GOSUB
17100:GFA=GFA+879:GOSUB 12700:GFA=GFA+480:GOSUB 17200:A$=" "+A$:GOSUB 12700
12420 IF T>7 THEN 12470 ELSE IF KK=1 THEN GFB=1683 ELSE IF KK=2 THEN GFB=1203 EL
SE IF KK=3 THEN GFB=4083 ELSE IF KK=4 THEN GFB=3603 ELSE IF KK=5 THEN GFB=3123 E
LSE IF KK=6 THEN GFB=5683 ELSE GFB=5203
12430 FOR I=1 TO KK : J=0 : GOSUB 17000 : GFA=GFB+I*960 : GOSUB 12700 : J=1 : GO
SUB 17000 : GFA=GFB+480+I*960 : GOSUB 12700 : NEXT I
12440 IF KK<3 THEN GFB=3609 ELSE IF KK<6 THEN GFB=8649 ELSE GFB=13129
12450 FOR I=1 TO KK :GFA=GFB+I*480 :A$=K$(I) :GOSUB 12700 :NEXT I : RETURN
12470 GFB=1683 : J=0 : FOR I=1 TO 3 : GOSUB 17000 : GFA=GFB+I*480 : GOSUB 12700
 : NEXT I : IF C(3)<>8 THEN A$=K$(1) : GOTO 12490
12480 A$=STR$(D(3))+")" :MID$(A$,1,1)="(" :GOSUB 17040 :GFA=3603 :GOSUB 12700 :
A$=K$(1)
12490 IF RIGHT$(A$,1)=" " THEN A$=LEFT$(A$,LEN(A$)-1) : GOTO 12490
12500 GFA=4090 :A$=A$+" "+K$(2) :GOSUB 12700 :GFA=4570 :A$=K$(3) :GOSUB 12700 :
RETURN
12600 IF GFT<11 THEN GFB=2253 : GFC=4564 ELSE IF GFT<13 THEN GFB=5613 : GFC=9604
 ELSE GFB=8653 : GFC=14084
12610 D!=GFBD! : IF GFTA=1 THEN GFT$=" NO" ELSE GFT$="YES"
12620 GOSUB 17160 : GFA=GFC : A$=GFT$ : GOSUB 13200 : GFA=GFB : IF GFTA=1 THEN A
$="YES" ELSE A$="NO "
12630 GOSUB 13200:GFN!=GFRD!
```

```
12640 GOSUB 17100 : GFA=GFA+879 : GOSUB 13200 : GFA=GFA+480 : GOSUB 17200 : A$="
 "+A$ : GOSUB 13200 : RETURN
12680 GF$=MKI$(0) : CALL GFBLK(GF$) : RETURN
12690 GF$=MKI$(GFT) : CALL GFBLK(GF$) : RETURN
12700 GF$=MKI$(GFA)+MKI$(LEN(A$))+A$ : CALL GFBTX(GF$) : RETURN
12710 GFN!=8! : GOSUB 17100 : GOSUB 12700 : RETURN
12720 IF GFL=1 THEN GFA=5124 ELSE IF GFL=2 THEN GFA=11524 ELSE GFA=17924
12730 GFN!=0! :GOSUB 17100 :A$=" "+A$ :GOSUB 12700 :GFA=GFA+481 :GOSUB 17200 :GO
SUB 12700 : RETURN
13100 GF$=LEFT$(GF$,4)+MKI$(GFA)+MKI$(LEN(A$))+A$ : CALL GFTXT(GF$) : RETURN
13200 IF (GFY+INT(GFA/6400))<0 THEN RETURN ELSE IF (GFY+INT(GFA/6400))>3 THEN RE
TURN
13210 GF$=MKI$(GFX)+MKI$(GFY)+MKI$(GFA)+MKI$(LEN(A$)+256)+A$ : CALL GFTXT(GF$) :
 RETURN
13300 GF$=LEFT$(GF$,4)+MKI$(GFA)+MKI$(LEN(A$)+256)+A$ :CALL GFTXT(GF$) :RETURN
14000 IF (GFY+GFL)>4 THEN GOSUB 14100 : GOTO 14000
14010 IF GFY<0 THEN GOSUB 14200 : GOTO 14010
14050 GF$=MKI$(GFX)+MKI$(GFY)+MKI$(GFL) : CALL GFREV(GF$) : RETURN
14100 CALL GFSUP : GFBY=GFBY+1 : GFY=GFY-1 : GFEY=3 : GOTO 14300
14200 CALL GFSDN : GFBY=GFBY-1 : GFY=GFY+1 : GFEY=0
14300 GFSL=GFL : GOSUB 18700 : GFL=GFSL
14310 IF CGLT=0 THEN B!=GBS! : GOSUB 18800 : GOSUB 27970 : GOSUB 12000
14320 RETURN
15000 GBS!=B! : GOSUB 9800 : GOSUB 9820 : GOSUB 12050 : GFS=GFP : GOSUB 16010 :
GFP=GFS : CGLT=1 : GFX=(GFP MOD 10) : GFEY=INT(GFP/10)
15005 IF GFDB=0 THEN GOSUB 9960 ELSE GFDB=0 : GOSUB 9960 : GOTO 15030
15010 IF GFEY=>GFBY THEN IF (GFEY+GFL-1)<(GFBY+4) THEN GFY=GFEY-GFBY : GOTO 1505
0
15030 GFBY=GFEY : GOSUB 18600 : GFY=0 : B!=GBS! : GOSUB 9800 : GOSUB 9820 : GOSU
B 12050
15050 GFYL=GFY+GFL-1 : RETURN
15100 IF GBS!<>B3! THEN RETURN
15110 B3!=0 : GFAP=0 : B!=.002 : GOSUB 9800 : GOSUB 9790 : IF ASC(MID$(A$,4,1))>
0 THEN GOSUB 9820 : B3!=B! : GFAP=GFP
15120 B!=.002 : GOSUB 9800 : GOSUB 9820 : GOSUB 12050 : GFPB=GFP+(GFL-1)*10 : GF
XB=GFP MOD 10 : GFYB=INT(GFPB/10) : IF GFPB=GFAP-10 THEN XFBD!=B3! : XFBP=-1 ELS
E XFBD!=0 : XFBP=0
15130 GF$=MKI$(GFXB)+MKI$(GFYB-GFBY) : IF XFBP<0 THEN GOSUB 19100
15140 IF (GFYB<GFBY) OR (GFYB>(GFBY+3)) THEN 15160 ELSE IF XFBP<0 THEN 15160
15150 GFA=5124 : IF B3!=0 THEN A$=SPACE$(8) ELSE GFN!=B3! : GOSUB 17100 : A$=" "
+A$
15155 GOSUB 13300 : GFA=5605 : IF B3!=0 THEN A$=SPACE$(6) : GOSUB 13300 ELSE GOS
UB 17200 : GOSUB 13300
15160 GFBD!=XFBD! : GFBP=XFBP : GOSUB 9700 : RETURN
15200 CGLT=0 : XFL=GFL : B!=GBS! : GOSUB 18800 : GOSUB 27970 : GOSUB 12000 : NFL
=GFL : IF XFL=NFL THEN 15500
15220 GFL=XFL : GOSUB 11000 : B!=GBS! : GOSUB 9800 : GOSUB 9820 : GOSUB 11010 :
GOSUB 12680 : GF$=MKI$(GFX)+MKI$(GFY)+MKI$(0)+MKI$(GFL+4) : CALL GFWRT(GF$)
15250 B!=GBS! : GOSUB 9800 : GOSUB 9820 : GFBP=0 : GFRP=0 : GOSUB 9700 : GFS=GFP
 : GFL=NFL : GOSUB 15800 : GFP=GFS : IF GFOK=0 THEN 10391
15300 B!=GBS! : GOSUB 18800 : GOSUB 27970 : GOSUB 12000 : IF T<3 THEN B!=T/1000
15310 GFMOD=1 : GOSUB 14000 : GOTO 10060
15400 IF B3!=0 THEN 15405 ELSE IF GBS!<>.002 THEN 15405 ELSE IF GFBP<>0 THEN 154
05
15402 IF GFP=GFLP+10 THEN GF$=MKI$(GFX)+MKI$(GFYL) : GOSUB 19100 : B!=.002 : GOS
UB 9800 : GOSUB 9820 : GFBD!=B3! : GFBP=-1 : GOSUB 9700
15405 B!=GBS! : GOSUB 9800 : GOSUB 9820 : GOSUB 12050 : IF GFBD!=0 THEN 15420 EL
SE IF GFBP<>0 THEN 15420 ELSE GFN!=GFBD! : GOSUB 17200
15410 IF GFDA=GFP+GFL*10 THEN GF$=MKI$(GFX)+MKI$(GFYL) : GOSUB 19100 : GFBP=-1 :
 GOSUB 9700
15420 IF GFP<10 THEN 15440 ELSE GFR=GFP-10 : GFQ=18 : GOSUB 19500 : IF GW=0 THEN
 15440
15430 CALL GFWHT : GF$=MKI$(GFX)+MKI$(GFY-1)+MKI$(8)+MKI$(2) : CALL GFSLL(GF$)
15440 GFR=GFP : GFQ=20 : GOSUB 19500 : IF GW>0 THEN CALL GFWHT : GF$=MKI$(GFX)+M
KI$(GFY)+MKI$(2)+MKI$(3) : CALL GFSLL(GF$)
15450 GFMOD=0 : GOTO 10323
15500 GFRS=0 : GFBS=0 : GFSA=GFTA : GFCA=0 : IF B!=Y! THEN GFCA=1 ELSE IF B!=N!
THEN GFCA=0
15505 IF GFRP=0 THEN 15600 ELSE IF T<7 THEN 15550
15510 IF B!=Y! THEN 15550 ELSE IF B!=N! THEN 15550 ELSE IF N!=GFRD! THEN D!=N! :
 GFCA=0 ELSE IF Y!=GFRD! THEN D!=Y! : GFCA=1 ELSE D!=N!
15520 IF D!=GFRD! THEN GFRS=1 : GFRSP=GFRP : GOTO 15600
15550 GOSUB 11010 : B!=GBS! : GOSUB 9800 : GOSUB 9820 : GFRP=0 : GOSUB 9700 : GF
L=NFL
15600 IF GFBP=0 THEN 15700 ELSE IF T=2 THEN D!=B3! : GOTO 15650 ELSE IF T<7 THEN
 15650
```

```
15610 IF GFCA=1 THEN D!=N! ELSE IF N!=GFBD! THEN D!=N! : GFCA=1 ELSE D!=Y! : IF
Y!=GFBD! THEN GFCA=0
15650 IF D!=GFBD! THEN GFBS=1 : GFBSP=GFBP : GOTO 15700
15660 GOSUB 11000 : B!=GBS! : GOSUB 9800 : GOSUB 9820 : GFBP=0 : GOSUB 9700 : GF
L=NFL
15700 B!=GBS! : GOSUB 18800 : GOSUB 27970 : GOSUB 12000 : IF T<3 THEN B!=T/1000
15710 GFMOD=2 : GOSUB 14000 : GOTO 10060
15750 B!=GBS! : GOSUB 9800 : GOSUB 9820
15753 IF T<7 THEN 15760 ELSE IF GFTA=1 THEN 15760 ELSE IF GFCA=0 THEN 15760 ELSE
  IF GFCA=1 THEN 15756 ELSE IF GFSA=0 THEN 15760
15756 GFTA=1 : GFN!=GFBD! : GFBD!=GFRD! : GFRD!=GFN! : GOSUB 12600
15760 IF GFRS=1 THEN GFRP=GFRSP : GF$=MKI$(GFX)+MKI$(GFY)+MKI$(GFT)+MKI$(1) : CA
LL GFSLS(GF$)
15770 IF GFBS=1 THEN GFBP=GFBSP : IF GFBP=-1 THEN GF$=MKI$(GFX)+MKI$(GFYL) : CAL
L GFSTL(GF$) ELSE GF$=MKI$(GFX)+MKI$(GFY)+MKI$(GFT)+MKI$(0) : CALL GFSLS(GF$)
15780 GOSUB 9700 : B3!=0 : B!=.002 : GOSUB 9800 : GOSUB 9790 : IF ASC(MID$(A$,4,
1))>0 THEN GOSUB 9820 : B3!=B!
15790 GOTO 15400
15800 GFOK=0 : GOSUB 9600 : IF B!<>0 THEN 15950
15810 IF GFL=1 THEN 15910 ELSE GFR=GFP : GFQ=7 : GOSUB 19500 : IF GW>0 THEN 1595
0
15820 GFQ=7 : GOSUB 19500 : IF GW>0 THEN 15950
15830 GFP=GFP+10 : GOSUB 9600 : IF B!<>0 THEN 15950
15840 GFR=GFP : GFQ=1 : GOSUB 19500 : IF GW>0 THEN 15950
15850 GFQ=2 : GOSUB 19500 : IF GW>0 THEN 15950
15860 IF GFL=2 THEN 15910 ELSE GFR=GFP : GFQ=7 : GOSUB 19500 : IF GW>0 THEN 1595
0
15870 GFQ=7 : GOSUB 19500 : IF GW>0 THEN 15950
15880 GFP=GFP+10 : GOSUB 9600 : IF B!<>0 THEN 15950
15890 GFR=GFP : GFQ=1 : GOSUB 19500 : IF GW>0 THEN 15950
15900 GFQ=2 : GOSUB 19500 : IF GW>0 THEN 15950
15910 GFOK=1
15950 RETURN
16000 B!=GBS! : GOSUB 9800 : GOSUB 9820 : GOSUB 12050 : GFN!=B! : GOSUB 9660 : A
$=GA$+MKI$(0) : CALL PUTGFB(A$)
16010 B!=0 : GOSUB 9750 : IF GFL>1 THEN GFP=GFP+10 : GOSUB 9750 : IF GFL>2 THEN
GFP=GFP+10 : GOSUB 9750
16020 RETURN
16050 GFEX=(GFP MOD 10) : GFEY=INT(GFP/10)-GFBY : GOSUB 12050 : GFLY=GFEY+GFL-1
: RETURN
16100 GOSUB 16050 : IF GFET=1 THEN IF GFT<>9 THEN GFLY=GFLY-1
16105 IF GFLY<0 THEN 16110 ELSE IF GFLY>3 THEN 16110 ELSE GF$=MKI$(GFEX)+MKI$(GF
EY)+MKI$(GFT)+MKI$(GFET) : CALL GFELS(GF$)
16110 IF GFET=0 THEN GFNX=GFEX : GFNY=GFLY : LPS=8 : I=GFBP : GOTO 16190
16180 I=GFRP : GFNX=GFEX : GFNY=GFEY : LPS=6 : IF GFT=11 THEN LPS=9 ELSE IF GFT=
13 THEN GFNY=GFNY+1
16190 GL$=MKI$(I)+SPACE$(95) : CALL GETGFS(GL$) : GFLN=ASC(MID$(GL$,3,1))-1 : GF
NL$=MID$(GL$,4,GFLN)
16195 GFEP=(GFNY+GFBY)*10+GFNX : GFEL=LPS
16200 IF LEN(GFNL$)=0 THEN RETURN
16205 IF LPS=5 THEN GOSUB 9895
16210 IF ((GFNY+GFBY)*10+GFNX)=GFEP THEN IF LPS=GFEL THEN GFD$=LEFT$(GFNL$,1) :
IF GFD$="C" THEN GFNL$="" ELSE GFEP=CVI(MID$(GFNL$,2,2)) : GFEL=ASC(MID$(GFNL$,4
,1)) : GFNL$=RIGHT$(GFNL$,LEN(GFNL$)-4)
16220 IF GFD$="D" THEN GOSUB 19810 : GL$=GL$+MKI$(5) : GOTO 16270
16230 IF GFD$="U" THEN GOSUB 19800 : GL$=GL$+MKI$(5) : GOTO 16270
16240 IF GFD$="L" THEN GOSUB 19830 : GL$=GL$+MKI$(4) : GOTO 16270
16250 IF GFD$="R" THEN GOSUB 19820 : GL$=GL$+MKI$(4) : GOTO 16270
16260 GOSUB 19850 : GFQ=20 : GL$=GL$+MKI$(6)
16270 GOSUB 19450 : IF GW=0 THEN GOSUB 19300
16275 GOTO 16200
17000 IF J=0 THEN A$=MID$(K1$(I),2,15) : GOTO 17040
17010 A$="" : IF C(I)>8 THEN A$="NOT "
17020 IF (C(I) MOD 8)=3 THEN A$=A$+"DONE " ELSE A$=A$+"ON "
17030 IF C1(I)=208 THEN A$=A$+"AND" ELSE IF C1(I)=224 THEN A$=A$+"OR"
17040 IF RIGHT$(A$,1)=" " THEN A$=LEFT$(A$,LEN(A$)-1) : GOTO 17040
17050 IF LEN(A$)>0 THEN I1=0 : GOTO 17070 ELSE I1=1 : A$=K$(I) : IF C(I)>8 THEN
A$=RIGHT$(A$,LEN(A$)-4)
17060 J1=INSTR(A$," ") : IF J1>0 THEN A$=LEFT$(A$,J1-1)
17070 IF T<>1 THEN J1=(P4-LEN(A$))/2 : IF J1>0 THEN A$=SPACE$(J1)+A$
17080 IF T<>1 THEN IF LEN(A$)<P4 THEN A$=A$+" " : GOTO 17080
17090 RETURN
17100 A$=SPACE$(7) : IF GFN!>.002 THEN 17105 ELSE IF GFN!=.001 THEN A$=" FREEZE"
  ELSE IF GFN!=.002 THEN A$=" ENABLE"
17102 RETURN
```

```
17105 A$=STR$(GFN!) : J1=INSTR(1,A$,".") : IF J1=0 THEN A$=A$+".00" :GOTO 17130
17110 IF (J1+2)>LEN(A$) THEN A$=A$+"0" : GOTO 17110
17120 IF (J1+2)<LEN(A$) THEN A$=LEFT$(A$,LEN(A$)-1) : GOTO 17120
17130 IF J1=2 THEN MID$(A$,1,1)="0"
17140 A$=RIGHT$(SPACE$(4)+A$,7) : RETURN
17150 GFN!=8! : GOSUB 17100 : GOSUB 13100 : RETURN
17160 IF GFL=1 THEN GFA=5124 ELSE IF GFL=2 THEN GFA=11524 ELSE GFA=17924
17170 GFN!=0! : GOSUB 17100 : A$=" "+A$ : GOSUB 13200 : GFA=GFA+481 : GOSUB 17220
 : GOSUB 13200 : RETURN
17200 GFDA=-1 : IF GFN!=0 THEN 17250
17205 GOSUB 9780 : IF ASC(MID$(A$,4,1))=0 THEN 17250
17210 GFDA=CVI(MID$(A$,5,2)) : GFDX=GFDA MOD 10 : GFDY=INT(GFDA/10)
17220 A$=STR$(GFDY) : MID$(A$,1,1)=CHR$(GFDX+65) : A$=" "+A$ : IF LEN(A$)<5 THEN
 A$=" "+A$
17230 IF LEN(A$)<6 THEN A$=A$+" " : GOTO 17230
17240 RETURN
17250 A$=" UNDEF" : RETURN
18000 GOSUB 14000 : GFDY=GFBY+GFY : GFDX=GFX : GOSUB 17220
18005 GM$=A$+" " : CALL GFPOS(GM$) : GOTO 18020
18010 BEEP
18020 A$=INKEY$ : IF A$<>"" THEN 18020 ELSE F=0
18025 A$=INKEY$ : IF A$="" THEN 18025 ELSE IF LEN(A$)=2 THEN A=ASC(MID$(A$,2,1))
 ELSE 18010
18030 IF A=72 THEN IF GFDY>0 THEN GOSUB 14000 : GFY=GFY-1 : GOTO 18100
18040 IF A=80 THEN IF GFDY<3276 THEN GOSUB 14000 : GFY=GFY+1 :GOTO 18100
18050 IF A=77 THEN IF GFX<4 THEN GOSUB 14000 : GFX=GFX+1 : GOTO 18100
18060 IF A=75 THEN IF GFX>0 THEN GOSUB 14000 : GFX=GFX-1 : GOTO 18100
18062 IF A=73 THEN 18400
18064 IF A=81 THEN 18410
18066 IF A=71 THEN 18420
18068 IF A=79 THEN 18430
18070 IF A=59 THEN F=1 : GOTO 18100
18071 IF A=60 THEN F=2 : GOTO 18100
18072 IF A=61 THEN F=3 : GOTO 18100
18073 IF A=62 THEN F=4 : GOTO 18100
18075 IF A=64 THEN F=6 : GOTO 18100
18078 IF A=66 THEN 18500
18080 IF A=68 THEN F=10 : GOTO 18100
18090 GOTO 18010
18100 IF CGLT=0 THEN IF F=0 THEN 18000 ELSE RETURN
18105 GFT=0 : GL=0 : GOSUB 9830
18110 GFP=(GFY+GFBY)*10+GFX : GFS=GFP : GOSUB 9600 : IF B!>0 THEN GOSUB 9800 : G
OSUB 9820
18115 IF GFP=GFS THEN GOSUB 12050 : GFYL=GFY+GFL-1 : RETURN
18120 IF A=80 THEN GFY=GFY+1 ELSE GFY=GFY-1
18130 GOTO 18100
18400 IF GFBY=0 THEN 18010 ELSE IF GFBY<4 THEN 18420 ELSE GFBY=GFBY-4 : GOTO 184
40
18410 IF GFBY=3273 THEN 18010 ELSE IF GFBY>3269 THEN GFBY=3273 : GOTO 18440 ELSE
 GFBY=GFBY+4 : GOTO 18440
18420 IF (GFBY=0) AND (GFX=0) AND (GFY=0) THEN 18010 ELSE GFBY=0 : GOTO 18440
18430 A$=MKI$(0) : CALL GETLST(A$) : MGFY=INT(CVI(A$))/10 : GFBY=MGFY-3 : IF GF
BY<0 THEN GFBY=0
18440 GOSUB 18600 : GFX=0 : GFY=0 : GOTO 18100
18490 A$=MKI$(2) : CALL GFCLR(A$) : A=1780 : A$="PRESS 'F10' TO EXIT NUMBER ENTR
Y" : GOSUB 9980
18495 A=340 : A$="PLEASE ENTER BLOCK/CELL NUMBER:" : GOSUB 9980 : RETURN
18500 GOSUB 18490 : GEP=0 : GOTO 18510
18505 BEEP
18510 C$=INKEY$ : IF C$="" THEN 18510 ELSE IF LEN(C$)=1 THEN C=ASC(C$) ELSE IF A
SC(MID$(C$,2,1))=68 THEN GEP=0 : GOTO 18538 ELSE 18505
18512 IF GEP=0 THEN GOSUB 18490 : G$=MKI$(357)+MKI$(7)+SPACE$(7)
18515 IF C=8 THEN IF GEP>0 THEN 18537
18520 IF C=13 THEN 18538
18525 IF GEP=7 THEN 18505
18527 IF C=46 THEN 18535 ELSE IF C<48 THEN 18505 ELSE IF C<58 THEN 18535
18530 IF C<65 THEN 18505 ELSE IF C>90 THEN IF C<97 THEN 18505
18533 IF C>122 THEN 18505 ELSE IF C>96 THEN C=C-32 : C$=CHR$(C)
18535 GEP=GEP+1 : MID$(G$,GEP+4,1)=C$ : CALL GFMSG(G$) : GOTO 18510
18537 MID$(G$,GEP+4,1)=" " : GEP=GEP-1 : GOSUB 18490 : CALL GFMSG(G$) : GOTO 185
10
18538 IF GFDS=1 THEN CALL GFSRR(GS$) : GFDS=0
18540 IF GEP>0 THEN 18542 ELSE IF CGLT=0 THEN GOSUB 9970:GOSUB 9975: GOSUB 9973
18541 GOSUB 14000 : F=0 : GOTO 18100
18542 A=ASC(MID$(G$,5,1)) : IF A>57 THEN 18550 ELSE GFN!=VAL(MID$(G$,5,7)) : IF
GFN!=>10000 THEN 18580
```

```
18545 GOSUB 17200 : IF GFDA<0 THEN 18580 ELSE GOSUB 14000 : GFX=GFDX : GEBY=GFDY
 : GEY=0 : GOTO 18570
18550 IF MID$(G$,5,6)="FREEZE" THEN GFN!=.001 : GOTO 18545
18555 IF MID$(G$,5,6)="ENABLE" THEN GFN!=.002 : GOTO 18545
18557 IF A>64 THEN IF A<70 THEN GEX=A-65 ELSE 18580
18560 A=ASC(MID$(G$,6,1)) : IF A=46 THEN 18580 ELSE IF A>57 THEN 18580
18562 GEY=VAL(MID$(G$,6,4)) : IF GEY>3276 THEN GOTO 18580
18565 GOSUB 14000 : GFX=GEX : IF GEY>3273 THEN GEY=GEY-3273 : GEBY=3273 ELSE GEB
Y=GEY : GEY=0
18570 IF CGLT=0 THEN GOSUB 9970 : GOSUB 9975 : GOSUB 9978
18572 IF (GEBY+GEY)<GFBY THEN 18575 ELSE IF (GEBY+GEY)>GFBY+3 THEN 18575
18573 GFY=GEBY+GEY-GFBY : F=0 : GOTO 18100
18575 GFBY=GEBY : GFY=GEY : GOSUB 18600 : F=0 : GOTO 18100
18580 GOSUB 18490 : GEP=0 : GM$=MKI$(825)+MKI$(18)+"INVALID  OR  UNDEF" : CALL G
FMSG(GM$) : BEEP : BEEP : GOTO 18510
18600 GM$=MKI$(1) : CALL GFCLR(GM$) : FOR GFEY=0 TO 3 : GOSUB 18700 : NEXT GFEY
18610 IF CGLT=0 THEN B!=GBS! : GOSUB 18800 : GOSUB 27970 : GOSUB 12000
18620 RETURN
18700 FOR GFEX=0 TO 4 : GFP=(GFBY+GFEY)*10+GFEX : GFS=GFP : GOSUB 9600 : IF B!<=
0 THEN 18748 ELSE GOSUB 9800 : GOSUB 9820
18710 GOSUB 18800:GOSUB 27970:GOSUB 12000:GOSUB 12105 :IF T<3 THEN B!=T/1000
18720 GFZ1=(GFS-GFP)/10 : GFZ2=1 : IF GFZ1=GFL-1 THEN GFZ2=5
18730 GF$=MKI$(GFEX)+MKI$(GFEY)+MKI$(GFZ1)+MKI$(GFZ2) : CALL GFWRT(GF$)
18732 IF GFT=9 THEN 18734 ELSE IF GFT=11 THEN 18734 ELSE IF GFT<>13 THEN 18740
18734 IF GFTA=0 THEN 18740 ELSE GFSX=GFX : GFSY=GFY : GFX=GFEX : GFY=GFEY-GFZ1
18736 GFN!=GFBD! :GFBD!=GFRD! : GFRD!=GFN! : GOSUB 12600 : GFX=GFSX : GFY=GFSY
18740 GF$=MKI$(GFEX)+MKI$(GFEY) : IF GFBP=-1 THEN IF GFZ1=GFL-1 THEN CALL GFSTL(
GF$)
18741 IF B!=GBS! THEN IF GDS!>0 THEN IF XD=0 THEN IF GFZ1=GFL-1 THEN CALL GFRED
 : GF$=LEFT$(GF$,4)+MKI$(0)+MKI$(0) : CALL GFSLS(GF$)
18742 CALL GFWHT : IF GFBP<>0 THEN IF GFZ1=GFL-1 THEN GF$=LEFT$(GF$,4)+MKI$(0)+MK
I$(0) : CALL GFSLS(GF$)
18743 IF B!=GBS! THEN IF GDS!>0 THEN IF XD=1 THEN CALL GFRED :IF GFT=9 THEN 1874
6 ELSE IF GFT=11 THEN 18745 ELSE IF GFT=13 THEN IF GFZ1=1 THEN 18746 ELSE 18748
18744 IF GFRP=0 THEN 18748 ELSE IF GFT=9 THEN 18746 ELSE IF GFT=13 THEN IF GFZ1=
1 THEN 18746 ELSE 18748
18745 GF$=LEFT$(GF$,4)+MKI$(GFZ1) : CALL GFSLP(GF$) : GOTO 18748
18746 GF$=LEFT$(GF$,4)+MKI$(9)+MKI$(1) : CALL GFSLS(GF$)
18748 FOR I=1 TO 19 : GQ$=MKI$((GFBY+GFEY)*10+GFEX)+CHR$(I)+MKI$(0) : GOSUB 1955
0
18749 IF I>10 THEN J=I-10 : K=2 ELSE J=I : K=1
18750 IF GR>0 THEN CALL GFRED : GOSUB 18790 : CALL GFWHT : GOTO 18754
18752 IF GW>0 THEN CALL GFWHT : GOSUB 18790
18754 NEXT I : GQ$=MKI$((GFBY+GFEY)*10+GFEX)+CHR$(20)+MKI$(0) : GOSUB 19550
18762 IF GW>0 THEN J=2 : K=3 : CALL GFWHT : GOSUB 18790
18770 NEXT GFEX : RETURN
18790 GF$=MKI$(GFEX)+MKI$(GFEY)+MKI$(J)+MKI$(K+256*GD) : CALL GFSLL(GF$) : RETUR
N
18800 IF B!=.001 THEN B$=MKI$(0)+CHR$(1)+SPACE$(32) : CALL GETBLK(B$) : RETURN
18810 IF B!=.002 THEN B$=MKI$(0)+CHR$(2)+SPACE$(32) : CALL GETBLK(B$) : RETURN
18820 GOSUB 27950 : RETURN
19000 GFR=(CVI(MID$(GF$,3,2))+GFBY)*10+CVI(MID$(GF$,1,2)) : RETURN
19100 GOSUB 19000 : GFQ=18 : GOSUB 19400 : GFR=GFR+10 : GFQ=20 : GOSUB 19400 : G
FR=GFR-10
19110 IF INT(GFR/10)=>GFBY THEN IF INT(GFR/10)<GFBY+4 THEN CALL GFWHT : CALL GFS
TL(GF$)
19120 RETURN
19200 GOSUB 19000 : IF INT(GFR/10)=>GFBY THEN IF INT(GFR/10)<GFBY+4 THEN CALL GF
UNL(GF$)
19205 GFQ=18 :GOSUB 19450 :IF GW>0 THEN GL$=GF$+MKI$(8)+MKI$(2) :GOSUB 19300
19210 GFR=GFR+10 : GFQ=20 : GOSUB 19450 : IF GW>0 THEN GL$=LEFT$(GF$,2)+MKI$(INT
(GFR/10)-GFBY)+MKI$(2)+MKI$(3) : GOSUB 19300
19220 RETURN
19300 IF INT(GFR/10)=>GFBY THEN IF INT(GFR/10)<GFBY+4 THEN CALL GFWHT : CALL GFS
LL(GL$)
19305 RETURN
19400 GOSUB 19500 : GW=GW+1 : GR=0 : GOSUB 19600 : RETURN
19450 GOSUB 19500 : GW=GW-1 : GOSUB 19600 : RETURN
19500 GQ$=MKI$(GFR)+CHR$(GFQ)+MKI$(0)
19550 CALL GETGFL(GQ$) : GR=CVI(MID$(GQ$,4,2)) : GW=INT(GR/4) : GD=(GR MOD 2) :
GR=INT((GR MOD 4)/2) : RETURN
19600 GR=GW*4+GR*2+GD : IF GR=GD THEN GR=0
19610 MID$(GQ$,4,2)=MKI$(GR) : CALL PUTGFL(GQ$) : RETURN
19750 GFNL$=LEFT$(GFLN$,1) : CALL GFWHT : GFY=GFY+GFSB-GFBY : GFT=GFST : IF GFY=
>0 THEN IF GFY<4 THEN GF$=MKI$(GFX)+MKI$(GFY)+MKI$(GFT)+MKI$(XD) : CALL GFSLS(GF
$)
```

```
19752 GFNX=GFX : GOSUB 12050 : IF XD=0 THEN LPS=8 : GFNY=GFY+GFL-1 ELSE LPS=6 :
GFNY=GFY : IF GFT=11 THEN LPS=9 ELSE IF GFT=13 THEN GFNY=GFNY+1
19755 IF LEN(GFLN$)=0 THEN RETURN
19760 GFD$=LEFT$(GFLN$,1) : GFLN$=RIGHT$(GFLN$,LEN(GFLN$)-1) : IF GFD$<>RIGHT$(G
FNL$,1) THEN GFNL$=GFNL$+MKI$((GFNY+GFBY)*10+GFNX)+CHR$(LPS)+GFD$
19762 IF GFD$="U" THEN 19765 ELSE IF GFD$="D" THEN 19770 ELSE IF GFD$="R" THEN 1
9775 ELSE IF GFD$="L" THEN 19780 ELSE 19785
19765 GOSUB 19800 : GL$=GL$+MKI$(258) : GOTO 19790
19770 GOSUB 19810 : GL$=GL$+MKI$(2) : GOTO 19790
19775 GOSUB 19820 : GL$=GL$+MKI$(1) : GOTO 19790
19780 GOSUB 19830 : GL$=GL$+MKI$(257) : GOTO 19790
19785 GOSUB 19850 : GFQ=20 : GL$=GL$+MKI$(3)
19790 GOSUB 19400 : GOSUB 19300 : GOTO 19755
19800 IF LPS<4 THEN LPS=LPS+6 : GFNY=GFNY-1 ELSE LPS=LPS-3
19805 GOSUB 19850 : GFQ=LPS+10 : RETURN
19810 GOSUB 19850:GFQ=LPS+10:IF LPS>6 THEN LPS=LPS-6:GFNY=GFNY+1 ELSE LPS=LPS-3
19815 RETURN
19820 GOSUB 19850 : GFQ=LPS : IF (LPS MOD 3)=0 THEN LPS=LPS-2 : GFNX=GFNX+1 ELSE
 LPS=LPS+1
19825 RETURN
19830 IF (LPS MOD 3)=1 THEN LPS=LPS+2 : GFNX=GFNX-1 ELSE LPS=LPS-1
19835 GOSUB 19850 : GFQ=LPS : RETURN
19850 GL$=MKI$(GFNX)+MKI$(GFNY)+MKI$(LPS)
19855 GFR=(GFBY+GFNY)*10+GFNX : RETURN
19860 GOSUB 19855 : IF LPS<4 THEN GFQ=LPS+16 : GFR=GFR-10 ELSE GFQ=LPS+7
19865 RETURN
19870 GOSUB 19855 : GFQ=LPS+10 : RETURN
19880 GOSUB 19855 : GFQ=LPS : RETURN
19890 GOSUB 19855 : IF (LPS MOD 3)=1 THEN GFQ=LPS+2 : GFR=GFR-1 ELSE GFQ=LPS-1
19895 RETURN
27300 LINE (278,10)-(640,200),0,BF : RETURN
27950 B$=MKI$(INT(B!))+CHR$(CINT((B!-INT(B!))*100)+10)+SPACE$(32) : CALL GETBLK(
B$) : RETURN
27960 B!=CVI(MID$(B$,1,2))+(ASC(MID$(B$,3,1))-10)/100 : RETURN
27970 GOSUB 27960
27980 L=ASC(MID$(B$,4,1)) : T=ASC(MID$(B$,5,1))
27990 IF T<1 OR T>2 THEN IF L>2 THEN EN=CVI(MID$(B$,L+2,2))
28000 ON T GOTO 28020,28020,28050,28090,28170,28210,28240,28260,28260,28260
28010 RETURN
28020 IF G=0 THEN IF T=1 THEN GOSUB 28410 ELSE GOSUB 28430
28030 IF L=2 THEN C(1)=255 : D(1)=HIO : C(1)=0 : K=1 : KK=1 : AGF=1 : IF G=0 TH
EN LOCATE 14,67 : PRINT "NO CRITERIA" : RETURN ELSE RETURN
28040 KK=(L-2)/3 : FOR I=1 TO KK : GOSUB 28750 : GOSUB 28640 : NEXT I : K=1 : AG
F=1 : RETURN
28050 IF G=0 THEN GOSUB 28450 : LOCATE 4,54 : PRINT "CONTROL BLOCK"
28060 KK=(L-7)/3 : IF (G>0) OR (KK=1) THEN 28080 ELSE FOR J=2 TO KK
28070 I=J*16+36 : LINE (475,I)-(475,I+16),0 : LINE (575,I)-(575,I+16) : LINE -(3
75,I+16) : LINE -(375,I) : NEXT J
28080 FOR I=1 TO KK : GOSUB 28750 : GOSUB 28760 : NEXT I : K=1 : AGF=1 : GOTO 28
300
28090 IF G=0 THEN GOSUB 28460 : LOCATE 4,55 : PRINT "MOVE  BLOCK"
28100 K=1 : I=ASC(MID$(B$,6,1)) : C(4)=I MOD 16 : C(1)=(I-C(4))/16
28110 D(1)=CVI(MID$(B$,7,2)) : J=9 : IF C(1)<>1 THEN D(3)=HIO ELSE D(3)=CVI(MID$
(B$,J,2)) : J=J+2
28120 IF C(1)=8 THEN D(2)=0
28130 I=1 : GOSUB 28960 : IF C(1)=1 THEN I=3 : C(3)=1 : GOSUB 28960 : IF G=0 THE
N LOCATE 9,74 : PRINT "THRU"
28140 D(4)=CVI(MID$(B$,J,2)) : J=J+2 : IF C(4)<>7 THEN D(6)=HIO ELSE D(6)=CVI(MI
D$(B$,J,2))
28150 I=4 : GOSUB 28960 : IF C(4)=7 THEN I=6 : C(6)=7 : GOSUB 28960 : IF G=0 THE
N LOCATE 12,74 : PRINT "THRU"
28160 GOTO 28300
28170 IF G=0 THEN GOSUB 28450 : LOCATE 4,55 : PRINT "WAIT  BLOCK" : LOCATE 8,49
 : PRINT "WAIT";
28180 X!=CVI(MID$(B$,6,2))+ASC(MID$(B$,8,1))/100
28190 IF G=0 THEN LOCATE 8,55 : PRINT USING "####.## SECONDS";X!;
28200 GOTO 28300
28210 IF G=0 THEN GOSUB 28450 : LOCATE 4,55 : PRINT "EXIT  BLOCK" : LOCATE 8,49
 : PRINT "EXIT FLOWCHARTS";
28220 FE=CVI(MID$(B$,6,2)) : IF G=0 THEN LOCATE 8,68 : PRINT USING "###";FE;
28230 GOTO 28300
28240 IF G=0 THEN GOSUB 28480 : LOCATE 4,53 : PRINT "DECISION BLOCK";
28250 KK=(L-10)/3 : FOR I=1 TO KK : GOSUB 28750 : GOSUB 28640 : NEXT I : K=1 : A
GF=1 : GOTO 28320
28260 IF G=0 THEN GOSUB 28480 : LOCATE 4,53 : PRINT "COMPARE BLOCK";
```

```
28270 K=1 : I=ASC(MID$(B$,6,1)) : C(3)=I MOD 16 : C(1)=(I-C(3))/16 : C1(2)=T-2
28280 D(1)=CVI(MID$(B$,7,2)) : D(2)=0 : D(3)=CVI(MID$(B$,9,2))
28290 I=1 : GOSUB 28960 : I=2 : GOSUB 29050 : I=3 : GOSUB 28960 : GOTO 28320
28300 D!=CVI(MID$(B$,L-1,2))+(ASC(MID$(B$,L+1,1))-10)/100 : OY!=D! : OZ!=0 : IF
G=0 THEN LOCATE 24,56 : PRINT USING "####.##";D!;
28310 RETURN
28320 Y!=CVI(MID$(B$,L-4,2))+(ASC(MID$(B$,L-2,1))-10)/100 : OY!=Y!
28330 N!=CVI(MID$(B$,L-1,2))+(ASC(MID$(B$,L+1,1))-10)/100 : OZ!=N!
28340 IF G>0 THEN RETURN
28350 GOSUB 28390 : LOCATE 11,67 : PRINT "NO " : LOCATE 16,57 : PRINT "YES" : LO
CATE 12,73 : PRINT SPACE$(7); : LOCATE 24,56 : PRINT SPACE$(7);
28360 IF Y!>0 THEN IF Y!<>B! THEN LOCATE 24,56 : PRINT USING "####.##";Y!; : ELS
E LOCATE 11,67 : PRINT "YES" : LOCATE 16,57 : PRINT "NO "; : GOSUB 28400
28370 IF N!=0 THEN RETURN ELSE IF N!=B! THEN GOSUB 28400 : RETURN ELSE IF Y!=B!
THEN LOCATE 24,56 : ELSE LOCATE 12,73
28380 PRINT USING "####.##";N!; : RETURN
28390 LINE (575,92)-(575,44),0 : LINE -(477,44),0 : LINE -(485,40),0 : LINE (477
,44)-(485,48),0 : LINE (575,92)-(567,88) : LINE (575,92)-(567,96) : RETURN
28400 LINE (575,92)-(567,88),0 : LINE (575,92)-(567,96),0 : LINE (575,92)-(575,4
4) : LINE -(477,44) : LINE -(485,40) : LINE (477,44)-(485,48) : RETURN
28410 GOSUB 27300 : LINE (440,52)-(510,52) : LINE -(530,62) : LINE -(530,82): LI
NE -(510,92) : LINE -(440,92) : LINE -(420,82) : LINE -(420,62) : LINE -(440,52)
28420 LOCATE 4,53 : PRINT "FREEZE CRITERIA" : LOCATE 9,56 : PRINT " H A L T " :
RETURN
28430 GOSUB 27300 : LINE (420,52)-(530,52) : CIRCLE (530,72),48,,4.7124,1.5708 :
 LINE (530,92)-(420,92) : CIRCLE (420,72),48,,1.5708,4.7124 : LINE (475,92)-(475
,180) : LINE -(467,172) : LINE (475,180)-(483,172)
28440 LOCATE 4,53 : PRINT "ENABLE CRITERIA" : LOCATE 9,56 : PRINT "POWER  ON" :
RETURN
28450 GOSUB 27300 : LINE (475,34)-(475,52) : LINE (375,52)-(575,52) : LINE -(575
,68) : LINE -(375,68) : LINE -(375,52) : LINE (475,68)-(475,180) : LINE -(467,17
2) : LINE (475,180)-(483,172) : GOSUB 28500 : RETURN
28460 GOSUB 27300 : LINE (475,34)-(475,52) : LINE (375,52)-(575,52) : LINE -(575
,108) : LINE -(375,108) : LINE -(375,52) : LINE (475,108)-(475,180) : LINE -(467
,172) : LINE (475,180)-(483,172) : GOSUB 28500
28470 LOCATE 8,49 : PRINT "MOVE"; : LOCATE 11,49 : PRINT "TO"; : RETURN
28480 GOSUB 27300 : LINE (475,34)-(475,64) : LINE -(425,92) : LINE -(475,120) :
LINE -(525,92) : LINE -(475,64) : LINE (475,120)-(475,180) : LINE -(467,172) : L
INE (475,180)-(483,172)
28490 LINE (525,92)-(575,92) : LINE-(567,88) : LINE (575,92)-(567,96) : LOCATE 2
,61 : PRINT USING "####.##";B!; : LOCATE 11,67 : PRINT "NO"; : LOCATE 16,57 : PR
INT "YES"; : RETURN
28500 LOCATE 6,61 : PRINT USING "####.##";B!; : RETURN
28510 IF C(I)=0 THEN IF D(I)<HIO THEN K$(I)=" -"
28520 IF C(I)=1 THEN K$(I)="I-"
28530 IF C(I)=2 THEN K$(I)="F-"
28540 IF C(I)=3 THEN K$(I)="T-"
28550 IF C(I)=4 THEN K$(I)="K-"
28560 IF C(I)=5 THEN K$(I)="C-"
28570 IF C(I)=6 THEN K$(I)="R-"
28580 IF C(I)=7 THEN K$(I)="O-"
28590 IF C(I)=9 THEN K$(I)="NOT I-"
28600 IF C(I)=10 THEN K$(I)="NOT F-"
28610 IF C(I)=11 THEN K$(I)="NOT T-"
28620 IF D(I)<>HIO THEN N$=STR$(D(I)):K$(I)=K$(I)+RIGHT$(N$,LEN(N$)-1)
28630 RETURN
28640 K$(I)="" : K1$(I)=SPACE$(17) : GOSUB 28510
28650 IF D(I)=HIO THEN 28720
28660 LT=C(I) MOD 8 : IF LT=4 THEN L$="FUNCTION KEY"+STR$(D(I)) : GOSUB 29120 EL
SE LN=D(I) : GOSUB 29110
28670 K1$(I)="("+L$+")"
28680 IF C1(I)<192 THEN 28720
28690 IF C1(I)<208 THEN IF G=0 THEN K$(I)=K$(I)+" end" : GOTO 28720 ELSE 28720
28700 IF C1(I)<224 THEN K$(I)=K$(I)+" AND" : GOTO 28720
28710 K$(I)=K$(I)+" OR"
28720 IF LEN(K$(I))=13 THEN 28730 ELSE K$(I)=K$(I)+" " : GOTO 28720
28730 IF G=0 THEN LOCATE 13+I,38 : PRINT K1$(I); : LOCATE 13+I,67 : PRINT K$(I)
28740 RETURN
28750 C1(I)=ASC(MID$(B$,3+I*3,1)) : C(I)=C1(I) MOD 16 : C1(I)=C1(I)-C(I) : D(I)=
CVI(MID$(B$,4+I*3,2)) : RETURN
28760 K1$(I)="" : K$(I)="" : GOSUB 28510
28770 IF C(I)=3 THEN 28820 ELSE IF C(I)=5 THEN 28860
28780 IF C1(I)=144 THEN K1$(I)="T.ON    "
28790 IF C1(I)=160 THEN K1$(I)="T.OFF   "
28800 IF C1(I)=176 THEN K1$(I)="P.ON    "
28810 GOTO 28890
```

```
28820 IF C1(I)=144 THEN K1$(I)="START  "
28830 IF C1(I)=160 THEN K1$(I)="STOP   "
28840 IF C1(I)=176 THEN K1$(I)="RESET  "
28850 GOTO 28890
28860 IF C1(I)=144 THEN K1$(I)="INCR   "
28870 IF C1(I)=160 THEN K1$(I)="DECR   "
28880 IF C1(I)=176 THEN K1$(I)="CLEAR  "
28890 IF D(I)=HIO THEN 28920
28900 LT=C(I) : IF LT=7 THEN LT=4
28910 LN=D(I) : GOSUB 29110 : K1$(I)=K1$(I)+L$
28920 IF LEN(K1$(I))=23 THEN 28930 ELSE K1$(I)=K1$(I)+" " : GOTO 28920
28930 IF LEN(K$(I))=5 THEN 28940 ELSE K$(I)=K$(I)+" " : GOTO 28930
28940 IF G=0 THEN LOCATE I*2+6,49 :PRINT K1$(I); :LOCATE I*2+6,74 :PRINT K$(I);
28950 RETURN
28960 K$(I)="" : K1$(I)=SPACE$(15) : GOSUB 28510
28970 IF C(I)=8 THEN K1$(I)="FIXED VALUE    " : IF D(2)<HIO THEN N$=STR$(D(I)) : K$(I)=RIGHT$(N$,LEN(N$)-1)
28980 IF D(I)=HIO THEN 29010
28990 LT=C(I) : IF LT=7 THEN LT=4 ELSE IF LT=8 THEN 29010
29000 LN=D(I) : GOSUB 29110 : K1$(I)=L$
29010 IF T>7 THEN K1$(I)="("+K1$(I)+")"
29020 IF LEN(K$(I))=5 THEN 29030 ELSE K$(I)=K$(I)+" " : GOTO 29020
29030 IF T>7 THEN 28730 ELSE IF G=0 THEN LOCATE 7+I,56 :PRINT K1$(I); :LOCATE 7+I,74 : PRINT K$(I);
29040 RETURN
29050 K$(I)="" : K1$(I)=SPACE$(17)
29060 IF C1(I)=0 THEN K$(I)="=" : K1$(I)="(EQUAL TO     )"
29070 IF C1(I)=1 THEN K$(I)="<" : K1$(I)="(LESS THAN    )"
29080 IF C1(I)=2 THEN K$(I)=">" : K1$(I)="(GREATER THAN )"
29090 IF G=0 THEN LOCATE 15,38 : PRINT K1$(I); : LOCATE 15,68 : PRINT K$(I)
29100 RETURN
29110 L$=MKI$(LT)+MKI$(LN)+SPACE$(16) : CALL GETLBL(L$) : L$=MID$(L$,6,ASC(MID$(L$,5,1)))
29120 IF LEN(L$)=15 THEN RETURN ELSE L$=L$+" " : GOTO 29120
30000 B=GMF : END SUB
37300 SUB FLOKEY(F) STATIC
37310 IF F=1 THEN GOSUB 37330 : GOTO 37500
37315 IF F=2 THEN GOSUB 37340 : GOTO 37500
37320 IF F=3 THEN GOSUB 37350 : GOTO 37500
37325 IF F=4 THEN GOSUB 37360 : GOTO 37500 ELSE 37500
37330 GOSUB 37350 : IF F>10 THEN BEEP : GOTO 37330 ELSE RETURN
37340 GOSUB 37360 : IF F>10 THEN BEEP : GOTO 37340 ELSE RETURN
37350 A$=INKEY$ : IF LEN(A$)>0 THEN 37350
37360 F=0 : A$=INKEY$ : IF LEN(A$)=0 THEN 37360
37370 IF A$=CHR$(0)+CHR$(59) THEN F=1
37380 IF A$=CHR$(0)+CHR$(60) THEN F=2
37390 IF A$=CHR$(0)+CHR$(61) THEN F=3
37400 IF A$=CHR$(0)+CHR$(62) THEN F=4
37410 IF A$=CHR$(0)+CHR$(63) THEN F=5
37420 IF A$=CHR$(0)+CHR$(64) THEN F=6
37430 IF A$=CHR$(0)+CHR$(65) THEN F=7
37440 IF A$=CHR$(0)+CHR$(66) THEN F=8
37450 IF A$=CHR$(0)+CHR$(67) THEN F=9
37460 IF A$=CHR$(0)+CHR$(68) THEN F=10
37470 IF A$=CHR$(9) THEN F=11
37480 IF A$=CHR$(0)+CHR$(15) THEN F=12
37490 IF F>0 THEN RETURN ELSE BEEP : GOTO 37360
37500 END SUB
```

DATA STORAGE ROUTINES FOR EDITOR & COMPILER

```
FPACS    SEGMENT PARA PUBLIC 'CODE'      ; PARMEND   AT   49176
;                                         ;
;        ASSUME CS:FPACS,DS:FPACS          BLKSEG    DW 1 DUP (0)
;                                          BLKLEN    DW 1 DUP (49200)
LBLSEG   DW 1 DUP (0)                      ;
;                                         ; PARMSEG   AT   0
; PARMSEG   AT   0                        ; PARMADR   AT   2
; PARMADR   AT   2                        ; PARMLST   AT   4
; PARMHLD   AT   4                        ; PARMHLD   AT   8
; PARMDAT   AT   24                       ; PARMCNT   AT   48
```

```
;   PARMNDX AT    50
;   PARMFRE AT 10053
;   PARMDAT AT 10055
;   PARMEND AT  ?
;
;
            PUBLIC  CHKMEM
CHKMEM      PROC    FAR
            RET     2
CHKMEM      ENDP
;
            PUBLIC  PUTLBL
PUTLBL      PROC    FAR
;
            PUSH    BP
            MOV     BP,SP
            CALL    HLDLBL
            MOV     SI,4
            MOV     AX,[SI]
            CMP     AX,0
            JE      PUTLBL1
            CALL    GETADR
            MOV     DI,AX
            MOV     SI,8
            MOV     CX,16
            REP     MOVSB
            JMP     PUTLBL2
PUTLBL1:    SUB     AX,AX
            MOV     DI,24
            MOV     CX,49176
            SUB     CX,DI
            REP     STOSB
PUTLBL2:    MOV     SI,0
            MOV     AX,[SI]
            MOV     DS,AX
            MOV     ES,AX
            POP     BP
            RET     2
PUTLBL      ENDP
;
            PUBLIC  GETLBL
GETLBL      PROC    FAR
            PUSH    BP
            MOV     BP,SP
            CALL    HLDLBL
            MOV     SI,4
            MOV     AX,[SI]
            CALL    GETADR
            MOV     SI,AX
            MOV     DI,8
            MOV     CX,16
            REP     MOVSB
            MOV     SI,0
            MOV     ES,[SI]
            MOV     DI,2[SI]
            MOV     SI,4
            MOV     CX,20
            REP     MOVSB
            PUSH    ES
            POP     DS
            POP     BP
            RET     2
GETLBL      ENDP
;
GETADR      PROC    NEAR
            DEC     AX
            MOV     CX,512
            MUL     CX
            ADD     AX,2[SI]
            MOV     CX,16
            MUL     CX
            ADD     AX,24
            RET
GETADR      ENDP
;
HLDLBL      PROC    NEAR
            MOV     BX,6[BP]
            MOV     CX,[BX]
            INC     BX
            INC     BX
            MOV     SI,[BX]
            MOV     AX,FPADS
            MOV     ES,AX
            MOV     ES:0,DS
            MOV     ES:2,SI
            MOV     DI,4
            CLD
            REP     MOVSB
            PUSH    ES
            POP     DS
            RET
HLDLBL      ENDP
;
;
            PUBLIC  PUTBLK
PUTBLK      PROC    FAR
;
            PUSH    BP
            MOV     BP,SP
            CALL    HLDBLK
            CALL    GETNDX
            CMP     AX,0
            JNE     PUTBLK0
            MOV     DI,4
            PUSH    DS
            PUSH    CS
            POP     DS
            MOV     CX,BLKLEN
            POP     DS
            SUB     CX,DI
            SUB     AX,AX
            REP     STOSB
            JMP     PUTBLK4
PUTBLK0:    CMP     AX,1
            JNE     PUTBLK5
            SUB     CX,CX
            ADD     SI,3
            CMP     CL,[SI]
            JE      PUTBLK2
            MOV     DI,3[DI]
            ADD     DI,10055
            MOV     CL,[SI]
            CMP     CL,[DI]
            JA      PUTBLK1
            REP     MOVSB
            JMP     PUTBLK4
PUTBLK2:    MOV     AX,5
            MOV     SI,48
            MOV     CX,[SI]
            DEC     CX
            MOV     [SI],CX
            MUL     CX
            ADD     AX,50
            MOV     CX,AX
```

```
            SUB     CX,BX
            MOV     DI,BX
            CMP     CX,0
            JE      PUTBLK3
            ADD     BX,5
            MOV     SI,BX
            REP     MOVSB
PUTBLK3:    SUB     AX,AX
            MOV     CX,5
            REP     STOSB
            JMP     PUTBLK4
PUTBLK5:    SUB     CX,CX
            CMP     CL,3[SI]
            JE      PUTBLK4
            CMP     AX,3
            JE      PUTBLK1
            MOV     SI,48
            MOV     CX,[SI]
            MUL     CX
            ADD     AX,50
            MOV     CX,AX
            SUB     CX,BX
            MOV     SI,AX
            DEC     SI
            MOV     DI,AX
            ADD     DI,4
            STD
            REP     MOVSB
            CLD
PUTBLK1:    CALL    PBSTRB
PUTBLK4:    CALL    PBMEMC
            CMP     AX,0
            JNE     PUTBLK9
            MOV     SI,48
            MOV     CX,[SI]
            CMP     CX,1998
            JB      PUTBLK9
PUTBLK8:    MOV     AX,1
PUTBLK9:    MOV     SI,0
            MOV     ES,[SI]
            MOV     DI,2[SI]
            MOV     ES:[DI],AX
            PUSH    ES
            POP     DS
            POP     BP
            RET     2
PUTBLK      ENDP
;
PBMEMC      PROC    NEAR
            SUB     AX,AX
            PUSH    DS
            PUSH    CS
            POP     DS
            MOV     CX,BLKLEN
            POP     DS
            SUB     CX,10055
            MOV     SI,10053
            SUB     CX,[SI]
            CMP     CX,40
            JA      PBMEMC1
            MOV     AX,2
PBMEMC1:    RET
PBMEMC      ENDP
;
PBSTRB      PROC    NEAR
            MOV     DI,BX
            MOV     SI,8
            MOV     CX,3
            REP     MOVSB
            MOV     BX,10053
            MOV     AX,[BX]
            MOV     [DI],AX
            MOV     DI,AX
            ADD     DI,10055
            SUB     CX,CX
            MOV     CL,[SI]
            ADD     AX,CX
            MOV     [BX],AX
            REP     MOVSB
            MOV     BX,48
            MOV     AX,[BX]
            INC     AX
            MOV     [BX],AX
            RET
PBSTRB      ENDP
;
            PUBLIC  GETBLK
GETBLK      PROC    FAR
;
            PUSH    BP
            MOV     BP,SP
            CALL    HLDBLK
            CALL    GETNDX
            CMP     AX,0
            JE      GETBLK2
            CMP     AX,1
            JNE     GETBLK1
GETBLK0:    MOV     SI,3[DI]
            ADD     SI,10055
            SUB     CX,CX
            MOV     CL,[SI]
            MOV     DI,11
            REP     MOVSB
            JMP     GETBLK9
GETBLK1:    MOV     DI,11
            MOV     AX,0
            MOV     [DI],AX
            JMP     GETBLK9
GETBLK2:    MOV     DI,8
            MOV     SI,4
            MOV     AL,2[SI]
            INC     AL
            MOV     2[SI],AL
            MOV     CX,3
            REP     MOVSB
            CALL    GETNDX
            CMP     AX,0
            JE      GETBLK1
            CMP     AX,3
            JE      GETBLK1
GETBLK3:    MOV     SI,BX
            MOV     DI,8
            MOV     CX,3
            REP     MOVSB
            MOV     DI,BX
            JMP     GETBLK0
GETBLK9:    MOV     DI,4
            MOV     SI,8
            MOV     CX,3
            REP     MOVSB
            MOV     SI,0
            MOV     ES,[SI]
```

```
              MOV     DI,2[SI]
              MOV     SI,8
              MOV     CX,35
              REP     MOVSB
              PUSH    ES
              POP     DS
              POP     BP
              RET     2
GETBLK        ENDP
;
GETNDX        PROC    NEAR
              MOV     BX,50
              MOV     SI,8
              MOV     AX,[SI]
              CMP     AX,0
              JNE     GETNDX0
              MOV     AL,2[SI]
              CMP     AL,0
              JE      GETNDX9
GETNDX0:      MOV     DI,BX
              MOV     AX,[DI]
              CMP     AX,0
              JNE     GETNDX1
              MOV     AL,2[DI]
              CMP     AL,0
              JNE     GETNDX1
              MOV     AX,3
              JMP     GETNDX9
GETNDX1:      MOV     AX,[SI]
              CMP     AX,[DI]
              JA      GETNDX2
              JB      GETNDX3
              MOV     AL,2[SI]
              CMP     AL,2[DI]
              JA      GETNDX2
              JB      GETNDX3
              MOV     AX,1
              JMP     GETNDX9
GETNDX2:      ADD     BX,5
              JMP     GETNDX0
GETNDX3:      MOV     AX,5
GETNDX9:      RET
GETNDX        ENDP
;
HLDBLK        PROC    NEAR
              MOV     BX,6[BP]
              MOV     CX,[BX]
              INC     BX
              INC     BX
              MOV     SI,[BX]
              MOV     AX,FPAES
              MOV     ES,AX
              MOV     ES:0,DS
              MOV     ES:2,SI
              MOV     DI,8
              CLD
              REP     MOVSB
              PUSH    ES
              POP     DS
              RET
HLDBLK        ENDP
;
FPACS         ENDS
;
FPADS         SEGMENT PARA PUBLIC 'CODE'
;
              DB      49200 DUP (?)
;
FPADS         ENDS
;
FPAES         SEGMENT PARA PUBLIC 'CODE'
;
              DB      49200 DUP (?)
;
FPAES         ENDS
;
              END
```

DATA STORAGE ROUTINES FOR GRAPHICS

```
GBSDS         SEGMENT PARA PUBLIC 'CODE'
;
PSEG          DW      0
PADR          DW      0
BCNT          DW      0
BFRE          DW      0
BLST          DB      4 DUP (0)
PHLD          DB      100 DUP (0)
BNDX          DB      10000 DUP (0)
BDAT          DB      18000 DUP (0)
;
ACNT          DW      0
ASEQ          DW      0
ABXR          DB      10000 DUP (0)
;
SFRE          DW      0
SDAT          DB      10000 DUP (0)
;
LCNT          DW      0
LSEQ          DW      0
LDAT          DB      15000 DUP (0)
;
GBSDS         ENDS
;
GBSCS         SEGMENT PARA PUBLIC 'CODE'
;
              ASSUME  CS:GBSCS,DS:GBSDS
;
              PUBLIC  PUTGFB
PUTGFB        PROC    FAR
;
              PUSH    BP
              MOV     BP,SP
              CALL    HLDBLK
              CALL    GETNDX
              CMP     AX,0
              JNE     PUTGFB0
              MOV     DI,OFFSET BCNT
              MOV     CX,63118
              SUB     AX,AX
              REP     STOSB
              JMP     PUTGFB4
PUTGFB0:      CMP     AX,1
              JNE     PUTGFB5
              SUB     CX,CX
              ADD     SI,3
              CMP     CL,[SI]
              JE      PUTGFB2
              MOV     DI,3[DI]
              ADD     DI,OFFSET BDAT
              MOV     CL,[SI]
              CMP     CL,[DI]
```

```
                JA      PUTGFB1
                REP     MOVSB
                JMP     PUTGFB4
PUTGFB2:        MOV     AX,5
                MOV     SI,OFFSET BCNT
                MOV     CX,[SI]
                DEC     CX
                MOV     [SI],CX
                MUL     CX
                ADD     AX,OFFSET BNDX
                MOV     CX,AX
                SUB     CX,BX
                MOV     DI,BX
                CMP     CX,0
                JE      PUTGFB3
                ADD     BX,5
                MOV     SI,BX
                REP     MOVSB
PUTGFB3:        SUB     AX,AX
                MOV     CX,5
                REP     STOSB
                JMP     PUTGFB4
PUTGFB5:        SUB     CX,CX
                CMP     CL,3[SI]
                JE      PUTGFB4
                CMP     AX,3
                JE      PUTGFB1
                MOV     SI,OFFSET BCNT
                MOV     CX,[SI]
                MUL     CX
                ADD     AX,OFFSET BNDX
                MOV     CX,AX
                SUB     CX,BX
                MOV     SI,AX
                DEC     SI
                MOV     DI,AX
                ADD     DI,4
                STD
                REP     MOVSB
                CLD
PUTGFB1:        CALL    PBSTRB
PUTGFB4:        CALL    PBMEMC
                CMP     AX,0
                JNE     PUTGFB9
                MOV     SI,OFFSET BCNT
                MOV     CX,[SI]
                CMP     CX,1998
                JB      PUTGFB9
PUTGFB8:        MOV     AX,1
PUTGFB9:        MOV     SI,OFFSET PSEG
                MOV     ES,[SI]
                MOV     SI,OFFSET PADR
                MOV     DI,[SI]
                MOV     ES:[DI],AX
                PUSH    ES
                POP     DS
                POP     BP
                RET     2
PUTGFB          ENDP
;
                PUBLIC  PUTSQB
PUTSQB          PROC    FAR
                PUSH    BP
                MOV     BP,SP
                CALL    HLDBLK
                MOV     SI,OFFSET BCNT
                MOV     CX,[SI]
                MOV     AX,5
                MUL     CX
                ADD     AX,OFFSET BNDX
                MOV     BX,AX
                CALL    PBSTRB
                CALL    PBMEMC
                CMP     AX,0
                JNE     PUTSQB9
                MOV     SI,OFFSET BCNT
                MOV     CX,[SI]
                CMP     CX,1998
                JB      PUTSQB9
PUTSQB8:        MOV     AX,1
PUTSQB9:        MOV     SI,OFFSET PSEG
                MOV     ES,[SI]
                MOV     SI,OFFSET PADR
                MOV     DI,[SI]
                MOV     ES:[DI],AX
                PUSH    ES
                POP     DS
                POP     BP
                RET     2
PUTSQB          ENDP
;
PBMEMC          PROC    NEAR
                SUB     AX,AX
                MOV     CX,18000
                MOV     SI,OFFSET BFRE
                SUB     CX,[SI]
                CMP     CX,40
                JA      PBMEMC1
                MOV     AX,2
PBMEMC1:        RET
PBMEMC          ENDP
;
PBSTRB          PROC    NEAR
                MOV     DI,BX
                MOV     SI,OFFSET PHLD
                MOV     CX,3
                REP     MOVSB
                MOV     BX,OFFSET BFRE
                MOV     AX,[BX]
                MOV     [DI],AX
                MOV     DI,AX
                ADD     DI,OFFSET BDAT
                SUB     CX,CX
                MOV     CL,[SI]
                ADD     AX,CX
                MOV     [BX],AX
                REP     MOVSB
                MOV     BX,OFFSET BCNT
                MOV     AX,[BX]
                INC     AX
                MOV     [BX],AX
                RET
PBSTRB          ENDP
;
                PUBLIC  GETGFB
GETGFB          PROC    FAR
;
                PUSH    BP
                MOV     BP,SP
                CALL    HLDBLK
                CALL    GETNDX
                CMP     AX,0
```

```
            JE      GETGFB2                         JMP     GETNDX9
            CMP     AX,1                GETNDX1:    MOV     AX,[SI]
            JNE     GETGFB1                         CMP     AX,[DI]
GETGFB0:    MOV     SI,3[DI]                        JA      GETNDX2
            ADD     SI,OFFSET BDAT    5             JB      GETNDX3
            SUB     CX,CX                           MOV     AL,2[SI]
            MOV     CL,[SI]                         CMP     AL,2[DI]
            MOV     DI,OFFSET PHLD+3                JA      GETNDX2
            REP     MOVSB                           JB      GETNDX3
            JMP     GETGFB9           10            MOV     AX,1
GETGFB1:    MOV     DI,OFFSET PHLD+3                JMP     GETNDX9
            MOV     AX,0                GETNDX2:    ADD     BX,5
            MOV     [DI],AX                         JMP     GETNDX0
            JMP     GETGFB9           15 GETNDX3:   MOV     AX,5
GETGFB2:    MOV     DI,OFFSET PHLD      GETNDX9:    RET
            MOV     SI,OFFSET BLST      GETNDX      ENDP
            MOV     AL,2[SI]            ;
            INC     AL                  HLDBLK      PROC    NEAR
            MOV     2[SI],AL          20            MOV     BX,6[BP]
            MOV     CX,3                            MOV     CX,[BX]
            REP     MOVSB                           INC     BX
            CALL    GETNDX                          INC     BX
            CMP     AX,0                            MOV     SI,[BX]
            JE      GETGFB1           25            MOV     AX,GBSDS
            CMP     AX,3                            MOV     ES,AX
            JE      GETGFB1                         MOV     DI,OFFSET PSEG
GETGFB3:    MOV     SI,BX                           MOV     ES:[DI],DS
            MOV     DI,OFFSET PHLD                  MOV     DI,OFFSET PADR
            MOV     CX,3              30            MOV     ES:[DI],SI
            REP     MOVSB                           MOV     DI,OFFSET PHLD
            MOV     DI,BX                           CLD
            JMP     GETGFB0                         REP     MOVSB
GETGFB9:    MOV     DI,OFFSET BLST                  PUSH    ES
            MOV     SI,OFFSET PHLD    35            POP     DS
            MOV     CX,3                            RET
            REP     MOVSB               HLDBLK      ENDP
            MOV     SI,OFFSET PSEG      ;
            MOV     ES,[SI]                         PUBLIC  PUTGFA
            MOV     SI,OFFSET PADR    40 PUTGFA     PROC    FAR
            MOV     DI,[SI]             ;
            MOV     SI,OFFSET PHLD                  PUSH    BP
            MOV     CX,20                           MOV     BP,SP
            REP     MOVSB             45            CALL    HLDBLK
            PUSH    ES                              MOV     BX,OFFSET ABXR
            POP     DS                              MOV     SI,OFFSET PHLD
            POP     BP                              MOV     AX,[SI]
            RET     2                               INC     AX
GETGFB      ENDP                      50            MOV     [SI],AX
;                                       PUTGFA1:    MOV     DI,BX
GETNDX      PROC    NEAR                            MOV     AX,[DI]
            MOV     BX,OFFSET BNDX                  CMP     AX,0
            MOV     SI,OFFSET PHLD                  JE      PUTGFA3
            MOV     AX,[SI]           55            CMP     AX,[SI]
            CMP     AX,0                            JA      PUTGFA2
            JNE     GETNDX0                         JE      PUTGFA4
            MOV     AL,2[SI]                        ADD     BX,5
            CMP     AL,0                            JMP     PUTGFA1
            JE      GETNDX9           60 PUTGFA2:   PUSH    SI
GETNDX0:    MOV     DI,BX                           PUSH    DI
            MOV     AX,[DI]                         MOV     CX,ACNT
            CMP     AX,0                            MOV     AX,5
            JNE     GETNDX1                         MUL     CX
            MOV     AL,2[DI]          65            ADD     AX,OFFSET ABXR
            CMP     AL,0                            MOV     CX,AX
            JNE     GETNDX1                         SUB     CX,BX
            MOV     AX,3                            MOV     SI,AX
```

```
            DEC     SI                                  RET     2
            MOV     DI,AX                       PUTSQA  ENDP
            ADD     DI,4                        ;
            STD                                         PUBLIC  GETGFA
            REP     MOVSB                       GETGFA  PROC    FAR
            CLD                                 ;
            POP     DI                                  PUSH    BP
            POP     SI                                  MOV     BP,SP
PUTGFA3:    INC     ACNT                                CALL    HLDBLK
PUTGFA4:    MOV     CX,5                                MOV     BX,OFFSET ABXR
            REP     MOVSB                               MOV     SI,OFFSET PHLD
            MOV     CX,3                                MOV     AX,[SI]
            SUB     AX,AX                               INC     AX
PUTGFA5:    DEC     DI                                  MOV     [SI],AX
            CMP     AL,[DI]                     GETGFA1: MOV    DI,BX
            JNE     PUTGFA9                             MOV     AX,[DI]
            DEC     CX                                  CMP     AX,0
            JNZ     PUTGFA5                             JE      GETGFA3
            DEC     DI                                  CMP     AX,[SI]
            DEC     DI                                  JA      GETGFA3
            MOV     AX,5                                JE      GETGFA2
            MOV     SI,OFFSET ACNT                      ADD     BX,5
            MOV     CX,[SI]                             JMP     GETGFA1
            DEC     CX                          GETGFA2: MOV    AX,2[DI]
            MOV     [SI],CX                             MOV     2[SI],AX
            MUL     CX                                  MOV     AL,4[DI]
            ADD     AX,OFFSET ABXR                      MOV     4[SI],AL
            MOV     CX,AX                               JMP     GETGFA4
            SUB     CX,DI                       GETGFA3: SUB    AX,AX
            CMP     CX,0                                MOV     2[SI],AX
            JE      PUTGFA6                             MOV     4[SI],AL
            MOV     SI,DI                       GETGFA4: MOV    SI,OFFSET PSEG
            ADD     SI,5                                MOV     ES,[SI]
            REP     MOVSB                               MOV     SI,OFFSET PADR
PUTGFA6:    SUB     AX,AX                               MOV     DI,[SI]
            MOV     CX,5                                MOV     SI,OFFSET PHLD
            REP     STOSB                               MOV     CX,5
PUTGFA9:    MOV     SI,OFFSET PSEG                      REP     MOVSB
            MOV     ES,[SI]                             PUSH    ES
            PUSH    ES                                  POP     DS
            POP     DS                                  POP     BP
            POP     BP                                  RET     2
            RET     2                           GETGFA  ENDP
PUTGFA      ENDP                                ;
;                                                       PUBLIC  SETSQA
            PUBLIC  PUTSQA                      SETSQA  PROC    FAR
PUTSQA      PROC    FAR                                 PUSH    DS
            PUSH    BP                                  MOV     AX,GBSDS
            MOV     BP,SP                               MOV     DS,AX
            CALL    HLDBLK                              MOV     ASEQ,0
            MOV     SI,OFFSET PHLD                      POP     DS
            MOV     AX,[SI]                             RET
            INC     AX                          SETSQA  ENDP
            MOV     [SI],AX                     ;
            MOV     CX,ACNT                             PUBLIC  GETSQA
            MOV     AX,5                        GETSQA  PROC    FAR
            MUL     CX                                  PUSH    BP
            ADD     AX,OFFSET ABXR                      MOV     BP,SP
            MOV     DI,AX                               CALL    HLDBLK
            INC     ACNT                                MOV     AX,ASEQ
            MOV     CX,5                                MOV     BX,ACNT
            REP     MOVSB                               CMP     AX,BX
            MOV     SI,OFFSET PSEG                      JGE     GETSQA1
            MOV     ES,[SI]                             INC     AX
            PUSH    ES                                  MOV     ASEQ,AX
            POP     DS                                  DEC     AX
            POP     BP                                  MOV     BX,5
```

```
           MUL    BX                              SUB    CX,CX
           MOV    SI,OFFSET ABXR                  MOV    CL,[SI]
           ADD    SI,AX                           ADD    AX,CX
           MOV    DI,OFFSET PHLD                  MOV    SFRE,AX
           MOV    CX,5                            REP    MOVSB
           REP    MOVSB                           MOV    SI,OFFSET PSEG
           JMP    GETSQA2                         MOV    ES,[SI]
GETSQA1:   MOV    AX,255                          MOV    SI,OFFSET PADR
           MOV    DI,OFFSET PHLD                  MOV    DI,[SI]
           MOV    CX,5                            MOV    SI,OFFSET PHLD
           REP    STOSB                           MOV    CX,2
GETSQA2:   MOV    SI,OFFSET PSEG                  REP    MOVSB
           MOV    ES,[SI]                         PUSH   ES
           MOV    SI,OFFSET PADR                  POP    DS
           MOV    DI,[SI]                         POP    BP
           MOV    SI,OFFSET PHLD                  RET    2
           MOV    CX,5                   PUTGFS   ENDP
           REP    MOVSB                  ;
           PUSH   ES                              PUBLIC PUTGFL
           POP    DS                     PUTGFL   PROC   FAR
           POP    BP                     ;
           RET    2                               PUSH   BP
GETSQA     ENDP                                   MOV    BP,SP
;                                                 CALL   HLDBLK
           PUBLIC GETGFS                          MOV    BX,OFFSET LDAT
GETGFS     PROC   FAR                             MOV    SI,OFFSET PHLD
;                                         PUTGFL1: MOV   DI,BX
           PUSH   BP                              MOV    AX,[DI]
           MOV    BP,SP                           MOV    DL,2[DI]
           CALL   HLDBLK                          CMP    AX,0
           MOV    SI,OFFSET PHLD                  JNE    PUTGFL9
           MOV    AX,[SI]                         CMP    DL,0
           MOV    SI,OFFSET SDAT                  JE     PUTGFL3
           ADD    SI,AX                  PUTGFL9: CMP    AX,[SI]
           SUB    CX,CX                           JA     PUTGFL2
           MOV    CL,[SI]                         JB     PUTGFL8
           MOV    DI,OFFSET PHLD+2                CMP    DL,2[SI]
           REP    MOVSB                           JA     PUTGFL2
           MOV    SI,OFFSET PSEG                  JE     PUTGFL4
           MOV    ES,[SI]                PUTGFL8: ADD    BX,5
           MOV    SI,OFFSET PADR                  JMP    PUTGFL1
           MOV    DI,[SI]                PUTGFL2: PUSH   SI
           MOV    SI,OFFSET PHLD                  PUSH   DI
           MOV    CX,90                           MOV    CX,LCNT
           REP    MOVSB                           MOV    AX,5
           PUSH   ES                              MUL    CX
           POP    DS                              ADD    AX,OFFSET LDAT
           POP    BP                              MOV    CX,AX
           RET    2                               SUB    CX,BX
GETGFS     ENDP                                   MOV    SI,AX
;                                                 DEC    SI
           PUBLIC PUTGFS                          MOV    DI,AX
PUTGFS     PROC   FAR                             ADD    DI,4
;                                                 STD
           PUSH   BP                              REP    MOVSB
           MOV    BP,SP                           CLD
           CALL   HLDBLK                          POP    DI
           MOV    AX,SFRE                         POP    SI
           CMP    AX,0                   PUTGFL3: INC    LCNT
           JNZ    PUTGFS1                PUTGFL4: MOV    CX,5
           INC    AX                              REP    MOVSB
PUTGFS1:   MOV    SI,OFFSET PHLD                  SUB    AX,AX
           MOV    [SI],AX                         DEC    DI
           MOV    DI,OFFSET SDAT                  DEC    DI
           ADD    DI,AX                           CMP    AX,[DI]
           MOV    SI,OFFSET PHLD+2                JNE    PUTGFL7
```

```
                DEC     DI
                DEC     DI
                DEC     DI
                MOV     AX,5
                MOV     SI,OFFSET LCNT
                MOV     CX,[SI]
                DEC     CX
                MOV     [SI],CX
                MUL     CX
                ADD     AX,OFFSET LDAT
                MOV     CX,AX
                SUB     CX,DI
                CMP     CX,0
                JE      PUTGFL6
                MOV     SI,DI
                ADD     SI,5
                REP     MOVSB
PUTGFL6:        SUB     AX,AX
                MOV     CX,5
                REP     STOSB
PUTGFL7:        MOV     SI,OFFSET PSEG
                MOV     ES,[SI]
                PUSH    ES
                POP     DS
                POP     BP
                RET     2
PUTGFL          ENDP
;
                PUBLIC  PUTSQL
PUTSQL          PROC    FAR
                PUSH    BP
                MOV     BP,SP
                CALL    HLDBLK
                MOV     SI,OFFSET PHLD
                MOV     CX,LCNT
                MOV     AX,5
                MUL     CX
                ADD     AX,OFFSET LDAT
                MOV     DI,AX
                INC     LCNT
                MOV     CX,5
                REP     MOVSB
                MOV     SI,OFFSET PSEG
                MOV     ES,[SI]
                PUSH    ES
                POP     DS
                POP     BP
                RET     2
PUTSQL          ENDP
;
                PUBLIC  GETGFL
GETGFL          PROC    FAR
;
                PUSH    BP
                MOV     BP,SP
                CALL    HLDBLK
                MOV     BX,OFFSET LDAT
                MOV     SI,OFFSET PHLD
GETGFL1:        MOV     DI,BX
                MOV     AX,[DI]
                MOV     DL,2[DI]
                CMP     AX,0
                JNE     GETGFL9
                CMP     DL,0
                JE      GETGFL3
GETGFL9:        CMP     AX,[SI]
                JA      GETGFL3
                JB      GETGFL8
                CMP     DL,2[SI]
                JA      GETGFL3
                JE      GETGFL2
GETGFL8:        ADD     BX,5
                JMP     GETGFL1
GETGFL2:        MOV     AX,3[DI]
                MOV     3[SI],AX
                JMP     GETGFL4
GETGFL3:        SUB     AX,AX
                MOV     3[SI],AX
GETGFL4:        MOV     SI,OFFSET PSEG
                MOV     ES,[SI]
                MOV     SI,OFFSET PADR
                MOV     DI,[SI]
                MOV     SI,OFFSET PHLD
                MOV     CX,5
                REP     MOVSB
                PUSH    ES
                POP     DS
                POP     BP
                RET     2
GETGFL          ENDP
;
                PUBLIC  SETSQL
SETSQL          PROC    FAR
                PUSH    DS
                MOV     AX,GBSDS
                MOV     DS,AX
                MOV     LSEQ,0
                POP     DS
                RET
SETSQL          ENDP
;
                PUBLIC  GETSQL
GETSQL          PROC    FAR
                PUSH    BP
                MOV     BP,SP
                CALL    HLDBLK
                MOV     AX,LSEQ
                MOV     BX,LCNT
                CMP     AX,BX
                JGE     GETSQL1
                INC     AX
                MOV     LSEQ,AX
                DEC     AX
                MOV     BX,5
                MUL     BX
                MOV     SI,OFFSET LDAT
                ADD     SI,AX
                MOV     DI,OFFSET PHLD
                MOV     CX,5
                REP     MOVSB
                JMP     GETSQL2
GETSQL1:        MOV     AX,255
                MOV     DI,OFFSET PHLD
                MOV     CX,5
                REP     STOSB
GETSQL2:        MOV     SI,OFFSET PSEG
                MOV     ES,[SI]
                MOV     SI,OFFSET PADR
                MOV     DI,[SI]
                MOV     SI,OFFSET PHLD
                MOV     CX,5
                REP     MOVSB
```

```
            PUSH   ES                                     DEC    BX
            POP    DS                                     MOV    AX,5
            POP    BP                                     MUL    BX
            RET    2                                      ADD    AX,OFFSET LDAT
GETSQL      ENDP                                          MOV    SI,AX
;                                                         MOV    BX,[SI]
            PUBLIC GETLST                     GETLST2:    CMP    BX,CX
GETLST      PROC   FAR                                    JB     GETLST3
;                                                         MOV    AX,BX
            PUSH   BP                                     JMP    GETLST4
            MOV    BP,SP                     GETLST3:    MOV    AX,CX
            CALL   HLDBLK                    GETLST4:    MOV    SI,OFFSET PSEG
            MOV    CX,ACNT                                MOV    ES,[SI]
            CMP    CX,0                                   MOV    SI,OFFSET PADR
            JZ     GETLST1                                MOV    DI,[SI]
            DEC    CX                                     MOV    ES:[DI],AX
            MOV    AX,5                                   PUSH   ES
            MUL    CX                                     POP    DS
            ADD    AX,OFFSET ABXR                         POP    BP
            MOV    SI,AX                                  RET    2
            MOV    CX,[SI]                   GETLST      ENDP
            DEC    CX                        ;
GETLST1:    MOV    BX,LCNT                   GBSCS       ENDS
            CMP    BX,0                      ;
            JZ     GETLST2                               END
```

SCREEN DRAWING ROUTINES FOR GRAPHICS

```
BACKLF=4
BACKRT=1
FOREGD=15
;
FLOGRFA  SEGMENT PARA PUBLIC 'CODE'
BLNK     DB 14 DUP (0)
FLVT     DB 0,0,0,0,0,8,0,0,0,0,0,0,0,0
BOXH     DB 255,255,255,255,255,255,255,255,255,255,255,240,0,0
BOXV     DB 128,0,0,0,0,0,0,0,0,0,0,16,0,0
NBL1     DB 0,3,255,255,255,255,255,255,255,224,0,0,0,0
; DCSN HAS 49 LINES
DCSN     DB 0,0,0,0,0,34,0,0,0,0,0,0,0,0
         DB 0,0,0,0,0,128,128,0,0,0,0,0,0,0
         DB 0,0,0,0,2,0,32,0,0,0,0,0,0,0
         DB 0,0,0,0,8,0,8,0,0,0,0,0,0,0
         DB 0,0,0,0,32,0,2,0,0,0,0,0,0,0
         DB 0,0,0,0,128,0,0,128,0,0,0,0,0,0
         DB 0,0,0,2,0,0,0,32,0,0,0,0,0,0
         DB 0,0,0,8,0,0,0,8,0,0,0,0,0,0
         DB 0,0,0,32,0,0,0,2,0,0,0,0,0,0
         DB 0,0,0,128,0,0,0,0,128,0,0,0,0,0
         DB 0,0,2,0,0,14,224,0,32,0,0,0,0,0
         DB 0,0,8,0,0,4,128,0,8,0,0,0,0,0
         DB 0,0,32,0,0,4,224,0,2,0,0,0,0,0
         DB 0,0,128,0,0,4,32,0,0,128,0,0,0,0
         DB 0,2,0,0,0,14,224,0,0,32,0,0,0,0
NBL2     DB 0,8,0,0,0,0,0,0,0,8,0,0,0,0
         DB 0,32,0,0,0,0,0,0,0,2,0,0,0,0
         DB 0,128,0,0,0,0,0,0,0,128,0,0,0
         DB 2,0,0,0,0,0,0,0,0,0,32,0,0,0
         DB 4,0,0,0,0,0,0,0,0,0,16,0,0,0
         DB 8,0,0,0,0,0,0,0,0,0,8,0,0,0
         DB 16,0,0,0,0,0,0,0,0,0,4,0,0,0
         DB 32,0,0,0,0,0,0,0,0,0,2,0,0,0
         DB 64,0,0,0,0,0,0,0,0,0,1,0,0,0
         DB 128,0,0,0,0,0,0,0,0,0,0,255,255,255
         DB 64,0,0,0,0,0,0,0,0,0,1,0,0,0
         DB 32,0,0,0,0,0,0,0,0,0,2,0,0,0
         DB 16,0,0,0,0,0,0,0,0,0,4,0,0,0
         DB 8,0,0,0,0,0,0,0,0,0,8,0,0,0
         DB 4,0,0,0,0,0,0,0,0,0,16,0,0,0
         DB 2,0,0,0,0,0,0,0,0,0,32,0,0,0
         DB 0,128,0,0,0,0,0,0,0,0,128,0,0,0
         DB 0,32,0,0,0,0,0,0,0,2,0,0,0,0
```

```
        DB 0,8,0,0,0,0,0,0,0,8,0,0,0,0
        DB 0,2,0,0,0,0,0,0,0,32,0,0,0,0
        DB 0,0,128,0,0,0,0,0,0,128,0,0,0,0
        DB 0,0,32,0,0,0,0,0,2,0,0,0,0,0
        DB 0,0,8,0,0,0,0,0,8,0,0,0,0,0
        DB 0,0,2,0,0,0,0,0,32,0,0,0,0,0
        DB 0,0,0,128,0,0,0,0,128,0,0,0,0,0
        DB 0,0,0,32,0,4,0,2,0,0,0,0,0,0
        DB 0,0,0,8,0,10,0,8,0,0,0,0,0,0
        DB 0,0,0,2,0,2,0,32,0,0,0,0,0,0
        DB 0,0,0,0,128,4,0,128,0,0,0,0,0,0
        DB 0,0,0,0,32,4,2,0,0,0,0,0,0,0
        DB 0,0,0,0,8,0,8,0,0,0,0,0,0,0
        DB 0,0,0,0,2,0,32,0,0,0,0,0,0,0
        DB 0,0,0,0,0,128,128,0,0,0,0,0,0,0
        DB 0,0,0,0,0,34,0,0,0,0,0,0,0,0
;       CHARACTER MASKS ( 32 THRU 96 )
CMSK    DB 0,0,0,0,0
        DB 4,4,4,0,4
        DB 6,6,0,0,0
        DB 10,14,10,14,10
        DB 6,12,4,6,12
        DB 10,2,4,8,10
        DB 4,10,4,10,14
        DB 4,4,0,0,0
        DB 2,4,4,4,2
        DB 8,4,4,4,8
        DB 10,4,10,0,0
        DB 4,4,14,4,4
        DB 0,0,0,4,4
        DB 0,0,14,0,0
        DB 0,0,0,0,4
        DB 2,2,4,8,8
        DB 4,10,10,10,4
        DB 4,4,4,4,4
        DB 12,2,4,8,14
        DB 12,2,12,2,12
        DB 2,6,14,2,2
        DB 14,8,6,2,14
        DB 8,8,14,10,14
        DB 14,2,2,4,4
        DB 14,10,14,10,14
        DB 14,10,14,2,2
        DB 0,4,0,4,0
        DB 0,4,0,4,4
        DB 2,4,8,4,2
        DB 0,14,0,14,0
        DB 8,4,2,4,8
        DB 4,10,2,4,4
        DB 14,14,10,14,12
        DB 4,10,14,10,10
        DB 12,10,12,10,12
        DB 14,8,8,8,14
        DB 12,10,10,10,12
        DB 14,8,14,8,14
        DB 14,8,14,8,8
        DB 14,8,8,10,14
        DB 10,10,14,10,10
        DB 14,4,4,4,14
        DB 2,2,2,10,14
        DB 10,12,8,12,10
        DB 8,8,8,8,14
        DB 10,14,10,10,10
        DB 14,10,10,10,10
        DB 14,10,10,10,14
        DB 14,10,14,8,8
        DB 14,10,10,14,14
        DB 14,10,14,12,10
        DB 14,8,14,2,14
        DB 14,4,4,4,4
        DB 10,10,10,10,14
        DB 10,10,10,10,4
        DB 10,10,10,14,10
        DB 10,10,4,10,10
        DB 10,10,4,4,4
        DB 14,2,4,8,14
        DB 6,4,4,4,6
        DB 8,8,4,2,2
        DB 12,4,4,4,12
```

```
              DB    4,10,0,0,0
              DB    0,0,0,0,14
              DB    4,4,0,0,0
PMSK          DB    38H,44H,82H,82H,82H,82H,82H,44H,38H
              DB    10H,30H,10H,10H,10H,10H,10H,10H,38H
              DB    7CH,82H,02H,04H,08H,10H,20H,40H,0FEH
              DB    7CH,82H,02H,02H,1CH,02H,02H,82H,7CH
              DB    04H,0CH,14H,24H,44H,0FEH,04H,04H,04H
              DB    0FEH,80H,80H,80H,0FCH,02H,02H,82H,7CH
              DB    3CH,40H,80H,80H,0FCH,82H,82H,82H,7CH
              DB    0FEH,82H,02H,04H,08H,10H,10H,10H,10H
              DB    7CH,82H,82H,82H,7CH,82H,82H,82H,7CH
              DB    7CH,82H,82H,82H,7EH,02H,02H,04H,78H
              DB    10H,28H,44H,82H,0FEH,82H,82H,82H,82H
              DB    0F8H,44H,42H,44H,78H,44H,42H,44H,0F8H
              DB    3CH,42H,80H,80H,80H,80H,80H,42H,3CH
              DB    0F8H,44H,42H,42H,42H,42H,42H,44H,0F8H
              DB    0FEH,80H,80H,80H,0FCH,80H,80H,80H,0FEH
              DB    0,0,0,0,07CH,0,0,0,0
;
XCLR          DB    255
;
TMSG          DB    80 DUP (0)
;
SBUF          DB    26000 DUP (0)
;
FLOGRFA       ENDS
FLOGRFC       SEGMENT PARA PUBLIC 'CODE'
              ASSUME CS:FLOGRFC,DS:FLOGRFA
              PUBLIC GFSET
GFSET         PROC  FAR
              MOV   AX,10H
              INT   10H
              MOV   AX,1123H
              MOV   BX,3
              INT   10H
              PUSH  DS
              MOV   AX,FLOGRFA
              MOV   DS,AX
              MOV   SI,OFFSET SBUF
              MOV   AX,0A000H
              MOV   ES,AX
              MOV   DI,0
              MOV   CX,26000
              REP   MOVSB
              PUSH  DI
              MOV   XCLR,BACKLF
              CALL  GFSEQ
              MOV   BX,25
              MOV   AX,255
GFSET0:       MOV   CX,15
              REP   STOSB
              ADD   DI,65
              DEC   BX
              JNZ   GFSET0
              POP   DI
              ADD   DI,15
              MOV   XCLR,BACKRT
              CALL  GFSEQ
              MOV   BX,25
              MOV   AX,255
GFSET1:       MOV   CX,65
              REP   STOSB
              ADD   DI,15
              DEC   BX
              JNZ   GFSET1
              MOV   XCLR,255
              CALL  GFSEQ
              POP   DS
              MOV   AX,DS
              MOV   ES,AX
              RET
```

```
GFSET     ENDP                            PUSH    BP
          PUBLIC  GFRET                   MOV     BP,SP
GFRET     PROC    FAR                     MOV     BX,[BP+6]
          PUSH    DS                      MOV     DI,[BX+2]
          MOV     AX,0A000H         5     MOV     BX,[DI]
          MOV     DS,AX                   PUSH    DS
          MOV     SI,0                    MOV     AX,FLOGRFA
          MOV     AX,FLOGRFA              MOV     DS,AX
          MOV     ES,AX                   MOV     ES,AX
          MOV     DI,OFFSET SBUF          MOV     DI,OFFSET SBUF
          MOV     CX,26000         10     PUSH    DI
          REP     MOVSB                   MOV     CX,13000
          POP     DS                      MOV     AX,0
          MOV     AX,DS                   REP     STOSW
          MOV     ES,AX                   POP     DI
          MOV     AX,06H                  ADD     DI,401
          INT     10H              15     CMP     BX,0
          RET                             JNZ     GFWX1
GFRET     ENDP                            JMP     GFWBX
          PUBLIC  GFCLR         GFWX1:    CMP     BX,1
GFCLR     PROC    FAR                     JNZ     GFWX2
          PUSH    BP                      MOV     BX,23
          MOV     BP,SP            20  GFW11:    MOV     SI,OFFSET FLVT
          MOV     BX,[BP+6]               MOV     CX,14
          MOV     DI,[BX+2]               REP     MOVSB
          MOV     BX,[DI]                 ADD     DI,66
          PUSH    DS                      DEC     BX
          MOV     AX,FLOGRFA       25     JNZ     GFW11
          MOV     DS,AX                   MOV     DX,1
          MOV     AX,0A000H               CALL    GFCTL
          MOV     ES,AX                   MOV     BX,24
          CMP     BX,2          GFW12:    MOV     SI,OFFSET FLVT
          JE      GFCL2                   MOV     CX,14
          MOV     DI,0             30     REP     MOVSB
          MOV     CX,26000                ADD     DI,66
          MOV     AX,0                    DEC     BX
          REP     STOSB                   JNZ     GFW12
          CMP     BX,1                    JMP     GFWBX
          JE      GFCLX         GFWX2:    CMP     BX,2
GFCL2:    MOV     DI,26020         35     JNZ     GFWX3
          MOV     BX,25                   MOV     BX,18
          MOV     AX,0          GFW21:    MOV     SI,OFFSET FLVT
GFCL3:    MOV     CX,60                   MOV     CX,14
          REP     STOSB                   REP     MOVSB
          ADD     DI,20                   ADD     DI,66
          DEC     BX               40     DEC     BX
          JNZ     GFCL3                   JNZ     GFW21
          MOV     XCLR,BACKRT             MOV     DX,2
          CALL    GFSEQ                   CALL    GFCTL
          MOV     DI,26020                MOV     BX,19
          MOV     BX,25         GFW22:    MOV     SI,OFFSET FLVT
          MOV     AX,255           45     MOV     CX,14
GFCL4:    MOV     CX,60                   REP     MOVSB
          REP     STOSB                   ADD     DI,66
          ADD     DI,20                   DEC     BX
          DEC     BX                      JNZ     GFW22
          JNZ     GFCL4                   JMP     GFWBX
          MOV     XCLR,255         50  GFWX3:   CMP     BX,3
          CALL    GFSEQ                   JNZ     GFWX4
GFCLX:    POP     DS                      MOV     BX,13
          MOV     AX,DS         GFW31:    MOV     SI,OFFSET FLVT
          MOV     ES,AX                   MOV     CX,14
          POP     BP               55     REP     MOVSB
          RET     2                       ADD     DI,66
GFCLR     ENDP                            DEC     BX
GFCEL     PROC    NEAR                    JNZ     GFW31
          MOV     BX,[BP+6]               MOV     DX,3
          MOV     DI,[BX+2]               CALL    GFCTL
          MOV     SI,[DI+2]        60     MOV     BX,14
          MOV     AX,6400       GFW32:    MOV     SI,OFFSET FLVT
          MUL     SI                      MOV     CX,14
          MOV     SI,[DI]                 REP     MOVSB
          MOV     CL,4                    ADD     DI,66
          SHL     SI,CL                   DEC     BX
          ADD     AX,SI            65     JNZ     GFW32
          RET                             JMP     GFWBX
GFCEL     ENDP                         GFWX4:   CMP     BX,4
          PUBLIC  GFBLK                   JNZ     GFWX5
GFBLK     PROC    FAR                     MOV     BX,9
```

```
GFW41:  MOV   SI,OFFSET FLVT              DEC   BX
        MOV   CX,14                       JNZ   GFW81
        REP   MOVSB                       MOV   SI,OFFSET BOXH
        ADD   DI,66                       MOV   CX,14
        DEC   BX                          REP   MOVSB
        JNZ   GFW41                       ADD   DI,66
        MOV   DX,4                        MOV   BX,39
        CALL  GFCTL              GFW82:   MOV   SI,OFFSET BOXV
        MOV   BX,8                        MOV   CX,14
GFW42:  MOV   SI,OFFSET FLVT              REP   MOVSB
        MOV   CX,14                       ADD   DI,66
        REP   MOVSB                       DEC   BX
        ADD   DI,66                       JNZ   GFW82
        DEC   BX                          MOV   SI,OFFSET BOXH
        JNZ   GFW42                       MOV   CX,14
        JMP   GFWBX                       REP   MOVSB
GFWX5:  CMP   BX,5                        ADD   DI,66
        JNZ   GFWX6                       MOV   BX,8
        MOV   BX,43              GFW83:   MOV   SI,OFFSET FLVT
GFW51:  MOV   SI,OFFSET FLVT              MOV   CX,14
        MOV   CX,14                       REP   MOVSB
        REP   MOVSB                       ADD   DI,66
        ADD   DI,66                       DEC   BX
        DEC   BX                          JNZ   GFW83
        JNZ   GFW51                       JMP   GFWBX
        MOV   DX,5               GFWX9:   CMP   BX,10
        CALL  GFCTL                       JL    GFW90
        MOV   BX,44                       JZ    GFWA0
GFW52:  MOV   SI,OFFSET FLVT              JMP   GFWBX
        MOV   CX,14              GFWA0:   PUSH  DI
        REP   MOVSB              GFW90:   MOV   AX,BX
        ADD   DI,66                       MOV   BX,6
        DEC   BX                 GFW91:   MOV   SI,OFFSET FLVT
        JNZ   GFW52                       MOV   CX,14
        JMP   GFWBX                       REP   MOVSB
GFWX6:  CMP   BX,6                        ADD   DI,66
        JNZ   GFWX7                       DEC   BX
        MOV   BX,38                       JNZ   GFW91
GFW61:  MOV   SI,OFFSET FLVT              MOV   BX,49
        MOV   CX,14                       MOV   SI,OFFSET DCSN
        REP   MOVSB              GFW92:   MOV   CX,14
        ADD   DI,66                       REP   MOVSB
        DEC   BX                          ADD   DI,66
        JNZ   GFW61                       DEC   BX
        MOV   DX,6                        JNZ   GFW92
        CALL  GFCTL                       MOV   BX,3
        MOV   BX,39              GFW93:   MOV   SI,OFFSET FLVT
GFW62:  MOV   SI,OFFSET FLVT              MOV   CX,14
        MOV   CX,14                       REP   MOVSB
        REP   MOVSB                       ADD   DI,66
        ADD   DI,66                       DEC   BX
        DEC   BX                          JNZ   GFW93
        JNZ   GFW62                       CMP   AX,10
        JMP   GFWBX                       JZ    GFWA9
GFWX7:  CMP   BX,7                        JMP   GFWBX
        JNZ   GFWX8              GFWA9:   POP   SI
        MOV   BX,33                       ADD   SI,86
GFW71:  MOV   SI,OFFSET FLVT              MOV   AX,25
        MOV   CX,14                       CALL  GFDCL
        REP   MOVSB                       JMP   GFWBX
        ADD   DI,66              GFWXB:   CMP   BX,12
        DEC   BX                          JL    GFWB0
        JNZ   GFW71                       JZ    GFWC0
        MOV   DX,7                        JMP   GFWXD
        CALL  GFCTL              GFWC0:   PUSH  DI
        MOV   BX,34              GFWB0:   MOV   AX,BX
GFW72:  MOV   SI,OFFSET FLVT              MOV   BX,30
        MOV   CX,14              GFWB1:   MOV   SI,OFFSET FLVT
        REP   MOVSB                       MOV   CX,14
        ADD   DI,66                       REP   MOVSB
        DEC   BX                          ADD   DI,66
        JNZ   GFW72                       DEC   BX
        JMP   GFWBX                       JNZ   GFWB1
GFWX8:  CMP   BX,8                        MOV   BX,49
        JNZ   GFWX9                       MOV   SI,OFFSET DCSN
        MOV   BX,9               GFWB2:   MOV   CX,14
GFW81:  MOV   SI,OFFSET FLVT              REP   MOVSB
        MOV   CX,14                       ADD   DI,66
        REP   MOVSB                       CMP   BX,34
        ADD   DI,66                       JG    GFWB9
```

```
               CMP   BX,16
               JL    GFWB9
               CMP   BX,25
               JZ    GFWB9
               DEC   DX
               JZ    GFWB9
               SUB   SI,14
               JMP   GFWB2
       GFWB9:  MOV   DX,3
               DEC   BX
               JNZ   GFWB2
               MOV   BX,23
       GFWB3:  MOV   SI,OFFSET FLVT
               MOV   CX,14
               REP   MOVSB
               ADD   DI,66
               DEC   BX
               JNZ   GFWB3
               CMP   AX,12
               JZ    GFWC9
               JMP   GFWBX
       GFWC9:  POP   SI
               ADD   SI,1686
               MOV   AX,47
               CALL  GFDCL
               JMP   GFWBX
       GFWXD:  CMP   BX,14
               JL    GFWD0
               JZ    GFWE0
               JMP   GFWXF
       GFWE0:  PUSH  DI
       GFWD0:  MOV   AX,BX
               MOV   BX,50
       GFWD1:  MOV   SI,OFFSET FLVT
               MOV   CX,14
               REP   MOVSB
               ADD   DI,66
               DEC   BX
               JNZ   GFWD1
               MOV   BX,49
               MOV   SI,OFFSET DCSN
       GFWD2:  MOV   CX,14
               REP   MOVSB
               ADD   DI,66
               CMP   BX,34
               JG    GFWD9
               CMP   BX,16
               JL    GFWD9
               CMP   BX,25
               JZ    GFWD9
               DEC   DX
               JZ    GFWD9
               SUB   SI,14
               JMP   GFWD2
       GFWD9:  MOV   DX,5
               DEC   BX
               JNZ   GFWD2
               MOV   BX,47
       GFWD3:  MOV   SI,OFFSET FLVT
               MOV   CX,14
               REP   MOVSB
               ADD   DI,66
               DEC   BX
               JNZ   GFWD3
               CMP   AX,14
               JZ    GFWE9
               JMP   GFWBX
       GFWE9:  POP   SI
               ADD   SI,3206
               MOV   AX,66
               CALL  GFDCL
               JMP   GFWEX
       GFWXF:  CMP   BX,15
               JNZ   GFWXG
               MOV   BX,3
       GFWF1:  MOV   SI,OFFSET BLNK
               MOV   CX,14
               REP   MOVSB
               ADD   DI,66
               DEC   BX
               JNZ   GFWF1
               MOV   SI,OFFSET NBL1
               MOV   CX,14
               REP   MOVSB
               ADD   DI,66
               MOV   BX,19
               MOV   SI,OFFSET NBL2
       GFWF2:  MOV   CX,14
               REP   MOVSB
               ADD   DI,66
               SUB   SI,14
               MOV   CX,14
               REP   MOVSB
               ADD   DI,66
               CMP   BX,11
               JNE   GFWF9
               ADD   SI,14
               DEC   BX
       GFWF9:  DEC   BX
               JNZ   GFWF2
               MOV   SI,OFFSET NBL1
               MOV   CX,14
               REP   MOVSB
               ADD   DI,66
               MOV   BX,17
       GFWF3:  MOV   SI,OFFSET FLVT
               MOV   CX,14
               REP   MOVSB
               ADD   DI,66
               DEC   BX
               JNZ   GFWF3
               JMP   GFWBX
       GFWXG:  CMP   BX,16
               JNZ   GFWXH
               MOV   BX,5
       GFWG1:  MOV   SI,OFFSET BLNK
               MOV   CX,14
               REP   MOVSB
               ADD   DI,66
               DEC   BX
               JNZ   GFWG1
               MOV   SI,OFFSET NBL1
               MOV   CX,14
               REP   MOVSB
               ADD   DI,66
               MOV   DX,4
               MOV   BX,19
               MOV   SI,OFFSET NBL2
       GFWG2:  MOV   CX,14
               REP   MOVSB
               ADD   DI,66
               DEC   DX
               JZ    GFWG8
               SUB   SI,14
               JMP   GFWG2
       GFWG8:  MOV   DX,4
               CMP   BX,11
               JNE   GFWG9
               ADD   SI,14
               DEC   BX
       GFWG9:  DEC   BX
               JNZ   GFWG2
               MOV   SI,OFFSET NBL1
               MOV   CX,14
               REP   MOVSB
               ADD   DI,66
               MOV   BX,59
       GFWG3:  MOV   SI,OFFSET FLVT
               MOV   CX,14
               REP   MOVSB
               ADD   DI,66
               DEC   BX
               JNZ   GFWG3
               JMP   GFWBX
       GFWXH:  CMP   BX,17
               JNZ   GFWBX
               MOV   BX,5
       GFWH1:  MOV   SI,OFFSET BLNK
               MOV   CX,14
               REP   MOVSB
```

```
            ADD     DI,66                               MOV     BX,AX
            DEC     BX                      GFDC2:      MOV     BYTE PTR [SI],1
            JNZ     GFWH1                               ADD     SI,80
            MOV     SI,OFFSET NBL1                      DEC     BX
            MOV     CX,14                               JNZ     GFDC2
            REP     MOVSB                               RET
            ADD     DI,66                   GFDCL       ENDP
            MOV     DX,6                                PUBLIC  GFBTX
            MOV     BX,19                   GFBTX       PROC    FAR
            MOV     SI,OFFSET NBL2                      PUSH    BP
GFWH2:      MOV     CX,14                               MOV     BP,SP
            REP     MOVSB                               MOV     BX,[BP+6]
            ADD     DI,66                               MOV     DI,[BX+2]
            DEC     DX                                  MOV     DX,[DI]
            JZ      GFWH8                               MOV     CX,[DI+2]
            SUB     SI,14                               MOV     BX,CX
            JMP     GFWH2                               PUSH    DS
GFWH8:      MOV     DX,6                                MOV     SI,DI
            CMP     BX,11                               ADD     SI,4
            JNE     GFWH9                               MOV     AX,FLOGRFA
            ADD     SI,14                               MOV     ES,AX
            DEC     BX                                  MOV     DI,OFFSET TMSG
GFWH9:      DEC     BX                                  REP     MOVSB
            JNZ     GFWH2                               MOV     AX,ES
            MOV     SI,OFFSET NBL1                      MOV     DS,AX
            MOV     CX,14                               MOV     DI,OFFSET SBUF
            REP     MOVSB                               ADD     DI,DX
            ADD     DI,66                               MOV     SI,OFFSET TMSG
            MOV     BX,103                              XOR     DX,DX
GFWH3:      MOV     SI,OFFSET FLVT          GFBT0:      PUSH    SI
            MOV     CX,14                               XOR     AX,AX
            REP     MOVSB                               MOV     AL,[SI]
            ADD     DI,66                               CMP     AX,32
            DEC     BX                                  JL      GFBT9
            JNZ     GFWH3                               CMP     AX,128
GFWBX:      POP     DS                                  JG      GFBT9
            MOV     AX,DS                               SUB     AX,32
            MOV     ES,AX                               CMP     AX,64
            POP     BP                                  JLE     GFBT8
            RET     2                                   SUB     AX,32
GFBLK       ENDP                                        JMP     GFBT8
GFCTL       PROC    NEAR                    GFBT9:      XOR     AX,AX
            MOV     SI,OFFSET BOXH          GFBT8:      MOV     CX,5
            MOV     CX,14                               MUL     CL
            REP     MOVSB                               MOV     SI,OFFSET CMSK
            ADD     DI,66                               ADD     SI,AX
GFCT0:      MOV     BX,9                                PUSH    DI
GFCT1:      MOV     SI,OFFSET BOXV                      MOV     CX,5
            MOV     CX,14                   GFBT1:      LODSB
            REP     MOVSB                               MOV     DL,ES:[DI]
            ADD     DI,66                               TEST    DH,1
            DEC     BX                                  JNZ     GFBTZ
            JNZ     GFCT1                               SHL     AL,1
            MOV     SI,OFFSET BOXH                      SHL     AL,1
            MOV     CX,14                               SHL     AL,1
            REP     MOVSB                               SHL     AL,1
            ADD     DI,66                               JMP     GFBTZ
            DEC     DX                      GFBTZ:      OR      AL,DL
            JNZ     GFCT0                               STOSB
            RET                                         ADD     DI,79
GFCTL       ENDP                                        DEC     CX
GFDCL       PROC    NEAR                                JNZ     GFBT1
            MOV     BYTE PTR [SI],128                   POP     DI
            ADD     SI,79                               INC     DH
            MOV     BYTE PTR [SI],9                     TEST    DH,1
            ADD     SI,80                               JNZ     GFBTY
            MOV     BYTE PTR [SI],11                    INC     DI
            MOV     BX,8                    GFBTY:      POP     SI
GFDC1:      INC     SI                                  INC     SI
            MOV     BYTE PTR [SI],255                   DEC     BX
            DEC     BX                                  JNZ     GFBT0
            JNZ     GFDC1                               POP     DS
            ADD     SI,72                               MOV     AX,DS
            MOV     BYTE PTR [SI],9                     MOV     ES,AX
            ADD     SI,8                                POP     BP
            MOV     BYTE PTR [SI],1                     RET     2
            ADD     SI,73                   GFBTX       ENDP
            MOV     BYTE PTR [SI],128       GFWMV       PROC    NEAR
            ADD     SI,7                    GFWM0:      MOV     CX,14
```

```
                REP     MOVSB
                MOV     AL,ES:[DI]
                AND     AL,31
                OR      AL,[SI]
                MOV     ES:[DI],AL
                ADD     SI,66
                ADD     DI,66
                DEC     DX
                JNZ     GFWM0
                RET
GFWMV           ENDP
                PUBLIC  GFWRT
GFWRT           PROC    FAR
                PUSH    BP
                MOV     BP,SP
                CALL    GFCEL
                MOV     BX,[DI+4]
                MOV     CX,[DI+6]
                PUSH    DS
                PUSH    AX
                MOV     AX,FLOGRFA
                MOV     DS,AX
                MOV     SI,OFFSET SBUF+1
                MOV     AX,0A000H
                MOV     ES,AX
                POP     DI
                INC     DI
                PUSH    CX
                CMP     BX,0
                JNZ     GFWR1
                ADD     DI,400
                ADD     SI,400
                MOV     DX,70
                CALL    GFWMV
                JMP     GFWR3
GFWR1:          MOV     AX,6400
                MUL     BX
                ADD     SI,AX
GFWR2:          MOV     DX,75
                CALL    GFWMV
GFWR3:          POP     CX
                CMP     CX,5
                JZ      GFWRX
                PUSH    CX
                MOV     DX,5
                CALL    GFWMV
                POP     CX
                CMP     CX,1
                JZ      GFWRX
                DEC     CX
                PUSH    CX
                JMP     GFWR2
GFWRX:          POP     DS
                MOV     AX,DS
                MOV     ES,AX
                POP     BP
                RET     2
GFWRT           ENDP
                PUBLIC  GFTXT
GFTXT           PROC    FAR
                PUSH    BP
                MOV     BP,SP
                CALL    GFCEL
                MOV     SI,[DI+4]
                ADD     AX,SI
                MOV     BX,[DI+6]
                MOV     CX,BX
                AND     CX,0FFH
                PUSH    DS
                PUSH    AX
                MOV     SI,DI
                ADD     SI,8
                MOV     AX,FLOGRFA
                MOV     ES,AX
                MOV     DI,OFFSET TMSG
                REP     MOVSB
                MOV     AX,ES
                MOV     DS,AX
                MOV     AX,0A000H
                MOV     ES,AX
                POP     DI
                MOV     SI,OFFSET TMSG
                XOR     DX,DX
GFBK0:          PUSH    SI
                XOR     AX,AX
                MOV     AL,[SI]
                CMP     AX,32
                JL      GFBK9
                CMP     AX,128
                JG      GFBK9
                SUB     AX,32
                CMP     AX,64
                JLE     GFBK8
                SUB     AX,32
                JMP     GFBK8
GFBK9:          XOR     AX,AX
GFBK8:          MOV     CX,5
                MUL     CL
                MOV     SI,OFFSET CMSK
                ADD     SI,AX
                PUSH    DI
                MOV     CX,5
GFBK1:          LODSB
                MOV     DL,ES:[DI]
                TEST    DH,1
                JNZ     GFBKA
                SHL     AL,1
                SHL     AL,1
                SHL     AL,1
                SHL     AL,1
                TEST    BH,1
                JZ      GFBKX
                AND     DL,0FH
                JMP     GFBKX
GFBKA:          TEST    BH,1
                JZ      GFBKX
                AND     DL,0F0H
GFBKX:          OR      AL,DL
                STOSB
                ADD     DI,79
                DEC     CX
                JNZ     GFBK1
                POP     DI
                INC     DH
                TEST    DH,1
                JNZ     GFBKY
                INC     DI
GFBKY:          POP     SI
                INC     SI
                DEC     BL
                JNZ     GFBK0
                POP     DS
                MOV     AX,DS
                MOV     ES,AX
                POP     BP
                RET     2
GFTXT           ENDP
                PUBLIC  GFSTL
GFSTL           PROC    FAR
                PUSH    BP
                MOV     BP,SP
                CALL    GFCEL
                ADD     AX,5041
                PUSH    DS
                PUSH    AX
                MOV     AX,FLOGRFA
                MOV     DS,AX
                MOV     AX,0A000H
                MOV     ES,AX
                POP     DI
                MOV     BX,12
GFST1:          MOV     SI,OFFSET FLVT
                MOV     CX,14
                REP     MOVSB
                ADD     DI,66
                DEC     BX
                JNZ     GFST1
                MOV     BX,10
                ADD     DI,5
GFST2:          OR      BYTE PTR ES:[DI],8
```

```
                ADD     DI,80
                DEC     BX
                JNZ     GFST2
                POP     DS
                MOV     AX,DS
                MOV     ES,AX
                POP     BP
                RET     2
GFSTL           ENDP
                PUBLIC  GFUNL
GFUNL           PROC    FAR
                PUSH    BP
                MOV     BP,SP
                CALL    GFCEL
                ADD     AX,5041
                PUSH    DS
                PUSH    AX
                MOV     AX,FLOGRFA
                MOV     DS,AX
                MOV     AX,0A000H
                MOV     ES,AX
                POP     DI
                MOV     BX,12
GFUN1:          MOV     SI,OFFSET BLNK
                MOV     CX,14
                REP     MOVSB
                ADD     DI,66
                DEC     BX
                JNZ     GFUN1
                MOV     BX,10
                ADD     DI,5
GFUN2:          AND     BYTE PTR ES:[DI],247
                ADD     DI,80
                DEC     BX
                JNZ     GFUN2
                POP     DS
                MOV     AX,DS
                MOV     ES,AX
                POP     BP
                RET     2
GFUNL           ENDP
                PUBLIC  GFUNO
GFUNO           PROC    FAR
                PUSH    BP
                MOV     BP,SP
                CALL    GFCEL
                CMP     AX,80
                JG      GFUNB
                ADD     AX,6
                PUSH    DS
                PUSH    AX
                MOV     AX,FLOGRFA
                MOV     DS,AX
                MOV     AX,0A000H
                MOV     ES,AX
                POP     DI
                MOV     BX,5
GFUNA:          AND     BYTE PTR ES:[DI],247
                ADD     DI,80
                DEC     BX
                JNZ     GFUNA
                POP     DS
                MOV     AX,DS
                MOV     ES,AX
GFUNB:          POP     BP
                RET     2
GFUNO           ENDP
                PUBLIC  GFREV
GFREV           PROC    FAR
                PUSH    BP
                MOV     BP,SP
                CALL    GFCEL
                ADD     AX,400
                MOV     CX,[DI+4]
                PUSH    DS
                PUSH    AX
                MOV     AX,0A000H
                MOV     DS,AX
                POP     SI
                SUB     BX,BX
GFRV0:          ADD     BX,80
                DEC     CX
                JNZ     GFRV0
                SUB     BX,10
GFRV1:          XOR     BYTE PTR [SI],15
                INC     SI
                MOV     CX,14
GFRV2:          XOR     BYTE PTR [SI],255
                INC     SI
                DEC     CX
                JNZ     GFRV2
                XOR     BYTE PTR [SI],240
                ADD     SI,65
                DEC     BX
                JNZ     GFRV1
                POP     DS
                POP     BP
                RET     2
GFREV           ENDP
                PUBLIC  GFMSG
GFMSG           PROC    FAR
                PUSH    BP
                MOV     BP,SP
                MOV     BX,[BP+6]
                MOV     DI,[BX+2]
                MOV     AX,[DI]
                MOV     BX,[DI+2]
                MOV     CX,BX
                PUSH    DS
                PUSH    AX
                MOV     SI,DI
                ADD     SI,4
                MOV     AX,FLOGRFA
                MOV     ES,AX
                MOV     DI,OFFSET TMSG
                REP     MOVSB
                MOV     AX,ES
                MOV     DS,AX
                MOV     AX,0A000H
                MOV     ES,AX
                POP     DI
                ADD     DI,25760
                MOV     SI,OFFSET TMSG
                MOV     XCLR.FOREGD
                CALL    GFSEQ
                MOV     DX,BX
GFMS0:          PUSH    SI
                XOR     AX,AX
                MOV     AL,[SI]
                CMP     AX,32
                JL      GFMS9
                CMP     AX,128
                JG      GFMS9
                SUB     AX,32
                CMP     AX,64
                JLE     GFMS8
                SUB     AX,32
                JMP     GFMS8
GFMS9:          XOR     AX,AX
GFMS8:          MOV     CX,5
                MUL     CL
                MOV     SI,OFFSET CMSK
                ADD     SI,AX
                PUSH    DI
                MOV     CX,5
GFMS1:          MOV     BL,[SI]
                TEST    DH,1
                JNZ     GFMSA
                SHL     BL,1
                SHL     BL,1
                SHL     BL,1
                SHL     BL,1
GFMSA:          CALL    GFMK1
                ADD     DI,80
                INC     SI
                DEC     CX
                JNZ     GFMS1
                POP     DI
                INC     DH
                TEST    DH,1
```

```
              JNZ    GFMSY                              INC    DX
              INC    DI                                 MOV    AL,BL
GFMSY:        POP    SI                                 OUT    DX,AL
              INC    SI                                 MOV    AL,ES:[DI]
              DEC    DL                         5       SUB    AL,AL
              JNZ    GFMSO                              MOV    ES:[DI],AL
              MOV    XCLR,255                           CALL   GFSEQ
              CALL   GFSEQ                              MOV    AL,ES:[DI]
              POP    DS                                 MOV    ES:[DI],BL
              MOV    AX,DS                              MOV    DX,03CEH
              MOV    ES,AX                     10       MOV    AL,8
              POP    BP                                 OUT    DX,AL
              RET    2                                  INC    DX
GFMSG         ENDP                                      MOV    AL,255
              PUBLIC GFRED                              OUT    DX,AL
GFRED         PROC   FAR                                POP    DX
              MOV    AX,FLOGRFA                15       RET
              MOV    DS,AX                     GFMK1    ENDP
              MOV    XCLR,12                            PUBLIC GFSLP
              MOV    AX,ES                     GFSLP    PROC   FAR
              MOV    DS,AX                              PUSH   BP
              RET                                       MOV    BP,SP
GFRED         ENDP                              20      CALL   GFCEL
              PUBLIC GFWHT                              MOV    SI,[DI+4]
GFWHT         PROC   FAR                                PUSH   DS
              MOV    AX,FLOGRFA                         PUSH   SI
              MOV    DS,AX                              PUSH   AX
              MOV    XCLR,255                           MOV    AX,FLOGRFA
              MOV    AX,ES                     25       MOV    DS,AX
              MOV    DS,AX                              MOV    AX,0A000H
              RET                                       MOV    ES,AX
GFWHT         ENDP                                      POP    DI
GFSEQ         PROC   NEAR                               POP    AX
              PUSH   DS                         30      CMP    AX,0
              MOV    AX,FLOGRFA                         JNZ    GFSP1
              MOV    DS,AX                              ADD    DI,6175
              MOV    DX,03C4H                           CALL   GFSEQ
              MOV    AL,2                               MOV    BYTE PTR ES:[DI],248
              OUT    DX,AL                              CALL   GFSQR
              INC    DX                                 JMP    GFSPX
              MOV    AL,XCLR                    35 GFSP1: ADD   DI,572
              OUT    DX,AL                              MOV    BX,6
              POP    DS                        GFSP2:   MOV    SI,OFFSET BLNK
              RET                                       MOV    CX,3
GFSEQ         ENDP                                      REP    MOVSB
GFSQR         PROC   NEAR                       40      AND    BYTE PTR ES:[DI],15
              MOV    DX,03C4H                           ADD    DI,77
              MOV    AL,2                               DEC    BX
              OUT    DX,AL                              JNZ    GFSP2
              INC    DX                        GFSPX:   POP    DS
              MOV    AL,255                             MOV    AX,DS
              OUT    DX,AL                      45      MOV    ES,AX
              RET                                       POP    BP
GFSQR         ENDP                                      RET    2
GFMKO         PROC   NEAR                      GFSLP    ENDP
              PUSH   DX                                 PUBLIC GFSLS
              MOV    DX,03CEH                  GFSLS    PROC   FAR
              MOV    AL,8                       50      PUSH   BP
              OUT    DX,AL                              MOV    BP,SP
              INC    DX                                 CALL   GFCEL
              MOV    AL,BL                              MOV    SI,[DI+4]
              OUT    DX,AL                              MOV    BX,[DI+6]
              MOV    AL,ES:[DI]                         PUSH   DS
              SUB    AL,AL                      55      PUSH   SI
              MOV    ES:[DI],AL                         PUSH   AX
              MOV    DX,03CEH                           MOV    AX,FLOGRFA
              MOV    AL,8                               MOV    DS,AX
              OUT    DX,AL                              MOV    AX,0A000H
              INC    DX                                 MOV    ES,AX
              MOV    AL,255                     60      POP    DI
              OUT    DX,AL                              POP    AX
              POP    DX                                 CMP    AX,5
              RET                                       JL     GFSB1
GFMKO         ENDP                                      CMP    AX,8
GFMK1         PROC   NEAR                               JL     GFSB2
              PUSH   DX                         65      JE     GFSB1
              CALL   GFSQR                              CMP    BX,1
              MOV    DX,03CEH                           JE     GFSR0
              MOV    AL,8                               CMP    AX,11
              OUT    DX,AL                              JL     GFSB1
```

```
         CMP    AX,13                              JE     GFL03
         JL     GFSB2                              CMP    DX,4
         CMP    AX,15                              JE     GFL04
         JL     GFSB3                              CMP    DX,5
         JE     GFSB1                              JE     GFL05
         CMP    AX,16                              CMP    DX,6
         JE     GFSB2                              JE     GFL06
         JMP    GFSB3                              CMP    DX,7
GFSR0:   CMP    AX,11                              JE     GFL07
         JL     GFSR1                              CMP    DX,8
         JE     GFSR2                              JE     GFL08
         JMP    GFSR3                              CMP    DX,9
GFSB1:   MOV    AX,5601                            JE     GFL09
         JMP    GFSB4                              ADD    DI,160
GFSB2:   MOV    AX,12001                           MOV    BL,32
         JMP    GFSB4                              MOV    DX,101H
GFSB3:   MOV    AX,18401                           JMP    GFL10
GFSB4:   ADD    DI,AX                    GFL02:    ADD    DI,166
         PUSH   DI                                 MOV    BL,8
         MOV    BX,5                               MOV    DX,201H
GFSB5:   MOV    SI,OFFSET BLNK                     JMP    GFL10
         MOV    CX,14                    GFL03:    ADD    DI,175
         REP    MOVSB                              MOV    BL,4
         ADD    DI,66                              MOV    DX,301H
         DEC    BX                                 JMP    GFL10
         JNZ    GFSB5                    GFL04:    ADD    DI,2800
         CALL   GFSEQ                              MOV    BL,32
         POP    DI                                 MOV    DX,102H
         ADD    DI,5                               JMP    GFL10
         MOV    CX,7                     GFL05:    ADD    DI,2806
         MOV    BX,8                               MOV    BL,8
GFSB6:   CALL   GFMK1                              MOV    DX,202H
         ADD    DI,80                              JMP    GFL10
         DEC    CX                       GFL06:    ADD    DI,2815
         JNZ    GFSB6                              MOV    BL,4
         CALL   GFSQR                              MOV    DX,302H
         JMP    GFSLX                              JMP    GFL10
GFSR1:   MOV    AX,2815                  GFL07:    ADD    DI,6160
         JMP    GFSR4                              MOV    BL,32
GFSR2:   MOV    AX,6175                            MOV    DX,103H
         JMP    GFSR4                              JMP    GFL10
GFSR3:   MOV    AX,9215                  GFL08:    ADD    DI,6166
GFSR4:   ADD    DI,AX                              MOV    BL,8
         CALL   GFSEQ                              MOV    DX,203H
         MOV    BX,248                             JMP    GFL10
         CALL   GFMK1                    GFL09:    ADD    DI,6175
         CALL   GFSQR                              MOV    BL,4
         ADD    DI,797                             MOV    DX,303H
         MOV    BX,6                     GFL10:    CMP    CL,1
GFSR5:   MOV    SI,OFFSET BLNK                     JE     GFL1S
         MOV    CX,3                               JMP    GFL1Z
         REP    MOVSB                    GFL1S:    CMP    DH,2
         AND    BYTE PTR ES:[DI],15                JB     GFL11
         ADD    DI,77                              JE     GFL12
         DEC    BX                                 JMP    GFL13
         JNZ    GFSR5                    GFL11:    MOV    BL,63
GFSLX:   POP    DS                                 CALL   GFMK1
         MOV    AX,DS                              INC    DI
         MOV    ES,AX                              PUSH   CX
         POP    BP                                 MOV    CX,5
         RET    2                        GFL1A:    MOV    BL,255
GFSLS    ENDP                                      CALL   GFMK1
         PUBLIC GFSLL                              INC    DI
GFSLL    PROC   FAR                                DEC    CX
         PUSH   BP                                 JNZ    GFL1A
                                                   MOV    BL,248
   MOV   BP,SP                                     CALL   GFMK1
         CALL   GFCEL                              POP    CX
         MOV    DX,[DI+4]                          CMP    DL,3
         MOV    CX,[DI+6]                          JNZ    GFL1X
         PUSH   DS                                 SUB    DI,163
         PUSH   AX                                 JMP    GFL1W
         MOV    AX,FLOGRFA               GFL1X:    JMP    GFLLX
         MOV    DS,AX                    GFL12:    MOV    BL,15
         MOV    AX,0A000H                          CALL   GFMK1
         MOV    ES,AX                              INC    DI
         POP    DI                                 PUSH   CX
         CMP    DX,2                               MOV    CX,8
         JE     GFL02                    GFL1B:    MOV    BL,255
         CMP    DX,3
```

```
                CALL    GFMK1
                INC     DI
                DEC     CX
                JNZ     GFL1B
                MOV     BL,252
                CALL    GFMK1
                POP     CX
                CMP     DL,3
                JZ      GFL1V
                SUB     DI,154
GFL1W:          MOV     BL,8
                CALL    GFMK1
                MOV     BL,4
                CMP     CH,1
                JNZ     GFL1U
                MOV     BL,16
GFL1U:          ADD     DI,80
                CALL    GFMK1
                MOV     BH,BL
                MOV     BL,1
                CMP     CH,1
                JNZ     GFL1M
                MOV     BL,64
GFL1M:          ADD     DI,80
                CALL    GFMK0
                MOV     BL,BH
                ADD     DI,80
                CALL    GFMK1
                MOV     BL,8
                ADD     DI,80
                CALL    GFMK1
GFL1V:          JMP     GFLLX
GFL13:          MOV     BL,7
                CALL    GFMK1
                INC     DI
                MOV     BL,224
                CALL    GFMK1
                JMP     GFLLX
GFL1Z:          CMP     CL,2
                JE      GFL1T
                JMP     GFL1Y
GFL1T:          PUSH    CX
                CMP     DL,2
                JE      GFL22
                JA      GFL23
GFL21:          MOV     CX,34
                JMP     GFL2A
GFL22:          MOV     CX,43
                JMP     GFL2A
GFL23:          MOV     CX,6
GFL2A:          CALL    GFMK1
                ADD     DI,80
                DEC     CX
                JNZ     GFL2A
                POP     CX
                MOV     CL,BL
                CMP     DL,1
                JNZ     GFL2B
                CMP     DH,3
                JNZ     GFL2X
                SUB     DI,1520
                MOV     BL,17
                MOV     BH,10
                JMP     GFL2D
GFL2B:          CMP     DL,2
                JNZ     GFL2X
                CMP     DH,3
                JZ      GFL2X
                SUB     DI,1840
                CMP     DH,1
                JNZ     GFL2C
                MOV     BL,136
                MOV     BH,80
                JMP     GFL2D
GFL2C:          MOV     BL,34
                MOV     BH,20
GFL2D:          CALL    GFMK1
                CMP     CH,1
                JNZ     GFL2E
                SUB     DI,80
                JMP     GFL2F
GFL2E:          ADD     DI,80
GFL2F:          MOV     BL,BH
                CALL    GFMK1
                CMP     CH,1
                JNZ     GFL2G
                SUB     DI,160
                JMP     GFL2H
GFL2G:          ADD     DI,160
GFL2H:          MOV     BL,CL
                CALL    GFMK0
GFL2X:          JMP     GFLLX
GFL1Y:          CMP     CL,3
                JE      GFL30
                JMP     GFL40
GFL30:          PUSH    CX
                SUB     DX,DX
                MOV     CX,3
                JMP     GFL2A
GFL40:          CMP     CL,4
                JNE     GFL42
                CMP     DH,2
                JE      GFL42
                JA      GFL43
GFL41:          MOV     BL,63
                CALL    GFMK0
                INC     DI
                MOV     CX,5
GFL4A:          MOV     BYTE PTR ES:[DI],0
                INC     DI
                DEC     CX
                JNZ     GFL4A
                MOV     BL,248
                CALL    GFMK0
                CMP     DL,3
                JNZ     GFL4X
                SUB     DI,163
                JMP     GFL4W
GFL4X:          JMP     GFLLX
GFL42:          MOV     BL,15
                CALL    GFMK0
                INC     DI
                MOV     CX,8
GFL4B:          MOV     BYTE PTR ES:[DI],0
                CALL    GFMK0
                INC     DI
                DEC     CX
                JNZ     GFL4B
                MOV     BL,252
                CALL    GFMK0
                CMP     DL,3
                JZ      GFL4V
                SUB     DI,164
GFL4W:          MOV     CX,5
GFL4U:          MOV     BYTE PTR ES:[DI],0
                CALL    GFMK0
                ADD     DI,80
                DEC     CX
                JNZ     GFL4U
GFL4V:          JMP     GFLLX
GFL43:          MOV     BL,7
                CALL    GFMK0
                INC     DI
                MOV     BL,224
                CALL    GFMK0
                JMP     GFLLX
GFL4Z:          CMP     CL,5
                JNE     GFL60
                CMP     DL,2
                JE      GFL52
                JA      GFL53
GFL51:          MOV     CX,34
                JMP     GFL5A
GFL52:          MOV     CX,43
                JMP     GFL5A
GFL53:          MOV     CX,6
GFL5A:          CALL    GFMK0
                ADD     DI,80
```

```
            DEC     CX                              DEC     BX
            JNZ     GFL5A                           JNZ     GFEB5
            CMP     DL,1                            JMP     GFELX
            JNZ     GFL5B                GFER1:     MOV     AX,2815
            CMP     DH,3                            JMP     GFER4
            JNZ     GFL5X                GFER2:     MOV     AX,6175
            SUB     DI,1600                         JMP     GFER4
            MOV     BL,31                GFER3:     MOV     AX,9215
            JMP     GFL5D                GFER4:     ADD     DI,AX
GFL5B:      CMP     DL,2                            MOV     BYTE PTR ES:[DI],0
            JNZ     GFL5X                GFELX:     POP     DS
            CMP     DH,3                            MOV     AX,DS
            JZ      GFL5X                           MOV     ES,AX
            SUB     DI,1920                         POP     BP
            CMP     DH,1                            RET     2
            JNZ     GFL5C                GFELS      ENDP
            MOV     BL,248                          PUBLIC  GFSDN
            JMP     GFL5D                GFSDN      PROC    FAR
GFL5C:      MOV     BL,62                           PUSH    DS
GFL5D:      SUB     DX,DX                           MOV     AX,0A000H
            MOV     CX,3                            MOV     DS,AX
            JMP     GFL5A                           MOV     ES,AX
GFL5X:      JMP     GFLLX                           MOV     AX,0
GFL60:      MOV     CX,3                            MOV     DI,25760
            SUB     DX,DX                           MOV     CX,240
            JMP     GFL5A                           REP     STOSB
GFLLX:      CALL    GFSQR                           MOV     SI,19359
            POP     DS                              MOV     DI,25759
            MOV     AX,DS                           MOV     CX,19360
            MOV     ES,AX                           CALL    GFSC1
            POP     BP                              STD
            RET     2                               REP     MOVSB
GFSLL       ENDP                                    CLD
            PUBLIC  GFELS                           CALL    GFSC2
GFELS       PROC    FAR                             MOV     AX,0
            PUSH    BP                              MOV     DI,0
            MOV     BP,SP                           MOV     CX,6400
            CALL    GFCEL                           REP     STOSB
            MOV     SI,[DI+4]                       POP     DS
            MOV     BX,[DI+6]                       MOV     AX,DS
            PUSH    DS                              MOV     ES,AX
            PUSH    SI                              RET
            PUSH    AX                   GFSDN      ENDP
            MOV     AX,FLOGRFA                      PUBLIC  GFSUP
            MOV     DS,AX                GFSUP      PROC    FAR
            MOV     AX,0A000H                       PUSH    DS
            MOV     ES,AX                           MOV     AX,0A000H
            POP     DI                              MOV     DS,AX
            POP     AX                              MOV     ES,AX
            CMP     AX,5                            MOV     SI,6400
            JL      GFEB1                           MOV     DI,0
            CMP     AX,8                            MOV     CX,19360
            JL      GFEB2                           CALL    GFSC1
            JE      GFEB1                           REP     MOVSB
            CMP     BX,1                            CALL    GFSC2
            JE      GFER0                           MOV     AX,0
            CMP     AX,11                           MOV     CX,6640
            JL      GFEB1                           REP     STOSB
            CMP     AX,13                           POP     DS
            JL      GFEB2                           MOV     AX,DS
            CMP     AX,15                           MOV     ES,AX
            JL      GFEB3                           RET
            JE      GFEB1                GFSUP      ENDP
            CMP     AX,16                GFSC1      PROC    NEAR
            JE      GFEB2                           MOV     DX,03CEH
            JMP     GFEB3                           MOV     AX,5
GFER0:      CMP     AX,11                           OUT     DX,AL
            JL      GFER1                           INC     DX
            JE      GFER2                           MOV     AL,1
            JMP     GFER3                           OUT     DX,AL
GFEB1:      MOV     AX,5606                         RET
            JMP     GFEB4                GFSC1      ENDP
GFEB2:      MOV     AX,12006             GFSC2      PROC    NEAR
            JMP     GFEB4                           MOV     DX,03CEH
GFEB3:      MOV     AX,18406                        MOV     AX,5
GFEB4:      ADD     DI,AX                           OUT     DX,AL
            MOV     BX,7                            INC     DX
GFEB5:      MOV     BYTE PTR ES:[DI],0              MOV     AL,0
            ADD     DI,80                           OUT     DX,AL
                                                    RET
```

```
GFSC2   ENDP                                    CALL    GFSEQ
        PUBLIC  GFPOS                           POP     DS
GFPOS   PROC    FAR                             MOV     AX,DS
        PUSH    BP                              MOV     ES,AX
        MOV     BP,SP                       5   POP     BP
        MOV     BX,[BP+6]                       RET     2
        MOV     SI,[BX+2]               GFPOS   ENDP
        MOV     CX,8                    GFSCC   PROC    NEAR
        MOV     AX,FLOGRFA                      PUSH    DI
        MOV     ES,AX                           MOV     AX,0
        MOV     DI,OFFSET TMSG         10       MOV     BX,70
        REP     MOVSB                   GFCR2:  MOV     CX,14
        PUSH    DS                              REP     STOSB
        MOV     AX,ES                           ADD     DI,66
        MOV     DS,AX                           DEC     BX
        MOV     AX,0A000H                       JNZ     GFCR2
        MOV     ES,AX                  15       POP     DI
        MOV     DI,27203                        MOV     DX,03C4H
        MOV     SI,OFFSET TMSG                  MOV     AL,2
        PUSH    DI                              OUT     DX,AL
        MOV     BX,9                            INC     DX
        MOV     AX,0                            MOV     AL,9
GFPS4:  MOV     CX,8                   20       OUT     DX,AL
        REP     STOSB                           MOV     AX,255
        ADD     DI,72                           MOV     BX,70
        DEC     BX                      GFCR3:  MOV     CX,14
        JNZ     GFPS4                           REP     STOSB
        MOV     XCLR,BACKLF                     ADD     DI,66
        CALL    GFSEQ                  25       DEC     BX
        POP     DI                              JNZ     GFCR3
        PUSH    DI                              MOV     DX,03C4H
        MOV     BX,9                            MOV     AL,2
        MOV     AX,255                          OUT     DX,AL
GFPS5:  MOV     CX,8                            INC     DX
        REP     STOSB                  30       MOV     AL,255
        ADD     DI,72                           OUT     DX,AL
        DEC     BX                              RET
        JNZ     GFPS5                   GFSCC   ENDP
        MOV     XCLR,FOREGD                     PUBLIC  GFSCT
        CALL    GFSEQ                  35 GFSCT PROC    FAR
        POP     DI                              PUSH    BP
        MOV     DX,8                            MOV     BP,SP
GFPS0:  PUSH    SI                              CALL    GFCEL
        XOR     AX,AX                           MOV     SI,[DI+4]
        MOV     AL,[SI]                         ADD     AX,SI
        MOV     BX,30                  40       MOV     DX,[DI+6]
        CMP     AX,45                           MOV     CX,DX
        JE      GFPS1                           PUSH    DS
        MOV     BX,48                           PUSH    AX
        CMP     AX,48                           MOV     SI,DI
        JB      GFPS9                           ADD     SI,8
        CMP     AX,58                  45       MOV     AX,FLOGRFA
        JB      GFPS1                           MOV     ES,AX
        MOV     BX,55                           MOV     DI,OFFSET TMSG
        CMP     AX,65                           REP     MOVSB
        JB      GFPS9                           MOV     AX,ES
        CMP     AX,70                           MOV     DS,AX
        JB      GFPS1                  50       MOV     AX,0A000H
GFPS9:  MOV     SI,OFFSET BLNK                  MOV     ES,AX
        JMP     GFPS8                           POP     DI
GFPS1:  SUB     AX,BX                           MOV     SI,OFFSET TMSG
        MOV     CX,9                    GFST0:  PUSH    SI
        MUL     CL                              XOR     AX,AX
        MOV     SI,OFFSET PMSK         55       MOV     AL,[SI]
        ADD     SI,AX                           CMP     AX,32
GFPS8:  PUSH    DI                              JL      GFST9
        MOV     CX,9                            CMP     AX,128
GFPS3:  MOV     BL,[SI]                         JG      GFST9
        INC     SI                              SUB     AX,32
        CALL    GFMK1                  60       CMP     AX,64
        ADD     DI,80                           JLE     GFST8
        DEC     CX                              SUB     AX,32
        JNZ     GFPS3                           JMP     GFST8
        POP     DI                      GFST9:  XOR     AX,AX
        POP     SI                     65 GFST8: MOV    CX,5
        INC     SI                              MUL     CL
        INC     DI                              MOV     SI,OFFSET CMSK
        DEC     DX                              ADD     SI,AX
        JNZ     GFPS0                           PUSH    DI
        MOV     XCLR,255                        MOV     CX,5
```

```
GFST7:   MOV   BL,[SI]
         TEST  DH,1
         JNZ   GFSTA
         SHL   BL,1
         SHL   BL,1
         SHL   BL,1
         SHL   BL,1
GFSTA:   CALL  GFMK1
         ADD   DI,80
         INC   SI
         DEC   CX
         JNZ   GFST7
         POP   DI
         INC   DH
         TEST  DH,1
         JNZ   GFSTY
         INC   DI
GFSTY:   POP   SI
         INC   SI
         DEC   DL
         JNZ   GFST0
         CALL  GFSQR
         POP   DS
         MOV   AX,DS
         MOV   ES,AX
         POP   BP
         RET   2
GFSCT    ENDP
         PUBLIC GFSRC
GFSRC    PROC  FAR
         PUSH  BP
         MOV   BP,SP
         CALL  GFCEL
         MOV   DX,[DI+4]
         ADD   AX,401
         PUSH  DS
         PUSH  AX
         PUSH  AX
         MOV   AX,FLOGRFA
         MOV   ES,AX
         MOV   DI,OFFSET SBUF
         MOV   AX,0A000H
         MOV   DS,AX
         POP   SI
         CMP   DX,0
         JNZ   GFCR5
         MOV   BX,70
GFCR1:   MOV   CX,14
         REP   MOVSB
         ADD   SI,66
         DEC   BX
         JNZ   GFCR1
GFCR5:   MOV   AX,DS
         MOV   ES,AX
         POP   DI
         CALL  GFSCC
         POP   DS
         MOV   AX,DS
         MOV   ES,AX
         POP   BP
         RET   2
GFSRC    ENDP
         PUBLIC GFSRR
GFSRR    PROC  FAR
         PUSH  BP
         MOV   BP,SP
         CALL  GFCEL
         ADD   AX,401
         PUSH  DS
         PUSH  AX
         MOV   AX,FLOGRFA
         MOV   DS,AX
         MOV   SI,OFFSET SBUF
         MOV   AX,0A000H
         MOV   ES,AX
         POP   DI
         MOV   BX,70
GFRR1:   MOV   CX,14
         REP   MOVSB
         ADD   DI,66
         DEC   BX
         JNZ   GFRR1
         POP   DS
         MOV   AX,DS
         MOV   ES,AX
         POP   BP
         RET   2
GFSRR    ENDP
FLOGRFC  ENDS
```

GRAPHICS PRINT ROUTINES

```
FLOGBPA  SEGMENT PARA PUBLIC 'CODE'
;
PBUF     DB    4510 DUP (0)
;
FLOGBPA  ENDS
FLOGBPC  SEGMENT PARA PUBLIC 'CODE'
         ASSUME CS:FLOGBPC,DS:FLOGBPA
         PUBLIC GFPPL
GFPPL    PROC  FAR
         PUSH  BP
         MOV   BP,SP
         MOV   BX,[BP+6]
         MOV   DI,[BX+2]
         MOV   DX,[DI+2]
         DEC   DX
         JS    GFPL1
         MOV   AX,5
         MUL   DX
         ADD   AX,[DI]
         MOV   DX,AX
         MOV   AX,41
         MUL   DX
         MOV   CX,[DI+4]
         PUSH  DS
         PUSH  AX
         MOV   SI,DI
         ADD   SI,6
         MOV   AX,FLOGBPA
         MOV   ES,AX
         POP   DI
         ADD   DI,OFFSET PBUF
         REP   MOVSB
         POP   DS
         JMP   GFPL2
GFPL1:   MOV   AX,FLOGBPA
         MOV   ES,AX
         MOV   DI,OFFSET PBUF
         MOV   CX,4510
         MOV   AX,32
         REP   STOSB
GFPL2:   MOV   AX,DS
         MOV   ES,AX
         POP   BP
         RET   2
GFPPL    ENDP
         PUBLIC GFPPP
GFPPP    PROC  FAR
         PUSH  BP
         MOV   BP,SP
         MOV   BX,[BP+6]
         MOV   DI,[BX+2]
         MOV   DX,[DI+2]
         DEC   DX
         MOV   AX,5
         MUL   DX
         ADD   AX,[DI]
         MOV   DX,AX
         MOV   AX,41
         MUL   DX
```

```
            ADD     AX,[DI+4]
            MOV     CX,[DI+6]
            PUSH    DS
            PUSH    AX
            MOV     SI,DI
            ADD     SI,8
            MOV     AX,FLOGBPA
            MOV     ES,AX
            POP     DI
            ADD     DI,OFFSET PBUF
            REP     MOVSB
            POP     DS
            MOV     AX,DS
            MOV     ES,AX
            POP     BP
            RET     2
GFPPP       ENDP
            PUBLIC  GFPPG
GFPPG       PROC    FAR
            PUSH    BP
            MOV     BP,SP
            MOV     BX,[BP+6]
            MOV     DI,[BX+2]
            MOV     DX,[DI]
            DEC     DX
            MOV     AX,205
            MOV     CX,AX
            MUL     DX
            PUSH    DS
            MOV     SI,AX
            MOV     AX,FLOGBPA
            MOV     DS,AX
            ADD     SI,OFFSET PBUF
            REP     MOVSB
            POP     DS
            POP     BP
            RET     2
GFPPG       ENDP
FLOGBPC     ENDS
            END
```

EXECUTIVE

```
RUNOBJ=1
;
FLOPROA     SEGMENT PARA PUBLIC 'CODE'
;
ABSEGM      EQU     0D000H
ABOUTB      EQU     08000H
ABINPB      EQU     09000H
ABMODS      EQU     0A000H
ABFLAG      EQU     0F019H
ABTIMR      EQU     0F000H
;
PRTTBB      EQU     THIS BYTE
PRTTBL      DW      64 DUP (0)
;
AITRMK      DB      1,2,4,8,16,32,64,128
;
IOIN        DB      64 DUP(0)
IOOUT       DB      64 DUP(0)
FLGS        DB      512 DUP(0)
TMRW        EQU     THIS WORD
TMRS        DB      4096 DUP(0)
CTRS        DW      512 DUP(0)
REGS        DW      512 DUP(0)
KEYS        DB      16 DUP(0)
;
CBNO        DW      0
OTIM        DW      0
EADR        DW      0
CRFL        DB      0
DFLG        DB      0
NFLS        DW      0
NTMR        DW      0
NIOR        DW      0
;
SADR        DW      50 DUP(0)
ADRS        DW      50 DUP(0)
ENFR        DB      52 DUP (0)
FNMS        DB      750 DUP (0)
;
;
RAMLEN      DW      0
RAMOFF      DW      0
;
FLSCKS      DW      0
FLSCKB      DW      0
FLSLEN      DW      0
```

```
FLSOFF     DW    0
;
PGMCKS     DW    0
PGMCKB     DW    0
PGMLEN     DW    0
PGMOFF     DW    0
;
OBJW       EQU   THIS WORD
OBJC       DB    24576 DUP(255)
;
OBJFCB     DB    0
           DB    'PROJOBJ UAI'
           DB    26 DUP(0)
;
OBJBWD     EQU   THIS WORD

OBJBUF     DB    512 DUP(0)
;
CRLF       DB    10,13,36
SCNM       DB    '(5.00)$'
SCNR       DW    0
HDR0       DB    'FloPro Debugger  V1.1G',13,10,10,36
HDR9       DB    'Project: '
H9PN       DB    40 DUP (32)
H9L2       DB    '  Compiled: '
H9DT       DB    11 DUP (32)
H9TM       DB    8 DUP (32)
           DB    13,10,36
ANYM       DB    10,'PRESS ANY KEY TO CONTINUE...$'
DISM       DB    '*** OUTPUTS ARE DISABLED ***',13,36
HDR1       DB    'FLOWCHART           BLOCK       $'
LIN1       DB    2 DUP (32)
FLN1       DB    16 DUP (32)
BLK1       DB    9 DUP (32)
           DB    36
HDR2       DB    'Please select next action:',13,10,10
           DB    'F1  ------  I (INPUT)',13,10
           DB    'F2  ------  O (OUTPUT)',13,10
           DB    'F3  ------  F (FLAG)',13,10
           DB    'F4  ------  T (TIMER)',13,10
           DB    'F5  ------  C (COUNTER)',13,10
           DB    'F6  ------  R (REGISTER)',13,10,10,36
HDR3       DB    'F8  ------  SINGLE SCAN EXECUTE',13,10,10
           DB    'F9  ------  RESUME EXECUTION',13,10,10
           DB    'F10 ------  TERMINATE EXECUTION',13,10,36
HDR4       DB    10,10,'F10 ------  EXIT DEBUG MODE',13,10,36
INPM       DB    'INPUT   '
OUTM       DB    'OUTPUT  '
FLGM       DB    'FLAG    '
TMRM       DB    'TIMER   '
CTRM       DB    'COUNTER '
REGM       DB    'REGISTER'
XNUM       DB    'Enter number for '
XTYP       DB    '         ',36
YNUM       DB    13,10,10,'Invalid entry',13,10,36
LIN3       DB    10,'       IS ',36
ONM        DB    'ON ',36
OFFM       DB    'OFF',36
VALM       DB    '00000',36
F1TG       DB    13,10,10,10,'F1  ------  TOGGLE ON/OFF',36
F1MT       DB    13,10,10,10,'F1  ------  MODIFY DONE VALUE',36
TMRC       DB    'CURRENTLY AT           DONE AT          ',36
```

```
XTMR      DB      'Enter new DONE value  ',36
F1MV      DB      13,10,10,10,'F1 ------  MODIFY VALUE',36
XMCR      DB      'Enter new value  ',36
F10R      DB      13,10,10,10,'F10 ------  RETURN TO DEBUG MENU',36
ABLN      DB      '(Rack-Slot-Point = '
ABIO      DB      0,0,0,0,0,0,0,41,36
;
FLOPROA   ENDS
IF RUNOBJ
;
FLOPROB   SEGMENT PARA PUBLIC 'CODE'
;
CRTS      DB      30 DUP (?)
CRTB      DB      16384 DUP (?)
;
FLOPROB   ENDS
ENDIF
;
FLOPROC   SEGMENT PARA PUBLIC 'CODE'
;
          PUBLIC FLOPRO
FLOPRO    PROC FAR
          ASSUME CS:FLOPROC,DS:FLOPROA,ES:FLOPROA
;
FPSTRT    EQU     THIS BYTE
;
          PUSH    BP
          MOV     BP,SP
          PUSH    DS
          MOV     AX,FLOPROA
          MOV     DS,AX
          MOV     ES,AX
;
          MOV     CBNO,0
          CMP     OBJC,255
          JZ      SETBUF
          JMP     SCANLP
;
SETBUF:   MOV     DX,OFFSET OBJBUF
          MOV     AH,26
          INT     21H
;
OPNFCB:   MOV     DX,OFFSET OBJFCB
          MOV     AH,15
          INT     21H
          CMP     AL,0
          JZ      OPENOK
          MOV     CBNO,513
          JMP     BSCRET
OPENOK:   MOV     OBJFCB+14,0
          MOV     OBJFCB+15,2
;
          MOV     AH,20
          INT     21H
          CMP     AL,0
          JZ      FRSTRD
          MOV     CBNO,514
          JMP     BSCRET
FRSTRD:   MOV     BX,OBJBWD
          MOV     AX,OBJBWD+60
```

```
            CMP     AX,7
            JZ      FRSTOK
            MOV     CBNO,515
            JMP     BSCRET
FRSTOK:     MOV     SI,OFFSET OBJBUF+2
            MOV     DI,OFFSET H9PN
            MOV     CX,40
            REP     MOVSB
            MOV     DI,OFFSET H9DT
            MOV     CX,10
            REP     MOVSB
            MOV     DI,OFFSET H9TM
            MOV     CX,8
            REP     MOVSB
            MOV     AX,OBJBWD+62
            MOV     EADR,AX
            MOV     FLSLEN,AX
            MOV     AX,OBJBWD+64
            MOV     NFLS,AX
            MOV     AX,OBJBWD+66
            MOV     NIOR,AX
            MOV     AX,OBJBWD+68
            MOV     NTMR,AX
            SUB     BX,68
            MOV     CX,NFLS
            SHL     CX,1
            SUB     BX,CX
            MOV     SI,OFFSET OBJBUF+70
            MOV     DI,OFFSET SADR
            REP     MOVSB
            MOV     CX,NFLS
            MOV     AX,15
            MUL     CL
            CMP     AX,BX
            JGE     FRSTR1
            MOV     CX,AX
            SUB     BX,AX
            SUB     AX,AX
            JMP     FRSTR2
FRSTR1:     MOV     CX,BX
            SUB     AX,BX
            SUB     BX,BX
FRSTR2:     MOV     DI,OFFSET FNMS
            REP     MOVSB
            CMP     AX,0
            JE      FRSTR4
            MOV     CX,AX
            MOV     AH,20
            INT     21H
            CMP     AL,0
            JZ      FRSTR3
            MOV     CBNO,514
            JMP     BSCRET
FRSTR3:     MOV     BX,OBJBWD
            SUB     BX,CX
            MOV     SI,OFFSET OBJBUF+2
            REP     MOVSB
FRSTR4:     MOV     AX,128
            CMP     BX,0
            JE      FRSTR5
```

```
          MOV   CX,BX
          SUB   AX,BX
          MOV   DI,OFFSET PRTTBB
          REP   MOVSB
          CMP   AX,0
          JE    FRSTDN
FRSTR5:   MOV   AH,20
          INT   21H
          CMP   AL,0
          JZ    FRSTR6
          MOV   CBNO,514
          JMP   BSCRET
FRSTR6:   MOV   CX,OBJBWD
          MOV   SI,OFFSET OBJBUF+2
          REP   MOVSB
FRSTDN:   MOV   CX,NFLS
          SHL   CX,1
          MOV   SI,OFFSET SADR
          MOV   DI,OFFSET ADRS
          REP   MOVSB
          MOV   DI,OFFSET OBJC
;
OBJCRD:   MOV   AH,20
          INT   21H
          CMP   AL,0
          JZ    OBJCGD
          MOV   CBNO,514
          JMP   BSCRET
OBJCGD:   MOV   AX,OBJBWD
          MOV   CX,AX
          MOV   SI,OFFSET OBJBUF+2
          REP   MOVSB
          SUB   EADR,AX
          JNZ   OBJCRD
;
TMRSRD:   MOV   AH,20
          INT   21H
          CMP   AL,0
          JZ    TMRSGD
          MOV   CBNO,514
          JMP   BSCRET
TMRSGD:   MOV   BX,OBJBWD
          MOV   SI,2
TMRSBO:   MOV   AX,OBJBWD[SI]
          CMP   AX,0FFFFH
          JZ    CLSFCB
          MOV   CL,3
          SHL   AX,CL
          MOV   DI,AX
          MOV   AX,OBJBWD[SI+2]
          MOV   TMRW[DI],AX
          MOV   AX,OBJBWD[SI+4]
          MOV   TMRW[DI+5],AX
          MOV   AL,OBJBUF[SI+6]
          MOV   TMRS[DI+7],AL
          ADD   SI,7
          SUB   BX,7
          JNZ   TMRSBO
          JMP   TMRSRD
;
```

```
CLSFCB:    MOV     AH,16
           INT     21H
;
           PUSH    ES
           MOV     AX,ABSEGM
           MOV     ES,AX
           MOV     BX,ABMODS
           MOV     AX,0
           MOV     CX,128
ABSET0:    MOV     ES:[BX],AL
           ADD     BX,32
           DEC     CX
           JNZ     ABSET0
           MOV     DI,ABMODS
           MOV     SI,OFFSET PRTTBL
           MOV     DX,32
           MOV     AX,5
ABSETI:    MOV     BX,[SI]
           TEST    BX,08000H
           JNZ     ABSETJ
           MOV     CX,4
           SHL     BL,CL
           SHL     BX,1
           MOV     [SI],BX
           ADD     BX,DI
           MOV     ES:[BX],AL
ABSETJ:    ADD     SI,2
           DEC     DX
           JNZ     ABSETI
           MOV     DX,32
           MOV     AX,4
ABSETO:    MOV     BX,[SI]
           TEST    BX,08000H
           JNZ     ABSETP
           MOV     CX,4
           SHL     BL,CL
           SHL     BX,1
           MOV     [SI],BX
           ADD     BX,DI
           MOV     ES:[BX],AL
ABSETP:    ADD     SI,2
           DEC     DX
           JNZ     ABSETO
           PUSH    DS
           MOV     AX,40H
           MOV     DS,AX
           MOV     SI,6CH
           MOV     CX,10
           MOV     AX,[SI]
ABTIM1:    MOV     BX,[SI]
           CMP     AX,BX
           JZ      ABTIM1
ABTIM2:    MOV     AX,[SI]
           CMP     AX,BX
           JZ      ABTIM2
           DEC     CX
           JNZ     ABTIM1
           POP     DS
           MOV     DI,ABMODS
           MOV     CX,128
```

```
ABCHKI:     MOV     BX,DI
            MOV     AL,ES:[BX]
            TEST    AL,255
            JZ      ABCHKL
            INC     BX
            MOV     DL,ES:[BX]
            CMP     DL,3
            JZ      ABCHKL
            INC     BX
            MOV     DL,ES:[BX]
            CMP     AL,DL
            JZ      ABCHKE
            MOV     BX,328
            JMP     ABCHKF
ABCHKL:     ADD     DI,32
            DEC     CX
            JNZ     ABCHKI
            JMP     ABCHKO
ABCHKE:     MOV     BX,128
ABCHKF:     SUB     BX,CX
            ADD     BX,600
            MOV     CBNO,BX
            POP     ES
            JMP     BSCRET
ABCHKO:     POP     ES
            CALL    DIAGST
            CALL    IOCYCL
            TEST    AX,512
            JZ      IODGR1
            MOV     CBNO,AX
            JMP     BSCRET
IODGR1:
IFE RUNOBJ
            MOV     CBNO,520
            JMP     BSCRET
ENDIF
;
SCANLP:     SUB     AX,AX
            CLD
            MOV     DI,OFFSET KEYS
            MOV     CX,10
            REP     STOSB
CHKKEY:     MOV     DL,255
            MOV     AH,6
            INT     21H
            JZ      UPDTMR
            OR      AL,AL
            JNZ     CHKKEY
            INT     21H
            CMP     AL,25
            JNZ     CHKFUN
            SUB     AL,10
            JMP     SAVKEY
CHKFUN:     SUB     AL,59
            JC      CHKKEY
            CMP     AL,10
            JNC     CHKKEY
SAVKEY:     CBW
            MOV     DI,AX
            MOV     KEYS[DI],1
```

```
         JMP    CHKKEY
UPDTMR:  PUSH   DS
         MOV    AX,ABSEGM
         MOV    DS,AX
         MOV    SI,ABTIMR
         MOV    AX,[SI]
         POP    DS
         MOV    DX,AX
         SUB    DX,OTIM
TIMEOK:  MOV    OTIM,AX
         MOV    AX,10
         MUL    DL
         MOV    DX,AX
         MOV    BX,NTMR
         MOV    CL,3
         SAL    BX,CL
         SUB    DI,DI
TMRTST:  TEST   TMRS[DI],2
         JNZ    TMRACT
TMRADD:  ADD    DI,8
         CMP    BX,DI
         JNC    TMRTST
         JMP    STRTSC
TMRACT:  TEST   TMRS[DI],16
         JNZ    TMRRST
         TEST   TMRS[DI],8
         JNZ    TMRSTP
         ADD    TMRS[DI+2],DL
         ADC    TMRS[DI+3],DH
         ADC    TMRS[DI+4],0
         MOV    AL,TMRS[DI+7]
         CMP    AL,TMRS[DI+4]
         JC     TMRDON
         JNZ    TMRADD
         MOV    AL,TMRS[DI+6]
         CMP    AL,TMRS[DI+3]
         JC     TMRDON
         JNZ    TMRADD
         MOV    AL,TMRS[DI+5]
         CMP    TMRS[DI+2],AL
         JC     TMRADD
TMRDON:  TEST   TMRS[DI],64
         JNZ    TMROUT
         OR     TMRS[DI],1
TMRSTP:  AND    TMRS[DI],225
         JMP    TMRADD
TMROUT:  SUB    AX,AX
         MOV    AL,TMRS[DI+1]
         TEST   TMRS[DI],128
         JZ     TMRLOW
         ADD    AX,256
TMRLOW:  MOV    SI,AX
         AND    SI,7
         MOV    CL,AITRMK[SI]
         NOT    CL
         MOV    SI,AX
         SHR    SI,1
         SHR    SI,1
         SHR    SI,1
         AND    IOOUT[SI],CL
```

```
TMRRST:  AND   TMRS[DI],224
         MOV   TMRS[DI+2],0
         MOV   TMRS[DI+3],0
         MOV   TMRS[DI+4],0
         JMP   TMRADD
STRTSC:  MOV   CRFL,0
         MOV   SI,1
FLLOOP:  ADD   SI,2
         MOV   DX,OBJW[SI]
         MOV   EADR,DX
         ADD   SI,2
         MOV   DH,OBJC[SI]
         MOV   AX,OBJW[SI+1]
         CMP   DH,0C0H
         JZ    FREEZE
         CALL  DECIDE
         CMP   DFLG,0
         JNZ   FREEZE
         SUB   AX,AX
         MOV   AL,CRFL
         MOV   DI,AX
         MOV   ENFR[DI],1
         SHL   AL,1
         MOV   DI,AX
         MOV   SI,ADRS[DI]
         ADD   SI,3
         MOV   DH,OBJC[SI]
         CMP   DH,0F8H
         JNZ   NOWAIT
         MOV   AX,OBJW[SI+1]
         MOV   CL,3
         SHL   AX,CL
         MOV   SI,AX
         OR    TMRS[SI],18
NOWAIT:  MOV   AX,SADR[DI]
         MOV   ADRS[DI],AX
         JMP   FLOEND
FREEZE:  ADD   SI,3
         MOV   DH,OBJC[SI]
         MOV   AX,OBJW[SI+1]
         CMP   DH,0C0H
         JZ    DOFLOW
         CALL  DECIDE
         CMP   DFLG,0
         JZ    DOFLOW
         SUB   AX,AX
         MOV   AL,CRFL
         MOV   DI,AX
         MOV   ENFR[DI],2
         JMP   FLOEND
DOFLOW:  SUB   AX,AX
         MOV   AL,CRFL
         MOV   DI,AX
         MOV   ENFR[DI],0
         SHL   AL,1
         MOV   DI,AX
         MOV   SI,ADRS[DI]
DOBLOK:  ADD   SI,3
         MOV   DH,OBJC[SI]
         MOV   AX,OBJW[SI+1]
```

```
                CMP     DH,OFOH
                JNC     TSCOMP
                JMP     TSDCSN
TSCOMP:         CMP     DH,OF3H
                JC      COMPST
                JMP     TSMOVE
COMPST:         MOV     DL,DH
                MOV     DH,AL
                ADD     SI,2
                MOV     AX,OBJW[SI]
                SHL     AX,1
                MOV     DI,AX
                CMP     DH,O6OH
                JNC     COMPRG
                MOV     BX,OFFSET CTRS
                JMP     COMPVS
COMPRG:         MOV     BX,OFFSET REGS
COMPVS:         MOV     CX,[BX+DI]
                ADD     SI,2
                TEST    DH,8
                JNZ     COMPFV
                MOV     AX,OBJW[SI]
                SHL     AX,1
                MOV     DI,AX
                ADD     DI,BX
                JMP     COMPIT
COMPFV:         MOV     DI,OFFSET OBJC
                ADD     DI,SI
COMPIT:         ADD     SI,2
                MOV     BH,3
                AND     BH,DL
                JZ      COMPEQ
                CMP     BH,1
                JZ      COMPLT
                CMP     [DI],CX
                JC      COMPYS
                JMP     COMPNO
COMPLT:         CMP     CX,[DI]
                JC      COMPYS
                JMP     COMPNO
COMPEQ:         CMP     CX,[DI]
                JZ      COMPYS
COMPNO:         MOV     DFLG,0
                JMP     DCSNRT
COMPYS:         MOV     DFLG,1
                JMP     DCSNRT
TSDCSN:         CMP     DH,OCOH
                JNC     DCSNST
                JMP     TSCTRL
DCSNST:         CALL    DECIDE
                ADD     SI,3
DCSNRT:         CMP     DFLG,0
                JNZ     DCSNND
                ADD     SI,2
DCSNND:         MOV     DX,OBJW[SI]
                JMP     NXTBLK
TSCTRL:         CMP     DH,O90H
                JNC     CTRLST
                JMP     ERRCOD
CTRLST:         MOV     BH,7
```

```
                AND     BH,DH
                CMP     BH,2
                JZ      CTLISF
                CMP     BH,3
                JZ      CTLIST
                CMP     BH,5
                JNZ     CTLISY
                JMP     CTLISC
CTLISY:         CMP     DH,0B0H
                JNC     CTYPON
                MOV     DI,AX
                AND     DI,7
                MOV     CL,AITRMK[DI]
                MOV     DI,AX
                SHR     DI,1
                SHR     DI,1
                SHR     DI,1
                CMP     DH,0A0H
                JNC     CTYOFF
                OR      IOOUT[DI],CL
                JMP     CTNEXT
CTYOFF:         NOT     CL
                AND     IOOUT[DI],CL
                JMP     CTNEXT
CTYPON:         MOV     CL,3
                SHL     AX,CL
                MOV     DI,AX
                OR      TMRS[DI],6
                SUB     AX,AX
                MOV     AL,TMRS[DI+1]
                TEST    TMRS[DI],128
                JZ      CTYLOW
                ADD     AX,256
CTYLOW:         SUB     DH,020H
                JMP     CTLISY
CTLISF:         MOV     DI,AX
                CMP     DH,0A0H
                JNC     CTFOFF
                MOV     FLGS[DI],1
                JMP     CTNEXT
CTFOFF:         MOV     FLGS[DI],0
                JMP     CTNEXT
CTLIST:         MOV     CL,3
                SHL     AX,CL
                MOV     DI,AX
                CMP     DH,0B0H
                JNC     CTTRST
                CMP     DH,0A0H
                JNC     CTTSTP
                AND     TMRS[DI],225
                OR      TMRS[DI],6
                JMP     CTNEXT
CTTSTP:         AND     TMRS[DI],225
                OR      TMRS[DI],10
                JMP     CTNEXT
CTTRST:         AND     TMRS[DI],224
                MOV     TMRS[DI+2],0
                MOV     TMRS[DI+3],0
                MOV     TMRS[DI+4],0
                JMP     CTNEXT
```

```
CTLISC:   SHL   AX,1
          MOV   DI,AX
          MOV   BX,CTRS[DI]
          CMP   DH,080H
          JNC   CTCCLR
          CMP   DH,0ACH
          JNC   CTCDCR
          INC   BX
          JMP   CTCSTR
CTCDCR:   DEC   BX
          JMP   CTCSTR
CTCCLR:   SUB   BX,BX
CTCSTR:   MOV   CTRS[DI],BX
CTNEXT:   TEST  DH,8
          JNZ   CTLAST
          ADD   SI,3
          MOV   DH,OBJC[SI]
          MOV   AX,OBJW[SI+1]
          JMP   CTRLST
CTLAST:   ADD   SI,3
          MOV   DX,OBJW[SI]
          JMP   NXTBLK
TSMOVE:   CMP   DH,0F8H
          JC    MOVEST
          JMP   TSWAIT
MOVEST:   MOV   DH,AL
          ADD   SI,2
          MOV   AX,OBJW[SI]
          CMP   DH,080H
          JNC   MOVESV
          CMP   DH,01FH
          JC    MOVESI
          SHL   AX,1
          MOV   DI,AX
          CMP   DH,60H
          JNC   MOVESR
          MOV   BX,CTRS[DI]
          JMP   MOVOUT
MOVESR:   MOV   BX,REGS[DI]
          JMP   MOVOUT
MOVESV:   MOV   BX,AX
          JMP   MOVOUT
MOVESI:   SUB   BX,BX
          ADD   SI,2
MOVEIN:   SHL   BX,1
          MOV   DI,AX
          AND   DI,7
          MOV   CL,AITRMK[DI]
          MOV   DI,AX
          SHR   DI,1
          SHR   DI,1
          SHR   DI,1
          TEST  CL,IOIN[DI]
          JZ    MOVEIO
          OR    BX,1
MOVEIO:   CMP   AX,OBJW[SI]
          JZ    MOVOUT
          JC    MOVEII
          DEC   AX
          JMP   MOVEIN
```

```
MOVEII:   INC   AX
          JMP   MOVEIN
MOVOUT:   ADD   SI,2
          MOV   DL,7
          AND   DL,DH
          CMP   DL,7
          JNZ   MOVECR
          JMP   MOVEDO
MOVECR:   MOV   AX,OBJW[SI]
          SHL   AX,1
          MOV   DI,AX
          CMP   DI,5
          JNZ   MOVEDR
          ADD   DI,OFFSET CTRS
          JMP   MOVEOK
MOVEDR:   ADD   DI,OFFSET REGS
          CMP   DH,016H
          JZ    MOVECV
          CMP   DH,056H
          JNZ   MOVEOK
          CALL  BINTOB
MOVECV:   CALL  BCDTOB
MOVEOK:   MOV   [DI],BX
          JMP   MOVEDN
MOVEDO:   CMP   DH,067H
          JNZ   MOVEOB
          CALL  BINTOB
MOVEOB:   MOV   AX,OBJW[SI+2]
          MOV   DX,OBJW[SI]
          ADD   SI,2
MOVEON:   MOV   DI,AX
          AND   DI,7
          MOV   CL,AITRMK[DI]
          MOV   DI,AX
          SHR   DI,1
          SHR   DI,1
          SHR   DI,1
          TEST  BX,1
          JZ    MOVEOF
          OR    IOOUT[DI],CL
          JMP   MOVEOT
MOVEOF:   NOT   CL
          AND   IOOUT[DI],CL
MOVEOT:   SHR   BX,1
          CMP   AX,DX
          JZ    MOVEDN
          JC    MOVEOI
          DEC   AX
          JMP   MOVEON
MOVEOI:   INC   AX
          JMP   MOVEON
MOVEDN:   ADD   SI,2
          MOV   DX,OBJW[SI]
          JMP   NXTBLK
TSWAIT:   CMP   DH,0F8H
          JZ    WAITST
          JMP   TSCALL
WAITST:   MOV   CL,3
          SHL   AX,CL
          MOV   DI,AX
```

```
            TEST    TMRS[DI],1
            JNZ     WAITDN
            TEST    TMRS[DI],2
            JNZ     WAITND
            OR      TMRS[DI],6
WAITND:     MOV     DX,SI
            SUB     DX,3
            JMP     SAVNXT
WAITDN:     OR      TMRS[DI],18
            ADD     SI,3
            MOV     DX,OBJW[SI]
            JMP     NXTBLK
TSCALL:     CMP     DH,0FCH
            JZ      CALLST
ERRCOD:     MOV     CBNO,516
            JMP     BSCRET
CALLST:     CMP     CBNO,0
            JNZ     WAITND
            MOV     CBNO,AX
            ADD     SI,3
            MOV     DX,OBJW[SI]
            JMP     SAVNXT
NXTBLK:     CMP     DX,SI
            JC      SAVNXT
            MOV     SI,DX
            JMP     DOBLOK
SAVNXT:     SUB     AX,AX
            MOV     AL,CRFL
            SHL     AL,1
            MOV     DI,AX
            MOV     ADRS[DI],DX
FLOEND:     MOV     SI,EADR
            SUB     AX,AX
            MOV     AL,CRFL
            INC     AL
            CMP     AX,NFLS
            JNC     LASTFL
            MOV     CRFL,AL
            JMP     FLLOOP
LASTFL:     MOV     ENFR+50,0
            SUB     CX,CX
            MOV     DH,OBJC
            MOV     AX,OBJW+1
            CMP     DH,0C0H
            JZ      ENDSCN
            CALL    DECIDE
            CMP     DFLG,0
            JNZ     ENDSCN
            MOV     ENFR+50,1
            SUB     AX,AX
            MOV     DI,OFFSET IOOUT
            MOV     CX,64
            REP     STOSB
            MOV     BX,NTMR
            MOV     CL,3
            SAL     BX,CL
            SUB     DI,DI
OTMRCK:     TEST    TMRS[DI],64
            JNZ     OUTTMR
OTMRNX:     ADD     DI,8
```

```
            CMP     BX,DI
            JNC     OTMRCK
            JMP     ENDSCN
OUTTMR:     OR      TMRS[DI],18
            JMP     OTMRNX
ENDSCN:     CALL    IOCYCL
            TEST    AX,512
            JZ      IODGR2
            MOV     CBNO,AX
            JMP     BSCRET
IODGR2:     CMP     KEYS[15],0
            JZ      BSCCHK
            CALL    DBUGGR
            CMP     BX,0
            JNZ     DBUGEX
            CALL    IOCYCL
            TEST    AX,512
            JZ      BSCCHK
            MOV     CBNO,AX
            JMP     BSCRET
BSCCHK:     CMP     CBNO,0
            JNZ     BSCRET
            JMP     SCANLP
BSCRET:     MOV     BX,CBNO
DBUGEX:     POP     AX
            MOV     DS,AX
            MOV     ES,AX
            MOV     DI,[BP]+6
            MOV     [DI],BX
            POP     BP
            RET     2
FLOPRO      ENDP
;
IOCYCL      PROC    NEAR
            PUSH    ES
            MOV     AX,ABSEGM
            MOV     ES,AX
            MOV     DI,ABFLAG
            MOV     BYTE PTR ES:[DI],255
IOWTHI:     TEST    BYTE PTR ES:[DI],255
            JZ      IOWTLO
            CALL    DIAGRN
            JMP     IOWTHI
            JMP     IODGEX
IOWTLO:     MOV     DX,ABINPB
            MOV     CX,32
            MOV     SI,OFFSET PRTTBL
            MOV     DI,OFFSET IOIN
IOINLO:     MOV     BX,[SI]
            TEST    BX,08000H
            JNZ     IOINL1
            ADD     BX,DX
            MOV     AL,ES:[BX]
            INC     BX
            MOV     AH,ES:[BX]
            MOV     [DI],AX
IOINL1:     ADD     DI,2
            ADD     SI,2
            DEC     CX
            JNZ     IOINLO
```

```
                MOV     DX,ABOUTB
                MOV     CX,32
                MOV     DI,OFFSET IOOUT
IOOUT0:         MOV     BX,[SI]
                TEST    BX,08000H
                JNZ     IOOUT1
                ADD     BX,DX
                MOV     AX,[DI]
                MOV     ES:[BX],AL
                INC     BX
                MOV     ES:[BX],AH
IOOUT1:         ADD     DI,2
                ADD     SI,2
                DEC     CX
                JNZ     IOOUT0
                MOV     BX,ABFLAG
                MOV     AX,255
                MOV     ES:[BX],AL
IODGEX:         POP     ES
                RET
IOCYCL          ENDP
;
DECIDE          PROC    NEAR
                MOV     DFLG,0
                SUB     BX,BX
                JMP     DECG01
DECG00:         ADD     SI,3
                MOV     DH,OBJC[SI]
                MOV     AX,OBJW[SI+1]
DECG01:         MOV     BH,7
                AND     BH,DH
                CMP     BH,3
                JZ      DECIST
                JNC     DECISK
                MOV     DI,AX
                CMP     BH,2
                JZ      DECISF
                AND     DI,7
                MOV     CL,AITRMK[DI]
                MOV     DI,AX
                SHR     DI,1
                SHR     DI,1
                SHR     DI,1
                ADD     DI,OFFSET IOIN
                JMP     DECG09
DECISF:         ADD     DI,OFFSET FLGS
                JMP     DECG02
DECIST:         MOV     CL,3
                SHL     AX,CL
                MOV     DI,AX
                ADD     DI,OFFSET TMRS
                JMP     DECG02
DECISK:         DEC     AX
                MOV     DI,AX
                ADD     DI,OFFSET KEYS
DECG02:         MOV     CL,1
DECG09:         SUB     BH,BH
                TEST    DH,8
                JNZ     DECNOT
                TEST    [DI],CL
```

```
            JNZ     DECYES
            JMP     DECGO3
DECNOT:     TEST    [DI],CL
            JNZ     DECGO3
DECYES:     MOV     BH,1
DECGO3:     CMP     BL,0
            JNZ     DECAND
            MOV     DFLG,BH
            JMP     DECGO4
DECAND:     AND     DFLG,BH
DECGO4:     MOV     BX,3000H
            AND     BH,DH
            JZ      DECRET
            CMP     BH,20H
            JZ      DECOR
            INC     BL
            JMP     DECGO0
DECOR:      CMP     DFLG,0
            JNZ     DECON
            JMP     DECGO0
DECON:      ADD     SI,3
            TEST    OBJC[SI],30H
            JNZ     DECON
DECRET:     RET
DECIDE      ENDP

BCDTOB      PROC    NEAR
            SUB     AX,AX
            CMP     BX,0A000H
            JC      BCDT01
            ADD     AX,9000
            AND     BX,0FFFH
            JMP     BCDT09
BCDT01:     SUB     BX,1000H
            JC      BCDT02
            ADD     AX,1000
            JMP     BCDT01
BCDT02:     ADD     BX,1000H
BCDT09:     CMP     BX,0A00H
            JC      BCDT03
            ADD     AX,900
            AND     BX,0FFH
            JMP     BCDT08
BCDT03:     SUB     BX,100H
            JC      BCDT04
            ADD     AX,100
            JMP     BCDT03
BCDT04:     ADD     BX,100H
BCDT08:     CMP     BX,0A0H
            JC      BCDT05
            ADD     AX,90
            AND     BX,0FH
            JMP     BCDT07
BCDT05:     SUB     BX,10H
            JC      BCDT06
            ADD     AX,10
            JMP     BCDT05
BCDT06:     ADD     BX,10H
BCDT07:     CMP     BX,0AH
```

```
                JC      BCDTOA
                MOV     BX,9
BCDTOA:         ADD     BX,AX
                RET
BCDTOB          ENDP
;
BINTOB          PROC    NEAR
                SUB     AX,AX
                CMP     BX,9999
                JC      BINTO1
                MOV     BX,9999H
                RET
BINTO1:         SUB     BX,1000
                JC      BINTO2
                ADD     AX,1000H
                JMP     BINTO1
BINTO2:         ADD     BX,1000
BINTO3:         SUB     BX,100
                JC      BINTO4
                ADD     AX,100H
                JMP     BINTO3
BINTO4:         ADD     BX,100
BINTO5:         SUB     BX,10
                JC      BINTO6
                ADD     AX,10H
                JMP     BINTO5
BINTO6:         ADD     BX,10
                ADD     BX,AX
                RET
BINTOB          ENDP
;
IF RUNOBJ
                PUBLIC  GETCTR
GETCTR          PROC    FAR
                PUSH    BP
                MOV     AX,FLOPROA
                MOV     ES,AX
                MOV     BP,SP
                MOV     SI,DS:[BP]+8
                MOV     BX,DS:[SI]
                SHL     BX,1
                ADD     BX,OFFSET FLOPROA:CTRS
                MOV     AX,ES:[BX]
                MOV     DI,DS:[BP]+6
                MOV     DS:[DI],AX
                PUSH    DS
                POP     ES
                POP     BP
                RET     4
GETCTR          ENDP
;
                PUBLIC  SETCTR
SETCTR          PROC    FAR
                PUSH    BP
                MOV     AX,FLOPROA
                MOV     ES,AX
                MOV     BP,SP
                MOV     SI,DS:[BP]+8
                MOV     BX,DS:[SI]
                SHL     BX,1
```

```
                ADD     BX,OFFSET FLOPROA:CTRS
                MOV     SI,DS:[BP]+6
                MOV     AX,DS:[SI]
                MOV     ES:[BX],AX
                PUSH    DS
                POP     ES
                POP     BP
                RET     4
SETCTR          ENDP
;
                PUBLIC  GETREG
GETREG          PROC    FAR
                PUSH    BP
                MOV     AX,FLOPROA
                MOV     ES,AX
                MOV     BP,SP
                MOV     SI,DS:[BP]+8
                MOV     BX,DS:[SI]
                SHL     BX,1
                ADD     BX,OFFSET FLOPROA:REGS
                MOV     AX,ES:[BX]
                MOV     DI,DS:[BP]+6
                MOV     DS:[DI],AX
                PUSH    DS
                POP     ES
                POP     BP
                RET     4
GETREG          ENDP

PUBLIC  SETREG
SETREG          PROC    FAR
                PUSH    BP
                MOV     AX,FLOPROA
                MOV     ES,AX
                MOV     BP,SP
                MOV     SI,DS:[BP]+8
                MOV     BX,DS:[SI]
                SHL     BX,1
                ADD     BX,OFFSET FLOPROA:REGS
                MOV     SI,DS:[BP]+6
                MOV     AX,DS:[SI]
                MOV     ES:[BX],AX
                PUSH    DS
                POP     ES
                POP     BP
                RET     4
SETREG          ENDP
;
ELSE
                PUBLIC  SETDRV
SETDRV          PROC    FAR
                PUSH    BP
                MOV     BP,SP
                MOV     SI,[BP]+6
                MOV     BL,[SI]
                MOV     AX,FLOPROA
                MOV     DS,AX
                MOV     SI,OFFSET FLOPROA:OBJFCB
                MOV     [SI],BL
                PUSH    ES
```

```
            POP     DS
            POP     BP
            RET     2
SETDRV      ENDP
;
            PUBLIC  UADBUG
UADBUG      PROC    FAR
            PUSH    BP
            MOV     BP,SP
            PUSH    DS
            MOV     AX,FLOPROA
            MOV     DS,AX
            MOV     ES,AX
            CALL    DBUGGR
            POP     AX
            MOV     DS,AX
            MOV     ES,AX
            MOV     DI,[BP]+6
            MOV     [DI],BX
            POP     BP
            RET     2
UADBUG      ENDP
;
ENDIF
;
DBUGGR      PROC    NEAR
            PUSH    BP
IF RUNOBJ
            PUSH    ES
            MOV     AX,FLOPROB
            MOV     ES,AX
            MOV     DI,OFFSET FLOPROB:CRTB
            MOV     CX,16384
            MOV     AX,0B800H
            MOV     DS,AX
            SUB     SI,SI
            REP     MOVSB
            MOV     DI,OFFSET FLOPROB:CRTS
            MOV     AX,40H
            MOV     DS,AX
            MOV     SI,49H
            MOV     CX,30
            REP     MOVSB
            POP     ES
            MOV     AX,ES
            MOV     DS,AX
ENDIF
            MOV     AX,2
            INT     10H
            CMP     NFLS,0
            JZ      UAMENU
            MOV     SCNR,3130H
            CALL    CLRSCR
            MOV     DX,OFFSET HDR9
            INT     21H
            MOV     DX,OFFSET HDR1
            INT     21H
            INT     21H
            INT     21H
            MOV     DX,OFFSET CRLF+1
```

```
            INT     21H
            MOV     CRFL,0
LINLP1:     CALL    BUILD1
            SUB     AX,AX
            MOV     AL,CRFL
            INC     AL
            MOV     CRFL,AL
            CMP     AX,NFLS
            JNZ     LINLP1
            MOV     DX,OFFSET CRLF
            MOV     AH,9
            INT     21H
            TEST    ENFR+50,1
            JZ      OUTENA
            MOV     DX,OFFSET DISM
            INT     21H
OUTENA:     MOV     DX,OFFSET ANYM
            INT     21H
            CALL    GETKEY
UAMENU:     MOV     SCNR,3230H
            CMP     NFLS,0
            JZ      DOMENU
            INC     SCNR
DOMENU:     CALL    CLRSCR
            MOV     DX,OFFSET HDR2
            MOV     AH,9
            INT     21H
            CMP     NFLS,0
            JZ      NOFLOS
            MOV     DX,OFFSET HDR3
            INT     21H
            JMP     SELACT
NOFLOS:     MOV     DX,OFFSET HDR4
            INT     21H
SELACT:     CALL    GETKEY
            JNC     SELACT
            CMP     AL,59
            JNZ     SELAT2
            JMP     SELINP
SELAT2:     CMP     AL,60
            JNZ     SELAT3
            JMP     SELOUT
SELAT3:     CMP     AL,61
            JNZ     SELAT4
            JMP     SELFLG
SELAT4:     CMP     AL,62
            JNZ     SELAT5
            JMP     SELTMR
SELAT5:     CMP     AL,63
            JNZ     SELAT6
            JMP     SELCTR
SELAT6:     CMP     AL,64
            JNZ     SELAT8
            JMP     SELREG
SELAT8:     CMP     NFLS,0
            JZ      SELATA
            SUB     BX,BX
            MOV     KEYS[15],1
            CMP     AL,66
            JZ      RSMSCN
```

```
                MOV     KEYS[15],0
                CMP     AL,67
                JZ      RSMSCN
SELATA:         CMP     AL,68
                JNZ     SELACT
                SUB     AX,AX
                MOV     DI,OFFSET IOOUT
                MOV     CX,64
                REP     STOSB
                CALL    IOCYCL
                TEST    AX,512
                JZ      IODGR4
                MOV     BX,AX
                JMP     RSMSCN
IODGR4:         MOV     BX,512
IF RUNOBJ
RSMSCN:         PUSH    DS
                MOV     AX,FLOPROB
                MOV     DS,AX
                MOV     SI,OFFSET FLOPROB:CRTS
                SUB     AX,AX
                MOV     AL,[SI]
                INT     10H
                MOV     CX,[SI+23]
                MOV     AX,256
                INT     10H
                MOV     AX,40H
                MOV     ES,AX
                MOV     DI,49H
                MOV     CX,30
                REP     MOVSB
                MOV     AX,0B800H
                MOV     ES,AX
                SUB     DI,DI
                MOV     SI,OFFSET FLOPROB:CRTB
                MOV     CX,16384
                REP     MOVSB
                POP     DS
                MOV     AX,DS
                MOV     ES,AX
ELSE
RSMSCN:         PUSH    BX
                MOV     AX,600H
                MOV     BX,700H
                SUB     CX,CX
                MOV     DX,184FH
                INT     10H
                MOV     AX,100H
                MOV     CX,2607H
                INT     10H
                POP     BX
ENDIF
                POP     BP
                RET
SELINP:         MOV     SI,OFFSET INPM
                MOV     SCNR,3330H
                CALL    ASKNUM
                JNC     SELIRT
                MOV     ABIO,0
                MOV     AX,BX
                CALL    ABDEFN
```

```
              MOV     DX,OFFSET F1OR
              MOV     AH,9
              INT     21H
SELINX:       PUSH    BX
              MOV     DX,309H
              SUB     BX,BX
              MOV     AH,2
              INT     10H
              PUSH    NIOR
              MOV     NIOR,512
              CALL    IOCYCL
              POP     NIOR
              POP     BX
              TEST    AX,512
              JZ      IODGR5
              MOV     BX,AX
              JMP     RSMSCN
IODGR5:       MOV     DI,BX
              AND     DI,7
              MOV     AL,AITRMK[DI]
              MOV     DI,BX
              SHR     DI,1
              SHR     DI,1
              SHR     DI,1
              TEST    AL,IOIN[DI]
              JNZ     SELION
              MOV     DX,OFFSET OFFM
              JMP     SELIWM
SELION:       MOV     DX,OFFSET ONM
SELIWM:       MOV     AH,9
              INT     21H
              MOV     DL,255
              MOV     AH,6
              INT     21H
              JZ      SELINX
              OR      AL,AL
              JNZ     SELINX
              INT     21H
              CMP     AL,68
              JNZ     SELINX
SELIRT:       JMP     UAMENU
SELOUT:       MOV     SI,OFFSET OUTM
              MOV     SCNR,3430H
              CALL    ASKNUM
              JNC     SELORT
              MOV     ABIO,64
              MOV     AX,BX
              CALL    ABDEFN
              MOV     DX,OFFSET F1TG
              MOV     AH,9
              INT     21H
              MOV     DX,OFFSET F1OR
              INT     21H
SELONX:       PUSH    BX
              MOV     DX,309H
              SUB     BX,BX
              MOV     AH,2
              INT     10H
              PUSH    NIOR
              MOV     NIOR,512
```

```
                CALL    IOCYCL
                POP     NIOR
                POP     BX
                TEST    AX,512
                JZ      IODGR6
                MOV     BX,AX
                JMP     RSMSCN
IODGR6:         MOV     DI,BX
                AND     DI,7
                MOV     CL,AITRMK[DI]
                MOV     DI,BX
                SHR     DI,1
                SHR     DI,1
                SHR     DI,1
                TEST    CL,IOOUT[DI]
                JNZ     SELOON
                MOV     DX,OFFSET OFFM
                JMP     SELOWM
SELOON:         MOV     DX,OFFSET ONM
SELOWM:         MOV     AH,9
                INT     21H
SELOGK:         CALL    GETKEY
                JNC     SELOGK
                CMP     AL,59
                JNZ     SELO10
                XOR     IOOUT[DI],CL
                JMP     SELONX
SELO10:         CMP     AL,68
                JNZ     SELOGK
SELORT:         JMP     UAMENU
SELFLG:         MOV     SI,OFFSET FLGM
                MOV     SCNR,3530H
                CALL    ASKNUM
                JNC     SELFRT
                MOV     DX,OFFSET F1TG
                MOV     AH,9
                INT     21H
                MOV     DX,OFFSET F1OR
                INT     21H
SELFNX:         PUSH    BX
                MOV     DX,309H
                SUB     BX,BX
                MOV     AH,2
                INT     10H
                POP     BX
                TEST    FLGS[BX],1
                JNZ     SELFON
                MOV     DX,OFFSET OFFM
                JMP     SELFWM
SELFON:         MOV     DX,OFFSET ONM
SELFWM:         MOV     AH,9
                INT     21H
SELFGK:         CALL    GETKEY
                JNC     SELFGK
                CMP     AL,59
                JNZ     SELF10
                XOR     FLGS[BX],1
                JMP     SELFNX
SELF10:         CMP     AL,68
                JNZ     SELFGK
```

```
SELFRT:  JMP   UAMENU
SELTMR:  MOV   SI,OFFSET TMRM
         MOV   SCNR,3630H
         CALL  ASKNUM
         JNC   SELTRT
         MOV   DX,OFFSET F1MT
         MOV   AH,9
         INT   21H
         MOV   DX,OFFSET F1OR
         INT   21H
         MOV   CX,3
         SHL   BX,CL
         MOV   SI,BX
         ADD   SI,OFFSET TMRS
SELTNX:  MOV   SCNM+4,30H
         CALL  SCRNUM
         MOV   DX,309H
         SUB   BX,BX
         MOV   AH,2
         INT   10H
         MOV   AX,[SI+2]
         SUB   DX,DX
         MOV   DL,[SI+4]
         MOV   CX,1000
         DIV   CX
         MOV   BX,AX
         MOV   AX,DX
         MOV   CX,10
         DIV   CL
         SUB   DX,DX
         MOV   DL,AL
         MOV   DI,OFFSET TMRC+13
         CALL  BUILD4
         MOV   AX,[SI+5]
         MOV   DL,[SI+7]
         MOV   CX,1000
         DIV   CX
         MOV   BX,AX
         MOV   AX,DX
         MOV   CX,10
         DIV   CL
         SUB   DX,DX
         MOV   DL,AL
         MOV   DI,OFFSET TMRC+31
         CALL  BUILD4
         MOV   DX,OFFSET TMRC
         MOV   AH,9
         INT   21H
SELTGK:  CALL  GETKEY
         JNC   SELTGK
         CMP   AL,59
         JZ    SELTF1
         CMP   AL,68
         JNZ   SELTGK
SELTRT:  JMP   UAMENU
SELTF1:  MOV   SCNM+4,31H
         CALL  SCRNUM
         MOV   DX,0C00H
         SUB   BX,BX
         MOV   AH,2
```

```
                INT     10H
                MOV     DX,OFFSET XTMR
                MOV     AH,9
                INT     21H
                SUB     BX,BX
                SUB     CX,CX
                SUB     DX,DX
SELTF2:         CALL    GETKEY
                JC      SELTF2
                CMP     AL,8
                JZ      SELTF6
                CMP     AL,13
                JZ      SELTF8
                CMP     CH,7
                JNC     SELTF2
                CMP     DH,0
                JNZ     SELTF4
                CMP     AL,46
                JNZ     SELTF3
                MOV     DL,AL
                MOV     AH,2
                INT     21H
                PUSH    BX
                SUB     BX,BX
                INC     CH
                MOV     DH,CH
                JMP     SELTF2
SELTF3:         CMP     CH,4
                JNC     SELTF2
                JMP     SELTF5
SELTF4:         MOV     AH,CH
                SUB     AH,DH
                CMP     AH,2
                JNC     SELTF2
SELTF5:         CMP     AL,48
                JC      SELTF2
                CMP     AL,58
                JNC     SELTF2
                MOV     DL,AL
                MOV     AH,2
                INT     21H
                SUB     AL,48
                MOV     CL,4
                SHL     BX,CL
                OR      BL,AL
                INC     CH
                JMP     SELTF2
SELTF6:         CMP     CH,0
                JZ      SELTF2
                CMP     CH,DH
                JNZ     SELTF7
                SUB     DH,DH
                POP     BX
                JMP     SELTFX
SELTF7:         MOV     CL,4
                SHR     BX,CL
SELTFX:         DEC     CH
                CALL    BAKSPC
                JMP     SELTF2
SELTF8:         CMP     CH,0
                JZ      SELTFA
```

```
             MOV    DL,CH
             SUB    CX,CX
             CMP    DH,0
             JZ     SELTF9
             CALL   BCDTOB
             SUB    DL,DH
             CMP    DL,1
             JZ     SELTFY
             MOV    AX,10
             JMP    SELTFZ
SELTFY:      MOV    AX,100
SELTFZ:      MUL    BL
             MOV    CX,AX
             POP    BX
SELTF9:      CALL   BCDTOB
             MOV    AX,1000
             MUL    BX
             ADD    AX,CX
             ADC    DX,0
             MOV    [SI+7],DL
             MOV    [SI+5],AX
SELTFA:      MOV    AX,600H
             MOV    BX,700H
             MOV    CX,0C00H
             MOV    DX,0C4FH
             INT    10H
             JMP    SELTNX
SELCTR:      MOV    SI,OFFSET CTRM
             MOV    SCNR,3730H
             CALL   ASKNUM
             JNC    SELCRT
             MOV    DX,OFFSET F1MV
             MOV    AH,9
             INT    21H
             MOV    DX,OFFSET F10R
             INT    21H
             MOV    SI,BX
             SHL    SI,1
SELCNX:      MOV    SCNM+4,30H
             CALL   SCRNUM
             MOV    DX,309H
             SUB    BX,BX
             MOV    AH,2
             INT    10H
             MOV    AX,CTRS[SI]
             SUB    DX,DX
             MOV    CX,10000
             DIV    CX
             ADD    AL,48
             MOV    VALM,AL
             MOV    DI,OFFSET VALM+1
             MOV    BX,DX
             CALL   BINTOB
             MOV    AX,BX
             MOV    AL,AH
             CALL   BUILD9
             ADD    DI,2
             MOV    AX,BX
             MOV    AH,AL
             CALL   BUILD9
```

```
              MOV    DI,OFFSET VALM
              MOV    DX,DI
SELCL1:       CMP    BYTE PTR [DI],48
              JNZ    SELCL2
              MOV    BYTE PTR [DI],32
              INC    DI
              CMP    DI,OFFSET VALM+4
              JNZ    SELCL1
SELCL2:       MOV    AH,9
              INT    21H
SELCGK:       CALL   GETKEY
              JNC    SELCGK
              CMP    AL,59
              JZ     SELCF1
              CMP    AL,68
              JNZ    SELCGK
SELCRT:       JMP    UAMENU
SELCF1:       MOV    SCNM+4,31H
              CALL   SCRNUM
              MOV    DX,0C00H
              SUB    BX,BX
              MOV    AH,2
              INT    10H
              MOV    DX,OFFSET XMCR
              MOV    AH,9
              INT    21H
              SUB    BX,BX
              SUB    CX,CX
              SUB    DX,DX
SELCF2:       CALL   GETKEY
              JC     SELCF2
              CMP    AL,8
              JZ     SELCF5
              CMP    AL,13
              JZ     SELCF3
              CMP    CH,5
              JNC    SELCF2
              CMP    AL,48
              JC     SELCF2
              CMP    AL,58
              JNC    SELCF2
              MOV    DL,AL
              MOV    AH,2
              INT    21H
              SUB    AL,48
              CMP    CH,4
              JNZ    SELCFA
              CMP    BX,3276H
              JC     SELCFB
              JNZ    SELCFC
              CMP    AL,8
              JNC    SELCFC
SELCFB:       MOV    DH,BH
              MOV    CL,4
              SHR    DH,CL
SELCFA:       MOV    CL,4
              SHL    BX,CL
              OR     BL,AL
              INC    CH
              JMP    SELCF2
```

```
SELCFC:     CALL    BAKSPC
            JMP     SELCF2
SELCF3:     CMP     CH,0
            JZ      SELCF4
            CALL    BCDTOB
            MOV     CX,10000
            SUB     AX,AX
            MOV     AL,DH
            MUL     CX
            ADD     AX,BX
            MOV     CTRS[SI],AX
SELCF4:     MOV     AX,600H
            MOV     BX,700H
            MOV     CX,0C00H
            MOV     DX,0C4FH
            INT     10H
            JMP     SELCNX
SELCF5:     CMP     CH,0
            JZ      SELCF6
            DEC     CH
            MOV     CL,4
            SHR     BX,CL
            CALL    BAKSPC
            CMP     CH,4
            JNZ     SELCF6
            MOV     CL,4
            SHL     DH,CL
            OR      BH,DH
            SUB     DH,DH
SELCF6:     JMP     SELCF2
SELREG:     MOV     SI,OFFSET REGM
            MOV     SCNR,3830H
            CALL    ASKNUM
            JNC     SELRRT
            MOV     DX,OFFSET F1MV
            MOV     AH,9
            INT     21H
            MOV     DX,OFFSET F1OR
            INT     21H
            MOV     SI,BX
            SHL     SI,1
SELRNX:     MOV     SCNM+4,30H
            CALL    SCRNUM
            MOV     DX,309H
            SUB     BX,BX
            MOV     AH,2
            INT     10H
            MOV     BX,REGS[SI]
            MOV     VALM,48
            MOV     DI,OFFSET VALM+1
            CALL    BINTOB
            MOV     AX,BX
            MOV     AL,AH
            CALL    BUILD9
            ADD     DI,2
            MOV     AX,BX
            MOV     AH,AL
            CALL    BUILD9
            MOV     DI,OFFSET VALM
            MOV     DX,DI
```

```
SELRL1:  CMP   BYTE PTR [DI],48
         JNZ   SELRL2
         MOV   BYTE PTR [DI],32
         INC   DI
         CMP   DI,OFFSET VALM+4
         JNZ   SELRL1
SELRL2:  MOV   AH,9
         INT   21H
SELRGK:  CALL  GETKEY
         JNC   SELRGK
         CMP   AL,59
         JZ    SELRF1
         CMP   AL,68
         JNZ   SELRGK
SELRRT:  JMP   UAMENU
SELRF1:  MOV   SCNM+4,31H
         CALL  SCRNUM
         MOV   DX,0C00H
         SUB   BX,BX
         MOV   AH,2
         INT   10H
         MOV   DX,OFFSET XMCR
         MOV   AH,9
         INT   21H
         SUB   BX,BX
         SUB   CX,CX
SELRF2:  CALL  GETKEY
         JC    SELRF2
         CMP   AL,8
         JZ    SELRF5
         CMP   AL,13
         JZ    SELRF3
         CMP   CH,4
         JNC   SELRF2
         CMP   AL,48
         JC    SELRF2
         CMP   AL,58
         JNC   SELRF2
         MOV   DL,AL
         MOV   AH,2
         INT   21H
         SUB   AL,48
         MOV   CL,4
         SHL   BX,CL
         OR    BL,AL
         INC   CH
         JMP   SELRF2
SELRF3:  CMP   CH,0
         JZ    SELRF4
         CALL  BCDTOB
         MOV   REGS[SI],BX
SELRF4:  MOV   AX,600H
         MOV   BX,700H
         MOV   CX,0C00H
         MOV   DX,0C4FH
         INT   10H
         JMP   SELRNX
SELRF5:  CMP   CH,0
         JZ    SELRF2
```

```
            DEC    CH
            MOV    CL,4
            SHR    BX,CL
            CALL   BAKSPC
            JMP    SELRF2
DBUGGR      ENDP
;
BUILD1      PROC   NEAR
            SUB    AX,AX
            MOV    AL,CRFL
            MOV    CX,15
            MOV    BX,CX
            MUL    BL
            MOV    SI,OFFSET FNMS
            ADD    SI,AX
            MOV    DI,OFFSET FLN1
            REP    MOVSB
            SUB    AX,AX
            MOV    AL,CRFL
            SHL    AX,1
            MOV    DI,AX
            MOV    SI,ADRS[DI]
            MOV    BX,OBJW[SI]
            SUB    DX,DX
            MOV    DL,OBJC[SI+2]
            SUB    DL,10
            MOV    DI,OFFSET BLK1
            CALL   BUILD4
            SUB    AX,AX
            MOV    AL,CRFL
            MOV    DI,AX
            TEST   ENFR[DI],1
            JZ     BUILD2
            MOV    BLK1+8,68
            JMP    BUILD5
BUILD2:     TEST   ENFR[DI],2
            JZ     BUILD3
            MOV    BLK1+8,70
            JMP    BUILD5
BUILD3:     MOV    BLK1+8,32
BUILD5:     MOV    CX,3
            DIV    CL
            MOV    BH,AH
            CMP    AH,0
            JZ     BUILD6
            MOV    DX,OFFSET LIN1
            JMP    BUILD7
BUILD6:     MOV    DX,OFFSET FLN1
BUILD7:     MOV    AH,9
            INT    21H
            CMP    BH,2
            JNZ    BUILD8
            MOV    DX,OFFSET CRLF
            INT    21H
BUILD8:     RET
BUILD1      ENDP
;
BUILD4      PROC   NEAR
            CALL   BINTOB
            MOV    AX,BX
```

```
            MOV     AL,AH
            CALL    BUILD9
            ADD     DI,2
            MOV     AX,BX
            MOV     AH,AL
            CALL    BUILD9
            MOV     BYTE PTR [DI+2],46
            ADD     DI,3
            MOV     BX,DX
            CALL    BINTOB
            MOV     AX,BX
            MOV     AH,AL
            CALL    BUILD9
            SUB     DI,5
BILD41:     CMP     BYTE PTR [DI],48
            JNZ     BILD42
            MOV     BYTE PTR [DI],32
            INC     DI
            JMP     BILD41
BILD42:     RET
BUILD4      ENDP
;
BUILD9      PROC    NEAR
            MOV     CX,4
            SHR     AH,CL
            OR      AH,48
            MOV     [DI],AH
            AND     AL,15
            OR      AL,48
            MOV     [DI+1],AL
            RET
BUILD9      ENDP
;
CLRSCR      PROC    NEAR
            MOV     AX,600H
            MOV     BX,700H
            SUB     CX,CX
            MOV     DX,184FH
            INT     10H
            MOV     BX,SCNR
            MOV     SCNM+3,BH
            MOV     SCNM+4,BL
            CALL    SCRNUM
            SUB     DX,DX
            SUB     BX,BX
            MOV     AH,2
            INT     10H
            MOV     DX,OFFSET HDRO
            MOV     AH,9
            INT     21H
            RET
CLRSCR      ENDP
;
SCRNUM      PROC    NEAR
            SUB     BX,BX
            MOV     DX,04AH
            MOV     AH,2
            INT     10H
            MOV     DX,OFFSET SCNM
            MOV     AH,9
```

```
                INT     21H
                RET
SCRNUM          ENDP
;
ASKNUM          PROC    NEAR
                MOV     DI,OFFSET XTYP
                MOV     CX,8
                REP     MOVSB
                MOV     SCNM+4,35H
                CALL    SCRNUM
ASKNM0:         SUB     BX,BX
                MOV     DX,1400H
                MOV     AH,2
                INT     10H
                MOV     DX,OFFSET XNUM
                MOV     AH,9
                INT     21H
                SUB     BX,BX
                SUB     CX,CX
ASKNM1:         CALL    GETKEY
                JC      ASKNM1
                CMP     AL,8
                JZ      ASKNM4
                CMP     AL,13
                JZ      ASKNM2
                CMP     CH,3
                JNC     ASKNM1
                CMP     AL,48
                JC      ASKNM1
                CMP     AL,58
                JNC     ASKNM1
                MOV     DL,AL
                MOV     AH,2
                INT     21H
                SUB     AL,48
                MOV     CL,4
                SHL     BX,CL
                OR      BL,AL
                INC     CH
                JMP     ASKNM1
ASKNM2:         CMP     CH,0
                JZ      ASKNM3
                PUSH    BX
                CMP     BX,512H
                JNC     ASKNM5
                CALL    CLRSCR
                POP     BX
                MOV     AX,BX
                MOV     AL,AH
                MOV     DI,OFFSET LIN3+2
                CALL    BUILD9
                MOV     AX,BX
                MOV     AH,AL
                ADD     DI,2
                CALL    BUILD9
                MOV     AL,XTYP
                MOV     LIN3+1,AL
                MOV     LIN3+2,45
                MOV     DX,OFFSET LIN3
                MOV     AH,9
                INT     21H
```

```
                CALL    BCDTOB
                STC
                RET
ASKNM3:         CLC
                RET
ASKNM4:         CMP     CH,0
                JZ      ASKNM1
                DEC     CH
                MOV     CL,4
                SHR     BX,CL
                CALL    BAKSPC
                JMP     ASKNM1
ASKNM5:         MOV     DX,OFFSET YNUM
                MOV     AH,9
                INT     21H
                SUB     BX,BX
                MOV     DX,141EH
                MOV     AH,2
                INT     10H
                POP     BX
                JMP     ASKNM1
ASKNUM          ENDP
;
GETKEY          PROC    NEAR
                MOV     AH,7
                INT     21H
                CMP     AL,0
                JNZ     GETKY9
                INT     21H
                STC
GETKY9:         RET
GETKEY          ENDP
;
BAKSPC          PROC    NEAR
                PUSH    BX
                PUSH    CX
                PUSH    DX
                SUB     BX,BX
                MOV     AH,3
                INT     10H
                DEC     DL
                MOV     AH,2
                INT     10H
                MOV     CX,1
                MOV     AX,0A20H
                INT     10H
                MOV     AH,2
                INT     10H
                POP     DX
                POP     CX
                POP     BX
                RET
BAKSPC          ENDP
;
ABDEFN          PROC    NEAR
                PUSH    BX
                AND     BX,15
                INC     BX
                CMP     BX,9
                JNA     ABDEF1
```

```
            SUB     BX,10
            ADD     BX,256
ABDEF1:     ADD     BX,3030H
            MOV     ABIO+6,BL
            MOV     ABIO+5,BH
            MOV     ABIO+4,45
            SUB     BX,BX
            MOV     BL,ABIO
            ADD     BX,OFFSET PRTTBL
            SHR     AX,1
            SHR     AX,1
            SHR     AX,1
            AND     AX,0FEH
            ADD     BX,AX
            MOV     DX,[BX]
            TEST    DX,08000H
            JNZ     ABNDEF
            MOV     AX,DX
            MOV     CX,5
            SHR     AX,CL
            AND     AX,15
            INC     AX
            CMP     AX,9
            JNA     ABDEF2
            SUB     AX,10
            ADD     AX,256
ABDEF2:     ADD     AX,3030H
            MOV     ABIO+3,AL
            MOV     ABIO+2,AH
            MOV     ABIO+1,45
            MOV     AX,DX
            MOV     CX,9
            SHR     AX,CL
            ADD     AX,49
            MOV     ABIO,AL
            JMP     ABDWRT
ABNDEF:     MOV     ABIO+3,63
            MOV     ABIO+2,63
            MOV     ABIO+1,45
            MOV     ABIO,63
ABDWRT:     MOV     DX,314H
            SUB     BX,BX
            MOV     AH,2
            INT     10H
            MOV     DX,OFFSET ABLN
            MOV     AH,9
            INT     21H
            POP     BX
            RET
ABDEFN      ENDP
;
;
DIAGST      PROC    NEAR
            MOV     BX,OFFSET OBJC
            MOV     RAMLEN,BX
            MOV     RAMOFF,0
            MOV     CX,FLSLEN
            SUB     AX,AX
            MOV     FLSOFF,AX
            MOV     FLSCKB,AX
```

```
              CALL    CHKSUM
              MOV     FLSCKS,AX
              MOV     BX,OFFSET FPSTRT
              MOV     CX,OFFSET FPENDS
              SUB     CX,BX
              MOV     PGMLEN,CX
              SUB     AX,AX
              MOV     PGMOFF,AX
              MOV     PGMCKB,AX
              PUSH    DS
              PUSH    CS
              POP     DS
              CALL    CHKSUM
              POP     DS
              MOV     PGMCKS,AX
              RET
DIAGST        ENDP
DIAGRN        PROC    NEAR
              MOV     CX,550
              MOV     BX,RAMOFF
              CLI
              MOV     AL,[BX]
              MOV     BYTE PTR [BX],0AAH
              CMP     BYTE PTR [BX],0AAH
              JNZ     DGRAM9
              MOV     BYTE PTR [BX],055H
              CMP     BYTE PTR [BX],055H
              JNZ     DGRAM9
              MOV     [BX],AL
              STI
              INC     BX
              CMP     BX,RAMLEN
              JL      DGRAM1
              SUB     BX,BX
DGRAM1:       MOV     RAMOFF,BX
              INC     CX
              MOV     BX,OFFSET OBJC
              ADD     BX,FLSOFF
              MOV     AX,FLSCKB
              ADD     AL,[BX]
              JNB     DGFLS0
              ADD     AH,1
DGFLS0:       MOV     FLSCKB,AX
              MOV     BX,FLSOFF
              INC     BX
              CMP     BX,FLSLEN
              JNZ     DGFLS1
              CMP     AX,FLSCKS
              JNZ     DGROM9
              SUB     BX,BX
              MOV     FLSCKB,BX
DGFLS1:       MOV     FLSOFF,BX
              INC     CX
              MOV     BX,OFFSET FPSTRT
              ADD     BX,PGMOFF
              MOV     AX,PGMCKB
              PUSH    DS
              PUSH    CS
              POP     DS
              ADD     AL,[BX]
```

```
              JNB     DGPGM0
              ADD     AH,1
DGPGM0:       POP     DS
              MOV     PGMCKB,AX
              MOV     BX,PGMOFF
              INC     BX
              CMP     BX,PGMLEN
              JNZ     DGPGM1
              CMP     AX,PGMCKS
              JNZ     DGROM9
              SUB     BX,BX
              MOV     PGMCKB,BX
DGPGM1:       MOV     PGMOFF,BX
              RET
DGRAM9:       STI
              MOV     [BX],AL
DGROM9:       POP     AX
              ADD     AX,3
              PUSH    AX
              MOV     AX,CX
              RET
DIAGRN        ENDP
CHKSUM        PROC    NEAR
CKSUM1:       ADD     AL,[BX]
              JNB     CKSUM2
              ADD     AH,1
CKSUM2:       INC     BX
              LOOP    CKSUM1
              RET
CHKSUM        ENDP
;
FPENDS        EQU     THIS BYTE
;
FLOPROC       ENDS
              END
```

We claim:

1. A machine programming and control system including means for generating, editing, and displaying a continuous multi-block flow chart representing a program for controlling the operations of a machine, continuous and contiguous portions of said flow chart containing more than one flow chart block being displayed; means for directly compiling said programs from said flow chart; and, means for executing the compiled program represented by said flow chart such that said machine is controlled in accordance with a displayed flow chart, whereby generation and editing of said flow chart is facilitated by the display of multiple, continuous, and contiguous flow chart blocks.

2. The system of claim 1 and further including means during a run-time execution of said program for interrupting said execution and for displaying that portion of said flow chart which corresponds to the section of the program which was execution at the time of said interruption, thereby to permit easy alteration or debugging of the program represented by said flow chart.

3. The system of claim 2 and further including means for numbering the flow chart blocks, and wherein said interrupting means includes mea s for displaying the number of the flow chart block which corresponds to the section of the program executing at the time of said interruption.

4. In a machine programming and control system having a program for controlling a machine, which program is defined by a multi-block flow chart displayed on a monitor and which program is executed during a run-time execution, an improved debugging system including means active on a run-time execution interrupt for permitting changing of at least one block of said flowchart, said means including means for displaying at least a portion of said flow chart which includes the block of said flow chart which corresponds to the section of the program which is executing at the time of the execution interrupt.

5. The system of claim 4 and further including means for rerunning a program which has been altered by changing of a flow chart block, said rerunning means including a single-scan means to rerun the altered program without recompiling.

6. The system of claim 4 wherein the display means comprises means for highlighting the flow chart block corresponding to the section of the program which is executing at the time of interruption.

7. The system of claim 4 and further including means for highlighting the flow path of flow chart blocks leading to the flow chart block corresponding to the section of the program which is executing at the time of said interruption.

8. A formatting system for use in the execution of a flow chart, including means for displaying a format block and corresponding numbers; means for compiling and executing the program represented by said flow chart; means coupled to said display means for inserting and displaying a flow chart block number before all other format blocks; and means for both ignoring said block number during run-time execution, and for calling up and displaying said block number upon interruption of run-time execution, thereby to identify the particular flow chart block which corresponds to the section of the program which is executing at the time of interrupt.

* * * * *